United States Patent
Sajda et al.

(10) Patent No.: US 12,511,691 B2
(45) Date of Patent: Dec. 30, 2025

(54) OPTIMIZATION OF TRADING PERFORMANCE USING BOTH BRAIN STATE MODELS AND OPERATIONAL PERFORMANCE MODELS

(71) Applicant: Optios, Inc., San Diego, CA (US)

(72) Inventors: Paul Sajda, New York, NY (US); Jacek Dmochowski, Montclair, NJ (US); Pawel Gucik, Brooklyn, NY (US); Ben Londergan, Chicago, IL (US); Paul DeGuzman, Valley Cottage, NY (US); Sam DeWitt, New York, NY (US)

(73) Assignee: Optios, Inc., Greenville, SC (US)

( * ) Notice: Subject to any disclaimer, the term of this patent is extended or adjusted under 35 U.S.C. 154(b) by 0 days.

(21) Appl. No.: 18/343,584

(22) Filed: Jun. 28, 2023

(65) Prior Publication Data

US 2024/0005398 A1 Jan. 4, 2024

Related U.S. Application Data

(63) Continuation-in-part of application No. PCT/US2022/032724, filed on Jun. 8, 2022.
(Continued)

(51) Int. Cl.
*G06Q 40/04* (2012.01)

(52) U.S. Cl.
CPC .................................. *G06Q 40/04* (2013.01)

(58) Field of Classification Search
CPC .................................................... G06Q 40/04
See application file for complete search history.

(56) References Cited

U.S. PATENT DOCUMENTS 10,835,147 B1 11/2020 Parra
2011/0105859 A1 5/2011 Popovic et al.
(Continued)

FOREIGN PATENT DOCUMENTS

WO 2021242691 A2 12/2021

OTHER PUBLICATIONS

Torres, et al., in "Machine Learning Analysis of EEG Measurements of Stock Trading," in Advances in Artificial Intelligence, Software and Systems Engineering, from Spring, Jul. 4, 2020 (Year: 2020).*
(Continued)

*Primary Examiner* — Mike Anderson
*Assistant Examiner* — Brandon M Duck
(74) *Attorney, Agent, or Firm* — Miller Johnson

(57) ABSTRACT

A method includes generating a trading performance model for a trading activity involving a set of decisions by a set of expert traders. The trading performance model includes a set of input data sets, a set of data processing workflows operating on the input data sets, and a set of trading decision outputs resulting from interaction of the expert traders with a user interface representing the trading performance model. The method includes generating a brain state model representing a sequential set of brain states of the set of expert traders that characterize brain states measured during the interactions of the expert traders with the user interface representing the trading performance model, assessing the quality of the trading decisions, determining a preferred pattern of trader brain state sequences, and modifying a subsequent trading activity.

18 Claims, 77 Drawing Sheets

Related U.S. Application Data

(60) Provisional application No. 63/359,199, filed on Jul. 7, 2022, provisional application No. 63/356,308, filed on Jun. 28, 2022, provisional application No. 63/347,980, filed on Jun. 1, 2022, provisional application No. 63/332,125, filed on Apr. 18, 2022, provisional application No. 63/329,349, filed on Apr. 8, 2022, provisional application No. 63/280,495, filed on Nov. 17, 2021, provisional application No. 63/208,159, filed on Jun. 8, 2021.

(56) References Cited

U.S. PATENT DOCUMENTS

| | | | |
|---|---|---|---|
| 2016/0012530 A1* | 1/2016 | Gardner | G06Q 40/04 |
| 2016/0235324 A1 | 8/2016 | Mershin et al. | |
| 2020/0008725 A1* | 1/2020 | Bach | A61B 5/16 |
| 2020/0184496 A1* | 6/2020 | Medanic | G06Q 30/02 |

OTHER PUBLICATIONS

WIPO, International Search Report and Written Opinion for PCT/US2022/032724; dated Sep. 23, 2022; 22 pages.

\* cited by examiner

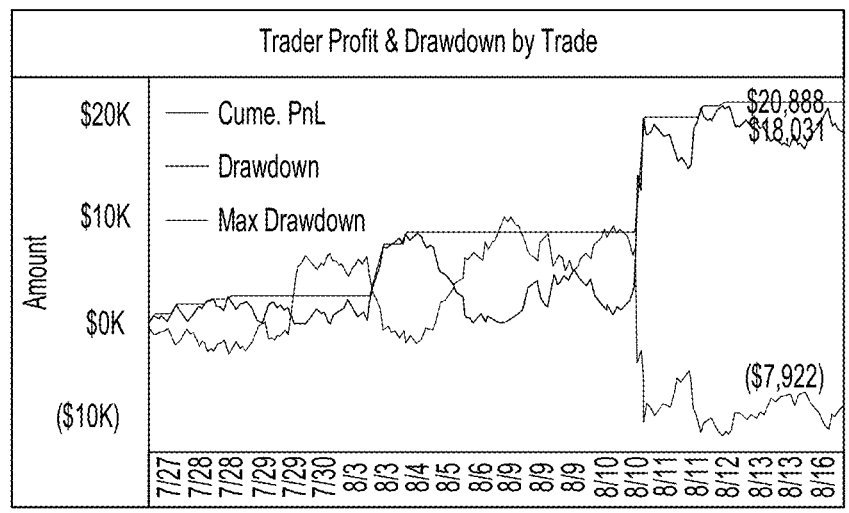
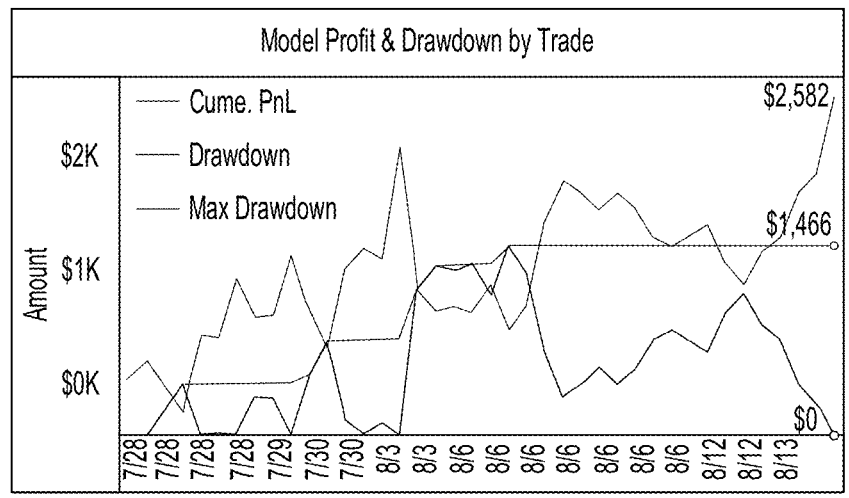
FIG. 51C

Today's Performance

| Status | Recommendation | # Trades | % of Trades | Bet Size | Pn L | Total Return % | Win Rate | WRI | Avg. Pred. |
|---|---|---|---|---|---|---|---|---|---|
| Closed | Recommended | 2 | 14% | $42K | $706 | 1.67% | 100% | 28.6% | 1.00 |
|  | Not Recommended | 12 | 86% | $330K | $829 | 0.25% | 66.7% | -4.8% | 0.30 |
| Grand Total |  | 14 | 100% | $372K | $1,535 | 0.41% | 71.4% | 0.0% | 0.40 |

Last 7 Day's Performance

| Status | Recommendation | # Trades | % of Trades | Bet Size | Pn L | Total Return % | Win Rate | WRI | Avg. Pred. |
|---|---|---|---|---|---|---|---|---|---|
| Closed | Recommended | 7 | 4% | $168K | $946 | 0.56% | 71.4% | 21.7% | 0.95 |
|  | Not Recommended | 170 | 96% | $4,571K | ($16,663) | -0.36% | 48.8% | -0.9% | 0.36 |
| Grand Total |  | 177 | 100% | $4,739K | ($15,717) | -0.33% | 49.7% | 0.0% | 0.38 |

FIG. 52A

Overall Performance

| Status | Recommendation | # Trades | % of Trades | Bet Size | PnL | Total Return % | Win Rate | WRI | Avg. Pred. |
|---|---|---|---|---|---|---|---|---|---|
| Closed | Recommended | 47 | 8% | $1,203K | $2,582 | 0.21% | 51.1% | 3.7% | 0.95 |
|  | Not Recommended | 548 | 92% | $13,734K | ($10,504) | -0.08% | 47.1% | -0.3% | 0.39 |
| Grand Total |  | 595 | 100% | $14,937K | ($7,922) | -0.05% | 47.4% | 0.0% | 0.43 |

Excluded Bet Size Overall Performance

| Status | Recommendation | # Trades | % of Trades | Bet Size | PnL | Total Return % | Win Rate | WRI | Avg. Pred. |
|---|---|---|---|---|---|---|---|---|---|
| Closed | Recommended | 2 | 11% | $641K | $1,604 | 0.25% | 100% | 57.9% | 0.96 |
|  | Not Recommended | 17 | 89% | $2,451K | ($1,539) | -0.06% | 35.3% | -6.8% | 0.42 |
| Grand Total |  | 19 | 100% | $3,092K | ($65) | 0.00% | 42.1% | 0.0% | 0.47 |

FIG. 52B

| Last 7 Day's Top 10 | | | | |
|---|---|---|---|---|
| Symbol-Side | Total Ret.. | Bet Size | Pn L | Prediction |
| DOCS-SELL | 3.05% | $8,156 | $248 | 0.91 |
| VXX-SELL | 1.82% | $30,953 | $562 | 1.00 |
| VXX-SELL | 1.28% | $11,256 | $144 | 1.00 |
| COIN-SELL | 0.84% | $13,117 | $111 | 0.95 |
| TSLA-BUY | 0.49% | $72,540 | $353 | 0.91 |
| Grand Total | 1.04% | $136,021 | $1,417 | * |

| Last 7 Day's Bottom 10 | | | | |
|---|---|---|---|---|
| Symbol-Side | Total Ret.. | Bet Size | Pn L | Prediction |
| MRNA-SELL | -1.60% | $19,493 | ($312) | 0.97 |
| PLTR-SELL | -1.29% | $12,410 | ($160) | 0.92 |
| Grand Total | -1.48% | $31,903 | ($472) | * |

FIG. 52C

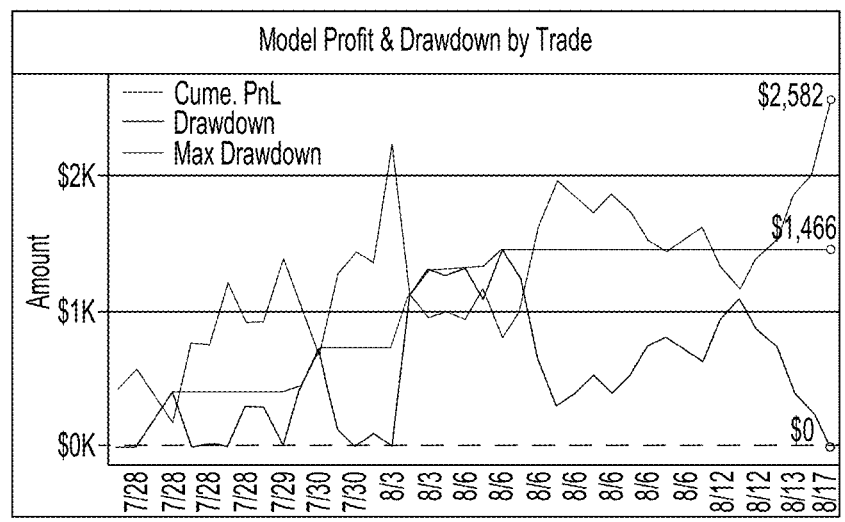
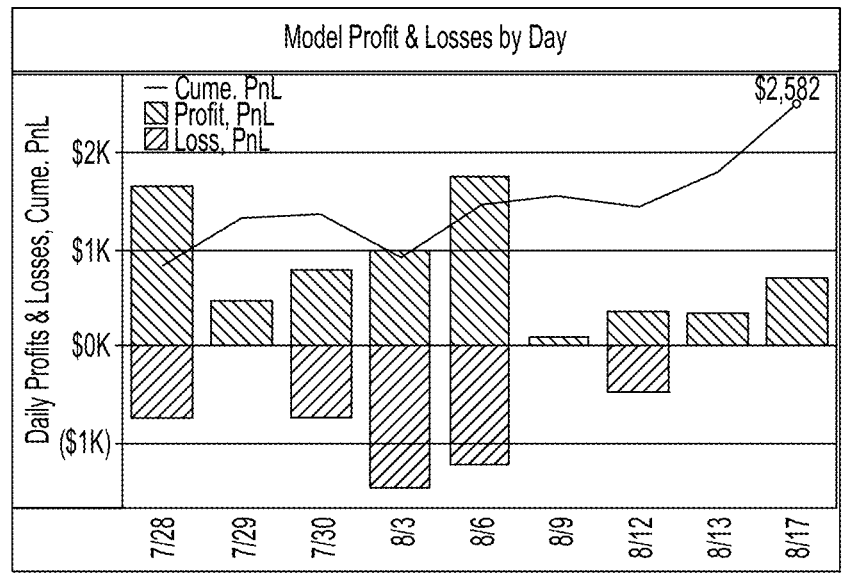
FIG. 54B

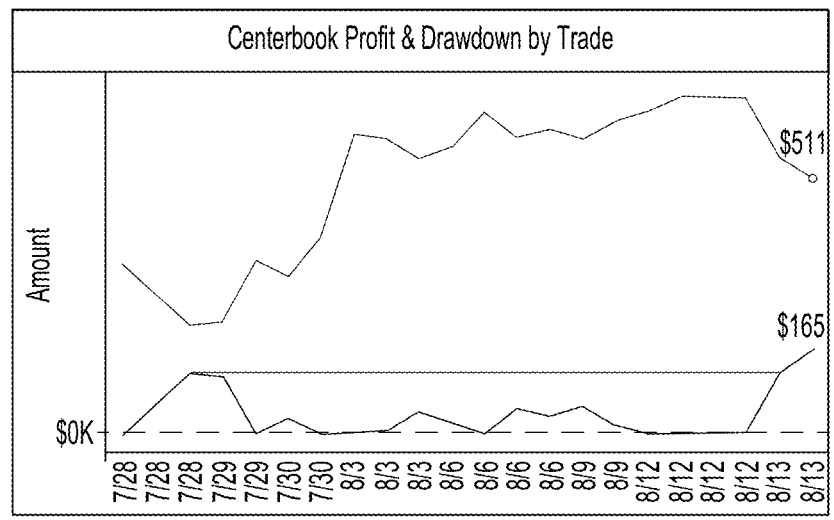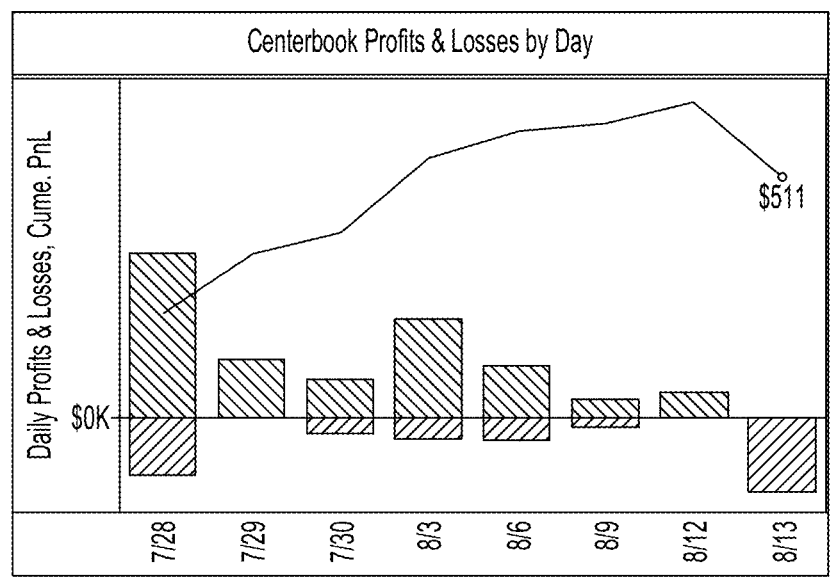
FIG. 54C

OPTIMIZATION OF TRADING PERFORMANCE USING BOTH BRAIN STATE MODELS AND OPERATIONAL PERFORMANCE MODELS

CROSS-REFERENCE TO RELATED APPLICATIONS

This application claims the benefit of U.S. Provisional App. Nos. 63/359,199 filed Jul. 7, 2022 and 63/356,308 filed Jun. 28, 2022. This application is a continuation-in-part of PCT App. No. PCT/US2022/032724 filed Jun. 8, 2022, which claims the benefit of U.S. Provisional App. Nos. 63/347,980 filed Jun. 1, 2022, 63/332,125 filed Apr. 18, 2022, 63/329,349 filed Apr. 8, 2022, 63/280,495 filed Nov. 17, 2021, 63/208,159 filed Jun. 8, 2021. The entire disclosures of the above applications are incorporated by reference.

FIELD

The present disclosure relates to brain-machine interfaces and more particularly to feedback systems inputting information derived from signals output by brain-machine interfaces.

BACKGROUND

The adult human brain has as many as 100 billion neurons. Each neuron is connected to up to 10,000 other neurons, implying as many as a quadrillion synaptic connections. The adult brain is also "plastic." It can be profoundly re-wired by experience, learning, and training. In the past decade, scientists have begun learning how to proactively "rewire" the brain. Efforts, with varying degrees of success, have been made to accelerate skill acquisition, enhance language learning, and delay the onset of cognitive decline. Innovations are needed to enable people to more effectively and quickly improve their decision-making, perception, cognition and motor performance.

In the past decade, the Defense Advanced Research Projects Agency (DARPA) conducted a study showing that the brains of marksmanship experts look different from those of novices when they are "in the zone." They also demonstrated a neurofeedback program where novices rapidly learned to create the expert brain state in marksmanship, doubling their accuracy within just a few training sessions. Other research has shown that visual processing speed is directly related to how many assists and steals a player generates in basketball, passing in soccer, and other sports-specific improvements. Further research has found relationships between high testosterone, antecedent-focused emotional regulation strategies, high-frequency heart rate variability and higher returns.

Relatedly, there has been interest in what factors influence traders in decision-making. In 2007, J. M. Coates and J. Herbert published an article in the Apr. 22, 2008 issue (vol. 105, no. 16, at pages 6167-6172) of the Proceedings of the National Academy of the Sciences of the United States of America (PNAS) entitled "Endogenous steroids and financial risk taking on a London trading floor," which is herein incorporated by reference. The article reported the findings of a study of endogenous steroids taken from a group of male traders in real working conditions in London. The study found that higher testosterone may contribute to economic return.

In 2011, Mark Fenton-O'Creevy, Emma Soane, Nigel Nicholson, and Paul Willman published an article in the Jul. 26, 2010 issue (32, 1044-1061) of the Journal of Organizational Behavior entitled "Thinking, feeling and deciding: The influence of emotions on the decision making and performance of traders," which article is herein incorporated by reference. The article reported on the influence of emotions in decision making in traders in four City of London investment banks. The investigation found that traders deploying antecedent-focused emotional regulation strategies performed better than those employing primarily response-focused strategies.

In 2012, Mark Fenton-O'Creevy, Jeffrey Lins, Shalini Vohra, Daniel Richards, Gareth Davies and Kristina Schaaff published an article in the Journal of Neuroscience, Psychology and Economics, 5(4) pp. 227-237 entitled "Emotional regulation and trader expertise: heart rate variability on the trading floor," which article is herein incorporated by reference. The article described a psychophysiological study of the emotion regulation of investment bank traders. The study found a significant inverse relationship between high-frequency heart rate variability (HF HRV) and market volatility and a positive relationship between HF HRV and trader experience.

On Feb. 19, 2019, Josef Faller, Jennifer Cummings, Sameer Saproo and Paul Sajda published an article in the PNAS entitled "Regulation of arousal via online neurofeedback improves human performance in a demanding sensory-motor task," which is herein incorporated by reference. The study demonstrated that online neurofeedback could shift an individual's arousal from the right side of the "Yerkes-Dodson curve" (which posits an inverse-U relationship between arousal and task performance) to the left toward a state of improved performance. Furthermore, the study demonstrated that simultaneous measurements of pupil dilation and heart-rate variability showed that neurofeedback reduced arousal, indicating that neurofeedback could be used to shift arousal state and increase task performance.

There is a need for further research and development into relationships between brain states and performance across a variety of fields. In particular, there is a need to discover relationships that yield improved sensory and feedback systems, which requires further research on ways to characterize and recognize physiological states and brain states that correlate with different levels of performance. There is also a need for improved methods and systems for data-based intervention and training programs to enable humans to reach greater performance outcomes and levels of achievements. There are significant challenges in designing systems and methods that can practically and efficiently harness this knowledge into accelerated learning programs and better productivity and performance.

SUMMARY

A computer-implemented method includes monitoring a brain state at a neurometric interface, and receiving a first signal from the neurometric interface at a first computer system. The first signal is indicative of the brain state. The method also includes initiating a request at a second computer system, detecting the initial request at the second computer system, and sending a second signal from the second computer system to the first computer system. The second signal includes a time that the request was initiated. The method also includes receiving the second signal at the first computer system, and capturing a snapshot of the first signal. The snapshot corresponds to the time the request was initiated. The method further includes transforming the snapshot of the first signal into a brain state score.

In other features, the request includes a financial instrument to be purchased, a quantity of the financial instrument to be purchased, and a purchase price of the financial instrument. In other features, the sequence of events is executed at the second computer system. In other features, the sequence of events is executed at the first computer system. In other features, the sequence of events includes determining whether the brain state score meets or exceeds a threshold. In response to the brain state score meeting or exceeding the threshold, the method includes determining whether the financial instrument is in a bin. In response to determining the financial instrument is in the bin, the method includes automatically adjusting the request to increase the quantity of the financial instrument to be purchased.

In other features, the sequence of events includes determining whether the brain state score meets or exceeds a threshold. In response to the brain state score meeting or exceeding the threshold, the method includes determining whether the financial instrument is in a bin. In response to determining that the financial instrument is in the bin, the method includes initiating a second request. The second request includes the financial instrument to be purchased, a second quantity of the financial instrument to be purchased, and the purchase price of the financial instrument.

In other features, the sequence of events includes determining whether the brain state score meets or exceeds a threshold. In response to the brain state score meeting or exceeding the threshold, the method includes determining whether the financial instrument is in a bin. In response to determining that the financial instrument is in the bin, the method includes transforming a user interface to display an element. The element includes the financial instrument to be purchased, a second quantity of the financial instrument to be purchased, and the purchase price of the financial instrument.

In other features, the sequence of events includes determining whether the brain state score meets or exceeds a threshold. In response to the brain state score meeting or exceeding the threshold, the method includes determining whether the financial instrument is in a bin. In response to determining the financial instrument is in the bin, the method includes automatically adjusting the request to increase the quantity of the financial instrument to be purchased by a first amount. In response to determining that the financial instrument is not in the bin, the method includes automatically adjusting the request to increase the quantity of the financial instrument to be purchased by a second amount. The first amount is greater than the second amount.

In other features, the sequence of events includes determining whether the brain state score meets or exceeds a threshold. In response to the brain state score meeting or exceeding the threshold, the method includes determining whether the financial instrument is in a bin. In response to determining that the financial instrument is in the bin, the method includes initiating a second request. The second request includes the financial instrument to be purchased, a second quantity of the financial instrument to be purchased, and the purchase price of the financial instrument. In response to determining that the financial instrument is not in the bin, the method includes initiating a third request. The third request includes the financial instrument to be purchased, a third quantity of the financial instrument to be purchased, and the purchase price of the financial instrument. The second quantity is greater than the third quantity.

In other features, the sequence of events includes determining whether the brain state score meets or exceeds a threshold. In response to determining that the brain state score meets or exceeds the threshold, the method includes determining whether the financial instrument is in a bin. In response to determining that the financial instrument is in the bin, the method includes transforming a user interface to display a first element. The first element includes the financial instrument to be purchased, a second quantity of the financial instrument to be purchased, and the purchase price of the financial instrument. In response to determining that the financial instrument is not in the bin, the method includes transforming the user interface to display a second element. The second element includes the financial instrument to be purchased, a third quantity of the financial instrument to be purchased, and the purchase price of the financial instrument. The second quantity is greater than the third quantity.

In other features, the sequence of events includes capturing the performance of the financial instrument, and training a machine learning model using the request, the brain state score, and the captured performance of the financial instrument. In other features, the sequence of events includes determining whether the financial instrument was purchased according to the request. In response to determining that the financial instrument was purchased according to the request, the method includes capturing the performance of the financial instrument, and training a machine learning model using the request, the brain state score, and the captured performance of the financial instrument.

A computer-implemented method includes monitoring a brain state at a neurometric interface, receiving a first signal from the neurometric interface indicative of the brain state at a first computer system, initiating a request at a second computer system, detecting the initiated request at the second computer system, sending a second signal including a time the request was initiated from the second computer system to the first computer system, receiving the second signal at the first computer system, capturing a snapshot of the first signal corresponding to the time the request was initiated, transforming the snapshot of the first signal into a brain state score, and determining whether the brain state score meets or exceeds a threshold. In response to determining that the brain state score meets or exceeds the threshold, the method includes initiating a first sequence of events based on the second signal and the brain state score. In response to determining that the brain state score does not meet or exceed the threshold, the method includes initiating a second sequence of events.

In other features, the request includes a financial instrument to be purchased, a quantity of the financial instrument to be purchased, and a purchase price of the financial instrument. In other features, the first sequence of events is executed at the second computer system. In other features, the first sequence of events is executed at the first computer system. In other features, the second sequence of events is executed at the second computer system. In other features, the second sequence of events is executed at the first computer system.

In other features, the first sequence of events includes determining whether the brain state score meets or exceeds a threshold. In response to the brain state score meeting or exceeding the threshold, the method includes determining whether the financial instrument is in a bin. In response to determining the financial instrument is in the bin, the method includes automatically adjusting the request to increase the quantity of the financial instrument to be purchased.

In other features, the first sequence of events includes determining whether the brain state score meets or exceeds a threshold. In response to the brain state score meeting or exceeding the threshold, the method includes determining whether the financial instrument is in a bin. In response to determining that the financial instrument is in the bin, the method includes initiating a second request. The second request includes the financial instrument to be purchased, a second quantity of the financial instrument to be purchased, and the purchase price of the financial instrument.

In other features, the first sequence of events includes determining whether the brain state score meets or exceeds a threshold. In response to the brain state score meeting or exceeding the threshold, the method includes determining whether the financial instrument is in a bin. In response to determining that the financial instrument is in the bin, the method includes transforming a user interface to display an element. The element includes the financial instrument to be purchased, a second quantity of the financial instrument to be purchased, and the purchase price of the financial instrument.

In other features, the first sequence of events includes determining whether the brain state score meets or exceeds a threshold. In response to the brain state score meeting or exceeding the threshold, the method includes determining whether the financial instrument is in a bin. In response to determining the financial instrument is in the bin, the method includes automatically adjusting the request to increase the quantity of the financial instrument to be purchased by a first amount. In response to determining that the financial instrument is not in the bin, the method includes automatically adjusting the request to increase the quantity of the financial instrument to be purchased by a second amount. The first amount is greater than the second amount.

In other features, the first sequence of events includes determining whether the brain state score meets or exceeds a threshold. In response to the brain state score meeting or exceeding the threshold, the method includes determining whether the financial instrument is in a bin. In response to determining that the financial instrument is in the bin, the method includes initiating a second request. The second request includes the financial instrument to be purchased, a second quantity of the financial instrument to be purchased, and the purchase price of the financial instrument. In response to determining that the financial instrument is not in the bin, the method includes initiating a third request. The third request includes the financial instrument to be purchased, a third quantity of the financial instrument to be purchased, and the purchase price of the financial instrument. The second quantity is greater than the third quantity.

In other features, the first sequence of events includes determining whether the brain state score meets or exceeds a threshold. In response to determining that the brain state score meets or exceeds the threshold, the method includes determining whether the financial instrument is in a bin. In response to determining that the financial instrument is in the bin, the method includes transforming a user interface to display a first element. The first element includes the financial instrument to be purchased, a second quantity of the financial instrument to be purchased, and the purchase price of the financial instrument. In response to determining that the financial instrument is not in the bin, the method includes transforming the user interface to display a second element. The second element includes the financial instrument to be purchased, a third quantity of the financial instrument to be purchased, and the purchase price of the financial instrument. The second quantity is greater than the third quantity.

In other features, the first sequence of events includes capturing the performance of the financial instrument, and training a machine learning model using the request, the brain state score, and the captured performance of the financial instrument. In other features, the sequence of events includes determining whether the financial instrument was purchased according to the request. In response to determining that the financial instrument was purchased according to the request, the method includes capturing the performance of the financial instrument, and training a machine learning model using the request, the brain state score, and the captured performance of the financial instrument.

In other features, the request is indicative of a first purchase order for the financial instrument. In other features, the second sequence of events includes generating a prompt for a second purchase order, the second purchase order opposing the first purchase order. In other features, the second sequence of events includes automatically generating a second purchase order, the second purchase order being opposite the first purchase order.

A computer-implemented method includes monitoring a plurality of brain states at a plurality of neurometric interfaces, and detecting a plurality of trade signals. Each trade signal corresponds to a respective brain state. In response to detecting the plurality of trade signals, the method includes capturing a plurality of snapshots from the plurality of trade signals. The method also includes transforming the plurality of snapshots into a plurality of brain state scores, determining whether each of the plurality of brain state scores meets or exceeds a threshold, and determining whether each of the trade signals indicates a trade occurring within a period of time. In response to determining that each of the plurality of brain state scores meets or exceeds the threshold and determining that each of the trade signals indicates a trade occurring within the period of time, the method includes generating an alert signal.

A method for improving performance on a conscious activity includes collecting behavioral data and neurophysiological data while a person performs the conscious activity. The method includes assessing the behavioral data by comparing the behavioral data with reference data to score the person's conscious activity in an assessment. The method includes synchronizing the behavioral data with the neurophysiological data. The method includes inputting the behavioral data, neurophysiological data, and the assessment into a machine learning system. The method includes training the machine learning system with the inputs to identify a probabilistic relationship between the person's neurophysiological data and the person's performance of the conscious activity.

In other features, the conscious activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the conscious activity is a physical activity, and the behavioral data is an outcome of the physical activity. In other features, the physical activity is a stroke by a golfer. In other features, the method includes determining whether the person is in an appropriate brain state based on the probabilistic relationship and conveying to the person whether the person is in an appropriate brain state.

A method for improving performance on a conscious activity includes collecting behavioral data and neurophysiological data while a person performs the conscious activity. The method includes assessing the behavioral data by comparing the behavioral data with reference data to score the person's conscious activity in an assessment. The method includes synchronizing the behavioral data with the neurophysiological data. The method includes inputting the behavioral data, neurophysiological data, and the assessment into a machine learning system. The method includes training the machine learning system with the inputs to identify a probabilistic relationship between the person's neurophysiological data and the person's performance of the conscious activity. The method includes decomposing the behavioral data and neurophysiological data into spatial and temporal components that reflect a functional connectivity state at an instant of time. The method includes repeating the decomposing step for a sequence of instances. The method includes, using machine learning, clustering a plurality of functional connectivity matrices into a set of discrete steps.

In other features, the conscious activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the conscious activity is a physical activity, and the behavioral data is an outcome of the physical activity. In other features, the physical activity is a stroke by a golfer. In other features, the method includes determining whether the person is in an appropriate brain state based on the probabilistic relationship and conveying to the person whether the person is in an appropriate brain state.

A method for improving performance on a conscious activity includes collecting behavioral data and neurophysiological data while a person performs the conscious activity. The method includes assessing the behavioral data by comparing the behavioral data with reference data to score the person's conscious activity in an assessment. The method includes synchronizing the behavioral data with the neurophysiological data. The method includes inputting the behavioral data, neurophysiological data, and the assessment into a machine learning system. The method includes training the machine learning system with the inputs to identify a probabilistic relationship between the person's neurophysiological data and the person's performance of the conscious activity. The method includes training a machine learning system with the behavioral data and neurophysiological data and assessments involves two machine learning layers: a first machine learning layer in which the neurophysiological data is decomposed into neurophysiological states that a person experienced, and a second machine learning layer that receives temporal sequences of neurophysiological states and correlates different sequential patterns of the states with probabilities of performing the activity well.

In other features, the conscious activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the conscious activity is a physical activity, and the behavioral data is an outcome of the physical activity. In other features, the physical activity is a stroke by a golfer.

A method for improving performance on a trading activity includes collecting behavioral data and neurophysiological data while a trader performs the trading activity. The method includes assessing the behavioral data by comparing the behavioral data with reference data to score the trader's trading performance in an assessment. The method includes synchronizing the behavioral data with the neurophysiological data. The method includes inputting the behavioral data, neurophysiological data, and the assessment into a machine learning system. The method includes training the machine learning system with the inputs to identify a probabilistic relationship between the person's neurophysiological data and the person's trading performance of the trading activity.

In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is one of a long-short term memory and a logistic regression model. In other features, the machine learning system is configured to identify one or both of a brain state associated with over-performance by the trader and a brain state associated with under-performance by the trader. In other features, the method includes determining whether the trader is in an appropriate brain state based on the probabilistic relationship and conveying to the trader whether the person is in an appropriate brain state.

A method for improving performance on a trading activity includes collecting behavioral data and neurophysiological data while a trader performs the trading activity. The method includes assessing the behavioral data by comparing the behavioral data with reference data to score the trader's trading performance in an assessment. The method includes synchronizing the behavioral data with the neurophysiological data. The method includes inputting the behavioral data, neurophysiological data, and the assessment into a machine learning system. The method includes training the machine learning system with the inputs to identify a probabilistic relationship between the person's neurophysiological data and the person's trading performance of the trading activity. The method includes decomposing the behavioral data and neurophysiological data into spatial and temporal components that reflect a functional connectivity state at an instant of time. The method includes repeating the decomposing step for a sequence of instances. The method includes, using machine learning, clustering a plurality of functional connectivity matrices into a set of discrete steps.

In other features, the instant of time is a defined action within the trading activity. In other features, the defined action is the execution of a trade. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is one of a long-short term memory and a logistic regression model.

A method for improving performance on a trading activity includes collecting behavioral data and neurophysiological data while a trader performs the trading activity. The method includes assessing the behavioral data by comparing the behavioral data with reference data to score the trader's trading performance in an assessment. The method includes synchronizing the behavioral data with the neurophysiological data. The method includes inputting the behavioral data, neurophysiological data, and the assessment into a machine learning system. The method includes training the machine learning system with the inputs to identify a probabilistic relationship between the person's neurophysiological data and the person's trading performance of the trading activity. The method includes training a machine learning system with the behavioral data and neurophysiological data and assessments involves two machine learning layers: a first machine learning layer in which the neurophysiological data is decomposed into neurophysiological states that the trader experienced and a second machine learning layer that receives temporal sequences of neurophysiological states and correlates different sequential patterns of the states with probabilities of performing the trading activity well.

In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is one of a long-short term memory and a logistic regression model. In other features, the machine learning system is configured to identify one or both of a brain state associated with over-performance by the trader and a brain state associated with under-performance by the trader.

A method for improving performance on an activity includes collecting behavioral data and neurophysiological data while a person performs the activity. The method includes grading the person's performance quality using comparisons of behavioral data with reference data. The method includes using a first machine learning system to estimate functional connectivity patterns from the neurophysiological data. The method includes training a second machine learning system with the functional connectivity patterns and the grades to identify relationships between the functional connectivity patterns and performance quality. The method includes applying an output of the second machine learning system to predict the quality of the person's subsequent performance of the activity on the basis of further functional connectivity state estimations based on neurophysiological data collected from the person.

In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the method includes determining whether the person is in an appropriate brain state based on the probabilistic relationship. In other features, the method includes conveying to the person whether the person is in an appropriate brain state. In other features, conveying to the person whether the person is in an appropriate brain state is performed via one or more of auditory feedback, visual feedback, auditory-visual feedback, and vibrational feedback. In other features, one or both of the first and second machine learning systems are a long-short term memory. In other features, one or both of the first and second machine learning systems are a logistic regression model.

A method for improving performance on an activity includes collecting behavioral data and neurophysiological data while a person performs the activity. The method includes grading the person's performance quality using comparisons of behavioral data with reference data. The method includes using a first machine learning system to estimate functional connectivity patterns from the neurophysiological data. The method includes training a second machine learning system with the functional connectivity patterns and the grades to identify relationships between the functional connectivity patterns and performance quality. The method includes applying an output of the second machine learning system to predict the quality of the person's subsequent performance of the activity on the basis of further functional connectivity state estimations based on neurophysiological data collected from the person. The method includes training the second machine learning system includes identifying relationships between leading sequences of the functional connectivity patterns and performance quality.

In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the method includes determining whether the person is in an appropriate brain state based on the probabilistic relationship. In other features, the method includes conveying to the person whether the person is in an appropriate brain state. In other features, conveying to the person whether the person is in an appropriate brain state is performed via one or more of auditory feedback, visual feedback, auditory-visual feedback, and vibrational feedback.

A method for improving performance on a trading activity includes collecting behavioral data and neurophysiological data while a trader performs the trading activity. The method includes grading the trader's performance quality using comparisons of behavioral data with reference data. The method includes using a first machine learning system to estimate functional connectivity patterns from the neurophysiological data. The method includes training a second machine learning system with the functional connectivity patterns and the grades to identify relationships between the functional connectivity patterns and performance quality. The method includes applying an output of the second machine learning system to predict the quality of the trader's subsequent performance of the trading activity on the basis of further functional connectivity state estimations based on neurophysiological data collected from the trader.

In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the method includes determining whether the person is in an appropriate brain state based on the probabilistic relationship. In other features, the method includes conveying to the person whether the person is in an appropriate brain state. In other features, conveying to the person whether the person is in an appropriate brain state is performed via one or more of auditory feedback, visual feedback, auditory-visual feedback, and vibrational feedback. In other features, one or both of the first and second machine learning systems are a long-short term memory. In other features, one or both of the first and second machine learning systems are a logistic regression model.

A method for improving performance on a trading activity includes collecting behavioral data and neurophysiological data while a trader performs the trading activity. The method includes grading the trader's performance quality using comparisons of behavioral data with reference data. The method includes using a first machine learning system to estimate functional connectivity patterns from the neurophysiological data. The method includes training a second machine learning system with the functional connectivity patterns and the grades to identify relationships between the functional connectivity patterns and performance quality. The method includes applying an output of the second machine learning system to predict the quality of the trader's subsequent performance of the trading activity on the basis of further functional connectivity state estimations based on neurophysiological data collected from the trader. The method includes training the second machine learning system includes identifying relationships between leading sequences of the functional connectivity patterns and performance quality.

In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the method includes determining whether the person is in an appropriate brain state based on the probabilistic relationship. In other features, the method includes conveying to the person whether the person is in an appropriate brain state. In other features, conveying to the person whether the person is in an appropriate brain state is performed via one or more of auditory feedback, visual feedback, auditory-visual feedback, and vibrational feedback.

A system for improving performance on an activity includes a human-machine interface that collects neurophysiological data while a person performs the activity. The system includes a computer configured to assess the behavioral data by comparing it with reference data in order to distinguish better behavior from worse behavior. The system includes a machine learning system configured to receive as inputs and train upon at least one of the behavioral data, the neurophysiological data, assessments of the behavioral data, assessments of the neurophysiological data, derivatives of the behavioral data, and derivatives of the neurophysiological data.

In other features, the computer is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is one of a long-short term memory and a logistic regression model.

A system for improving performance on an activity includes a human-machine interface that collects neurophysiological data while a person performs the activity. The system includes a computer configured to assess the behavioral data by comparing it with reference data in order to distinguish better behavior from worse behavior. The system includes a machine learning system configured to receive as inputs and train upon at least one of the behavioral data, the neurophysiological data, assessments of the behavioral data, assessments of the neurophysiological data, derivatives of the behavioral data, and derivatives of the neurophysiological data. The computer is further configured to apply an output of the machine learning system to predict the person's performance during a subsequent performance of the activity.

In other features, the computer is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is one of a long-short term memory and a logistic regression model.

A system for improving performance on a trading activity includes a human-machine interface that collects neurophysiological data while a trader performs the trading activity. The system includes a computer configured to assess the behavioral data by comparing it with reference data in order to distinguish better trading behavior from worse trading behavior. The system includes a machine learning system configured to receive as inputs and train upon at least one of the behavioral data, the neurophysiological data, assessments of the behavioral data, assessments of the neurophysiological data, derivatives of the behavioral data, and derivatives of the neurophysiological data.

In other features, the computer is configured to one or more of augment, complement and override subsequent performances of the trading activity by the person. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A system for improving performance on a trading activity includes a human-machine interface that collects neurophysiological data while a trader performs the trading activity. The system includes a computer configured to assess the behavioral data by comparing it with reference data in order to distinguish better trading behavior from worse trading behavior. The system includes a machine learning system configured to receive as inputs and train upon at least one of the behavioral data, the neurophysiological data, assessments of the behavioral data, assessments of the neurophysiological data, derivatives of the behavioral data, and derivatives of the neurophysiological data. The computer is further configured to apply an output of the machine learning system to predict the trader's performance during a subsequent performance of the trading activity.

In other features, the computer is configured to one or more of augment, complement and override subsequent performances of the trading activity by the person. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A system for improving performance on an activity includes a human-machine interface that collects behavioral data and neurophysiological data while a person performs the activity. The system includes a computer configured to assess the behavioral data to distinguish better behavior from worse behavior. The system includes a machine learning system configured to receive as inputs and train upon the at least one of the behavioral data, the neurophysiological data, assessments of the behavioral data, assessments of the neurophysiological data, derivatives of the behavioral data, and derivatives of the neurophysiological data.

In other features, the computer is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is one of a long-short term memory and a logistic regression model.

A system for improving performance on an activity includes a human-machine interface that collects behavioral data and neurophysiological data while a person performs the activity. The system includes a computer configured to assess the behavioral data to distinguish better behavior from worse behavior. The system includes a machine learning system configured to receive as inputs and train upon the at least one of the behavioral data, the neurophysiological data, assessments of the behavioral data, assessments of the neurophysiological data, derivatives of the behavioral data, and derivatives of the neurophysiological data. The computer is further configured to apply an output of the machine learning system to predict the person's performance during a subsequent performance of the activity.

In other features, the computer is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is one of a long-short term memory and a logistic regression model.

A system for improving performance on a trading activity includes a human-machine interface that collects behavioral data and neurophysiological data while a trader performs the trading activity. The system includes a computer configured to assess the behavioral data to distinguish better trading behavior from worse trading behavior. The system includes a machine learning system configured to receive as inputs and train upon the at least one of the behavioral data, the neurophysiological data, assessments of the behavioral data, assessments of the neurophysiological data, derivatives of the behavioral data, and derivatives of the neurophysiological data.

In other features, the computer is configured to one or more of augment, complement and override subsequent performances of the trading activity by the person. In other features, the trading activity is trading a financial asset, and the behavioral data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A system for improving performance on a trading activity includes a human-machine interface that collects behavioral data and neurophysiological data while a trader performs the trading activity. The system includes a computer configured to assess the behavioral data to distinguish better trading behavior from worse trading behavior. The system includes a machine learning system configured to receive as inputs and train upon the at least one of the behavioral data, the neurophysiological data, assessments of the behavioral data, assessments of the neurophysiological data, derivatives of the behavioral data, and derivatives of the neurophysiological data. The computer is further configured to apply an output of the machine learning system to predict the trader's performance during a subsequent performance of the trading activity.

In other features, the computer is configured to one or more of augment, complement and override subsequent performances of the trading activity by the person. In other features, the trading activity is trading a financial asset, and the behavioral data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the human-machine interface is configured to convey to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A non-transitory computer-readable medium has instructions stored thereon that is capable of causing or configuring a processor for biofeedback to improve a person's performance on an activity. The instructions include collecting behavioral data and neurophysiological data while a person performs the activity. The instructions include grading the person's performance quality using comparisons of behavioral data with reference data. The instructions include using a first machine learning system to estimate functional connectivity patterns from the neurophysiological data. The instructions include training a second machine learning system with the functional connectivity patterns and the grades to identify relationships between the functional connectivity patterns and performance quality. The instructions include applying an output of the second machine learning system to predict the quality of the person's subsequent performance of the activity on the basis of further functional connectivity state estimations based on neurophysiological data collected from the person.

In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the second machine learning system is further configured to determine whether the person is in an appropriate brain state based on the further functional connectivity state estimations based on neurophysiological data collected from the person. In other features, the medium is configured to convey to the person whether the person is in an appropriate brain state via one or more of auditory feedback, visual feedback, auditory-visual feedback, and vibrational feedback. In other features, the first machine learning system is one of a long-short term memory and a logistic regression model. In other features, the second machine learning system is one of a long-short term memory and a logistic regression model.

A non-transitory computer-readable medium has instructions stored thereon that is capable of causing or configuring a processor for biofeedback to improve a person's performance on an activity. The instructions include collecting behavioral data and neurophysiological data while a person performs the activity. The instructions include grading the person's performance quality using comparisons of behavioral data with reference data. The instructions include using a first machine learning system to estimate functional connectivity patterns from the neurophysiological data. The instructions include training a second machine learning system with the functional connectivity patterns and the grades to identify relationships between the functional connectivity patterns and performance quality. The instructions include applying an output of the second machine learning system to predict the quality of the person's subsequent performance of the activity on the basis of further functional connectivity state estimations based on neurophysiological data collected from the person. The instructions include providing one or more of audible, visual, and tactile stimulation to the person to direct and aid performance of the activity by the person.

In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the second machine learning system is further configured to determine whether the person is in an appropriate brain state based on the further functional connectivity state estimations based on neurophysiological data collected from the person. In other features, the medium is configured to convey to the person whether the person is in an appropriate brain state via one or more of auditory feedback, visual feedback, auditory-visual feedback, and vibrational feedback. In other features, the first machine learning system is one of a long-short term memory and a logistic regression model. In other features, the second machine learning system is one of a long-short term memory and a logistic regression model.

A non-transitory computer-readable medium has instructions stored thereon that is capable of causing or configuring a processor for biofeedback to improve a trader's performance on a trading activity. The instructions include collecting behavioral data and neurophysiological data while a trader performs the trading activity. The instructions include grading the trader's performance quality using comparisons of behavioral data with reference data. The instructions include using a first machine learning system to estimate functional connectivity patterns from the neurophysiological data. The instructions include training a second machine learning system with the functional connectivity patterns and the grades to identify relationships between the functional connectivity patterns and trading performance quality. The instructions include applying an output of the second machine learning system to predict the quality of the person's subsequent performance of the trading activity on the basis of further functional connectivity state estimations based on neurophysiological data collected from the trader.

In other features, the medium is configured to one or more of augment, complement and override subsequent performances of the trading activity by the person. In other features, the trading activity is trading a financial asset, and the behavioral data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the second machine learning system is further configured to determine whether the person is in an appropriate brain state based on the further functional connectivity state estimations based on neurophysiological data collected from the person. In other features, the medium is configured to convey to the person whether the person is in an appropriate brain state via one or more of auditory feedback, visual feedback, auditory-visual feedback, and vibrational feedback. In other features, the first machine learning system is one of a long-short term memory and a logistic regression model. In other features, the second machine learning system is one of a long-short term memory and a logistic regression model. In other features, the trading activity includes trading equities in a simulated environment, the simulated environment simulating a financial market having market conditions reflective of one of a long-term market average, a trending market average, and periods of high volatility.

A non-transitory computer-readable medium has instructions stored thereon that is capable of causing or configuring a processor for biofeedback to improve a trader's performance on a trading activity. The instructions include collecting behavioral data and neurophysiological data while a trader performs the trading activity. The instructions include grading the trader's performance quality using comparisons of behavioral data with reference data. The instructions include using a first machine learning system to estimate functional connectivity patterns from the neurophysiological data. The instructions include training a second machine learning system with the functional connectivity patterns and the grades to identify relationships between the functional connectivity patterns and trading performance quality. The instructions include applying an output of the second machine learning system to predict the quality of the person's subsequent performance of the trading activity on the basis of further functional connectivity state estimations based on neurophysiological data collected from the trader. The instructions include providing one or more of audible, visual, and tactile stimulation to the person to direct and aid performance of the activity by the person.

In other features, the medium is configured to one or more of augment, complement and override subsequent performances of the trading activity by the person. In other features, the trading activity is trading a financial asset, and the behavioral data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the second machine learning system is further configured to determine whether the person is in an appropriate brain state based on the further functional connectivity state estimations based on neurophysiological data collected from the person. In other features, the medium is configured to convey to the person whether the person is in an appropriate brain state via one or more of auditory feedback, visual feedback, auditory-visual feedback, and vibrational feedback. In other features, the first machine learning system is one of a long-short term memory and a logistic regression model. In other features, the second machine learning system is one of a long-short term memory and a logistic regression model. In other features, the trading activity includes trading equities in a simulated environment, the simulated environment simulating a financial market having market conditions reflective of one of a long-term market average, a trending market average, and periods of high volatility.

A method for improving performance on an activity or decision includes training a machine learning system to generate a prediction model that outputs a probability distribution of outcomes of performance on the activity or decision. The machine learning system is trained on past behavioral data from at least one person performing the activity, neurophysiological data collected from the at least one person performing the activity or decision, and performance assessments based on a ranking of the person's activity against reference data. After the prediction model is generated, the prediction model, when fed with data about the near real time activity or decision data, outputs a probability distribution of possible outcomes of the near real time activity or decision.

In other features, the machine learning system is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the method includes conveying to the person whether the person is in an appropriate brain state via one or more of auditory feedback, visual feedback, auditory-visual feedback, and vibrational feedback. In other features, the machine learning system is one of a long-short term memory and a logistic regression model.

A method for improving performance on an activity or decision includes training a machine learning system to generate a prediction model that outputs a probability value of an outcome of performance on the activity or decision. The machine learning system is trained on past behavioral data from at least one person performing the activity, neurophysiological data collected from the at least one person performing the activity or decision, and performance assessments based on a ranking of the person's activity against reference data. After the prediction model is generated, the prediction model, when fed with data about the near real time activity or decision data, outputs a probability distribution of possible outcomes of the near real time activity or decision.

In other features, the machine learning system is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the method includes conveying to the person whether the person is in an appropriate brain state via one or more of auditory feedback, visual feedback, auditory-visual feedback, and vibrational feedback. In other features, the machine learning system is one of a long-short term memory and a logistic regression model.

A method for improving trading performance on a trading activity or trading decision includes training a machine learning system to generate a prediction model that outputs a probability distribution of outcomes of performance on the trading activity or trading decision. The machine learning system is trained on past behavioral data from at least one trader performing the trading activity, neurophysiological data collected from the at least one trader performing the trading activity or trading decision, and performance assessments based on a ranking of the trader's activity against reference data. After the prediction model is generated, the prediction model, when fed with data about the near real time activity or decision data, outputs a probability distribution of possible outcomes of the near real time trading activity or trading decision.

In other features, the machine learning system is configured to one or more of augment, complement and override subsequent performances of the trading activity by the person. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the method includes conveying to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A method for improving trading performance on a trading activity or trading decision includes training a machine learning system to generate a prediction model that outputs a probability value of an outcome of performance on the trading activity or trading decision. The machine learning system is trained on past behavioral data from at least one trader performing the trading activity, neurophysiological data collected from the at least one trader performing the trading activity or trading decision, and performance assessments based on a ranking of the trader's activity against reference data. After the prediction model is generated, the prediction model, when fed with data about the near real time activity or decision data, outputs a probability distribution of possible outcomes of the near real time trading activity or trading decision.

In other features, the machine learning system is configured to one or more of augment, complement and override subsequent performances of the trading activity by the person. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the machine learning system is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the method includes conveying to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A system for identifying brain states in which a person is likely to at least one of overperform and underperform on an activity includes a sensor interface including one or more sensors attached to the person that generate data indicative of the brain states of the person while the person is performing the activity. The system includes a platform that collects performance data about performance of the activity. The system includes a data processing pipeline that collects the sensor data from the sensor interface, the performance data from the platform, and at least one performance metric pertinent to measuring at least one of overperformance and underperformance of the activity. The data processing pipeline also identifies characteristic brain states associated with at least one of overperformance and underperformance in performing the activity.

In other features, the data processing pipeline is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the data processing pipeline is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the system includes a human-machine interface configured to convey to the person whether the person is in an appropriate brain state via one or more of auditory feedback, visual feedback, auditory-visual feedback, and vibrational feedback. In other features, the data processing pipeline includes one of a long-short term memory and a logistic regression model.

A system for identifying brain states in which a person is likely to at least one of overperform and underperform on an activity includes a sensor interface including one or more sensors attached to the person that generate data indicative of the brain states of the person while the person is performing the activity. The system includes a platform that collects performance data about performance of the activity. The system includes a data processing pipeline that collects the sensor data from the sensor interface, the performance data from the platform, and at least one performance metric pertinent to measuring at least one of overperformance and underperformance of the activity. The data processing pipeline also identifies characteristic brain states associated with at least one of overperformance and underperformance in performing the activity. The data processing pipeline also processes the data indicative of the brain states to generate a special map of cognitive workload across the brain of the person.

In other features, the data processing pipeline is configured to one or more of augment, complement and override subsequent performances of the activity by the person. In other features, the activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, the data processing pipeline is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the system includes a human-machine interface configured to convey to the person whether the person is in an appropriate brain state via one or more of auditory feedback, visual feedback, auditory-visual feedback, and vibrational feedback. In other features, the data processing pipeline includes one of a long-short term memory and a logistic regression model.

A system for identifying brain states in which a trader is likely to at least one of overperform and underperform on a trading activity includes a sensor interface including one or more sensors attached to the trader that generate data indicative of the brain states of the trader while the trader is performing the trading activity. The system includes a platform that collects trading performance data about performance of the trading activity. The system includes a data processing pipeline that collects the sensor data from the sensor interface, the trading performance data from the platform, and at least one trading performance metric pertinent to measuring at least one of overperformance and underperformance of the trading activity. The data processing pipeline also identifies characteristic brain states associated with at least one of overperformance and underperformance in performing the trading activity.

In other features, the data processing pipeline is configured to one or more of augment, complement and override subsequent performances of the trading activity by the person. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the data processing pipeline is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the system includes a human-machine interface configured to convey to the person whether the person is in an appropriate brain state via one or more of auditory feedback, visual feedback, auditory-visual feedback, and vibrational feedback. In other features, the data processing pipeline includes a long-short term memory. In other features, the data processing pipeline includes a logistic regression model. In other features, the trading activity includes trading equities in a simulated environment, the simulated environment simulating a financial market having market conditions reflective of one of a long-term market average, a trending market average, and periods of high volatility.

A system for identifying brain states in which a trader is likely to at least one of overperform and underperform on a trading activity includes a sensor interface including one or more sensors attached to the trader that generate data indicative of the brain states of the trader while the trader is performing the trading activity. The system includes a platform that collects trading performance data about performance of the trading activity. The system includes a data processing pipeline that collects the sensor data from the sensor interface, the trading performance data from the platform, and at least one trading performance metric pertinent to measuring at least one of overperformance and underperformance of the trading activity. The data processing pipeline also identifies characteristic brain states associated with at least one of overperformance and underperformance in performing the trading activity. The data processing pipeline also processes the data indicative of the brain states to generate a special map of cognitive workload across the brain of the person.

In other features, the data processing pipeline is configured to one or more of augment, complement and override subsequent performances of the trading activity by the person. In other features, the trading activity is trading a financial asset, the behavioral data is transactional data related to trading the financial asset, and the reference data is market averages pertinent to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the data processing pipeline is further configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the system includes a human-machine interface configured to convey to the person whether the person is in an appropriate brain state via one or more of auditory feedback, visual feedback, auditory-visual feedback, and vibrational feedback. In other features, the data processing pipeline includes a long-short term memory. In other features, the data processing pipeline includes a logistic regression model. In other features, the trading activity includes trading equities in a simulated environment, the simulated environment simulating a financial market having market conditions reflective of one of a long-term market average, a trending market average, and periods of high volatility.

A method for identifying brain states in which a person is likely to at least one of overperform and underperform in performing an activity includes using a sensor interface that includes one or more sensors that generate sensor data indicative of the brain states of the person while the person is performing the activity. The method includes collecting performance data about performance of the activity through a data interface. The method includes collecting the sensor data from the sensor interface and the performance data from the data interface. The method includes identifying characteristic brain states associated with at least one of overperformance and underperformance in performing the activity.

In other features, a machine learning system is configured to one or more of augment, complement and override subsequent performances of the activity by the person. In other features, the activity is trading a financial asset, and the performance data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, a machine learning system is configured to determine whether the person is in an appropriate brain state based on the performance data. In other features, the method includes conveying to the person whether the person is in an appropriate brain state via one or more of auditory feedback, visual feedback, auditory-visual feedback, and vibrational feedback. In other features, identifying characteristic brain states is performed by one of a long-short term memory and a logistic regression model.

A method for identifying brain states in which a person is likely to at least one of overperform and underperform in performing an activity includes using a sensor interface that includes one or more sensors that generate sensor data indicative of the brain states of the person while the person is performing the activity. The method includes collecting performance data about performance of the activity through a data interface. The method includes collecting the sensor data from the sensor interface and the performance data from the data interface. The method includes identifying characteristic brain states associated with at least one of overperformance and underperformance in performing the activity. The identifying characteristic brain states is performed by one or more of decomposing the performance data, identifying components associated with variances in or sources of the performance data, bandpassing the components associated with variances across several frequency bands, finding correlations between envelopes of the bandpassed components to generate correlation data, and clustering the correlation data.

In other features, a machine learning system is configured to one or more of augment, complement and override subsequent performances of the activity by the person. In other features, the activity is trading a financial asset, and the performance data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, the activity is a physical activity, and the behavioral data is an outcome of the physical activity. In other features, the physical activity is a stroke by a golfer. In other features, a machine learning system is configured to determine whether the person is in an appropriate brain state based on the performance data. In other features, the method includes conveying to the person whether the person is in an appropriate brain state via one or more of auditory feedback, visual feedback, auditory-visual feedback, and vibrational feedback. In other features, identifying characteristic brain states is performed by one of a long-short term memory and a logistic regression model.

A method for identifying brain states in which a trader is likely to at least one of overperform and underperform in performing a trading activity includes using a sensor interface that includes one or more sensors that generate sensor data indicative of the brain states of the trader while the trader is performing the trading activity. The method includes collecting trading performance data about performance of the trading activity through a data interface. The method includes collecting the sensor data from the sensor interface and the trading performance data from the data interface. The method includes identifying characteristic brain states associated with at least one of overperformance and underperformance in performing the trading activity.

In other features, a machine learning system is configured to one or more of augment, complement and override subsequent performances of the trading activity by the person. In other features, the trading activity is trading a financial asset, and the performance data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, a machine learning system is configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the method includes conveying to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A method for identifying brain states in which a trader is likely to at least one of overperform and underperform in performing a trading activity includes using a sensor interface that includes one or more sensors that generate sensor data indicative of the brain states of the trader while the trader is performing the trading activity. The method includes collecting trading performance data about performance of the trading activity through a data interface. The method includes collecting the sensor data from the sensor interface and the trading performance data from the data interface. The method includes identifying characteristic brain states associated with at least one of overperformance and underperformance in performing the trading activity. Identifying characteristic brain states is performed by one or more of decomposing the performance data, identifying components associated with variances in or sources of the performance data, bandpassing the components associated with variances across several frequency bands, finding correlations between envelopes of the bandpassed components to generate correlation data, and clustering the correlation data.

In other features, a machine learning system is configured to one or more of augment, complement and override subsequent performances of the trading activity by the person. In other features, the trading activity is trading a financial asset, and the performance data is transactional data related to trading the financial asset. In other features, the financial asset is at least one of a stock, a bond, an amount of debt, a commodity, an amount of fiat currency, and an amount of cryptocurrency. In other features, the market averages are the volume weighted average price (VWAP) of the securities in a window of time around when the financial assets were traded. In other features, a machine learning system is configured to determine whether the person is in an appropriate brain state based on at least one of the behavioral data, the neurophysiological data, assessments of the behavioral data, assessments of the neurophysiological data, derivatives of the behavioral data, and derivatives of the neurophysiological data. In other features, the method includes conveying to the person whether the person is in an appropriate brain state via one or more of auditory feedback, visual feedback, auditory-visual feedback, and vibrational feedback. In other features, the machine learning system is a long-short term memory. In other features, the machine learning system is a logistic regression model. In other features, the trading activity includes trading equities in a simulated environment, the simulated environment simulating a financial market having market conditions reflective of one of a long-term market average, a trending market average, and periods of high volatility.

A method includes generating an operational performance model for an enterprise activity involving a set of decisions by a set of expert workers. The operational performance model includes a set of input data sets, a set of data processing workflows operating on the input data sets, and a set of decision outputs resulting from interaction of expert workers with a user interface representing the operational performance model. The method includes generating a brain state model representing a sequential set of brain states of the set of expert workers that characterize brain states measured during the interactions of the expert workers with the user interface representing the operational performance model. The method includes assessing the quality of the decision outputs. The method includes based on assessing the quality of the decision outputs, determining a preferred pattern of brain state sequences. The method includes modifying a subsequent enterprise activity based on determining the preferred pattern of brain state sequences.

In other features, modifying the subsequent enterprise activity includes mirroring the decisions of a selected subset of the set of expert workers across a set of enterprise activities other than the enterprise activities in which the set of workers is engaged. In other features, modifying the subsequent enterprise activity includes preferentially using decisions made by expert workers during periods when the expert workers manifest brain states that correspond to the preferred pattern of brain sequences. In other features, modifying the subsequent enterprise activity includes undertaking a set of actions to induce the preferred pattern of brain states before or during performance of the enterprise activity by a set of workers.

In other features, modifying the subsequent enterprise activity includes providing a set of simulations of the enterprise activity during which the set of expert workers is trained to induce the preferred pattern of brain states. In other features, modifying the subsequent enterprise activity includes providing a set of simulations of the enterprise activity during which the set of expert workers is trained to recognize the preferred pattern of brain states. In other features, assessing the quality of the decision outputs includes measuring a set of outcomes resulting from the set of decisions. In other features, assessing the quality of the decision outputs includes rating the set of decisions based on alignment of the decisions to a decision-making model. In other features, assessing the quality of the decision outputs includes generating a set of self-assessments by the set of expert workers of the set of decisions. In other features, assessing of the quality of the decision outputs includes generating a set of expert ratings of the set of decisions.

A method includes generating an operational performance model for an enterprise activity involving a set of decisions by a set of expert workers. The operational performance model includes a set of input data sets, a set of data processing workflows operating on the input data sets, and a set of decision outputs resulting from interaction of expert workers with a user interface representing the operational performance model. The method includes generating a brain state model representing a sequential set of brain states of the set of expert workers that characterize brain states measured during the interactions of the expert workers with the user interface representing the operational performance model. The method includes assessing the quality of the decision outputs. The method includes based on assessing the quality of the decision outputs, determining a preferred pattern of brain state sequences. The method includes modifying a subsequent enterprise activity based on determining the preferred pattern of brain state sequences. Modifying the subsequent enterprise activity includes iteratively adjusting guidance to the expert workers and measuring resulting patterns of brain states across a set of enterprise activity sessions and generating, based on the measured resulting patterns of brain states, an improved set of guidance for the enterprise activity and an improved model of preferred expert worker brain state patterns for the enterprise activity.

In other features, modifying the subsequent enterprise activity includes mirroring the decisions of a selected subset of the set of expert workers across a set of enterprise activities other than the enterprise activities in which the set of workers is engaged. In other features, modifying the subsequent enterprise activity includes preferentially using decisions made by expert workers during periods when the expert workers manifest brain states that correspond to the preferred pattern of brain sequences. In other features, modifying the subsequent enterprise activity includes undertaking a set of actions to induce the preferred pattern of brain states before or during performance of the enterprise activity by a set of workers. In other features, modifying the subsequent enterprise activity includes providing a set of simulations of the enterprise activity during which the set of expert workers is trained to induce the preferred pattern of brain states.

In other features, modifying the subsequent enterprise activity includes providing a set of simulations of the enterprise activity during which the set of expert workers is trained to recognize the preferred pattern of brain states. In other features, assessing the quality of the decision outputs includes measuring a set of outcomes resulting from the set of decisions. In other features, assessing the quality of the decision outputs includes rating the set of decisions based on alignment of the decisions to a decision-making model. In other features, assessing the quality of the decision outputs includes generating a set of self-assessments by the set of expert workers of the set of decisions. In other features, assessing of the quality of the decision outputs includes generating a set of expert ratings of the set of decisions.

A method includes generating a trading performance model for a trading activity involving a set of decisions by a set of expert traders. The trading performance model includes a set of input data sets, a set of data processing workflows operating on the input data sets, and a set of trading decision outputs resulting from interaction of the expert traders with a user interface representing the trading performance model. The method includes generating a brain state model representing a sequential set of brain states of the set of expert traders that characterize brain states measured during the interactions of the expert traders with the user interface representing the trading performance model. The method includes assessing the quality of the trading decisions. The method includes determining a preferred pattern of trader brain state sequences based on assessing the quality of the trading decisions. The method includes modifying a subsequent trading activity based on determining the preferred pattern of brain state sequences.

In other features, assessing the quality of the decision outputs includes measuring a set of financial outcomes resulting from the set of trades resulting from the trading decisions. In other features, assessing the quality of the decision outputs includes rating the set of trading decisions based on alignment of the trading decisions to a trade decision-making model. In other features, assessing the quality of the decision outputs includes a set of self-assessments by the set of expert traders of the set of trading decisions. In other features, assessing the quality of the decision outputs includes a set of expert ratings of the set of trading decisions. In other features, modifying the subsequent enterprise activity includes mirroring the decisions of a selected subset of the first set of expert traders in a different set of trading activities of the enterprise. In other features, modifying the subsequent enterprise activity includes preferentially executing trades recommended by expert traders during periods when the expert traders manifest brain states that correspond to the preferred pattern of brain sequences. In other features, modifying the subsequent enterprise activity includes undertaking a set of actions to induce the preferred pattern of brain state sequences before or during performance of trading by the expert traders. In other features, modifying the subsequent enterprise activity includes providing a set of simulations of the trading activity during which the set of expert traders is trained to induce the preferred pattern of brain states. In other features, modifying the subsequent enterprise activity includes providing a set of simulations of the trading activity during which the set of expert traders is trained to recognize the preferred pattern of brain states.

A method includes generating a trading performance model for a trading activity involving a set of decisions by a set of expert traders. The trading performance model includes a set of input data sets, a set of data processing workflows operating on the input data sets, and a set of trading decision outputs resulting from interaction of the expert traders with a user interface representing the trading performance model. The method includes generating a brain state model representing a sequential set of brain states of the set of expert traders that characterize brain states measured during the interactions of the expert traders with the user interface representing the trading performance model. The method includes assessing the quality of the trading decisions. The method includes determining a preferred pattern of trader brain state sequences based on assessing the quality of the trading decisions. The method includes modifying a subsequent trading activity based on determining the preferred pattern of brain state sequences. Modifying the subsequent enterprise activity includes iteratively adjusting trading guidance to the expert traders, measuring resulting patterns of brain states across a set of trading sessions, and generating, an improved set of trading instructions and an improved model of preferred brain state patterns for the trading activity based on the resulting patterns of brain states.

In other features, assessing the quality of the decision outputs includes measuring a set of financial outcomes resulting from the set of trades resulting from the trading decisions. In other features, assessing the quality of the decision outputs includes rating the set of trading decisions based on alignment of the trading decisions to a trade decision-making model. In other features, assessing the quality of the decision outputs includes a set of self-assessments by the set of expert traders of the set of trading decisions. In other features, assessing the quality of the decision outputs includes a set of expert ratings of the set of trading decisions. In other features, modifying the subsequent enterprise activity includes mirroring the decisions of a selected subset of the first set of expert traders in a different set of trading activities of the enterprise. In other features, modifying the subsequent enterprise activity includes preferentially executing trades recommended by expert traders during periods when the expert traders manifest brain states that correspond to the preferred pattern of brain sequences. In other features, modifying the subsequent enterprise activity includes undertaking a set of actions to induce the preferred pattern of brain state sequences before or during performance of trading by the expert traders. In other features, modifying the subsequent enterprise activity includes providing a set of simulations of the trading activity during which the set of expert traders is trained to induce the preferred pattern of brain states. In other features, modifying the subsequent enterprise activity includes providing a set of simulations of the trading activity during which the set of expert traders is trained to recognize the preferred pattern of brain states.

A method includes generating a first operational performance model for an enterprise activity involving a set of decisions by a set of expert workers within a first simulation environment. The operational performance model includes a first set of input data sets, a first set of data processing workflows operating on the first input data sets, and a first set of decision outputs. The first decision outputs results from interaction of the expert workers with a user interface representing the first operational performance model. The method includes generating a second operational performance model for an enterprise activity involving a set of decisions by the set of expert workers within a second simulation environment. The operational performance model includes a second set of input data sets, a second set of data processing workflows operating on the second input data sets, and a second set of decision outputs. The second decision outputs results from interaction of the expert workers with a user interface representing the second operational performance model. The method includes generating a first brain state model representing a sequential set of brain states of the set of expert workers, the brain state model characterizing brain states measured during the interactions of the expert workers with the user interface representing the first operational performance model. The method includes generating a second brain state model representing a sequential set of brain states of the set of expert workers, the brain state model characterizing brain states measured during the interactions of the expert workers with the user interface representing the second operational performance model. The method includes comparing a measure of performance of the first and second sets of decision outputs. The method includes, determining which of the first and second operational performance models is preferred given a set of contextual conditions based on comparing the measure of performance of the sets of decision outputs. The method includes comparing performance of the first and second brain state models. The method includes determining a preferred pattern of brain state sequences given the set of market conditions based on comparing the performance of the brain state models. The method includes modifying a subsequent enterprise activity based on determining the better performing operational performance model and preferred brain state sequences.

In other features, one of the first and second simulation environments simulates a financial market having market conditions reflective of at least one of a long-term market average, a trending market average, and periods of high volatility. In other features, the set of market conditions is reflective of at least one of a long-term market average, a trending market average, and periods of high volatility. In other features, the set of market conditions includes at least one of financial market data, environmental data, financial news, micro-economic data, and macro-economic data. In other features, assessing the quality of the decision outputs includes measuring a set of outcomes resulting from the set of decisions. In other features, assessing the measure of performance of the decision outputs includes rating the set of decisions based on alignment of the decision outputs to a decision-making model. In other features, assessing the measure of performance of the decision outputs includes a set of self-assessments by the set of expert workers of the set of decisions. In other features, assessing the measure of performance of the decision outputs includes a set of expert ratings of the set of decisions. In other features, modifying the subsequent enterprise activity includes iteratively adjusting guidance to the expert workers and measuring resulting patterns of brain states across a set of enterprise activity sessions to result in an improved set of guidance for the enterprise activity and an improved model of preferred expert worker brain state patterns for the enterprise activity.

In other features, modifying the subsequent enterprise activity includes mirroring the decisions of a selected subset of the set of expert workers across a set of enterprise activities other than the ones in which the set of expert workers is engaged. In other features, modifying the subsequent enterprise activity includes preferentially using decisions made by the expert workers during periods when the expert workers manifest brain states that correspond to the preferred pattern of brain sequences. In other features, modifying the subsequent enterprise activity includes undertaking a set of actions to induce the preferred pattern of brain states before or during performance of the enterprise activity by the set of expert workers. In other features, modifying the subsequent enterprise activity includes providing a set of simulations of the enterprise activity during which the set of expert workers is trained to induce the preferred pattern of brain states. In other features, modifying the subsequent enterprise activity includes providing a set of simulations of the enterprise activity during which the set of expert workers is trained to recognize the preferred pattern of brain states.

A method includes generating a first operational performance model for an enterprise activity involving a set of decisions by a set of expert workers within a first simulation environment. The operational performance model includes a first set of input data sets, a first set of data processing workflows operating on the first input data sets, and a first set of decision outputs. The first decision outputs resulting from interaction of the expert workers with a user interface representing the first operational performance model. The method includes generating a second operational performance model for an enterprise activity involving a set of decisions by the set of expert workers within a second simulation environment. The operational performance model includes a second set of input data sets, a second set of data processing workflows operating on the second input data sets, and a second set of decision outputs, the second decision outputs resulting from interaction of the expert workers with a user interface representing the second operational performance model. The method includes generating a first brain state model representing a sequential set of brain states of the set of expert workers, the brain state model characterizing brain states measured during the interactions of the expert workers with the user interface representing the first operational performance model.

The method includes generating a second brain state model representing a sequential set of brain states of the set of expert workers, the brain state model characterizing brain states measured during the interactions of the expert workers with the user interface representing the second operational performance model. The method includes comparing a measure of performance of the first and second sets of decision outputs. The method includes determining which of the first and second operational performance models is preferred given a set of contextual conditions based on comparing the measure of performance of the sets of decision outputs. The method includes comparing performance of the first and second brain state models. The method includes determining a preferred pattern of brain state sequences given the set of market conditions based on comparing the performance of the brain state models. The method includes modifying a subsequent enterprise activity based on determining the better performing operational performance model and preferred brain state sequences. The set of contextual conditions includes a set of at least one of operational conditions, workflow conditions, and market conditions.

In other features one of the first and second simulation environments simulates a financial market having market conditions reflective of at least one of a long-term market average, a trending market average, and periods of high volatility. In other features the set of market conditions is reflective of at least one of a long-term market average, a trending market average, and periods of high volatility. In other features the set of market conditions includes at least one of financial market data, environmental data, financial news, micro-economic data, and macro-economic data. In other features assessing the quality of the decision outputs includes one or both of measuring a set of outcomes resulting from the set of decisions and rating the set of decisions based on alignment of the decision outputs to a decision-making model. In other features assessing the measure of performance of the decision outputs includes generating one or both of a set of self-assessments by the set of expert workers of the set of decisions and a set of expert ratings of the set of decisions.

A method includes generating a first trading performance model for a trading for a trading activity involving a set of decisions by a set of expert traders within a first simulation environment. The trading performance model includes a first set of input data sets, a first set of data processing workflows operating on the first input data sets, and a first set of trading decision outputs, the first trading decision outputs resulting from interaction of the expert traders with a user interface representing the first trading performance model. The method includes generating a second trading performance model for a trading activity involving a set of decisions by the set of expert traders within a second simulation environment. The trading performance model includes a second set of input data sets, a second set of data processing workflows operating on the second input data sets, and a second set of trading decision outputs, the second trading decision outputs resulting from interaction of the expert traders with a user interface representing the second trading performance model. The method includes generating a first brain state model representing a sequential set of brain states of the set of expert traders. The brain state model characterizes brain states measured during the interactions of the expert traders with the user interface representing the first trading performance model. The method includes generating a second brain state model representing a sequential set of brain states of the set of expert traders. The brain state model characterizes brain states measured during the interactions of the expert traders with the user interface representing the second trading performance model. The method includes comparing a measure of performance of the first and second sets of trading decision outputs. The method includes, based on comparing the measure of performance of the sets of trading decision outputs, determining which of the first and second trading performance models is preferred given a set of market conditions. The method includes comparing performance of the first and second brain state models. The method includes, based on comparing the performance of the sets of brain state models, determining a preferred pattern of brain state sequences, given the set of market conditions. The method includes modifying a subsequent trading activity based on determining the better performing trading performance model and preferred brain state sequences.

In other features, one of the first and second simulation environments simulates a financial market having market conditions reflective of a long-term market average. In other features, one of the first and second simulation environments simulates a financial market having market conditions reflective of a trending market average. In other features, one of the first and second simulation environments simulates a financial market having market conditions reflective of periods of high volatility. In other features, the set of market conditions is reflective of a long-term market average. In other features, the set of market conditions is reflective of a trending market average. In other features, the set of market conditions is reflective of periods of high volatility. In other features, the set of market conditions includes financial market data and environmental data. In other features, the set of market conditions includes financial news. In other features, the set of market conditions includes micro- and macro-economic data. In other features, assessing the measure of performance of the trading decision outputs includes measuring a set of outcomes resulting from the set of decisions. In other features, assessing the measure of performance of the trading decision outputs includes rating the set of decisions based on their alignment to a decision-making model. In other features, assessing the measure of performance of the trading decision outputs includes a set of self-assessments by the set of expert traders of the set of decisions. In other features, assessing the measure of performance of the trading decision outputs includes a set of expert ratings of the set of decisions. In other features, modifying the subsequent trading activity includes iteratively adjusting guidance to the expert traders and measuring resulting patterns of brain states across a set of trading activity sessions to result in an improved set of guidance for the trading activity and an improved model of preferred expert worker brain state patterns for the trading activity. In other features, modifying the subsequent trading activity includes mirroring the decisions of a selected subset of the set of expert traders across a set of enterprise activities other than the ones in which the set of expert traders is engaged. In other features, modifying the subsequent trading activity includes preferentially using decisions made by the expert traders during periods when the expert traders manifest brain states that correspond to the preferred pattern of brain sequences. In other features, modifying the subsequent trading activity includes undertaking a set of actions to induce the preferred pattern of brain states before or during performance of the trading activity by the set of expert traders.

In other features, modifying the subsequent trading activity includes one or both of providing a set of simulations of the trading activity during which the set of expert traders is trained to induce the preferred pattern of brain states and providing a set of simulations of the trading activity during which the set of expert traders is trained to recognize the preferred pattern of brain states.

A method includes generating a first trading performance model for a trading for a trading activity involving a set of decisions by a set of expert traders within a first simulation environment. The trading performance model includes a first set of input data sets, a first set of data processing workflows operating on the first input data sets, and a first set of trading decision outputs, the first trading decision outputs resulting from interaction of the expert traders with a user interface representing the first trading performance model. The method includes generating a second trading performance model for a trading activity involving a set of decisions by the set of expert traders within a second simulation environment. The trading performance model includes a second set of input data sets, a second set of data processing workflows operating on the second input data sets, and a second set of trading decision outputs, the second trading decision outputs resulting from interaction of the expert traders with a user interface representing the second trading performance model. The method includes generating a first brain state model representing a sequential set of brain states of the set of expert traders. The brain state model characterizes brain states measured during the interactions of the expert traders with the user interface representing the first trading performance model. The method includes generating a second brain state model representing a sequential set of brain states of the set of expert traders. The brain state model characterizes brain states measured during the interactions of the expert traders with the user interface representing the second trading performance model. The method includes comparing a measure of performance of the first and second sets of trading decision outputs. The method includes, based on comparing the measure of performance of the sets of trading decision outputs, determining which of the first and second trading performance models is preferred given a set of market conditions. The method includes comparing performance of the first and second brain state models. The method includes, based on comparing the performance of the sets of brain state models, determining a preferred pattern of brain state sequences given the set of market conditions. The method includes modifying a subsequent trading activity based on determining the better performing trading performance model and preferred brain state sequences. The set of market conditions includes a set of at least one of operational conditions, workflow conditions, and contextual conditions.

A system and method are provided to measure and assess baseline brain performance, boost performance in targeted areas, and demonstrate, visualize, and track success. In embodiments, the system/method provides quantitative measures of cognitive reserve, brain entropy, and other cognitive traits.

In embodiments, the system/method provides visualized brain state feedback derived from a stream of neurophysiological sensor data directly to the subject whose brain state is being visualized, in order to enhance performance. In embodiments, the system/method uses neurophysiological sensor data (at least) to investigate and reveal functional systems of the brain. In embodiments, the system/method uses neurophysiological sensor data (at least) to enhance team preparation and coaching. In embodiments, the system/method uses neurophysiological sensor data and correlated performance data (at least) to identify brain pathways associated with a given task and signatures (representative patterns) of task-driven brain activity.

In embodiments, the system/method generates a map of selected brain functional systems (in various implementations, all brain functional systems are selected) superimposed with colored regions and pathways to illustrate the strength and integrity of the selected functional systems, which include one or more brain regions and the pathways, if any, that connect them. In embodiments, the system/method generates a predictive model of performance based on the neurophysiological data. In embodiments, the system/method examines the neurophysiological sensor data to monitor a subject's attention. In various implementations, the system/method also interrupts a task or activity, and/or administers a stimulus (either in combination or singularly e.g., haptic, visual, or auditory) to help the subject refocus on and re-engage with the task or activity. In embodiments, the system/method uses neurophysiological sensor data to adapt the training system in real time.

In various implementations, the system/method's use of neurometric data substitutes or complements traditionally qualitative and behavioral assessments and observational evaluations of brain performance with actual quantitative measures of brain performance. This disclosure also describes ways to test cognitive reserve or resilience that are adapted for identifying experts in the performance area and in training persons to become expert in the performance area.

In embodiments, brain performance is quantified by measuring the decrement in performance between an initial, baseline measure of motor speed and a final measure of motor speed. In between the initial and final measures, the subject is challenged to perform multiple tasks that create various pressures on the subject's ability to perform. In embodiments, the subject is given a motor speed test followed by an extended cognitive test followed by another motor speed test. The ability to not be impacted by the incremental changes in cognitive load provides a measure of resilience and reserve across time.

In embodiments, subjects are provided a set of tasks that are varied by practice, day, sleep cycle, time from last meal, and other variables. Task pressures are modified to better understand how different pressures affect a subject's reserve. As one type of pressure is increased, it is determined how much the subject can adapt to maintain the same level of performance before decrements in performance are observed. For example, distractions, irritations, and provocations are incorporated into the tasks to understand how loud noises, interruptions and other forms of stimulus, morale, competitive pressure, and competitive affinity pressure (pressure of a team) affect a subject's performance.

In embodiments, applications include developing proficiency in secondary language acquisition, real-world practical memory performance, and performance enhancement in groups of non-impacted individuals (e.g., not sleep-deprived) or high-performing individuals. Additional applications include developing precision learning models at the individual brain network level, versus for groups of brains. Tailored applications are described for athletes, employees, and financial traders.

BRIEF DESCRIPTION OF THE DRAWINGS

The present disclosure will become more fully understood from the detailed description and the accompanying drawings.

FIGS. 51A-51C together illustrate an embodiment of a user interface output depicting modeling thresholds and trading outcomes.

FIGS. 52A-52C together illustrate an embodiment of a user interface output depicting model performance outcomes.

FIGS. 54A-54C together illustrate an embodiment of a user interface output depicting trader performance outcomes.

DETAILED DESCRIPTION

Figure 1:
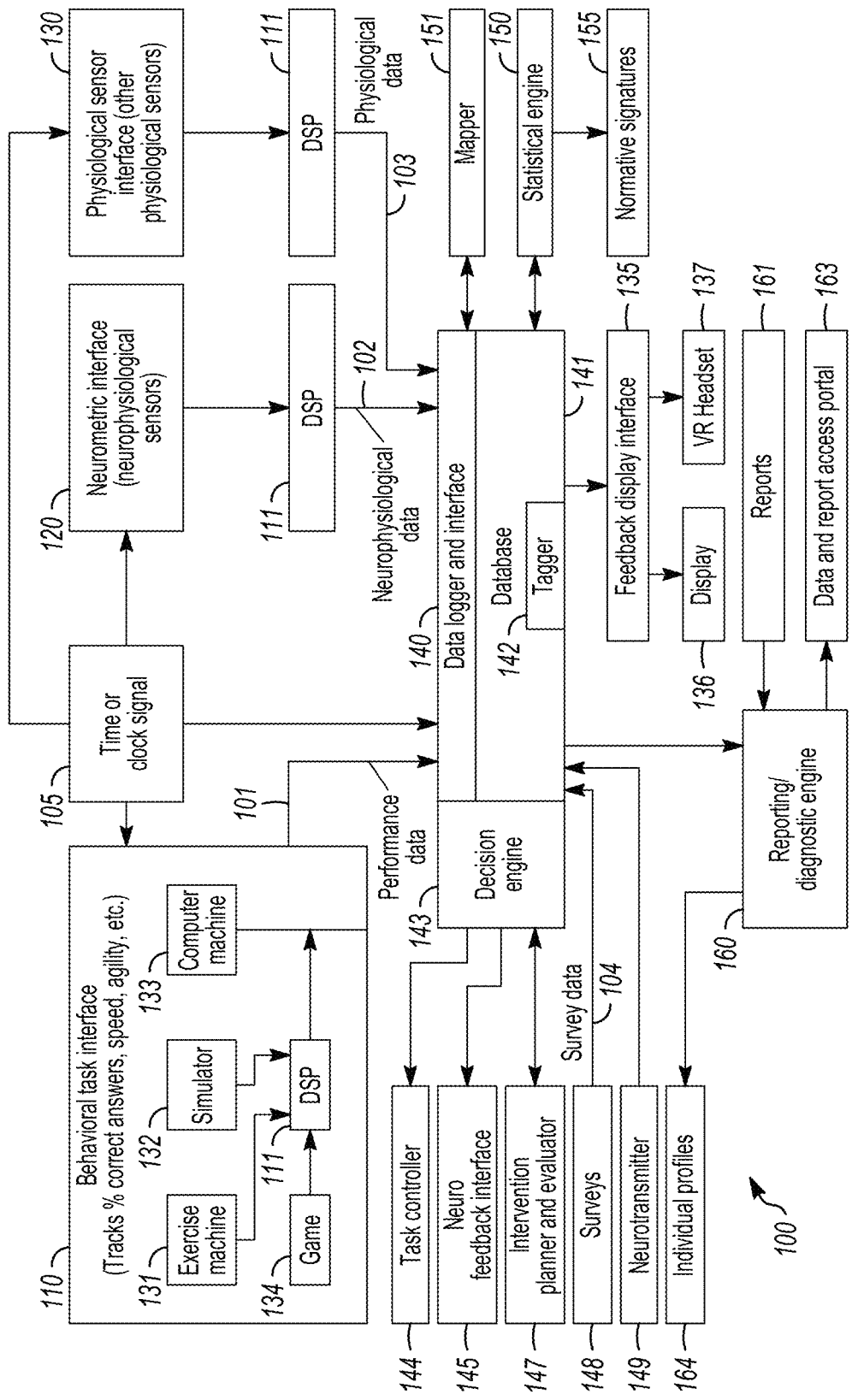
FIG. 1 is a block diagram illustrating components of one embodiment of a neurometric-enhanced performance assessment system.

Specific quantities (e.g., spatial dimensions) can be used explicitly or implicitly herein as examples only and are approximate values unless otherwise indicated. Where a range of values is provided, it is understood that each intervening value, to the tenth of the unit of the lower limit unless the context clearly dictates otherwise, between the upper and lower limit of that range and any other stated or intervening value in that stated range is encompassed within the various embodiments. The upper and lower limits of these smaller ranges can independently be included in the smaller ranges is also encompassed within the various embodiments, subject to any specifically excluded limit in the stated range. Where the stated range includes one or both of the limits, ranges excluding either both of those included limits are also included in the various embodiments.

In describing preferred and alternate embodiments of the technology described herein, various terms are employed for the sake of clarity. Technology described herein, however, is not intended to be limited to the specific terminology so selected, and it is to be understood that each specific element includes all technical equivalents that operate similarly to accomplish similar functions. Where several synonyms are presented, any one of them should be interpreted broadly and inclusively of the other synonyms, unless the context indicates that one term is a particular form of a more general term.

In the specification and claims, conventionally plural pronouns such as "they" or "their" are sometimes used as non-gendered singular replacements for "he," "she," "him," or "her" in accordance with emerging norms of pronoun usage. Also, although there may be references to "advantages" provided by some embodiments, other embodiments may not include those same advantages, or may include different advantages. Any advantages described herein are not to be construed as limiting to any of the claims.

To provide a better appreciation of the various embodiments, the following neuroscience concepts and terms of art are explained.

Systems of the Brain

One traditional anatomical model characterizes the brain as consisting of a plurality of anatomical systems, such as the prefrontal cortex, visual cortex, auditory cortex, primary motor cortex, and primary sensory cortex. Another anatomical model characterizes each hemisphere of the brain as consisting of a frontal lobe, insular cortex, limbic lobe, temporal lobe, parietal lobe, occipital lobe, cingulate gyms, subcortical structures, and cerebellum. Many of these brain structures can be further subdivided. For example, the subcortical structures of the brain include the forebrain, the midbrain, and the hindbrain. Each of these comprises a plurality of substructures, and many of the substructures can be characterized as having their own smaller subparts, and so on. More information can be found in the article by Tim Mullen et al., "Real-Time Modeling and 3D Visualization of Source Dynamics and Connectivity Using Wearable EEG," Conf Proc IEEE Eng Med Biol Soc. 2013; 2013: 2184-2187, which is herein incorporated by reference.

Another model characterizes the brain as having a visual association area, auditory association area, somatic motor association area, somatic sensory association area, Wernicke's area (for understanding speech), and Broca's area (for production of speech).

The brain also includes several major neural pathways. A neural pathway refers to the connection formed by axons that project from neurons to make synapses onto neurons in another location, to enable signals to be sent from one region to another. Neurons may be connected by either a single axon or a bundle of axons known as a nerve tract. The gray matter of the brain contains many short neural pathways. Long pathways may be made up of myelinated axons, which constitute white matter. A neural highway refers to a pathway with a large number or bundle of neural connections.

There are several well-studied major neural pathways, just a few of which are described here. The corpus callosum is the largest white matter structure in the brain, connecting the left and right cerebral hemispheres. The arcuate fasciculus connects Broca's Area to Wernicke's Area, both of which are specialized for language. The medial forebrain bundle connects the septal area of the forebrain with the medial hypothalamus, all of which are considered part of the reward system of the brain, but which also have a role in the brain's grief/sadness system. The cerebral peduncle connects parts of the midbrain and is important in refining motor movements, learning motor skills, and converting proprioceptive information into balance and posture maintenance. The corticobulbar tract conducts brain impulses associated with voluntary movement to the spinal cord. The corticospinal tract is involved in movement in muscles of the head, including facial expressions. The dorsal column-medial lemniscus pathway is a sensory pathway that conveys sensations of fine touch, vibration, two-point discrimination, and proprioception from the skin and joints.

One functional model characterizes the brain as having five major systems: cognition, attention and language, sleep and consciousness, memory, and emotion. Functional models are being adapted to recognize that a given cognitive function may recruit many different anatomical regions and pathways of the brain.

In "Structural and Functional Brain Networks: From Connections to Cognition," dated Nov. 1, 2013 and which appeared in Vol. 342 of the magazine "Science," and which is herein incorporated by reference, authors Hae-Jeong Park and Karl Friston characterize the brain as comprising a "modules," which largely correspond with what previous researchers referred to as "functional networks" or "intrinsic connectivity networks" (ICNs), examples of which include the default mode network, dorsal attention network, executive control network, salience network, and the sensorimotor, visual, and auditory systems. Each module is characterized by dense intrinsic connectivity within the module and sparse and weak extrinsic connections to other modules. Each module comprises a plurality of "submodules" that are characterized by synchronously active, persistently stable voxels. Each submodule comprises a plurality of hierarchically structured "nodes" or "voxels." Each node is equipped with intrinsic connections and states. Finally, each node is connected by "edges" to other nodes. The "edges" can be defined by any of three notions of connectivity: structural, functional, and effective. The authors also characterize node clusters that are highly interconnected to other modules as "rich-club hubs," which are critically important for global communication between brain modules. Specialized brain functions, the authors found, are characterized by local integration within segregated modules and the functions of perception, cognition, and action by global integration of modules.

Park and Friston's 2013 article was not the first to characterize complex brain networks in terms of graph theory. In "Complex brain networks: graph theoretical analysis of structural and functional systems," dated March 2009 and which appeared in volume 10 of the journal "Nature," and which is herein incorporated by reference, authors Ed Bullmore and Olaf Sporns describe some measures that have emerged for the analysis of brain networks. The "degree" of a node is defined by the number of connections that link it to the rest of the network. Collectively, the degrees of all the nodes defines a degree distribution. Assortativity relates to the correlation between degrees of connected nodes. Path length is the minimum number of edges that must be traversed to go from one node to the other. The "centrality" of a node refers to the number of shortest paths between all other node pairs in the network that must pass through the node. The concept of a "node" or "voxel" may be defined by the imaging resolution producing the brain image (which is insufficient to distinguish each neuron). For example, a node may be the anatomically localized region or voxel of an fMRI image or equate to whatever group of neurons an individual EEG electrode or MEG sensor senses.

Collectively, these models establish that effective connectivity and functional connectivity is constrained by structural connectivity, but structural connectivity does not fully determine functional or effective connectivity.

Cognition

Cognition is the mental action or process of acquiring knowledge and understanding through thought, experience, and the senses. Cognition encompasses several processes, including attention, knowledge formation, memory and working memory, judgment and evaluation, reasoning and computation, problem solving and decision making, and language comprehension and production. The fields of biology, neuroscience, psychiatry, psychology, logic, systemics, linguistics, and anesthesia each analyze cognitive states from different perspectives.

Cognitive State

A cognitive state refers to one's thought processes and state of mind. The classification of cognitive processes is, as a matter of practice, described using terms already found in English. For example, one study of children classified the following cognitive states: confidence, puzzlement, hesitation. Another study of military personnel classified the following states: planning, movement, giving/receiving orders, receiving information, clearing a building, responding to enemy, responding to civilians, reporting, responding to action, defending, securing, requesting, maintaining vigilance, preparing equipment, and after-action review. Other examples include distracted, confused, engrossed, amnesia, and paramnesia. These states are defined on the basis of how the person is acting and responding.

Brain State

Brain states are often discussed, but rarely defined. Discussions about the meaning of "brain state" are most frequently found in philosophical journals and forums. Richard Brown, in his article "What is a Brain State" published in the Journal of Philosophical Psychology, 23 Nov. 2006, argues that "brain states are patterns of synchronous neural firing, which reflects the electrical face of the brain; states of the brain are the gating and modulating of neural activity and reflect the chemical face of the brain." One student by the name of Karl Damgaard Asmussen argues: "A brain state is a snapshot of everything in the central-nervous-system. A brain state is said to contain everything about a person right the instant it is snapshotted: memories, emotions, skills, opinions, knowledge, etc." What these definitions have in common is that "brain state" is objective, material, and in some way quantifiable, in contradistinction to "cognitive state" and "mental state," which are typically described using social constructs—although plausible philosophical arguments can be made that a "cognitive state" is nothing more than a "brain state." There are many different ways to characterize a "brain state," including power spectral density, activated networks and patterns of correlation between brain waves.

This application embraces a practical definition of a brain state, as an objectively discernable and quantifiable pattern of power density, neuronal firing, correlations between brain waves, and/or other dynamic physical characteristics of the brain. As used in this application, brain states can be statistically defined and may not have a one-to-one relationship with a "cognitive state" or "mental state" label. These brain states can be observed during conscious, subconscious and/or sleep stages. Moreover, because as a practical matter it is impossible to obtain an infinitely detailed "snapshot of everything in the central-nervous system," a "brain state," as used herein, encompasses practical, detailed-enough-to-be-useful snapshots of dynamic physical characteristics of the brain. For example, a "brain state" may be characterized by the functional coordination of the connectivity and coherent phase-amplitude coupling between a brain's delta, theta, alpha, and beta frequency waves.

Cognitive Domain

In 1956, under the leadership of Dr. Benjamin Bloom, a taxonomy of learning domains was created. The learning domains consisted of the cognitive, affective and psychomotor domains. The cognitive domain was described in terms of six classifications: knowledge, comprehension, application, analysis, synthesis, and evaluation. The affective domain was classified as how a person receives and responds to phenomena, attaches worth or value to something, compares, relates, synthesizes values, and internalizes values. The psychomotor domain was classified as perception, set, guided response, basic proficiency, complex overt response, adaptation, and origination.

These taxonomies have evolved over time. For example, the Alzheimer's Association identifies the following as the four core cognitive domains: recent memory—the ability to learn and recall new information; language—either its comprehension or its expression; visuospatial ability—the comprehension and effective manipulation of nonverbal, graphic or geographic information; and executive function—the ability to plan, perform abstract reasoning, solve problems, focus despite distractions, and shift focus when appropriate. Others have created other cognitive domain taxonomies that are multi-dimensional.

As can be seen from the above discussion, there is some overlap and blurring of the definitions of "cognitive state" and "cognitive domain." Moreover, all three of the learning domains are sometimes referred to as "cognitive domains." Also, in some of the classifications, there is no rigorous consistent rationale for why the classifications are chosen. In the claims, the use of these terms is not limited to any one set of the aforementioned classifications.

Following months of data analysis, the research study succeeded in identifying and characterizing the trader's brain states during their trading day using an unsupervised machine learning algorithm. To characterize the traders' brain states, the traders' neurophysiological data were transformed into a space that efficiently represented their brain activity as a set of nodes. With this in hand, connectivity between these nodes was calculated via correlational measures in the neural activity, yielding distinct functional connectivity patterns and an ability to differentiate the traders' brain states based on whether or not they were exhibiting functional connectivity among specified brain regions.

Multiple distinct brain states that each of the traders went in and out of during their trading day were identified. In one of these states, the traders' brains demonstrated a high degree of "functional connectivity," meaning that several distinct regions within their brains were functionally interconnected and operating in synchrony with one another. In the other state (broadly defined), this type of functional connectivity was not present. It is worth noting that the functional connectivity (FC) pattern identified via the unsupervised machine learning algorithm was remarkably consistent among the traders.

Default Node Network

The default node network is a set of posterior, anterior medial, and lateral parietal brain regions that comprise the default mode network. These regions are consistently deactivated during the performance of diverse cognitive tasks. They are most active when a person is in a state of wakeful rest, such as daydreaming or "mind wandering." The default mode network activates immediately and "by default" after a person has completed a task.

Attention

The American Psychological Association describes attention as a state in which cognitive resources are focused on certain aspects of the environment rather than on others and the central nervous system is in a state of readiness to respond to stimuli. Human beings do not have an unlimited capacity to attend to everything. They must focus on certain items at the expense of others. A neuroscience-based definition of attention is "a process or computation including a group of distributed brain regions resulting in a non-linear summation of competing environmental information, the result of which is to bias selection and action to one option while simultaneously filtering interference from the remaining alternatives."

Researchers have identified (at least) two anatomically and functionally distinct attention networks, which are referred to as the dorsal and ventral attentional systems or networks. The dorsal frontoparietal system, also referred to as the task-positive network, mediates goal-directed top-down guided allocation of attention to locations or features. It supports the ability of someone to voluntarily focus increased attention on an attention-demanding task and to tune out other sensory inputs. The ventral frontoparietal system, mediates stimulus-driven, bottom-up attention and is involved in involuntary actions. It exhibits increased activity when detecting unattended or unexpected stimuli and triggering shifts of attention.

Functional Brain Connectome

A functional brain connectome is a comprehensive description of the brain's structural and functional connections in terms of brain networks.

Physiological and Neurophysiological Sensors

A physiological sensor is a sensor that senses some physiological signal or function of a living organism or its parts. A subset of physiological sensors comprises neurophysiological sensors. Neurophysiology is a discipline concerned with the integration of psychological observations on behavior and the mind with neurological observations on the brain and nervous system. Neurophysiological sensors include sensors that measure brain signals, or a psychological function known to be linked to a particular brain structure or pathway. Neurophysiological measurements can be taken in conjunction with a stimulus, sometimes simple, sometimes complex such as a subject taking a behavioral test, viewing content or engaging in a work-related task.

Common but non-limiting examples of neurophysiological sensors include a portable electroencephalograph (EEG), a diffuse optical technology (DOT) scanner, a diffusion magnetic resonance imager (MRI), a functional magnetic resonance imager (fMRI), a magnetoencephalography imager (MEG), positron emission tomography (PET) and a functional near-image spectroscopy (fNIR).

EEG measures electrical signals in the brain, usually using a plurality of electrodes strategically placed on different parts of the scalp. The EEG electrodes are in contact with the scalp via several potential modalities (e.g., a water-based gel, hydrogel, capacitive dry sensor, etc.) and are used to record electrical potentials produced by electrical field activity in the brain. The brain contains many billions of neurons, no one of which can produce enough of a potential difference to be measured and identified. However, brain activity is characterized by significant levels of local field synchrony that, in the aggregate, produce far-field potentials that project, with different loadings, to nearly all of the EEG sensors in an EEG recording. EEG is also useful in revealing the effective connectivity of the brain. However, EEG sensors pick up not only genuine brain activity, but also spurious potentials from other sources (such as eye movements, scalp muscles, line noise, scalp and cable movements) and channel noise. These spurious sources may produce greater potentials than the cortical sources and should be accounted for in analysis.

Diffusion MRI measures the rate of water diffusion in the brain and is useful in revealing the structural connectivity of the brain. fMRI measures the difference between oxygenated and deoxygenated blood in the regions, from which activity is imputed. Because neuronal activity and blood flow are coupled, it is useful in revealing the functional and effective connectivity of the brain. However, it is currently very slow compared to EEG. A MEG maps brain activity by recording magnetic fields produced by electrical currents occurring naturally in the brain. Advantageously, MEG is very fast, like EEG. A DOT scanner captures tomographic images by utilizing light in the near-infrared region (700 nm to 1100 nm) that exerts minimal effects on the human body. fNIR is the use of the use of near-infrared spectroscopy (NIRS).

Nonlimiting examples of physiological sensors other than neurophysiological sensors include the following: an electrocardiogram (ECG); a respiratory inductive plethysmography band that measures respiration rate at the rib cage; a galvanic skin response (GSR), skin conductance response (SCR), or Electrodermal Activity (EDA); a skin temperature sensor using a surface probe thermistor; a pulse oximeter to measure blood oxygen levels and heartrate; a respirator analyzer to measure $CO_2$ and $O_2$ respiratory contents. There are many other examples, including sensors that quantify perspiration, muscle flexion, facial expressions, eye wincing, and blinking frequency, pupil dilation, head/body position, cortisol level, adrenaline level, and other hormone levels.

Brain Mapping

Brain mapping is the illustration of the anatomy and function of the brain and spinal cord through the use of imaging, immunohistochemistry, molecular genetics, optogenetics, stem cell and cellular biology, engineering, neurophysiology and/or nanotechnology. Typically, brain mapping is understood to involve the mapping of quantities or properties (generated by neuroscientific techniques) onto diagrams or spatial representations of the brain, wherein color-coding and/or line thickness is used to represent those quantities or properties. As used herein, a "brain map" is intended to be understood broadly as a symbolic depiction that emphasizes relationships between structures of the brain.

For example, a brain map may project a representation of brain activity onto brain regions, using neuroscientific techniques such as fMRI. Detected brain activation is frequently represented by color-coding the strength of activation across the brain or a selected region of the brain.

Another example of a brain map is a connectome (aka connectogram) that depicts cortical regions around a circle, organized by lobes. This type of brain map is a diagram rather than a spatial representation of the brain. Separate halves of the connectome are used to depict the left and right sides of the brain. Each half is subdivided into lobes of the brain, and each lobe is further subdivided into cortical regions. Inside the circle are concentric rings that represent attributes of the corresponding cortical regions, including the grey matter volume, surface area, cortical thickness, and degree of connectivity. Inside the rings, lines are used to connect regions of the brain that are found to be structurally connected. An opacity of each line is used to reflect the density of the connection. The color of each line is used to represent the degree of anisotropy (directional dependency) of a diffusion process in that pathway.

Entropy

Entropy refers to a lack of dynamism and order in brain activity as a function of information presented to an individual. Entropy is frequently accompanied by subjective uncertainty or "puzzlement." The field of neuroscience characterizes entropy with a quantitative index of a dynamic system's randomness or disorder. The more a relevant system of the brain (e.g., the visual cortex) desynchronizes—e.g., is disrupted from a smooth, rhythmic, brain frequency, or the more pronounced is the change in the system's brain activity in response to information or stimulus—the more information is held or is being encoded by the brain. The extent of desynchronization is a measure of the system's information processing load, which leads also, conversely, to a measure of entropy across that system.

Brain entropy is not always necessarily bad. Two recent studies have found that greater resting-state brain entropy is correlated with higher verbal IQ and reasoning ability. Another study in Scientific Reports found that caffeine causes a widespread increase in cerebral entropy. They suggest that entropy can be an indicator of the brain's readiness to process unpredictable stimuli from the environment. Another recent study speculates that human consciousness may be a by-product of brain entropy.

Cognitive Reserve

Cognitive reserve refers to the capacity of the brain (processing) to do further work or decision making. In habit/willpower literature, there is some speculation that people essentially have a reserve of willpower. As a person make decisions throughout the day, this decrements the person's decision-making power. By the end of the day, the person has made so many decisions and exercised so much willpower that it depletes the person's cognitive reserve, making that person more susceptible into being talked into something. Accordingly, cognitive reserve refers to the resilience of a person's decision-making ability.

Cognitive reserve and cognitive resilience also refer to the ability of the brain to optimize or maximize performance through the differential recruitment of brain networks or alternate cognitive strategies. The scientific literature doesn't describe measurements for reserve very well, except with respect to decremented nervous systems, such as those beset by Alzheimer's and dementia.

Behavioral Data

Behavioral data refers to observational information collected about conscious actions and activities of a person under the circumstances where that behavior actually occurs. This includes, for example, a person's responses on a keyboard, mouse, game controller, or other input device to a computer task such as a game on a typical work-related task. In this specification, behavioral data is distinguished from physiological or neurophysiological data.

Flow

Flow, a term in the field of positive psychology also colloquially known as being "in the zone," refers to a mental state of operation in which a person performing an activity, such as a sport, is fully immersed in a feeling of energized focus, full involvement, and enjoyment in the process of the activity. It is a state in which a person, while concentrated on the present moment, acts almost instinctively without distraction while focused intensely on a specific task or goal. It is often accompanied by a sense of personal control, a merging of action and awareness, a distortion of temporal experience, a loss of reflective self-consciousness, and even disregard for the person's need for food, water, and sleep.

FIG. 1 is a block diagram illustrating components of one embodiment of a neurometric-enhanced performance assessment system (NEPAS) 100. The NEPAS 100 identifies relationships between brain state characteristics and performance of specific tasks by collecting performance and physiological (including neurophysiological) data from a subject, as well as from a population of subjects, while that subject and population of subjects perform tasks (optionally including tests). The population may be representative of, for example, the general public, a demographic group or subgroup, a professional group, or a specific team. Moreover, tasks are selected that are physiologically important, meaning that they differentially activate a part of the brain of which the system is testing the integrity. This enables NEPAS 100 to disassociate the integrity of two different parts of a subject's brain.

The NEPAS 100 utilizes this data in a plurality of ways, including modifying the tasks as a function of detected brain activity, identifying pathways in the brain associated with a given activity, identifying signatures of brain activity from the population, assessing the subject's brain activity and inferring the subject's brain functional connectivity, generating reports for the subject and the subject's trainer or coach (if any), building an intervention plan for the subject, and providing visual feedback of the brain's activity.

In some embodiments, the NEPAS 100 is configured to use a measure of functional correlation to infer the functional connectivity of the brain of the subject. The NEPAS 100 may use any suitable technique and/or metric to infer and/or measure functional connectivity of the brain of the subject, such as one or more of functional correlation, phase slope index, phase lag index, dynamic causal modeling, granger causality, and the like.

The NEPAS 100 comprises a neurometric interface 120 (also referred to as neurophysiological sensor interface or neurometric monitor), an optional physiological sensor interface 130, and a behavioral task interface 110. Digital signal processors (DSPs) 111 digitize any analog information collected by these interfaces 110, 120, and 130, and deliver neurophysiological data 102, physiological data 103, and performance data 101, respectively, to a data interface and logger/recorder 140. The logger/recorder 140 recorder collects and records neurometric data 102 from the neurometric interface 120, physiological data 103 from the physiological interface 130, the performance data 101 from the behavioral task interface 110 or some other source, and survey responses 104 from surveys 140. In one implementation, the collection of data 101, 102, and 103 are done simultaneously. The survey responses 104, task performance measurements 101, and physiological and neurophysiological data 102 and 103 can be collected from both internal and external sources (e.g., sports stats databases, financial databases) and delivered through several different modalities (e.g., tablet, laptop, VR headset, etc.).

The table below presents a list of physiological (including neurophysiological) metrics and the brain states or constructs to which they relate.

TABLE 1

Neuro/Physiological Metrics and Related Brain States or Constructs

| Neuro/Physiological Metric | Constructs/Brain States |
| --- | --- |
| Heart rate variability | Emotional regulation |
| Affective state classifier | Emotional valence |
| Engagement classifier | Engagement |
| Midline theta | Attention, memory encoding and retrieval, positive emotions, and relaxation |
| Heart rate | Emotions and arousal (including stress) |
| Mu suppression | Empathy |
| Prefrontal gamma | Perception, attention, memory, and narrative comprehension |
| Workload classification | Workload |
| Left occipital alpha slow suppression | Visual imagery |
| Right occipital alpha slow suppression | Visual imagery |
| Left parietal alpha slow suppression | Kinesthetic imagery |
| Right parietal alpha slow suppression | Kinesthetic imagery |
| Gamma power phased lock to Hippocampal theta | Working memory span |
| Frontal theta and occipital alpha | Attention and novelty detection |

A tagger 142 links and tags the data 101, 102, 103, 104, and any other data about the subject that is input, with metadata, including synchronizing time or clock data as well as profile data. For example, a system 100 built for a basketball or football team can include player positions, such as point guard, offensive linemen, and defensive linemen. The data 101, 102, 103, 104, and any other data about the subject, complete with database links and metatags, is recorded into the database 141.

The behavioral task interface 110 is configured to facilitate the person's performance on one or more tasks. The behavioral task interface 110 also acquires performance data 101 while the person performs the task(s). It one implementation, the behavioral task interface 110 comprises one or more exercise machines 131, simulators 132, computer exercises 133, and games 134 (collectively, equipment for performing tasks) that have sensors, transducers and analyzers that produce signals and evaluations indicative of the subject's attentiveness, comprehension, visual processing, accuracy, decision-making prowess, performance under pressure, recovery/resilience, mobility, flexibility, reaction speed, physical speed, strength, agility, endurance and/or other performance metrics on the tasks. The behavioral task interface 110 prompts the subject to perform one or more tasks and collects performance data about a subject while the subject is performing the task. In one implementation, the tasks are predefined and automated, and performance data 101 is automatically generated. For example, a computer game or exercise could be programmed to make the computer automatically track aspects of the subject's performance. For other tasks, such as a worksite task, the behavioral task interface 110 can be an API to a worksite system. In an example applicable to financial traders, the behavioral task interface 110 would comprise a trading interface and various trading tools. Data relating to each of the trader's transactions would be collected and compared with market data to assess the player's performance.

In another implementation, a task-performance monitor (not shown), such as a speedometer, track sensor, GPS, a human observer, a game statistician provides the NEPAS 100 with access to measures of the subject's performance.

In one embodiment, the behavioral task interface 110 also provides feedback to the person. The feedback can be in the form of a startling light, sound, or haptic stimulus to refocus the training subject. In one implementation, the behavioral task interface 110 couples neurometric-based feedback with words of encouragement.

In one embodiment, the behavioral task interface 110 is mobile and the tasks are free-form, not automated. For example, a task can be playing a position in a game or sport or performing on a multi-tasking job. The subject wears portable physiological and/or neurophysiological sensors, and optionally also gyroscopes, motion sensors, counters and the like, while performing the free-form task. The equivalent of behavioral or task performance data could be supplied by an observer, a sport statistician, a database of stats about a game, work records about the quality and efficiency of the subject's performance on the task, etc.

The neurometric interface 120 can comprise any of or several of the neurophysiological sensors described in the background section of this application. In one implementation designed to identify the least restrictive and least expensive set of sensors that will adequately indicate the person's brain activity, the neurometric interface 120 is multimodal. For example, one neurometric interface 120 comprises both an EEG, which is portable, and a fMRI, which is not. The EEG comprises sensors that detect electrical activity in the brain. The sensory data is Fourier-transformed to identify brain wave frequencies of different parts of the brain. The fMRI and EEG measurements are taken simultaneously for an initial test audience to find correlations between the relatively more abundant and accurate fMRI data and the relatively sparse EEG data. With an adequate database of fMRI correlation data, EEG data can be interpreted more accurately to indicate activity in various brain regions and pathways. In another implementation, the neurometric interface 120 is simplified, such as being made to operate without the fMRI or with fewer EEG sensors or be distributed among a smaller surface area of the head, after sufficient data is obtained to demonstrate that reasonably accurate measurements of brain activity can still be obtained. In another implementation, the neurophysiological sensors are EEG sensors that are distributed across left and right hemispheres of the brain, to ensure that a differential analysis can be made of brain activity on the left and right hemispheres of the brain.

In another implementation, the neurometric interface 120 comprises a plurality of neurophysiological sensors arranged on a base, such as a headband or virtual reality headset 137, plus a power supply and a transmitter that transmits neurometric data to the recorder. The base is configured to be worn on the subject's head and to place the neurophysiological sensors in contact with the head.

The optional physiological interface 130 can comprise any of the physiological sensors described in this application. Some of the sensors can be incorporated in devices such as wrist watches, chest bands, and the like, that minimally impede, if at all, the subject's performance of the tasks.

Physiological data such as heartrate, respiration rate and depth, blood oxygen levels, and stress levels (as, for example, estimated from cortisol levels) provide important insight into characteristics of a brain state. Correlating physiological data with performance data and neurophysiological data facilitates the development of even keener evaluations, subject diagnoses, recommendations, and training programs. Further examples of physiological characteristics that are measured in other implementations of NEPAS 100 include: a skin capacitance/galvanic response of the subject; a temperature of the subject; a stress level of the subject; perspiration by the subject; a tightening of a muscle (e.g., jaw muscle clenching teeth); whether the subject is wincing; whether the subject's pupils are dilating; eye movements; the subject's head or body position; the subject's cortisol level; the subject's adrenaline level; and the subject's blinking frequency.

A time or clock signal 105 (such as one or more synchronized time servers, a common clock signal, or more generally a "synchronizer") synchronizes the performance data 101, the neurophysiological data 102, and the physiological data 103, ensuring that each increment of simultaneously-collected data is tagged with the same time or clock value. In one implementation, each of the interfaces 110, 120, and 130 are fed a common time value 150 from one or more synchronized time servers, such as time.apple.com or time.windows.com, to which they are communicatively coupled. In another implementation, a periodic signal (not necessarily representative of time) is fed directly by wire into each of the interfaces 110, 120 and 130 to synchronize the data 101, 102 and 103. In yet another implementation, already-time-stamped external data, such as market-wide financial trading data, is synchronized with internally collected data.

In one implementation, the NEPAS 100 incorporates information from not only mechanical interfaces, but also surveys 148. The surveys 148 ask the subject to self-report about his/her workload, sleep quality, feelings of stress, mental focus and attentiveness versus distractibility, and motivation, as well as other emotions (e.g., anxiety, frustration, anger). The surveys 148 can be used not only for assessment, but also for training. For example, a survey completed right after a subject has a disappointing performance (e.g., a loss) can be followed by a mindfulness application to drive the subject back to a baseline. Surveys can also be used to collect other information such as measurements of stress, insomnia, depression, demographics, or other particulars of a person's life, job, etc.

In another implementation, the NEPAS 100 incorporates information from neurotransmitter tests 149. The neurotransmitter tests 149 one or more of the following: urine tests and blood tests. For example, a baseline test panel can be taken that provides data on 11 key neurotransmitters and precursors: glutamate, epinephrine, norepinephrine, dopamine, PEA, GABA, serotonin, glutamine, histamine, glycine and taurine.

In another implementation, the NEPAS 100 also incorporates non-physiological contextual data, such as data about the environment (e.g., temperature, humidity, altitude, storm conditions, terrain), the opposing player, or the subject (e.g., sick, suffering from an injury). The assessment takes this contextual data into account when assessing the subject and the subject's performance data.

The data interface and logger/recorder 140 collects the performance, neurophysiological, physiological, and survey data 101, 102, 103 from not only a particular subject, but also a plurality of subjects in order to identify patterns that statistically correlate performance data and sensed physiological characteristics across the plurality of subjects. Responses 104 from surveys 148 and results of neurotransmitter tests 149 are also input to the data interface and logger/recorder 140.

The data interface and logger/recorder 140 logs and records the data into the database 141. In one implementation, the database 141 is a relational, query-retrievable database.

To process and use the data 101, 102, 103 and 104, the NEPAS 100 provides one or more of a feedback display interface 135, a statistical engine 150, a mapper 151, a reporting engine 160, a database 141, and a decision engine 143. The mapper 151 superimposes a preferably live representation of brain activity derived from the neurophysiological data 102 onto a 3D model of a brain. This illustrates areas and/or pathways of the brain that are activated by a given task, and how those area and pathways change over time while the person performs the tasks. The 3D model can be representative of either a normal brain or the brain of the subject being assessed, or it can be a caricature of the brain. The 3D model is presented to the feedback display interface 135, which is a monitor, screen, video-containing headset, VR headset 137, game headset, glasses-embedded display, or other display device. The feedback display interface 135 is located within a viewing range of the subject and while the subject performs the tasks. The feedback display interface 135 provides the subject a visualization of the mapped 3D model to the subject while the subject is performing the task. In some implementations, the visualization is live, in real-time, with relatively little lag time. In other implementations, one or more visualizations are provided after the task is completed. In another implementation, the feedback display interface 135 also provides real-time assessment information about the subject's performance and physiological (including neurophysiological) characteristics.

The statistical engine 150 processes and analyzes the data 101, 102, 103, and 104 collected from a population of subjects to build normative models of brain activity and correlated performance levels for each of a plurality of task conditions (i.e., states). The statistical engine 150 can make use of machine learning, deep learning, and neural networks to identify patterns between the performance data 101 and other data and brain activity.

Figure 27:
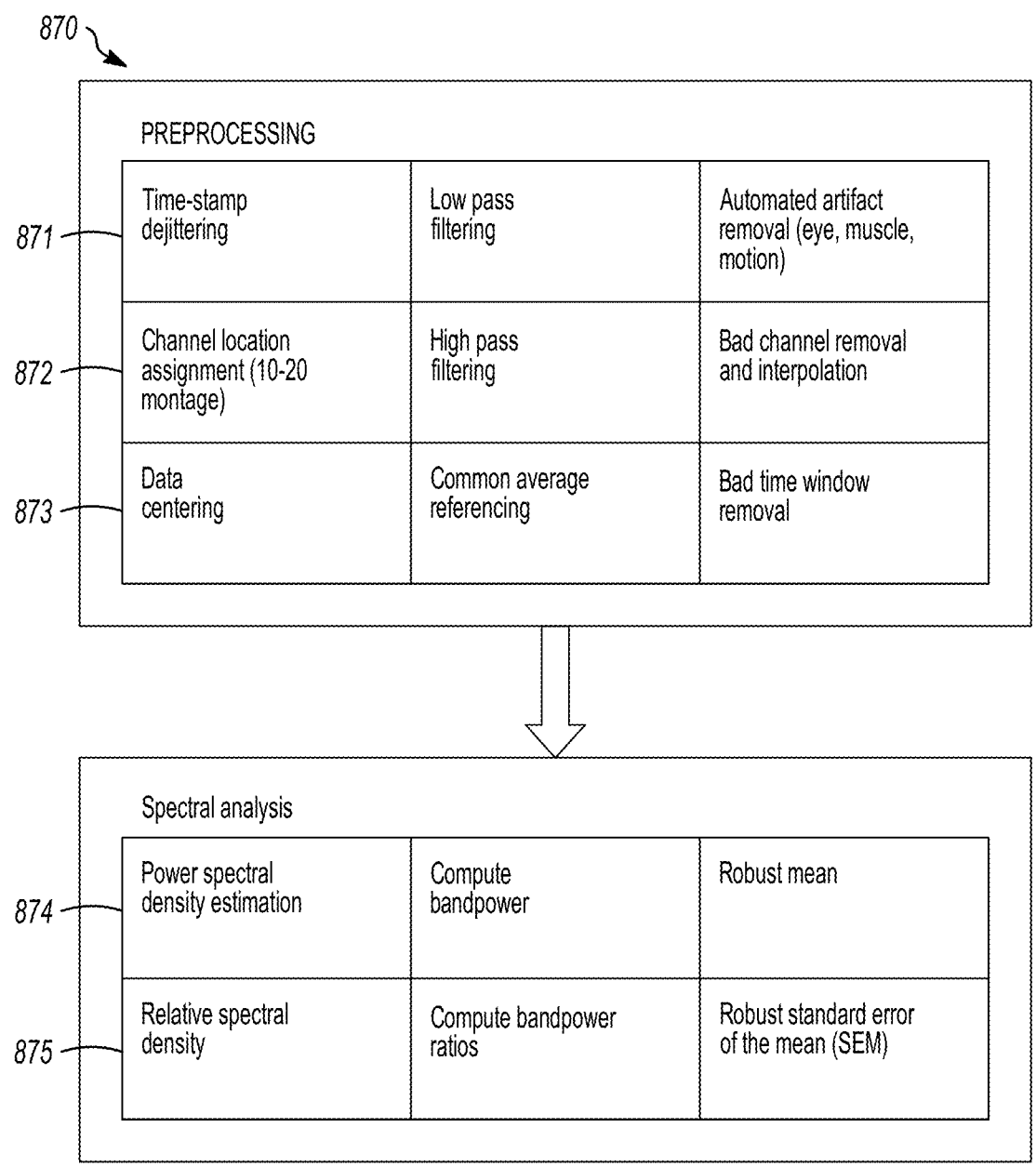
FIG. 27 is a flow chart illustrating preprocessing and spectral analysis steps used to analyze EEG data in pre-training and post-training assessments.

FIG. 27 illustrates one embodiment of a preprocessing and spectral analysis data pipeline 870. First, the data or a single one of the data sets 101-104 are preprocessed by undergoing filtering, including timestamp dejittering 871, channel location assignment 872, and data centering 873. The dejittering 871 utilizes low pass filtering to automatically remove eye and muscle motion artifacts. The channel location assignment 872 involves high pass filtering and interpolation to remove bad channels. The data centering 873 involves common average referencing to remove bad time windows. Second, the data undergoes a spectral analysis, including both a power spectral density estimation 874 and a relative density estimation 875. The power spectral density estimation 874 decomposes the signal data into one more individual frequency components, in order to determine a baseline power of pathways of the brain and the calculation of a robust mean. The relative density estimation 875 involves determining the power of those same pathways during the execution of a complex skill or task, calculating a ratio between this power and the baseline power, and calculating a robust standard error of the mean (SEM).

The statistical engine 150, in another embodiment, uses unsupervised and/or supervised principal component analysis (PCA) to identify brain states that explain the greatest amount of variance in performance. FIGS. 29-40 illustrate the use of PCA in an application of NEPAS 100 to financial traders. PCA is similarly applicable to data related to other domains, such as sports efficiency and teamwork. In another embodiment or in addition to PCA, independent component analysis (ICA) is used to identify independent source components of the data, for example, EEG artifacts caused by eye and muscle movements as well as components related to brain states.

The statistical engine 150 processes the data 101, 102, 103, and 104 from the population. In particular, the statistical engine 150 compares the spatial-temporal pattern of the physiological indicators across the task conditions (states) to make inferences of the neurophysiological basis of various states (e.g., inattention or overloaded). From this information and analysis, the statistical engine 150 generates models of task-oriented brain activity that include brain activity "signatures" comprising the degree of connectivity, speed, and directionality of a brain network of a subject, a population, and/or a real or normative expert performance cognitive state.

The statistical engine 150 creates normative wide-population signatures 155 of spatially distributed brain activity for the population of subjects performing various tasks, as well as normative expert-level signatures 155 of brain activity of experts who perform exceedingly well on those tasks. As used herein, "expert" can refer to persons who perform anywhere in the top X percentile of the population, wherein X refers to a threshold percentile number, such as 1%, 5%, 10%, 15%, etc., wherein population may refer to either the general population or a particular profession. Alternatively, "expert" can refer to persons who have well-defined neural signals or functional connectivity patterns (as quantified by a suitable metric), compared with those of a general population, during performance of a task. For example, it has been shown that expert sharpshooters exhibit a well-defined neural signal when they are engaging in known-distance shooting.

For a particular subject, the statistical engine 150 produces a real-time assessment of the subject's performance and that performance's relationship to a physiological state of the subject, wherein the physiological state is determined by the neurometric data.

The reporting engine 160 queries the database 141 to build or obtain a profile 164 for the subject, generate an assessment of the subject's performance and physiological characteristics from the performance data 101, the neurometric data 102, and the physiological data 103, and produce graphical & textual reports 161 about the subject's neurophysiological and behavioral performance on the tasks. The reporting engine 160 also optionally use the normative signatures 155 of performance as a baseline against which to compare a subject's brain activity and/or functional connectivity.

Figure 22:
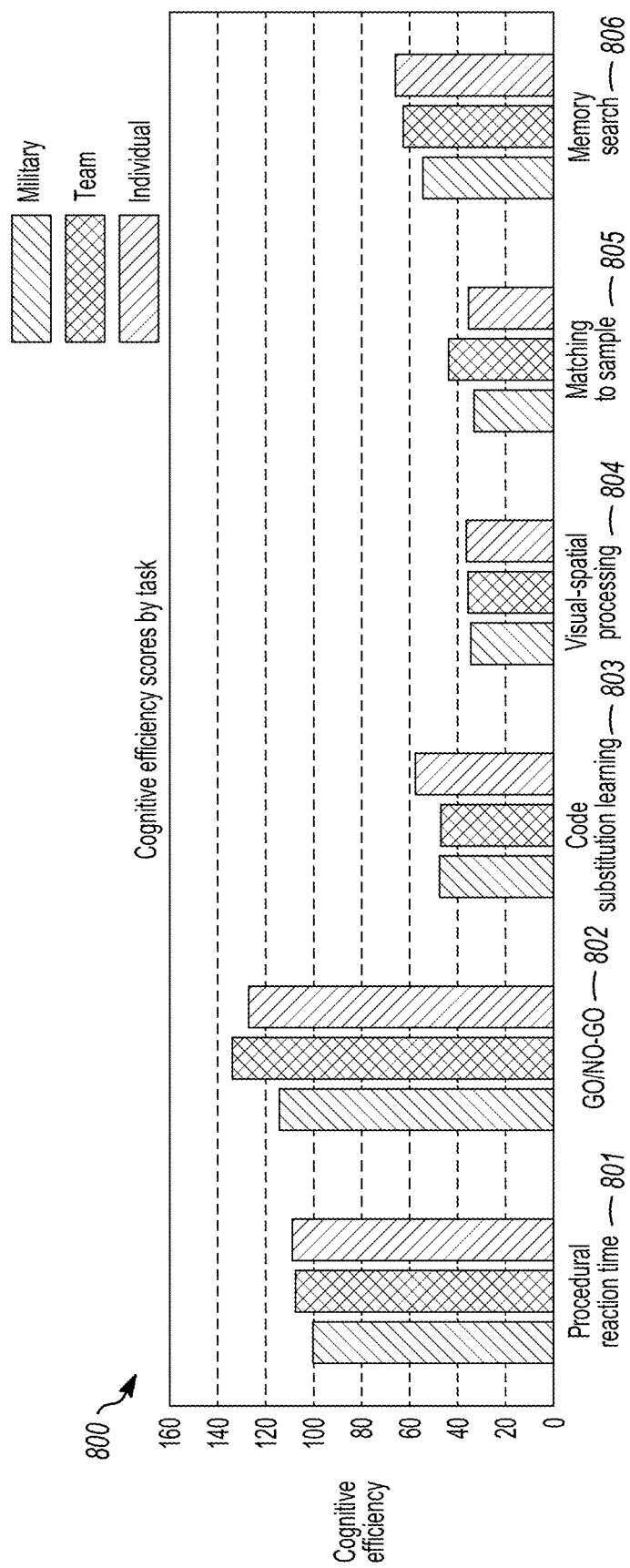
FIG. 22 is a clustered bar chart comparing the cognitive efficiencies of two groups and one individual in performing a set of tasks.

The report 161 also provides a summary and detailed review of the subject's performance on tasks or tests, as well as a review of the subject's sleep quality, levels of stress, and emotional resilience. For example, FIG. 22 illustrates a clustered bar chart 800 that appears in a group-level comparative brain training implementation of the report 161. The bar chart 800 illustrates cognitive efficiency scores (which are function of both speed and accuracy) across several tasks 801-806. The bars on the right side of each cluster show the individual's scores. The bars in the middle of each cluster show the average team score. Finally, the bars on the left side of each cluster show comparable performances by an elite team of special forces on the same tasks. In the report, the chart of FIG. 22 can be broken up into separate clusters, each of which is accompanied by an explanation of what the task reveals. For example, the report 161 may explain that simple reaction time 801 is a measure of pure reaction time and accuracy, and that Go-No-Go 802 is a measure of sustained attention and impulsivity, assessing the speed and accuracy of targets, omissions, and commissions.

Figure 23:
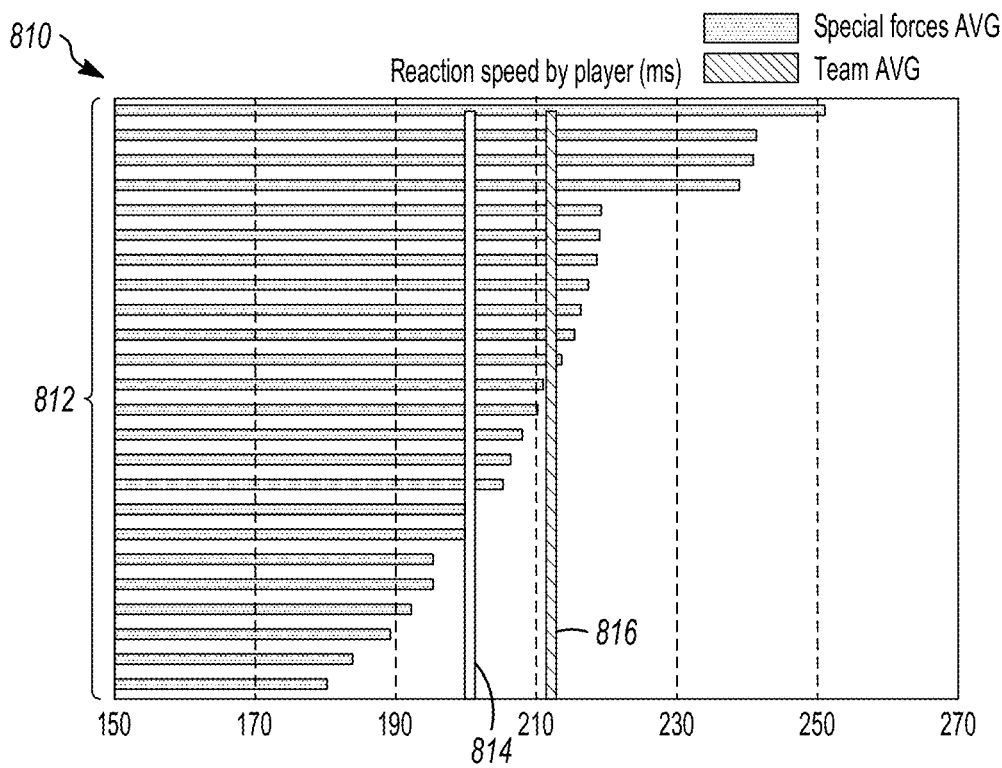
FIG. 23 is a bar chart comparing the reaction speeds of a team's players with the team average and an expert group (used as an external objective reference).

FIG. 23 illustrates a player/team-member-comparative chart 810 in an embodiment of a report particularly intended for coaches, trainers, or managers. The chart 810 compares the reaction speeds of each player 812 on the team, and further compares those reaction speeds with benchmark values, such as the average speed 814 of the players on the team, the average speed 816 of an elite group such as military special forces, and/or the average speed of a population of normal, healthy adults. In one implementation, not shown in the drawings, two sets of bars are provided for the player or team member for showing their reaction speeds both before and after completing some cognitively demanding tasks. This illustrates the impact that occurs in the players'/team-members' brains from cognitive fatigue.

Figure 24:
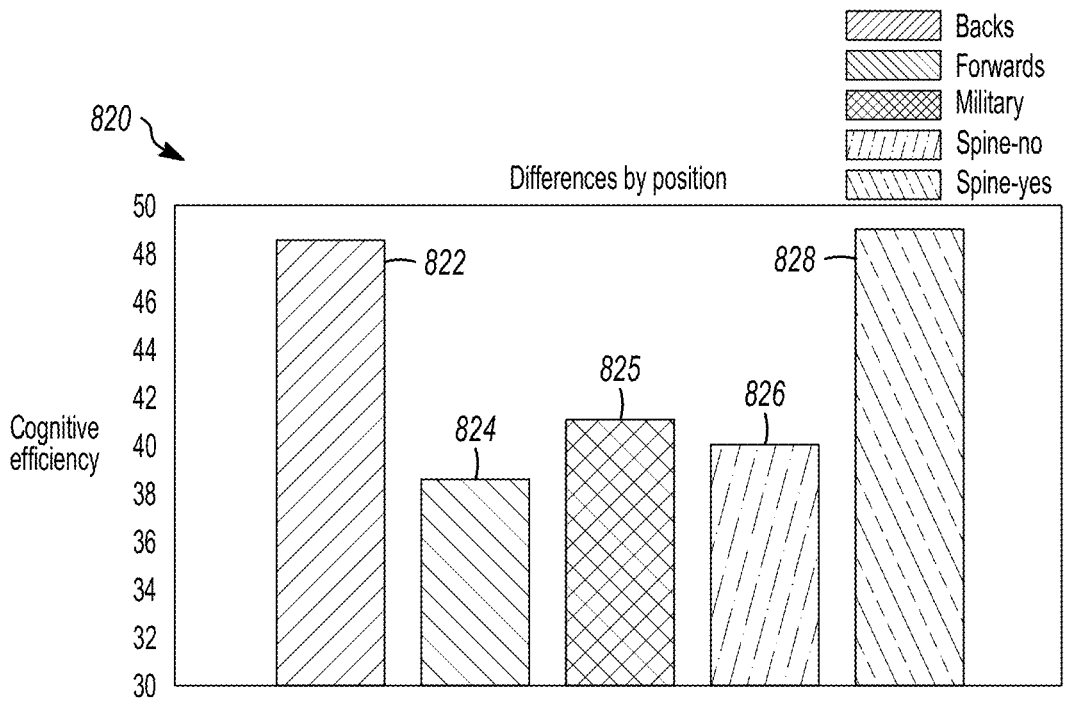
FIG. 24 is a bar chart illustrating a relationship between the reaction speeds of the team's players with the positions that they play.

FIG. 24 illustrates a chart 820 that groups the players/team-members according to their positions (e.g., backs 822, forwards 824, military 825, spine-no 826 and spine-yes 828; in a corporate environment, these groups might be programmers, designers, salespeople, those in marketing, etc.) in the sport/corporate environment and illustrates the average cognitive efficiency score for each group. In this example of Rugby players, backs and spine players are shown to perform better than forwards in tests for visual spatial memory and pattern recognition.

Figure 25:
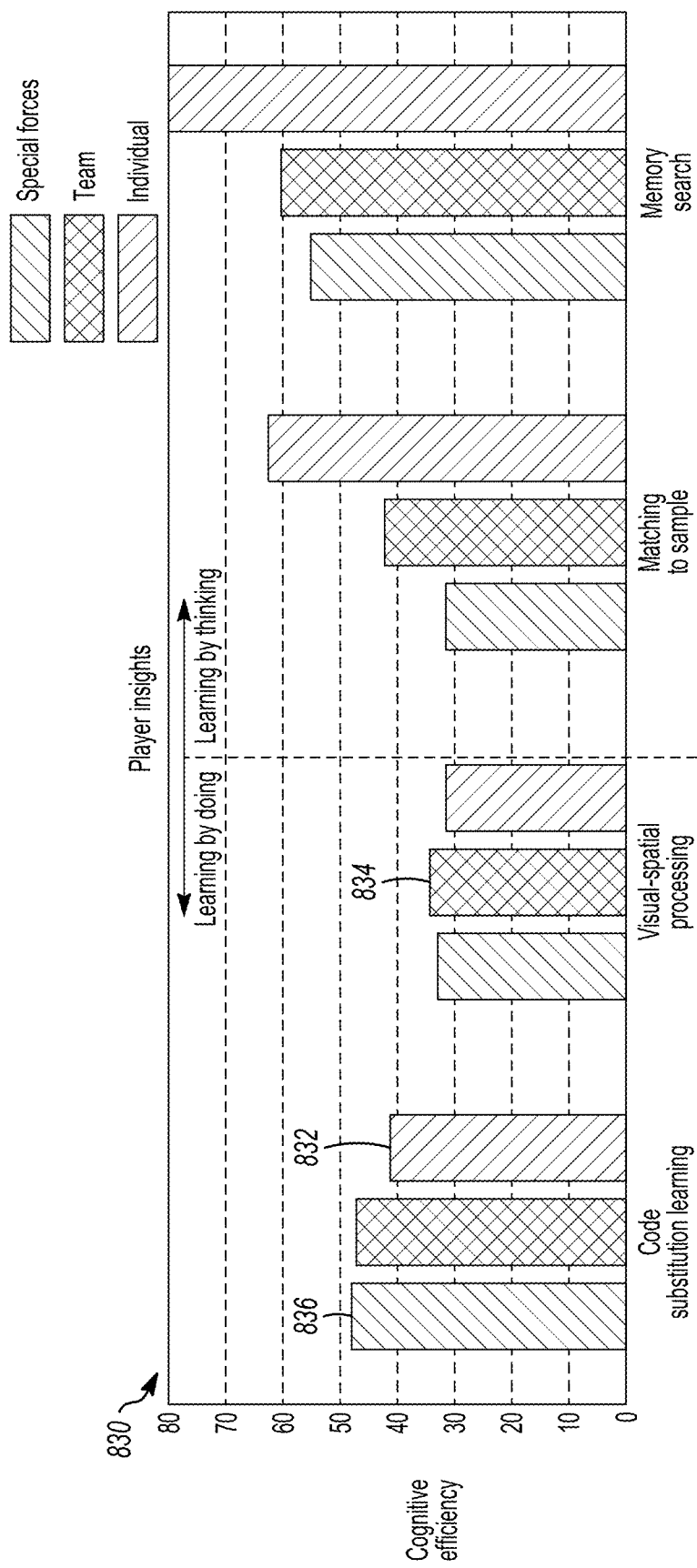
FIG. 25 is a clustered bar chart illustrating how one player's strengths lie in tasks that involve learning by thinking as opposed to learning by doing.

FIG. 25 illustrates a clustered bar chart 830 that compares the performances of an individual player/team-member 832, the team 834, and an elite military group 836 on code substitution learning, visual-spatial processing, matching to sample, and memory search tasks. The player/team-member in this example has a clear learning-by-thinking preference. This indicates that the player/team-member is more information driven and would benefit most from that type of coaching approach. This aids a coach, trainer, or manager in determining the relative importance and prevalence of different cognitive skills for each position/role.

In one implementation, the report 161 states that the subject has high levels of stress on a daily basis. Or it can state that the subject showed resilience to adverse events like a missed shot, an unforced error, or a bad call. In a sports implementation, NEPAS 100 might require either human input or game data from a game statistician, or a machine learning program that has image processed and analyzed the game, to produce the game data. The report 161 also describes each of the tasks or tests and explains which aspects of cognitive skill they reveal.

The report 161 also includes one or more images or videos, or one or more links thereto, of the subject's brain activity during a task and/or during a baseline task in which the subject rested with closed eyes. In one implementation shown in FIGS. 2 and 3, at least two images of the brain, one image 170 illustrating regions of the brain that are more active, and the second image 171 illustrating pathways in a manner that reveals their connectivity strength. Alternatively, the video can show side-by-side images of the subject's brain and a normal, expert, or ideal brain performing a task. In yet another alternative, the video can show a map or graph illustrating the state and/or functional connectivity of the subject's brain.

Figure 26:
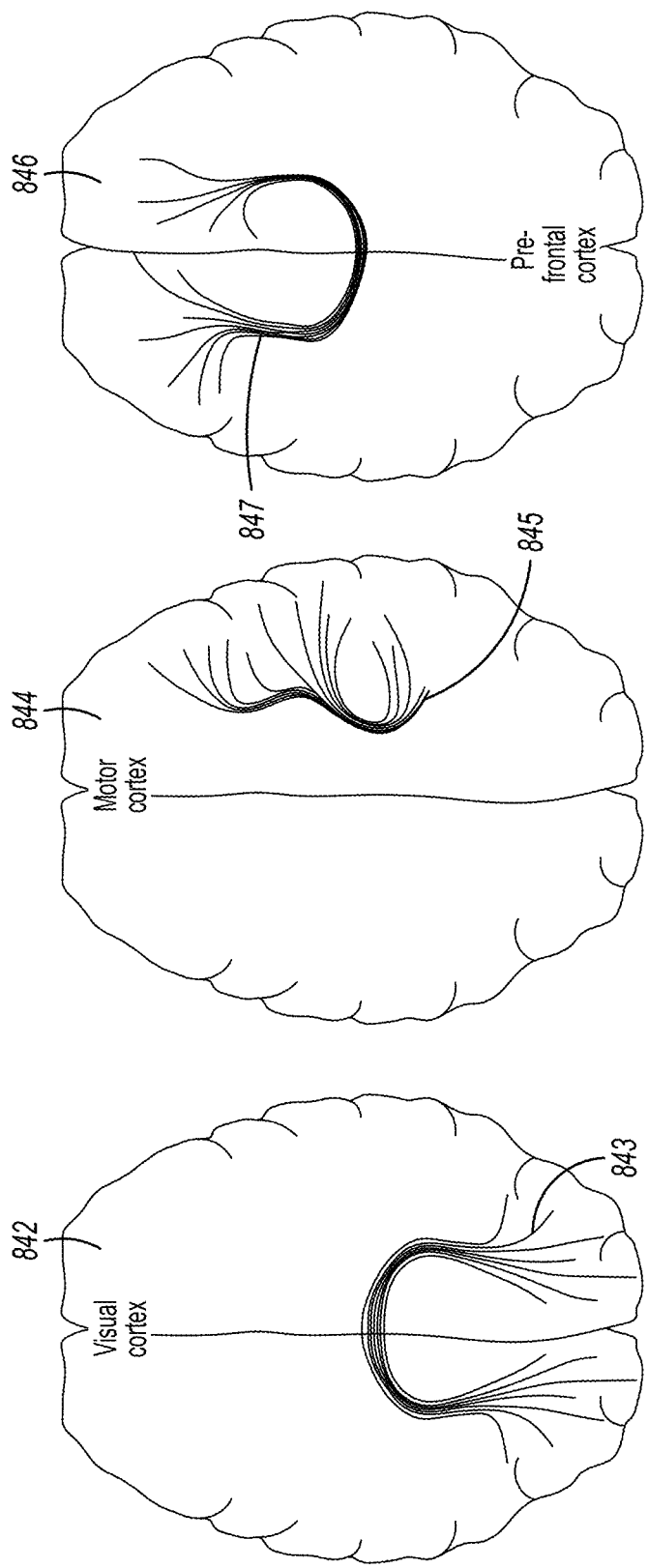
FIG. 26 are brain images that illustrate pathways in three principal brain regions of interest—the visual cortex, the motor cortex, and pre-frontal cortex.

FIG. 26, for example, illustrates three brain images 842, 844, and 846 from the prior art whose darker areas represent three brain regions of interest—the visual cortex 843, the motor cortex 845, and the pre-frontal cortex 846. The report 161 can include similar images with color, breadth and/or brightness to illustrate the strength of key inter-cortical pathways for a player, team-member, trader, salesperson, or other subject.

In another implementation, the report 161 identifies physiological (including neurophysiological) characteristics that are correlated with aspects of the subject's performance.

In one implementation, data processed using PCA and/or ICA is used to generate 3D maps or graphs illustrating the state and/or functional connectivity of the subject's brain and/or 3D maps or graphs that use color, brightness, and/or thickness to illustrate a ratio or other comparison between the pathways' task-state power values and the baseline power values.

The report 161 explains and/or displays how the subject's physiological and neurophysiological data, as well as the subject's self-reported characteristics on attention, distractibility, workload, and sleep deprivation are correlated with the subject's performance. In one implementation, the report 161 provides one of four observations based upon a comparison between simple reaction times for the first and last tasks of a session or day, where the subject also performed a series of cognitively challenging tasks in between: (1) both tasks were performed within normal limits and there was no significant difference in reaction times (meaning cognitive endurance was maintained), (2) both tasks were performed within normal limits but reaction times for the first task were better than for the last task (meaning cognitive fatigue occurred), (3) both tasks were performed within normal limits but reaction times for the last task were better than for the first task (meaning the participant could have benefited from a cognitive warm-up), and (4) one or both of the tasks was below normal limits (meaning that intervention is needed and cognitive reserve is depleted).

The report 161 also describes and graphically illustrates how the subject's measured cognitive efficiency, procedural reaction time, and go/no-go performance compares with that of one or more populations of persons. In one implementation, the report 161 includes brain activity images of the subject's brain. Another implementation of the report 161 adds a comparative view of brain activity representative of the population or a population norm. In another implementation, the report 161 includes contrasting images of the person's brain activity before and after performing the task a single time, or before and after performing the tasks over N repetitions, where N is greater than or equal to 1.

Moreover, the report 161 provides an inferential analysis of the integrity of the subject's brain systems, including a comparative assessment of the number of links or axon-formed connections in a relevant brain pathway and an assessment of the relative speed and bandwidth of the relative brain pathway.

Furthermore, the report 161 describes how the subject can get or keep his/her brain in optimal readiness and condition. For example, the report 161 describes ways in which the subject can get a full night's sleep, manage stress, and become more resilient. The report 161 can also provide a person with a reasonable achievement goal that includes an illustration of a sought-after brain signature. Finally, the report 161 also describes an optimized training regimen and schedule for the subject, or simply states that an optimized training regimen can be prepared.

In another embodiment, parts or all of the subject matter described in the report 161 are also displayed to the subject while the subject is performing the task.

As noted above, the reporting engine 160 generates reports 161 for both the individual and a third party (such as a coach, trainer or manager). The subject or a third party accesses the reports 161 through a data and report access portal 163. In one implementation, the data and report access portal 163 provides access to a dashboard 905 (FIG. 30) that includes visualizations 906-909 of the subject's physiological data 102. For the example, a brain state connectivity/brain wave correlation chart 906 would show the subject how active and focused their brain is. An efficiency bar graph 907 would show the subject variations across time in the subject's brain efficiency. A heart rate graph 908 would help the subject keep track of his/her heart rate. And a heart rate variability graph 909 would show the subject how significantly his/her heart rate is fluctuating. Other graphs (not shown) would show the subject how well their recent executions have performed relative to a benchmark.

It is contemplated that the elements of the dashboard 905 could fill the entire screen or a portion of the screen, such as a side bar or a bottom bar that extends along the length of the monitor 902.

In one implementation, different levels of access to the data 101 and 102 are provided. For example, a player or researcher might get access to the neurophysiological data 102 at a resolution of 60 Hz, a coach or personal trainer at a resolution of 20 Hz, or the league at a resolution of 1 Hz.

When NEPAS 100 is applied to sports training, the report 161 provides a high level of insight that coaches are very interested in obtaining and that can lead to interventions and boost strategies. NEPAS 100 recognizes and describes a pattern that goes with the behavior or state (e.g., emotional resilience) that is relevant to the coach. NEPAS 100 selects a recipe or regimen of tasks to address that behavior or state. For example, the regimen can include a warm-up of Posit Science tasks, Neurotracker, and baseline tasks to improve subsequent sports performance or can include a cool-down of meditative and neurofeedback tasks to allow an elite performer to down-regulate their emotional system after a highly competitive performance.

When NEPAS 100 is applied to corporate teamwork or financial trading, the reports 161 provide similarly high levels of insight for team managers or risk managers. NEPAS 100 recognizes and describes patters that go with brain states that are relevant to mediocre, average, and/or high performance. NEPAS 100 selects a recipe or regimen of tasks to address that behavior or state.

The decision engine 143 uses the data to program a task controller 143, a neurofeedback interface 144, and an intervention planner and evaluator 147. The task controller 143 modifies sensory stimulation or cognitive tasks and/or programs of training as a function of both the performance data and the neurophysiological data, and optionally also as a function of the physiological data. For example, adjustments could reduce or increase the attentional requirements of the task. In one implementation, the modifications are automatic and implemented in real time, while a task is being performed. In another implementation, the modifications are made to tasks subsequent to the one currently being performed.

In one implementation, the decision engine 160 identifies changes in the data 101, 102, or 103, or a running average of that data 101, 102, or 103, that exceed a predetermined threshold for a group or team of performers. Modifications to the individual are determined to benefit the overall group's performance. Modifications are selected to help keep the group, including the subject, paced, engaged and focused while performing the task, and to counteract boredom, fatigue and burnout.

There is no requirement that the group be confined to a particular physical space. The group members could be dispersed geographically and in various brain states (e.g., including sleep). For example, in an E-gaming or programming environment, a subject could be stimulated out of a sleep stage in order to contribute, and contribute maximally, to a team effort in that environment.

In one implementation, the neurofeedback interface 145 is one and the same as the display interface 135. In another implementation, the neurofeedback interface 145 comprises auditory, visual, stimulatory, oral, electrical and/or intravenous implements. The neurofeedback interface 145 provides one or more of the following stimuli or substances to the subject if the system detects that brain activity, a brain activity differential, or a brain activity change at a transition within the task, in a selected brain system has fallen below a threshold: electrical or magnetic stimulation administered to the subject's head; a neurotropic administered orally or intravenously to the subject; a tactile stimulation administered to the subject's body; a transient sound; and a transient light.

The intervention planner and evaluator 147 plans and monitors a program of training and other interventions for the subject that are designed to facilitate the subject's development of an expert-level brain state. An intervention plan can include, but is not limited to one or more of the following: an assessment, insights for a coach or trainer, suggestions on diet and neurotropics, brain stimulation, and cognitive stimulation. Details of the intervention plan can be included in, or provided separately from, the report.

In some implementations, the behavioral task interface 110, DSPs 103 and 111, data logger and interface 140, task controller 144, neurofeedback interface 145, intervention planner and evaluator 147, statistical engine 150, reporting engine 160, and feedback display interface 135 are embodied in one or more computers and one or more software applications for performing their functions.

Figure 2:
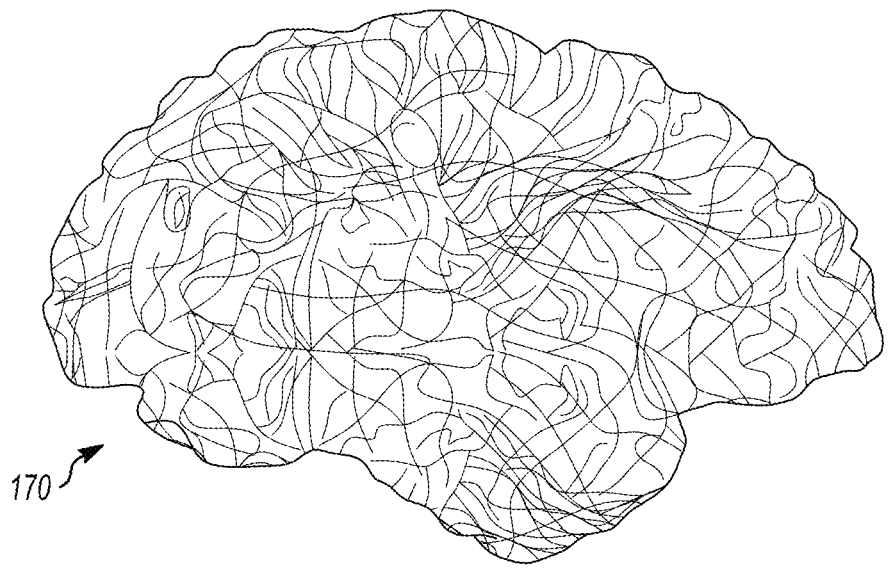
FIG. 2 illustrates one embodiment of a 3D spatial representation of a brain with extra-active pathways illuminated, oriented with a side view perspective.
Figure 3:
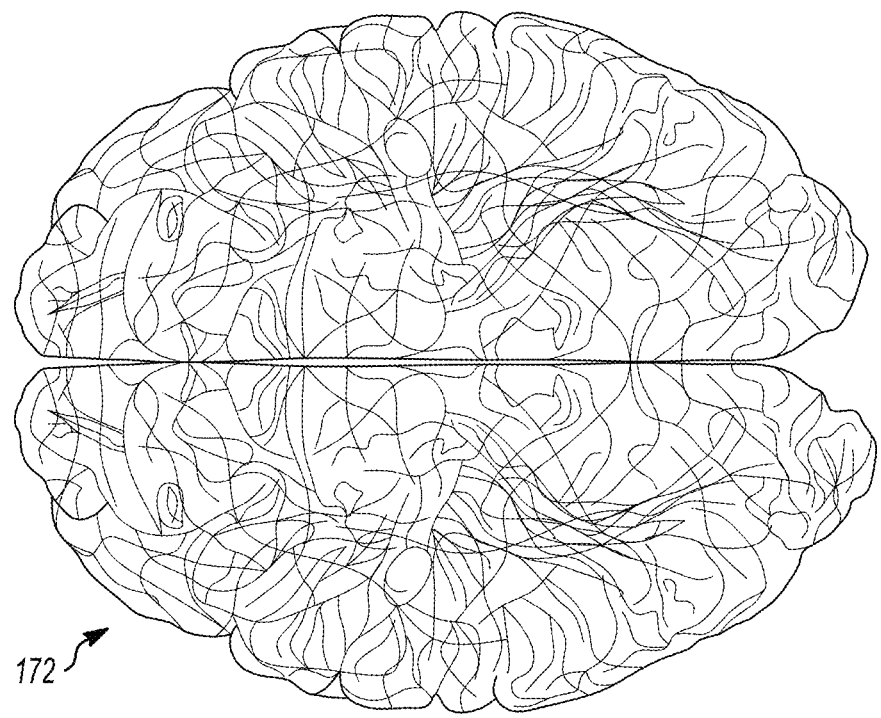
FIG. 3 illustrates one embodiment of a 3D spatial representation of a brain with extra-active pathways illuminated, oriented with a side view perspective.
Figure 4:
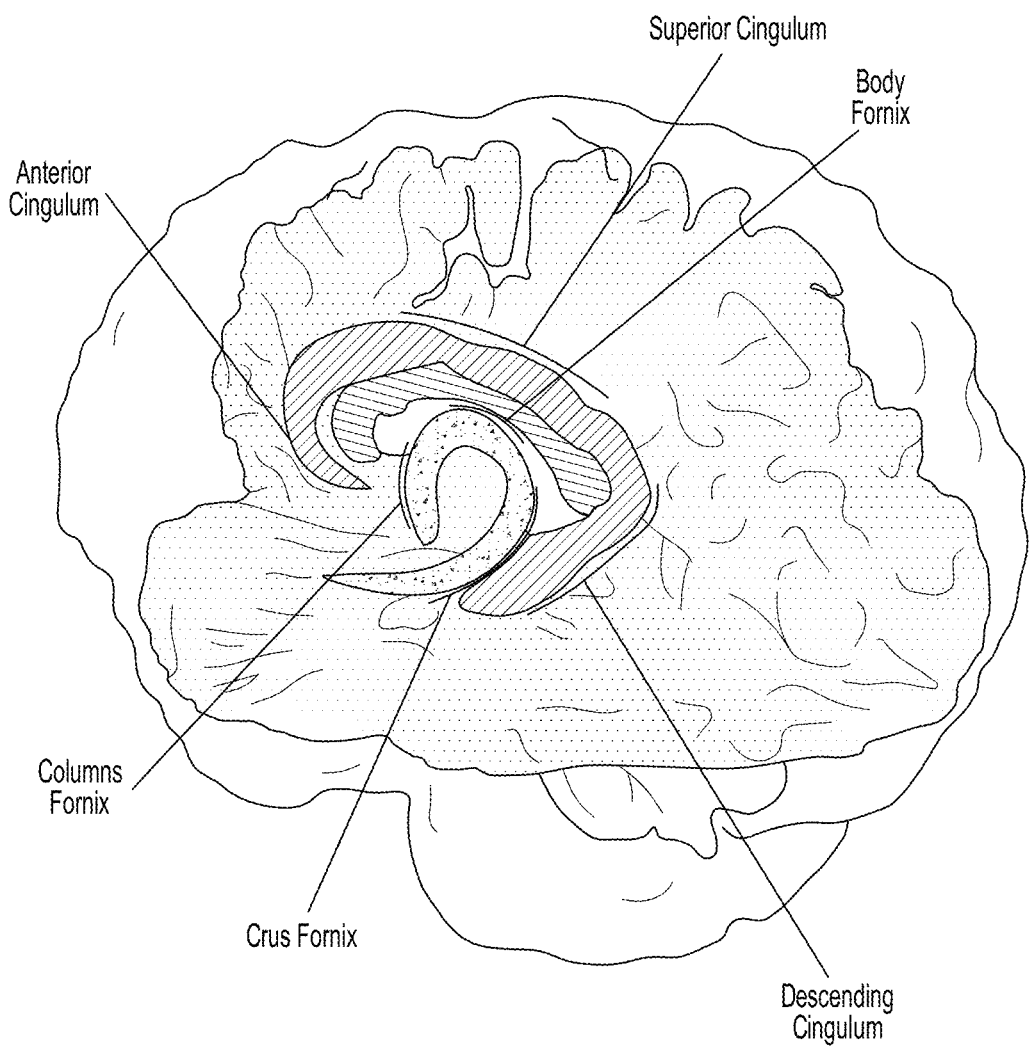
FIG. 4 illustrates one embodiment of a 3D spatial representation of brain in partial cross section illuminating selected pathways.

FIG. 2 illustrates one embodiment of a brain-mapped spatial representation 170 of brain activity, oriented to provide a side view perspective. The darker areas represent high activity. FIG. 3 illustrates another embodiment of a brain-mapped spatial representation 172 of the brain, oriented to provide a top-view perspective. In FIGS. 2 and 3, especially activated (i.e., differentially and positively activated, as compared to a baseline) pathways are illuminated, illustrating the strength and multiplicity of neural links between regions of the brain. A brain-mapped spatial representation 170 can display only selected regions of the brain. Certain exterior regions can be removed from view, as they are in FIG. 4, to better illustrate selected brain regions and pathways.

Brain-mapped spatial representations 170 and 172 can be generated using principal component analysis (PCA), independent component analysis (ICA), or other data transforms such as sparse and low-rank matrix decomposition, t-Distributed Stochastic Neighbor Embedding (tSNE), etc.

Figure 5:
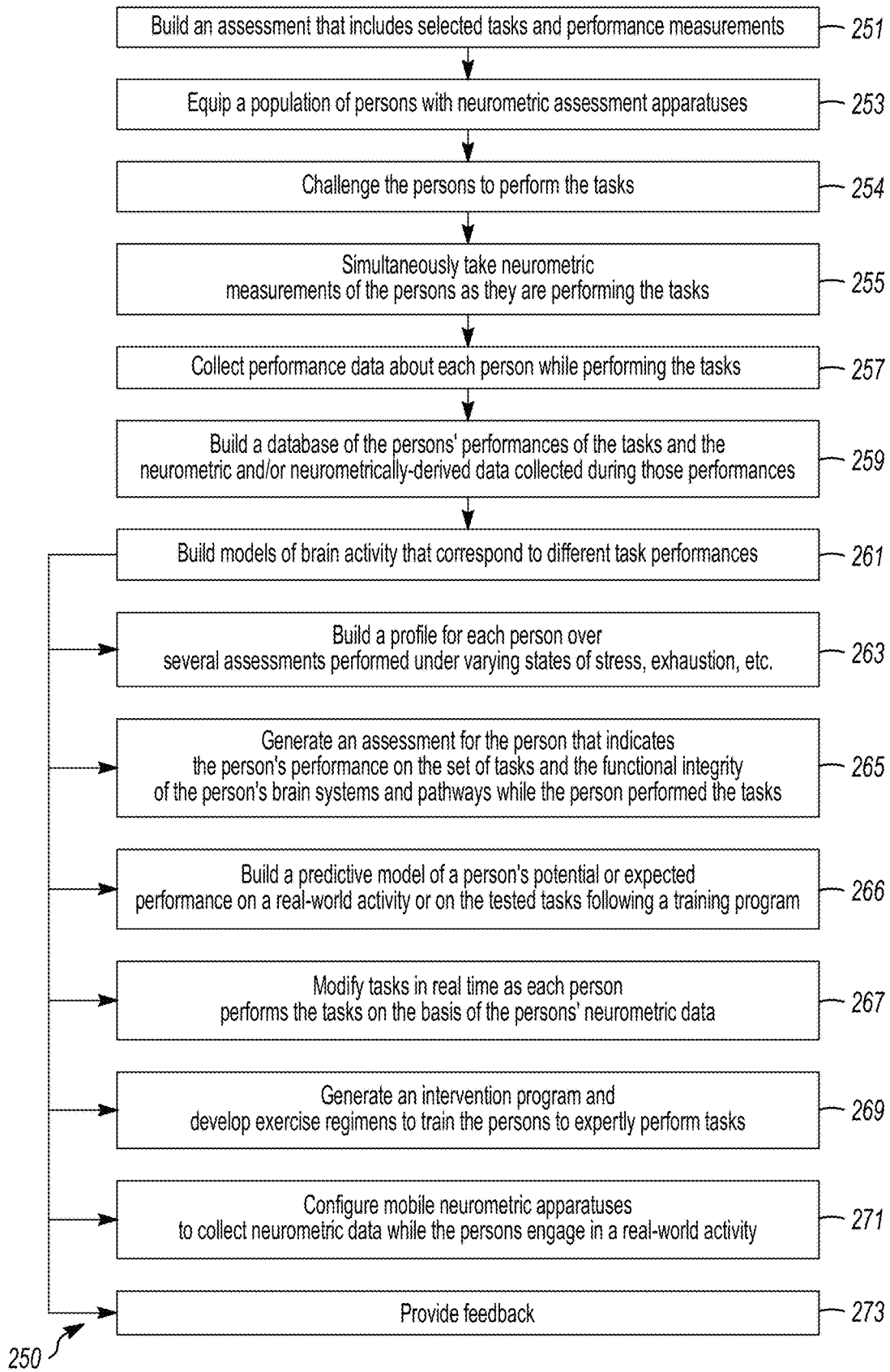
FIG. 5 illustrates one embodiment of a method of building a neurometric apparatus for enhancing a person's performance.

FIG. 5 illustrates an embodiment of a method 250 of constructing a neurometric apparatus to monitor, analyze, and/or enhance performance in a person or population of persons. The population of persons can consist or essentially consist of members of a team, an elite group, or a representative sample of the general population.

In block 251, select tasks that differentially recruit (i.e., preferentially activate or induce comparatively significant change, in a neuroscientifically distinguishable manner) selected systems, regions and/or pathways of the brain to incorporate into the assessment. Tasks can be selected to target a cognitive domain and detect abrupt brain activity changes in the person in an area associated with the cognitive domain. Such tasks are then used to indicate the integrity of specific systems of the brain. Also, select different types of tasks, such as at least one motor-behavioral task, at least one cognitively/neuropsychologically important task, at least one experiential task that the person performs in an unconfined or virtual-reality setting, and a survey-completion task. For example, the virtual-reality setting can provide a virtual representation of real settings such as golf courses, stadiums, fields, work environments, etc. Equip the person or configure a machine or computer interface to collect performance metrics while the person performs the tasks. Actions performed in the tasks should be detectable not only in a traditional way, such as through computer inputs, timers, force measurements, etc., but also through neurophysiological sensors that detect brain activity.

In block 253, equip the persons with neurometric apparatuses comprising neurophysiological sensors of brain activity. A neurometric apparatus can be formed as a neurophysiological head-mounted accessory such as a headset, a headband, a hat, helmet, or other item of apparel or device configured to be worn on the head and including a plurality of neurophysiological sensors configured to sense brain activity. In block 254, challenge the persons to perform the tasks. In one implementation, the first time a person performs the tasks, the performance data 101, neurophysiological data 102, and physiological data 103 are used to establish a baseline. This baseline is used to identify systems of the brain at which to target training.

In block 255, take neurometric measurements of each person both before and as he/she performs the tasks, and transmit the neurometric data to a record. In one implementation, neurometric measurements are taken before the tasks to evaluate the person's default mode network for a period in which the person is asked to do nothing but to lie quietly while staying awake. A representation of the person's brain activity when the default mode network is activated is used as a baseline against which the person's brain activity while performing the tasks is measured. In block 257, collect performance data about each person while the person performs the tasks, or after each task is or all of the tasks are completed, and transmit the performance data to the recorder. The neurometric data is synchronized with the performance data In block 259, build a database of the persons' performances of the tasks and the physiological and neurophysiological data (or information derived from such data) collected during those performances. Also identify correlations between the performance data and the neurometric data to construct a functional assessment of neurophysiological functions of the brain's highways from the neurometric data. To create a functional assessment, use baseline conditions or baseline stimuli and set ranges of brain activity during a brain state to determine training levels in subsequent tasks. For example, record the person's brain activity while resting to determine an average amount of energy in a specific frequency using specific scalp locations, and also record the person's brain activity while watching a video. When the person's brain activity drops below a level or a threshold—within a standard deviation (for example) of the person's resting level—use this level as a key performance indicator (KPI) of when the person is not engaged. When the person's brain activity pattern exceeds this resting activity range then assign the cognitive state of low, medium or high engagement based when compared to the resting state.

In block 261, query the database for data with which to build one or models. One model relates different types of brain activity in different regions and pathways of the brain to task performances. Another model is a 3D signature or model of brain activity corresponding to different task performances. The model or signature can be a statistical one based on a PCA and/or ICA of the data. In one implementation, multiple signatures are constructed associated with expert performance across a plurality of cognitive domains, with each signature representing expert performance in a particular cognitive domain. A person's brain activity while performing a task is compared with a corresponding signature to assess the integrity of the person's relevant brain regions and pathways.

Blocks 263-273 represent additional actions that are performed in various embodiments. All, some, or none of these actions can be included in the method 250.

In block 263, query the database for data with which to build profiles for the persons over several assessments that are conducted while the persons endure varying states of stress, exhaustion, emotional valence, etc. In block 265, generate an assessment for the person that indicates the person's performance on the tasks and describes a physiological and neurophysiological state of the subject based on the subject's performance and neurometric data. In one implementation, the assessment also assesses and illustrates, with mapped brain images, the functional integrity of the person's brain systems and pathways while the person performed the task. In block 266, build a predictive model that predicts the person's expected immediate and long-term performance and rate of progress on a related real-world activity or on the tested tasks themselves. In one implementation, an aspirational model of the person's brain activity when performing the tasks or real-world activity is presented. This can be in the form of a 3D representation of brain connectivity. The aspirational model, which is statistically based on empirical data derived from the database 141 for a whole population of persons, indicates how much the person's brain activity is expected to improve if the person completes a program of training. This aspirational model can be based upon a median of recorded brain activity improvements for persons who have completed the program of training.

In block 267, modify tasks in real time as each person performs the tasks, with the modification being a function of the person's neurometric data and optionally also the person's performance data. In block 269, generate an intervention plan, including recommendations for coaches or trainers and a customized, individual-specific training program that provides exercise regimens to train each person to expertly perform tasks.

In block 271, configure a mobile neurometric apparatus to collect neurometric data while the persons engage in a real-world activity, while another person or an interface records time-stamped observations about that activity. Examples of real-world activities include playing a sport, engaging in financial transactions in the open market, performing music, competing in a game, and performing a work task. In this manner, a person can be assessed while performing a work task, and then a training program can be created to help improve the person's productivity or to reach an expert state.

In block 273, provide feedback to each person as the person performs the real-world activity. Feedback can be provided on not only the person's performance but also the persons' cognitive states, wherein the feedback includes suggestions to improve the person's cognitive state in order to improve the person's performance. Feedback can also include comparisons of the person's scores with that of a team or greater population. Feedback can also comprise periodically updated predictions of how much longer the person will need to practice the training tasks to achieve the preselected level of proficiency (see FIG. 17). In a virtual-reality environment, the feedback can include information, graphs, tables, and/or imagery about the person's brain state, which is incorporated into the virtual reality construct, which itself can be a construct of real settings such as golf courses and stadiums.

Figure 6:
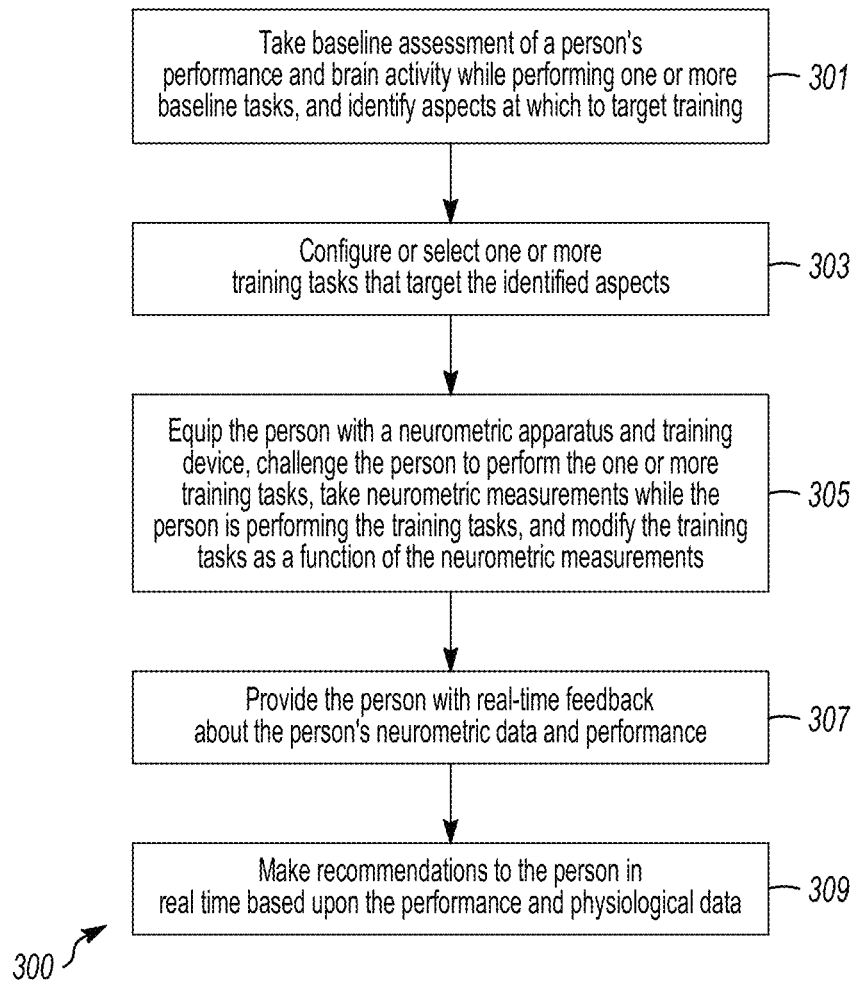
FIG. 6 illustrates one embodiment of a method of rapidly enhancing a person's performance.

FIG. 6 illustrates one embodiment of a method of rapidly enhancing a subject's performance. In block 301, take a baseline assessment of a subject's performance and brain activity while the subject performs one or more baseline tasks. Identify brain systems with subpar or suboptimal brain activity during the subject's performance of the activity. In block 303, configure or select one or more training tasks that target the identified area. Examples of training tasks include cognitive warmups, visual speed training, meditation/mindfulness, stress and recovery training. In the sports training context, cognitive warmups are daily warmups to prime the brain for practice and gameplay, focusing on improving attention, brain speed, memory, emotional recognition skills, intelligence, and navigation.

In block 305, equip the subject with a neurometric apparatus and training device, wherein the neurometric apparatus takes neurometric measurements while the subject is performing a training task. The training device challenges the subject to perform the one or more training tasks and modifies the one or more training tasks as a function of the neurometric measurements. In block 307, provide the subject with real-time feedback about the subject's neurometric data and performance. In block 309, make recommendations to the subject, optionally in real time, based upon the performance and physiological data.

Figure 7:
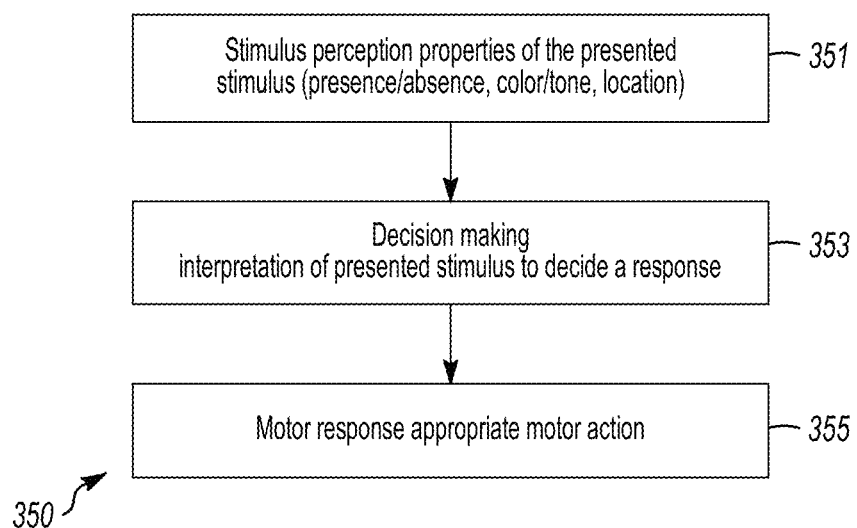
FIG. 7 illustrates three main assessment focal points for producing one embodiment of a measure of cognitive efficiency.

FIG. 7 illustrates three main assessment focal points 350 for producing one embodiment of a measure of cognitive efficiency. They are stimulus perception 351, decision making 353, and motor response 355. Stimulus perception 351 involves various properties that a subject perceives about a stimulus, such as presence/absent, color/tone, and location. Decision making 353 involves interpretations the subject makes of the presented stimulus to decide a response. Motor response 355 involves making appropriate motor actions in response to instructions.

Figure 8:
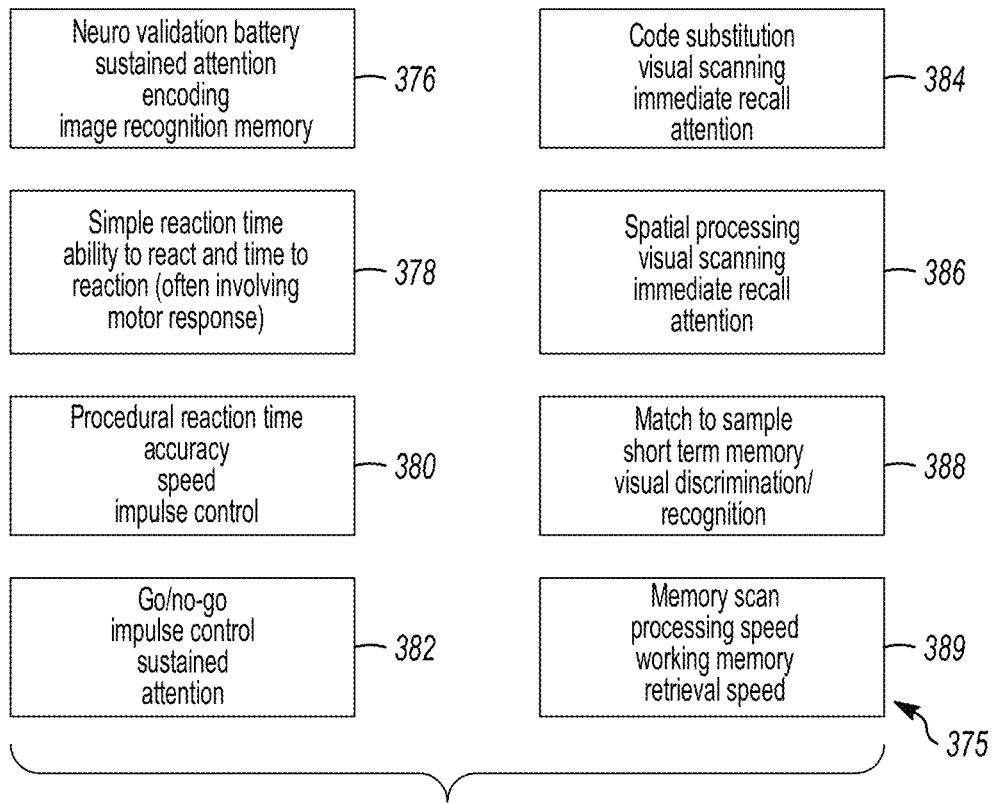
FIG. 8 illustrates one embodiment of a battery of assessment tasks.

FIG. 8 illustrates one embodiment of a bundle 375 of assessment tasks. The bundle 375 includes a neuro validation battery 376, a simple reaction time task 378, a procedural reaction time task 380, a go/no-go task 382, a code substitution task 384, a spatial processing task 386, a match to sample task 388, a memory search task 389, and another simple reaction time task 378 to measure reaction time after the rest of the tasks are completed. The neuro validation battery 376 comprises a sustained attention task, an encoding task, and an image recognition memory task.

Table 2 below describes a set of specific exercises subjects are tasked with doing in one implementation of the bundle 375.

TABLE 2

One embodiment of a set of assessment tasks

| Test Name | Task Description |
| --- | --- |
| Simple Reaction Time (SRT1) | Recognize the presence of an object and tap the object |
| Procedural Reaction Time (PRT) | Recognize 1 of 4 numbers and tap 1 of 2 buttons |
| Go/No-Go Task (GNG) | Recognize a green or gray object and only tap in response to gray |
| Code Substitution Learning (CSL) | Recognize whether or not a symbol-digit pair matches the key code shown and tap "Yes" or "No" |
| Spatial Processing (SP) | Recognize rotation of a visual object and tap "same" or "different" |
| Matching to Sample (M2S) | Recall a 4 × 4 checkerboard pattern after it disappears for 5 seconds and two options appear |
| Memory Search (MS) | Recognize letters that have been previously memorized |
| Simple Reaction Time (SRT2) | Recognize the presence of an object and tap the object (after ~15 minutes of cognitive exertion) |

The simple reaction time task 378, often involving a motor response, measures the ability to react and time to reaction. The procedural reaction time task 380 tests accuracy, speed, and impulse control. The go/no-go task 382 tests impulse control and sustained attention. The code substitution task 384 tests visual scanning, immediate recall, and attention. The spatial processing task 386 tests visual scanning, immediate recall, and attention. In one implementation, the spatial processing task 386 challenges a participant to track multiple targets moving dynamically in 3D space.

The match to sample task 388 tests short term memory and visual discrimination and recognition. The memory search task 389 provides measures of processing speed and working memory retrieval speed. In one implementation, a subject's results on these tasks are incorporated into a report 161, along with a color-coded brain image that use warmer colors to encode areas of greater brain energy, and a brain connectivity map with lines whose size and color indicate brain connectivity strength.

Another embodiment of a bundle of assessment tasks comprises the battery of eight (8) cognitive tests (code substitution, matching sample, memory search, etc.) and seven (7) psychological surveys set forth in the Defense Automated Neurobehavioral Assessment (DANA). DANA typically takes about 20 minutes to complete and provides an automatic report which can be incorporated into NEPAS 100's report 161.

Figure 9:
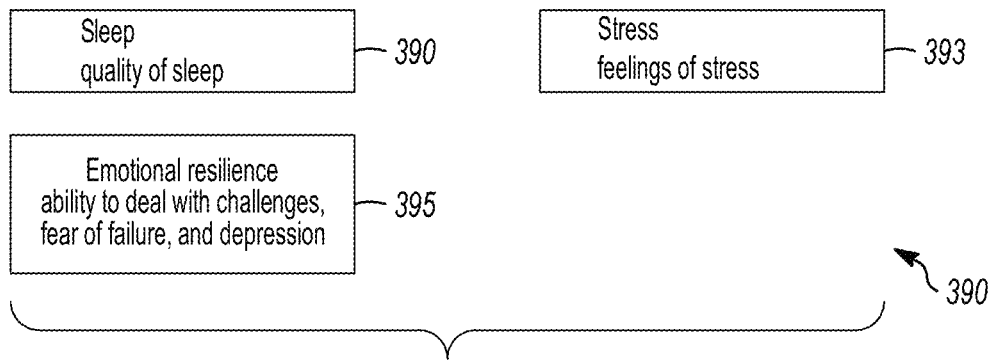
FIG. 9 illustrates components of one embodiment of a behavioral assessment.

FIG. 9 illustrates components of one embodiment of a behavioral assessment 390. The behavioral assessment 390 assesses a subject's sleep quality 391, feelings of stress 393, and emotional resilience 395. Emotional resilience 395 refers to the ability to deal with challenges that can take many different forms, including for example, fear of failure, exhaustion, frustration, adversity, criticism, humiliation, and depression.

Figure 10:
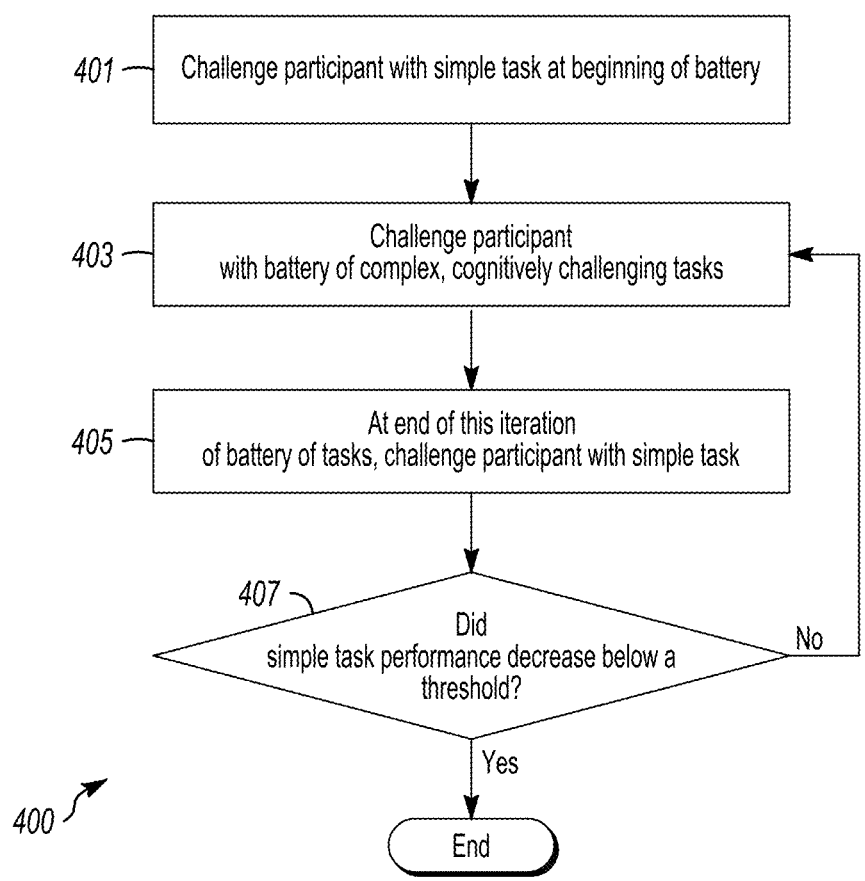
FIG. 10 illustrates one embodiment of a method of assessing cognitive reserve.

FIG. 10 illustrates one embodiment of a method 400 of assessing cognitive reserve. In block 401, challenge the participant with simple task at the beginning of an assessment. Afterwards, in block 403, challenge the participant with a battery of complex, cognitively challenging tasks. Then, in block 405, at end of the completion of one iteration of the battery of tasks, challenge the participant, once again, with a simple task. In block 407, compare the before and after simple task performances. If the post-battery simple task performance dropped at least a threshold amount below the pre-battery simple task performance, the process returns to block 403.

Figure 11:
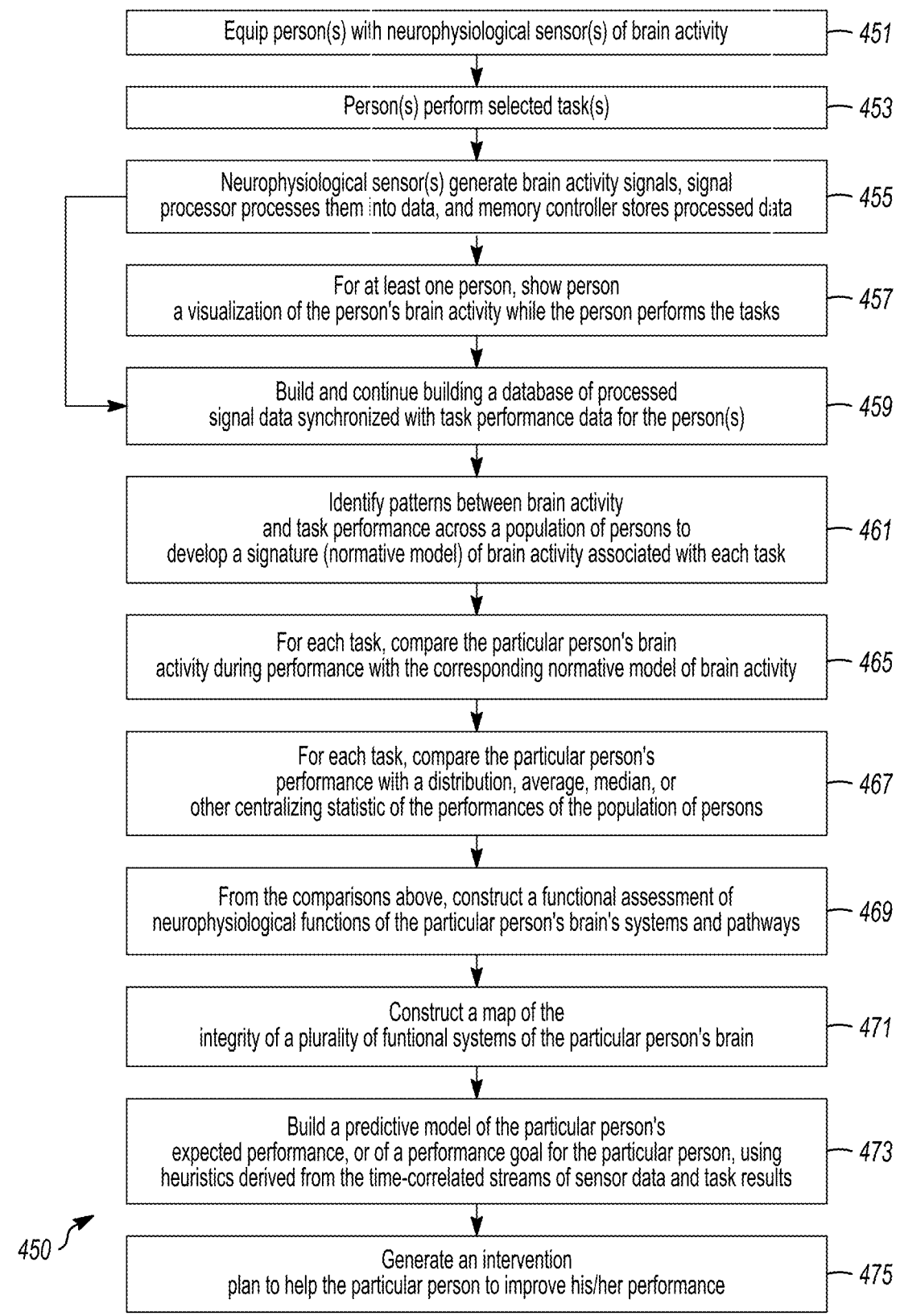
FIG. 11 illustrates one embodiment of a neurocognitive assessment and closed-loop feedback system that illustrates a subject's brain activity while the subject performs tasks, creates signatures of brain activity associated with different tasks, compares the subject's brain activity with those of a larger population, constructs a functional assessment and map of a subject's brain systems and pathways, and generates an intervention plan for the subject.

FIG. 11 illustrates one embodiment of a holistic neurocognitive assessment, training, and closed-loop feedback method 450 for illustrating a subject's brain activity while the subject performs tasks, creating signatures of brain activity or functional connectivity associated with different tasks, comparing the subject's brain activity with those of a larger population, constructing a functional assessment, and map of a subject's brain systems and pathways, and generating an intervention plan for the subject.

In block 451, equip one or more participants with neurophysiological sensors of brain activity. In block 453, the participant(s) perform(s) a series of selected tasks. In block 455, the neurophysiological sensor(s) generate brain activity signals, a signal processor processes them into data, and a memory controller stores the processed data. In block 457, show each participant a visualization of the participant's brain activity while the subject performs the tasks.

In block 459, build or add to a database of processed signal data synchronized with task performance data for the participants. In block 461, identify patterns between brain activity and task performance across a population of participants to construct a signature (normative model) of brain activity and/or functional connectivity associated with each task. This preferably involves distinguishing brain activity in multiple networks of the brain, including not only the network associated with the task activity, but also networks associated with emotional engagement. In one embodiment, PCA and/or ICA is performed to identify such patterns.

In block 465, compare a particular subject's brain activity during task performance with the corresponding normative model of brain activity. In block 467, compare the particular subject's performance of each task with a distribution, average, median, or other centralizing statistic of the performances of the population of subjects.

In block 469, construct, from the comparisons above, a functional assessment of neurophysiological functions of the particular subject's brain's systems and pathways. In block 471, construct a map—e.g., through spectral density estimation, PCA, ICA, etc.—of the integrity of a plurality of functional systems of the particular subject's brain.

In block 473, build a predictive model of the particular subject's expected performance, or of a performance goal for the particular subject, using heuristics derived from time-correlated streams of sensor data and task results. In one implementation, the predictive model predicts how long the subject will need to practice or train to achieve a predefined level of performance or proficiency. In another implementation, the model predicts a level of performance or proficiency that the particular subject will achieve if the subject keeps training indefinitely. In yet another implementation, the model predicts an asymptotic rate of progress over time that the subject will achieve with training. In block 475, generate an intervention plan to help the particular subject to improve his/her performance.

Figure 12:
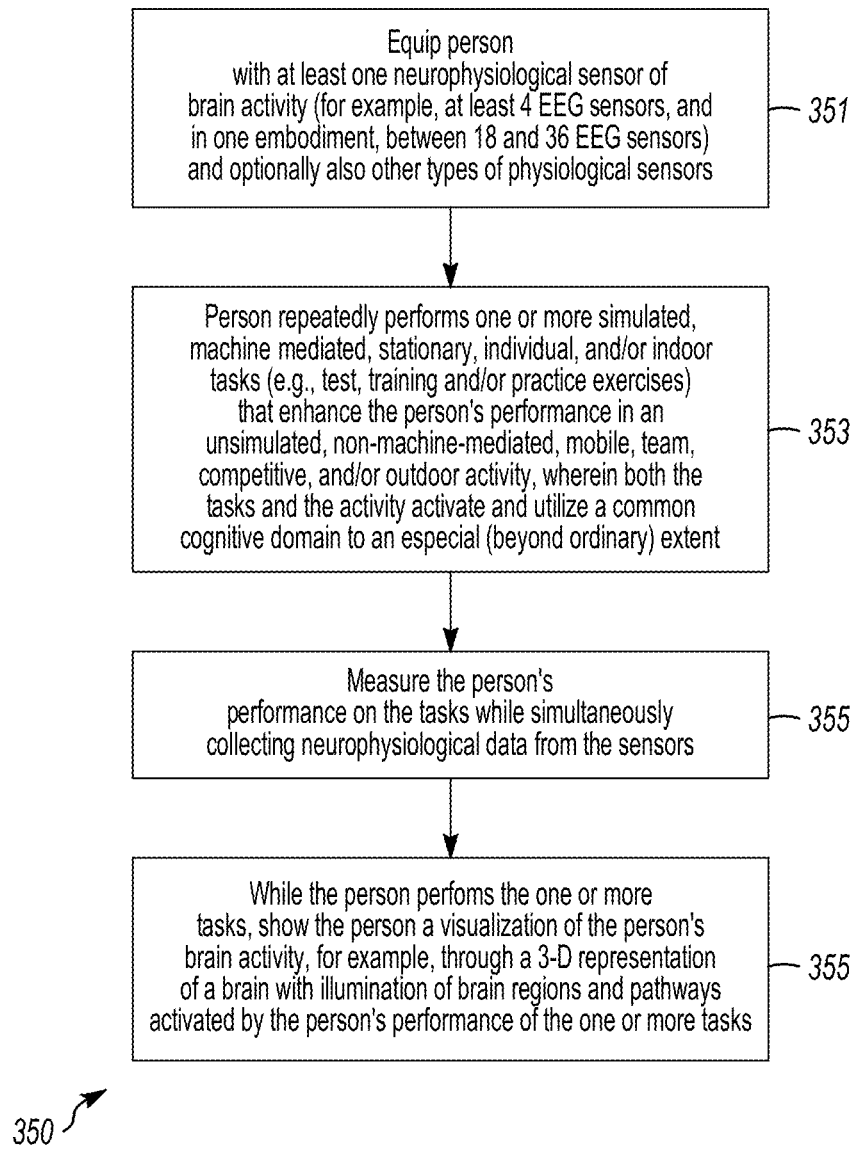
FIG. 12 illustrates one embodiment of a method of using brain imagery feedback to enhance performance.

FIG. 12 illustrates one embodiment of a method 500 of using brain imagery feedback to enhance performance in a real-world, un-simulated, and non-machine-guided activity such as a competitive sport, working at a job, or an outdoor activity. In block 501, equip a subject with at least one neurophysiological sensor of brain activity (for example, at least 4 EEG sensors, and in one embodiment, between 18 and 36 EEG sensors) and optionally also other types of physiological sensors. In block 503, select one or more simulated, machine-mediated, stationary, individual, and/or indoor tasks (e.g., test, training and/or practice exercises) that enhance the subject's performance in an un-simulated, non-machine-mediated, mobile, team, competitive, and/or outdoor activity. Moreover, select tasks that differentially recruit, activate, or utilize one or more common cognitive domains with the activity, as demonstrated by detectable changes in electrical or brain wave activity (e.g., higher-than-average frequency brain waves) of the associated system(s) of the brain, or as demonstrated by a comparison of systems of the brain significantly and markedly activated by a task with systems of the brain not significantly activated by the task. The tasks should be designed to produce a desired brain change-one that is closer to the brain state of an expert on the activity. Have the subject repeatedly perform the tasks over a period as short as a few minutes or as long as many years. In block 505, measure the subject's performance on the tasks while simultaneously collecting neurophysiological data from the sensors. In block 507, while the subject performs the one or more tasks, show the subject a visualization of the subject's brain activity, for example, through a 2D or 3D representation of a brain with illumination of brain regions and pathways activated by the subject's performance of the one or more tasks.

Figure 13:
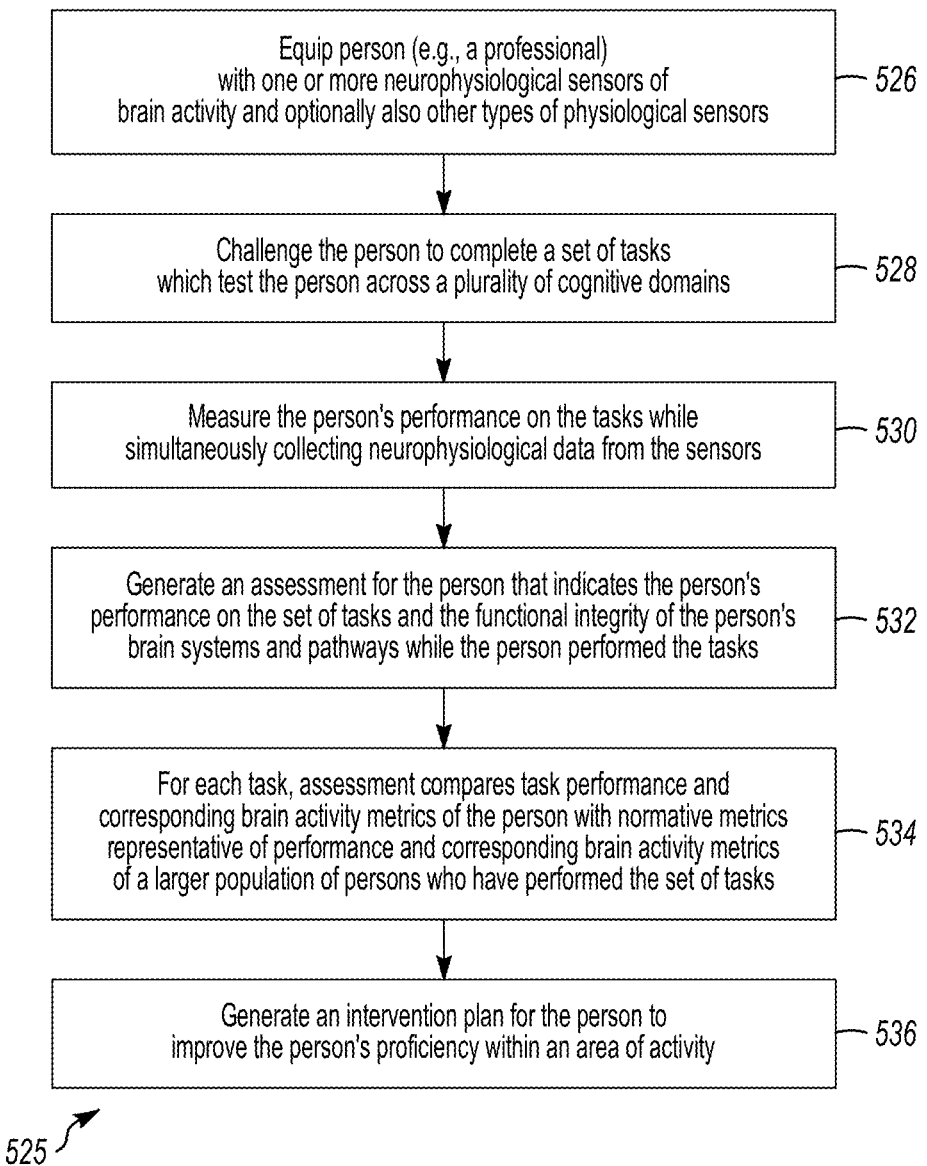
FIG. 13 illustrates one embodiment of a method of revealing functional systems of the brain.

FIG. 13 illustrates one embodiment of a method 525 of revealing functional systems of the brain. In block 526, equip a subject—for example, an athlete or professional—with one or more neurophysiological sensors of brain activity and optionally also other types of physiological sensors. In block 528, challenge the subject to complete a set of tasks which test the subject across a plurality of cognitive domains. In block 530, measure the subject's performance on the tasks while simultaneously collecting neurophysiological signal data from the sensors. In block 532, generate an assessment for the subject that indicates the subject's performance on the set of tasks and the functional integrity of the subject's brain systems and pathways while the subject performed the tasks. The assessment on the functional integrity is produced, in one implementation, by decomposing and bandpassing the signal data into multiple components across multiple frequency bands and then finding correlations between characteristics of the multiple components. The correlations are a useful approximation of the subject's functional connectivity. An example of this type of analysis is described in the discussion of the Portfolio Manager Case Study, discussed later in the specification.

In block 534, for each task, include in the assessment a comparison of task performance and corresponding brain activity metrics of the subject with normative metrics (e.g., a group performance metric and a corresponding group brain activity metric) that are representative of performance and corresponding brain activity metrics of a larger population of subjects-such as of athletes in the same sport or sport position or professionals in the same profession-who have performed the set of tasks.

In block 536, generate an intervention plan for the subject to improve the subject's proficiency within an area of activity. The plan includes exercises that preferentially activate selected systems and pathways of the subject's brain. The plan can also include the administration of a neurotropic or oral or intravenous supplement and/or coaching or training suggestions.

Figure 14:
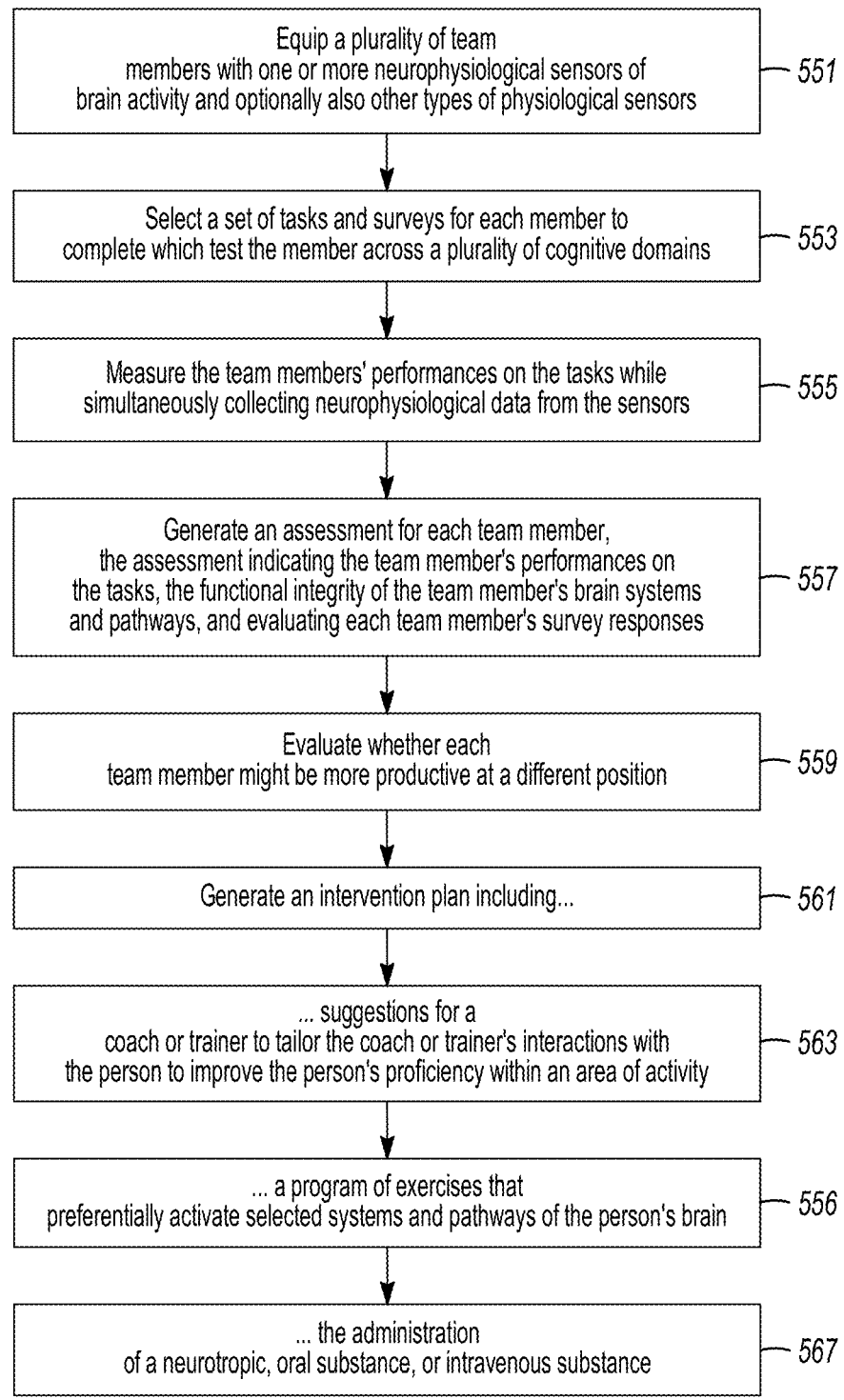
FIG. 14 illustrates one embodiment of a method of enhancing team preparation and coaching.

FIG. 14 illustrates one embodiment of a method 550 of enhancing team preparation and coaching. For example, goals in improving an athlete's/team-member's performance can include improved reaction time, increased motor speed, faster decision making, better performance under pressure, and shortened recovery time. Suitable metrics include brain activity and neural pathways, measuring baseline performance and improvements over time, comparing how players compare to each other, and comparing how the team compares to other elite teams. Desirable coaching insights would include a deeper understanding of each athlete's/team-member's brain strengths and weaknesses, greater insight into how each athlete/team-member learns, and information to help coaches/managers/trainers work with each athlete/team-member and for each athlete/team-member to stay in the zone.

In block 551, equip a plurality of team members with one or more neurophysiological sensors of brain activity and optionally also other types of physiological sensors. In block 553, select a set of tasks and surveys for each member to complete which test the team member across a plurality of cognitive domains. In block 555, measure the team members' performances on the tasks while simultaneously collecting neurophysiological data from the sensors. In block 557, generate an assessment for each team member, the assessment indicating the team member's performances on the tasks, the functional integrity of the team member's brain systems and pathways, and evaluating each team member's survey responses. In one implementation, the assessment also includes one or more of the following predictions: the player's/team-member's capacity to achieve a predefined level of proficiency through practicing and interventions; the amount of time and/or training and intervention needed to achieve the predefined level of proficiency; how well the team would play or operate if team positions/roles were reassigned amongst the players/team-members; and how well the team would play or operate if team positions/roles or more team players underwent targeted training. For example, the assessment may show that the team would perform 25% better if player/team-members A and B or B and C underwent training; but that targeted training on player/team-members A and C would provide less of a benefit.

In block 559, evaluate whether each team member might be more productive at a different position. This evaluation is based on predictive heuristics (see FIG. 17), which identifies an optimal assignment of players to team positions that provide the greatest odds of making the team successful. In one implementation, this evaluation is based on comparisons of statistical predictions of how proficient each team member would be in each of several positions, both with and without training and interventions.

In block 561, generate an intervention plan. As illustrated in block 563, the intervention plan can include suggestions for a coach, trainer or manager to tailor the coach's, trainer's, or manager's interactions with the subject to improve the subject's proficiency within an area of activity. As illustrated in block 565, the intervention plan can include a program of exercises that preferentially activate selected systems and pathways of the subject's brain. As illustrated in block 567, the intervention plan can include the administration of a neurotropic, oral substance, or intravenous substance.

Figure 15:
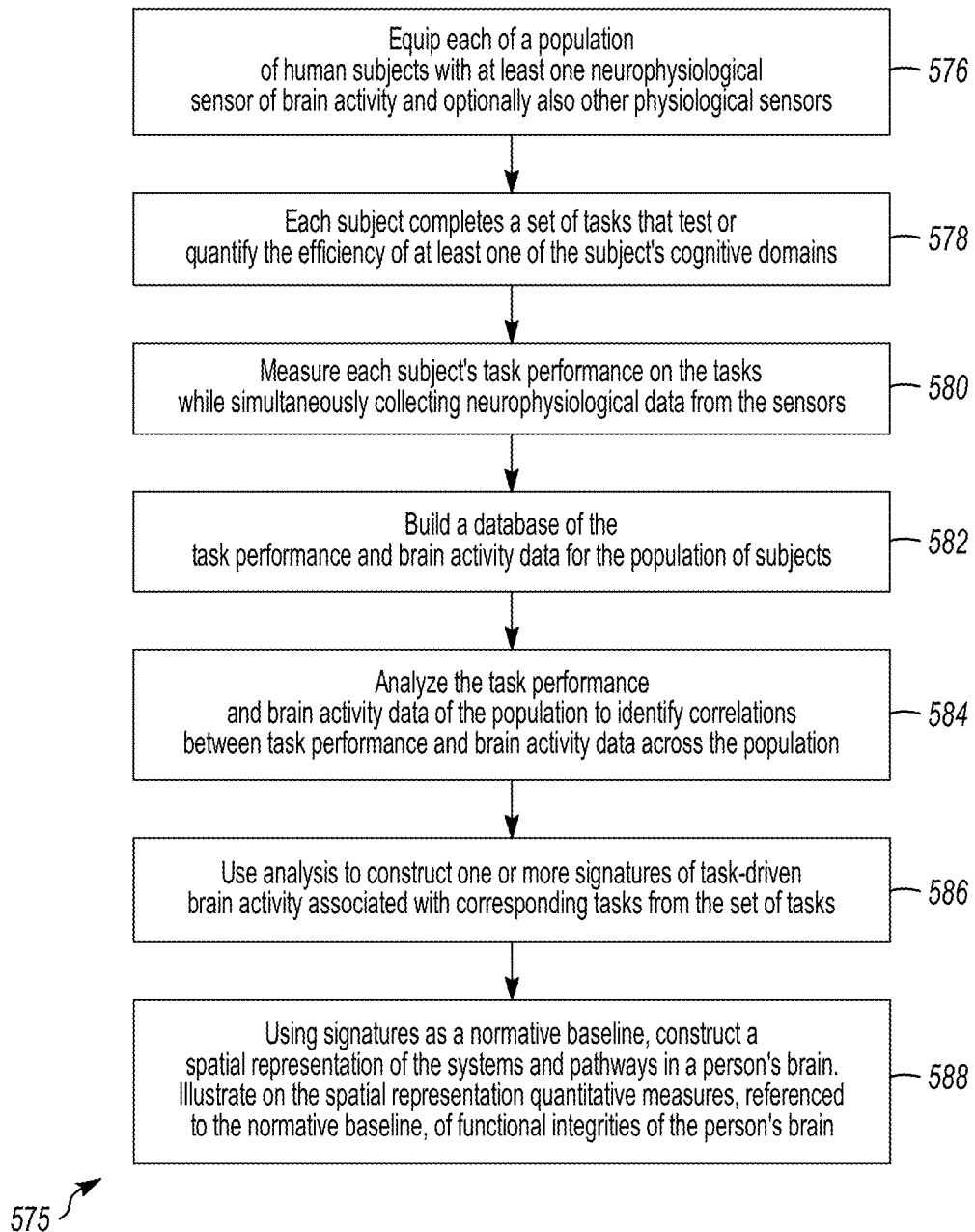
FIG. 15 illustrates one embodiment of a method of identifying signatures of task-driven brain activity.

FIG. 15 illustrates one embodiment of a method 575 of identifying signatures of task-driven brain activity. In block 576, equip each of a population of human subjects with at least one neurophysiological sensor of brain activity (e.g., at least 4 EEG sensors and in one embodiment, between 18 and 36 EEG sensors) and optionally also other types of physiological sensors. In block 578, each subject completes a set of tasks that test or quantify the efficiency of at least one of the subject's cognitive domains. In block 580, measure each subject's task performance on the tasks while simultaneously collecting neurophysiological data from the sensors. In block 582, build a database of the task performance and brain activity data for the population of subjects.

In block 584, analyze the task performance and brain activity data of the population to identify correlations between task performance and brain activity data across the population. In one embodiment, PCA and/or ICA is performed to identify such patterns. In block 586, use the analysis to construct one or more signatures of task-driven brain activity associated with corresponding tasks from the set of tasks. Each signature is a representation of characteristic levels of brain activity in one or more brain systems and/or pathways between the brain systems that are differentially activated by the task. Preferably, each signature quantifies levels of brain activity across a distribution of task performance levels, wherein the levels indicate a range of times, difficulty levels, and/or accuracy levels with which the task is performed.

In one implementation, signatures are built by inputting the database of task performance and brain activity data into a machine learning apparatus that identifies brain systems and/or pathways between the brain systems that are activated by each of the tasks and that further identifies degrees to which activity in said brain systems and/or pathways are correlated with task performance. Signatures are further refined by inputting data relating to several subjects' performances on tasks or in practical, real-world activities into the machine learning apparatus. The machine learning apparatus produces a matrix correlating a plurality of variables, including performance in tasks and performance in practical, real-world activities, with brain activity or quantitative representations of the brain systems' functional integrities. The machine learning apparatus also creates a prediction heuristic based on the correlation matrix which generates a prediction of a person's performance in a selected one of the practical, real-world activities as a function of the person's brain activity and performance of a task.

In block 588, using the signatures as a normative baseline, construct a spatial, spatio-temporal, and/or frequency-band-passed representation of the systems and pathways in a subject's brain. Illustrate on the representation quantitative measures, referenced to the normative baseline, of functional integrities of the subject's brain.

In one implementation of the process of FIG. 15, different numbers and arrangements of sensors are experimented with to find a minimal number of neurophysiological sensors, a minimally intrusive set of sensors, and/or a minimally expensive set of sensors necessary to detect and distinguish different levels of brain activity in different brain networks.

Figure 16:
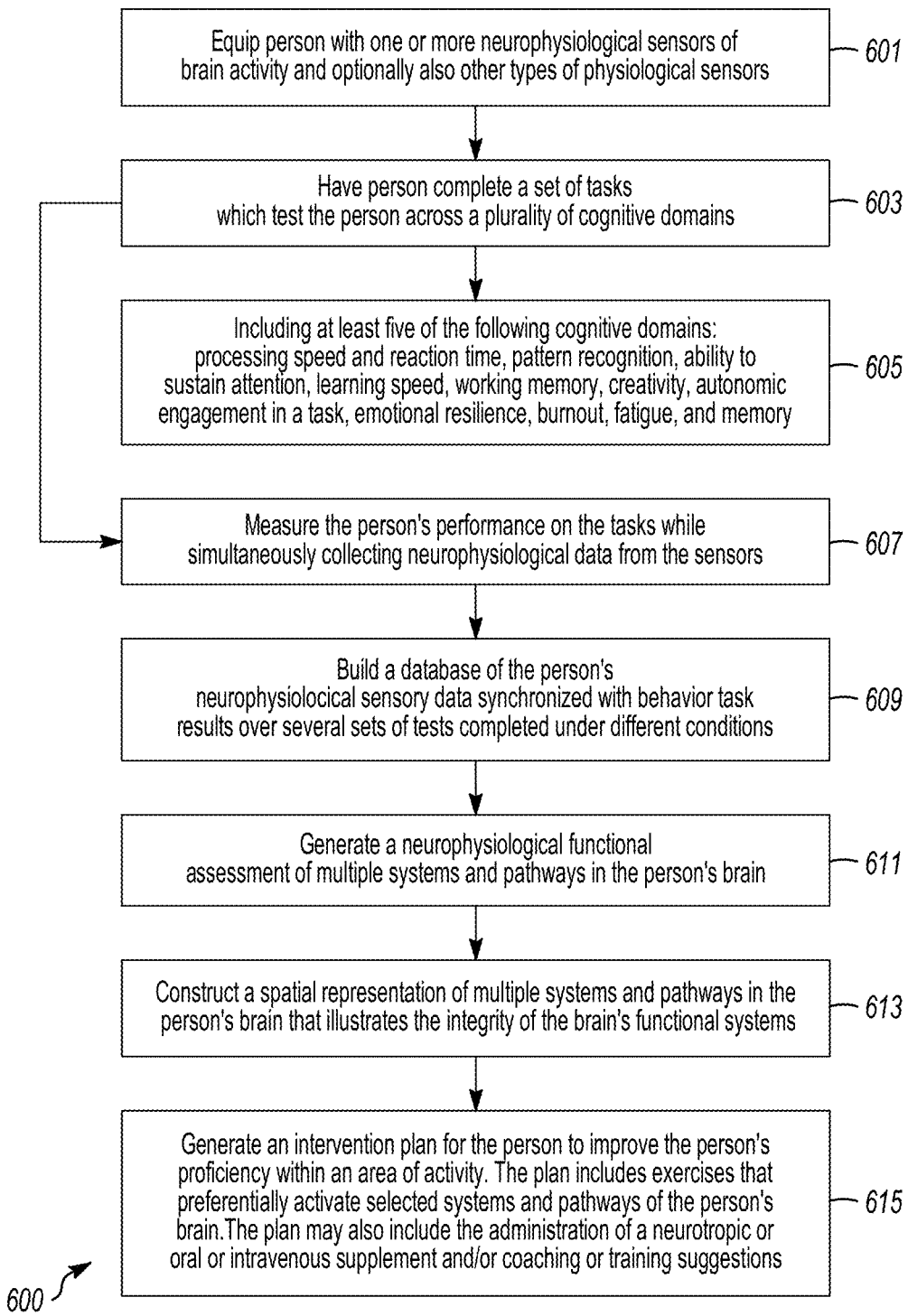
FIG. 16 illustrates one embodiment of a method of constructing an integrity map of the brain's functional systems.

FIG. 16 illustrates one embodiment of a method 600 of constructing an integrity map of the brain's functional systems. In block 601, equip a subject with one or more neurophysiological sensors of brain activity and optionally also other types of physiological sensors. In block 603, have the subject complete a set of tasks which test the subject across a plurality of cognitive domains. As illustrated in block 605, the plurality of cognitive domains can include at least five of the following: processing speed and reaction time, pattern recognition, ability to sustain attention, learning speed, working memory, creativity, autonomic engagement in a task, emotional resilience, burnout, fatigue, and memory. In block 607, measure the subject's performance on the tasks while simultaneously collecting neurophysiological data from the sensors. In block 609, build a database of the subject's neurophysiological sensory data synchronized with behavior task results over several sets of tests completed under different conditions. In block 611, generate a neurophysiological functional assessment of multiple systems and pathways in the subject's brain. In block 613, construct a spatial representation of multiple systems and pathways in the brain's brain that illustrates the integrity of the brain's functional systems. In block 615, generate an intervention plan for the subject to improve the subject's proficiency within an area of activity. The plan includes exercises that preferentially activate selected systems and pathways of the subject's brain. The plan can also include the administration of a neurotropic or oral or intravenous supplement and/or coaching or training suggestions.

Figure 17:
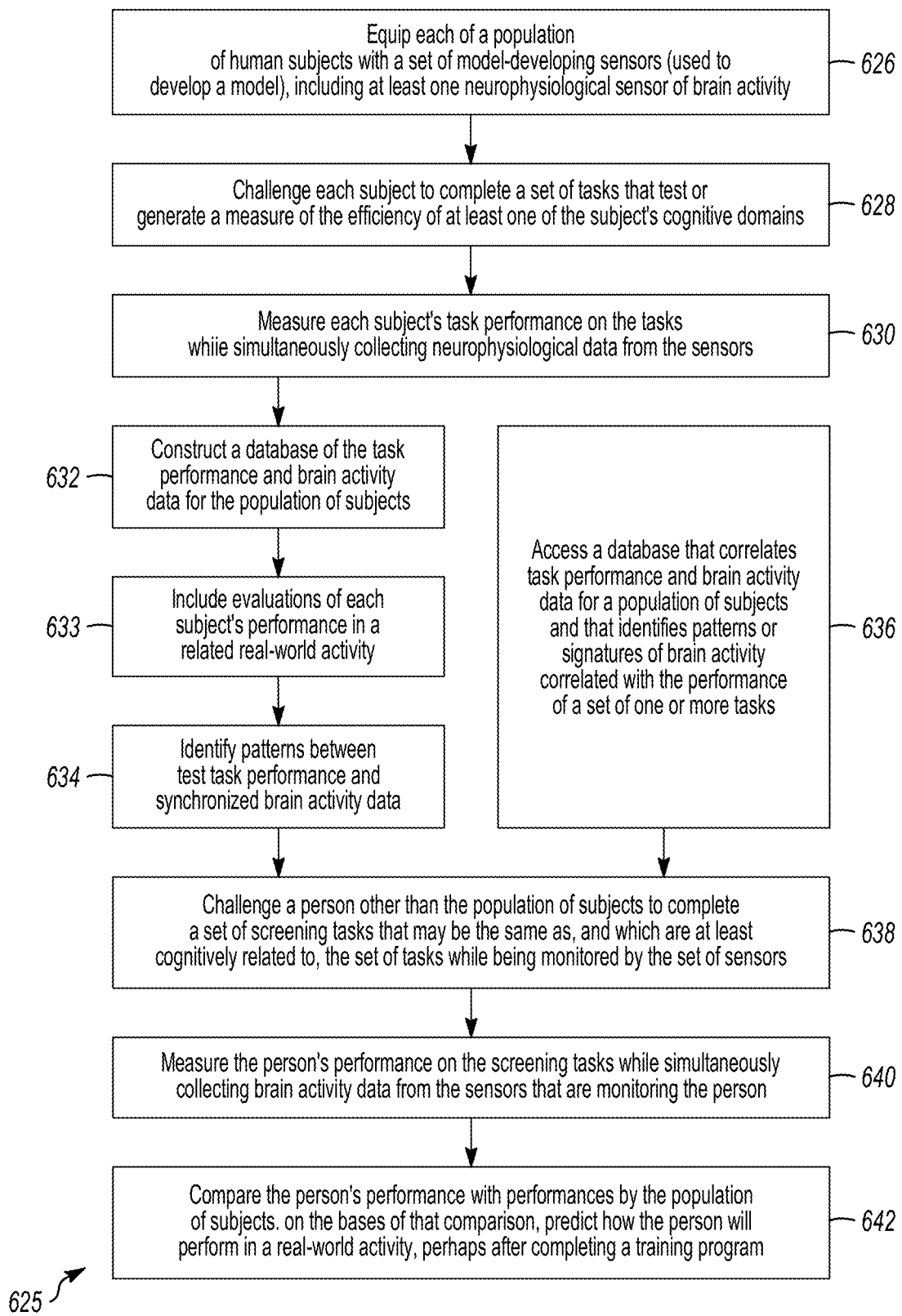
FIG. 17 illustrates one embodiment of a neurometric-based predictive model of performance.

FIG. 17 illustrates one embodiment of a neurometric-based performance predicting method 625. The method illustrates two paths, one starting with block 626 and including the construction of a database, and the other starting with block 636 and merely requiring access to such a database, to generating a prediction.

Starting with the first task, in block 626, equip each of a population of human subjects with a set of model-developing sensors (used to develop a brain model), including at least one neurophysiological sensor of brain activity. In block 628, challenge each subject to complete a set of tasks that test or generate a measure of the efficiency of at least one of the subject's cognitive domains. In block 630, measure each subject's task performance on the tasks while simultaneously collecting neurophysiological data from the sensors. In block 632, construct a database of the task performance and brain activity data for the population of subjects. In block 633, include evaluations of the subject's performances on real-world tasks are also included in the database.

In block 634, identify patterns between test task performance and synchronized brain activity data.

Flow proceeds to block 636. Block 636 is also the starting position for the second path, where a database 141 is already provided with the information generated in blocks 626-634. In block 636, access a database (e.g., the database of block 632) that correlates task performance and brain activity data for a population of subjects. The database includes data about performance and brain activity and brain activity signatures for a population of subjects that have performed a training program on a set of tasks, wherein the brain activity data includes chronologies of brain activity of one or more brain networks that are characterized by stronger connections when subjects repeatedly perform the set of tasks over a period of several days, weeks, or months.

In block 638, challenge or prompt or persuade an individual other than the population of subjects to complete a set of screening tasks that can be the same as, and which are at least cognitively related to, the set of tasks presented in block 628 while being monitored by the set of sensors. In block 640, measure the individual's performance on the screening tasks while simultaneously collecting brain activity data from the sensors that are monitoring the person.

In block 642, compare the individual's performance with performances by the population of subjects. On the basis of that comparison, predict how the individual will perform in a real-world activity, for example, playing in a professional sport or meeting or exceeding expectations as a financial professional, either with or without completing a training program. In one implementation, the prediction relates to how well the person will most likely perform the tasks that he/she trained upon after completing a training program. Also or alternatively, predict an amount of time that the individual will need to train to improve their performance to a predefined level of performance on the basis of the individual's performance on, and brain activity during performance on, the set of screening tasks, in relation to the data about performance and brain activity for the population of subjects.

In one embodiment, the method described above is extended to constructing a second predictive heuristic model. A sub-population of subjects undergoes a training program after completing the screening tasks a first time, and before completing the screening tasks a second time, while collecting brain activity data from the sub-population both the first and second times. A second predictive heuristic model is constructed that predicts the expected efficacy of a training regimen, based upon a comparison of the first-time and second-time performances on the screening task, along with corresponding brain activity data. Then, this second predictive heuristic model is used to predict how much the person's performance will improve upon completion of a training regimen.

In another embodiment, the method described in FIG. 17 is recharacterized as a method of predicting a person's fitness at performing one or more roles in a team effort. The person is prompted to complete a set of screening tasks while equipped with a set of brain activity sensors. Data is accessed that identifies brain networks that are most active in proficient performance of each of several different roles in the team effort. The person's performances on the set of screening tasks are measured and data simultaneously collected about activity in brain networks that are characterized by and known to have increased activity when performing the set of screening tasks. Then, a prediction is made about the person's fitness at performing the one or more roles in the team effort. The prediction is statistically- and algorithmically based rather than subjective. The prediction is generated as a function of the individual's performance, brain activity data, and data identifying brain networks most important in proficient performance of different roles in the team effort. The prediction can also be a function of the person's predicted emotional commitment to raise their fitness, wherein the emotional-commitment prediction is based on brain activity data of brain networks of the person that are associated with arousal and commitment.

In one implementation, the method also generates a prediction of how much training would be needed by the person to raise their fitness to perform the one or more roles in the team effort to a predefined level. The how-much-training prediction is also statistically based and a function of the individual's performance on, and brain activity during performance on, the set of screening tasks. This how-much-training prediction is furthermore a function of data about performance and brain activity for a previous population of subjects, demographics, surveys and/or other individual factors.

The method above can be extended to several members of a team. This involves performing the foregoing steps on a plurality of persons, including said person, that are contributing or available to contributing the team, and predicting a distribution of team roles among the plurality of persons that would make an optimally productive use of the plurality of person's relative talents as identified by their performance and brain activity data.

Alternatively, the method can be applied to candidates for positions on the team. This involves performing the foregoing steps on candidates for the one or more roles on the team, comparing the statistically-based predictions of the candidate's fitness as performing the one or more roles on the team effort, and selecting one of the candidates over another of the candidates to perform the one or more roles on the team on the basis of the comparison.

Figure 18:
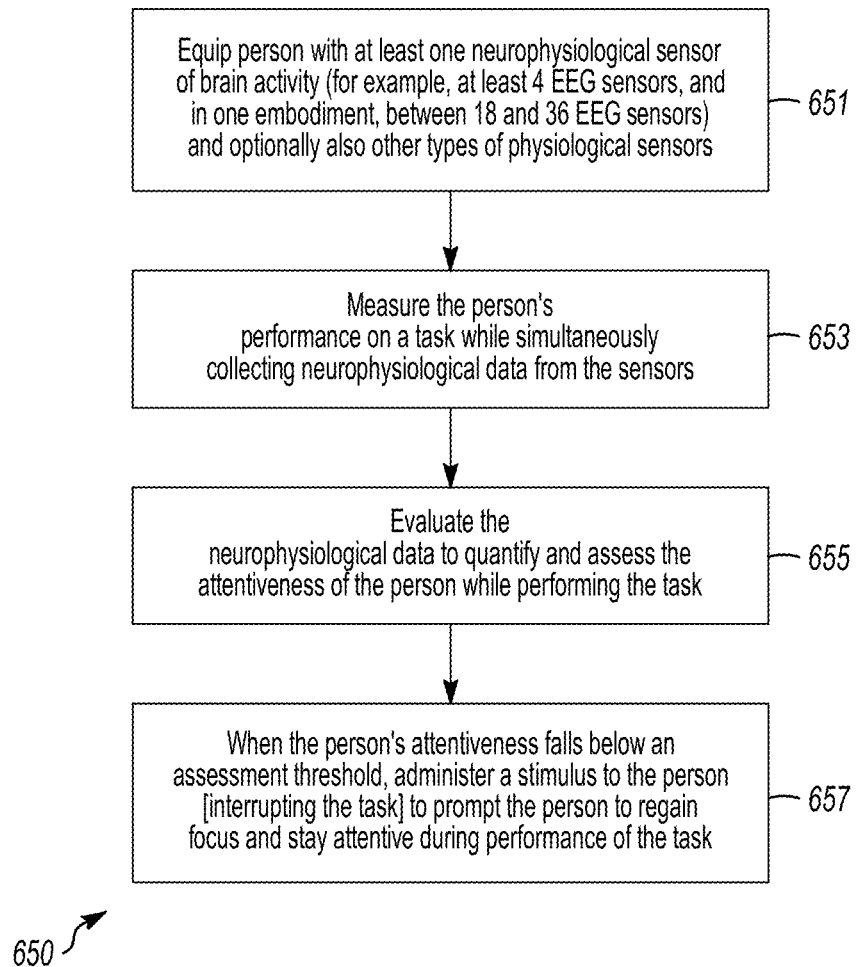
FIG. 18 illustrates one embodiment of a method of attention-monitoring system to improve cognitive efficiency.

FIG. 18 illustrates one embodiment of a method 650 of attention-monitoring to improve cognitive efficiency. In block 651, equip a person with at least one neurophysiological sensor of brain activity and optionally also other types of physiological sensors. In block 653, measure the person's performance on a task while simultaneously collecting neurophysiological data about the activity of the dorsal and/or ventral attention networks from the sensors. In block 655, evaluate the neurophysiological data to quantify and assess the attentiveness of the person while performing the task and to determine when the person's attention is waning.

If the person's attentiveness falls below an assessment threshold, in block 657 administer a stimulus to the person and/or interrupt the task to prompt, help, and/or remind the person to regain focus and stay attentive during performance of the task.

An attention-stimulating apparatus for performing the method of FIG. 18 comprises the following: one or more neurophysiological sensors 120 including one or more fittings to hold them, such as a helmet, headset, wristband, etc., to hold them; a processor (as embodied in the statistical engine 150); and a controller 165. The one or more neurophysiological sensors 120 are configured to monitor and generate data of brain activity of an attentional network of the person's brain (such as the dorsal or ventral attentional system or both) as well as of what is generally characterized as the default network of the person's brain. The processor is configured to analyze the brain activity data of the default network to assess whether the person is performing a cognitive task. The processor is further configured to analyze the brain activity data of the attentional network to assess whether the person is paying sufficient attention to performing the task. Sufficiency of attention is a function of a degree of brain activity in the attentional network. The controller 165 a controller is a chip, an expansion card, or a stand-alone device that interfaces with a peripheral device. The controller 165 operates a sensory output device that provides a sensory output such as haptic feedback, light, and/or sound.

The processor causes the controller 165 to activate the sensory output device when the analysis indicates that the person is not paying sufficient attention to performing the task. More particularly, the processor quantifies the attentiveness of the person while performing the task on the basis of the brain activity of the person's attentional network; and when the person's attentiveness falls below a threshold, triggers the sensory stimulus output to the person.

As an alternative to the sensory output device, the controller 165 can operate a different type of stimulus device (e.g., electrical stimulator to the brain, a device for delivering a neurotropic substance to the person that affects the brain, an IV, etc.). Electrical stimulation would be provided at a frequency associated with maximum or near-maximum attention.

Figure 19:
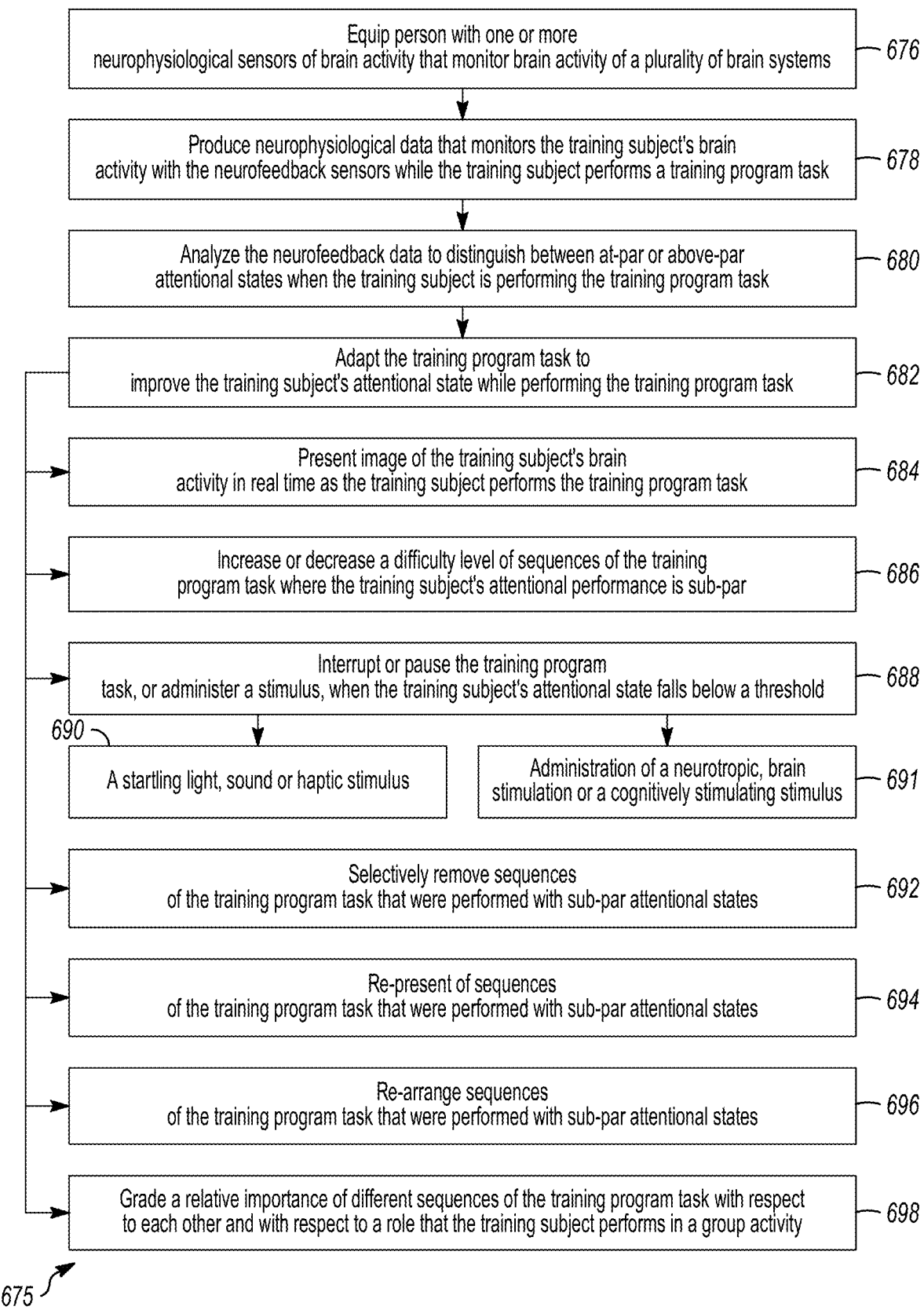
FIG. 19 illustrates one embodiment of a method of closed-loop adaptive training system using neurofeedback.

FIG. 19 illustrates one embodiment of a method 675 of closed-loop adaptive training using neurofeedback. In block 676, equip a training subject with one or more neurophysiological sensors of brain activity that monitor and produce data of brain activity of a plurality of brain systems/networks. In block 678, produce neurophysiological data that monitors the training subject's brain activity with the neurofeedback sensors while the training subject performs a training task. In block 680, quantify and rank attentional states of a previous population of people while performing the task. Define a targeted attentional state on the basis of the quantified and ranked data about the attentional states of the previous population of people. Also, analyze the training subject's neurofeedback data to determine whether the training subject is performing at the targeted attentional state and to distinguish between at-par or above-par attentional states when the training subject is performing the training task. In one embodiment, data transforms such as but not limited to PCA and/or ICA is performed to identify such patterns.

Different implementations or embodiments of FIG. 19 involve changes or additions to one or more of the above actions. In one implementation, the targeted attentional state is defined as a function of previously measured peak attentional states of the training subject. In another implementation, the neurophysiological data is analyzed to detect negative changes in the training subject's attentional state when the training subject is performing the training task. In yet another implementation, the training task is adapted to interrupt or pause the training task while the training subject performs the training task, in response to significant negative changes and/or drops below a threshold in attention. And in a further implementation, the neurophysiological data is also evaluated to determine the training subject's brain workload.

Blocks 682-696 present non-exhaustive implementations of feedback that transform the training regimen into a closed loop system. Block 682 broadly represents any adaptation and/or enhancement of the training task to improve/enhance the training subject's attentional state while performing the training task. Blocks 684-696 are more specific.

In block 684, present images or video of the training subject's brain activity in real time as the training subject performs the training task. In block 686, increase or decrease a difficulty level of sequences of the training task where the training subject's attentional performance is sub-par.

In block 688, interrupt or pause the training task, or administer a stimulus, when the training subject's attentional or neurocognitive state falls below a threshold and/or if the training subject's brain workload goes above a different threshold. As illustrated in block 690, the interruption or stimulus can be provided in the form of a startling light, sound, or haptic stimulus to refocus or encourage the training subject. As illustrated in block 691, the interruption or stimulus can be provided in the form of administration of a neurotropic, electrical or magnetic brain stimulation, or a cognitively stimulating stimulus. In block 692, selectively remove sequences of the training program task that were performed with sub-par attentional states. In block 694, re-present sequences of the training program task that were performed with sub-par attentional states. In block 696, Re-arrange sequences of the training program task that were performed with sub-par attentional states. In block 698, indicate the trainee's performance relative to a baseline. The baseline can be the trainee or another individual, an "elite" model, a team, a role in a group activity, the general public, or relevant demographic baselines.

The method of FIG. 19 is useful to the monotonous "task" or "activity" of studying game film of athletes playing a sport on a court or playing field, which taxes attentiveness and for which a training program of the various embodiments would be useful. As applied to the game-film-studying task, the function of adapting the game-film-studying task is, in one implementation, the selective removal of future film sequences that resemble sequences of the film where watching was performed with sub-par attentional states. This adaptation could dramatically reduce the amount of time a player needs to film watch. The function of adapting the game-film-studying task is, in another implementation, re-presentation of sequences of the film that were watched with sub-par attentional states. In yet another implementation, the adaptation of the game-film-studying is re-arrangement of sequences of the film that were watched with sub-par attentional states. Another implementation selectively removes sequences in which (a) the training subject's attentional state was below-par, and (b) the selectively removed sequences have a relatively low-importance grade.

In a more sophisticated implementation, adaptation of the game-film-studying task involves grading a relative importance of different sequences of the film with respect to each other and presenting only important sequences of the film. Grading is done at least in part by identifying particular sequences of the game-film-studying task that differentially activate particular brain systems or that cause neurometric markers of attentiveness to decline (such as boring sequences). This grading, in combination with logic programmed to identify similar sequences in other films of the same sort, enables these sequences to be culled out or re-emphasized, as needed.

In block 692, selectively remove sequences of the training task that were performed with sub-par attentional states. In alternative block 694, have the training subject repeat sequences of the training task that were performed with sub-par attentional states. In alternative block 696, re-arrange sequences of the training task that were performed with sub-par attentional states. In alternative block 698, grade a relative importance of different sequences of the training task with respect to each other and with respect to a role that the training subject performs in a group activity.

Figure 20:
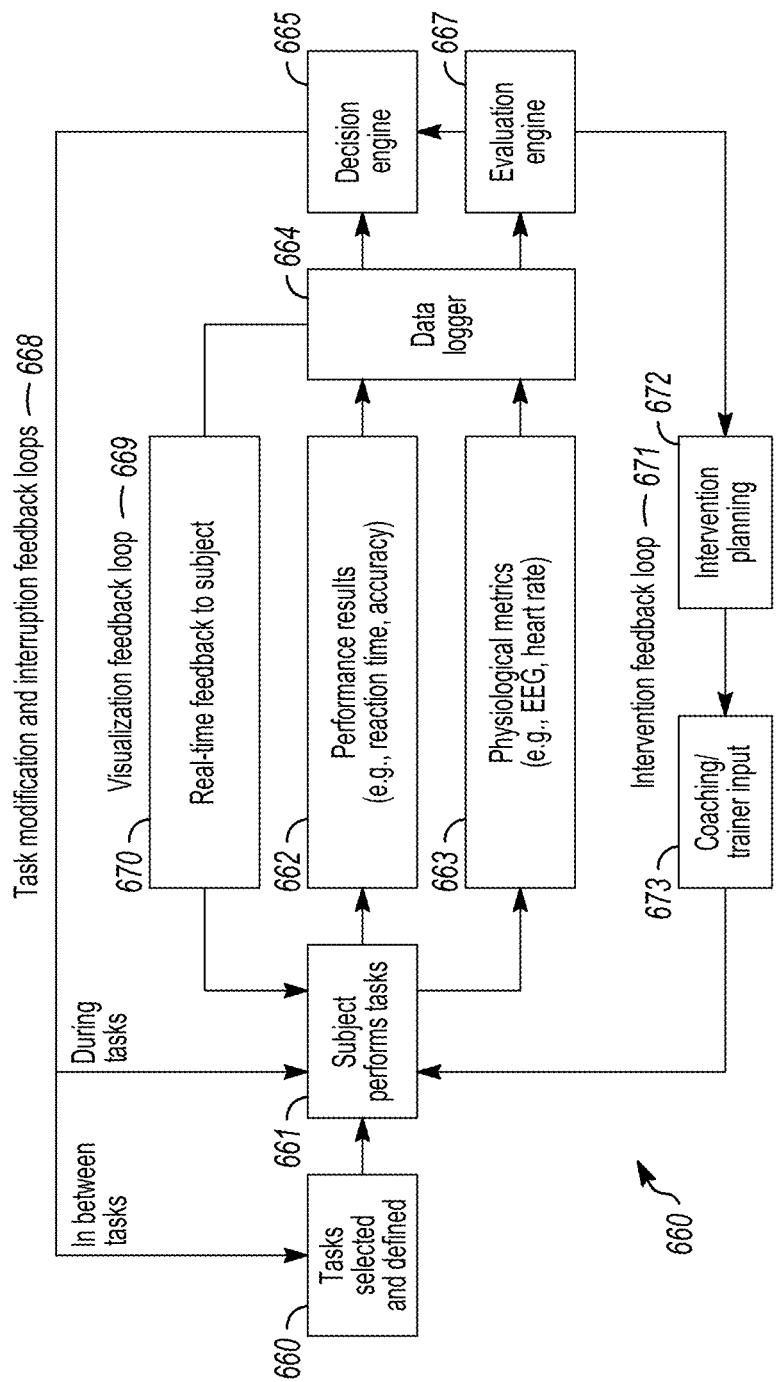
FIG. 20 is a block diagram illustrating several closed feedback loops in one embodiment of a neurometric-enhanced performance assessment system.

FIG. 20 is a block diagram illustrating several closed feedback loops in one embodiment of a neurometric-enhanced performance assessment system 660. In block 660, tasks are selected, and task parameters are defined. In block 661, a subject performs the tasks. While the subject performs the tasks, performance related-data-which include both the subject's performance (e.g., reaction time, accuracy) and comparative data (e.g., market data, industry standards)—and physiological metrics 663 (e.g., EEG, heart rate)—which can also include comparative data—are collected by a data logger 664. A decision engine 665 analyzes the collected data and decides whether and how to modify the tasks or interrupt the tasks (e.g., because of a detected distraction or lack of attentiveness). FIG. 20 depicts two task modification and interruption feedback loops 668. One feedback loop 668 involves modifying and redefining the tasks in between tasks, on the basis of the performance results 662 and physiological metrics 663. Another feedback loop 668 involves modifying or interrupting the tasks in real-time, as they are performed, as discussed in the description of FIG. 19.

The provision of real-time feedback 670 to the subject (e.g., brain imagery, charts, graphs, maps) produces a visualization feedback loop 669 when the subject, seeking to improve his/her performance, adjusts his/her focus and attention in response to the visualization. Also, the generation of an intervention plan 672 followed up by coaching or trainer input 673 forms an intervention feedback loop 671.

Figure 21:
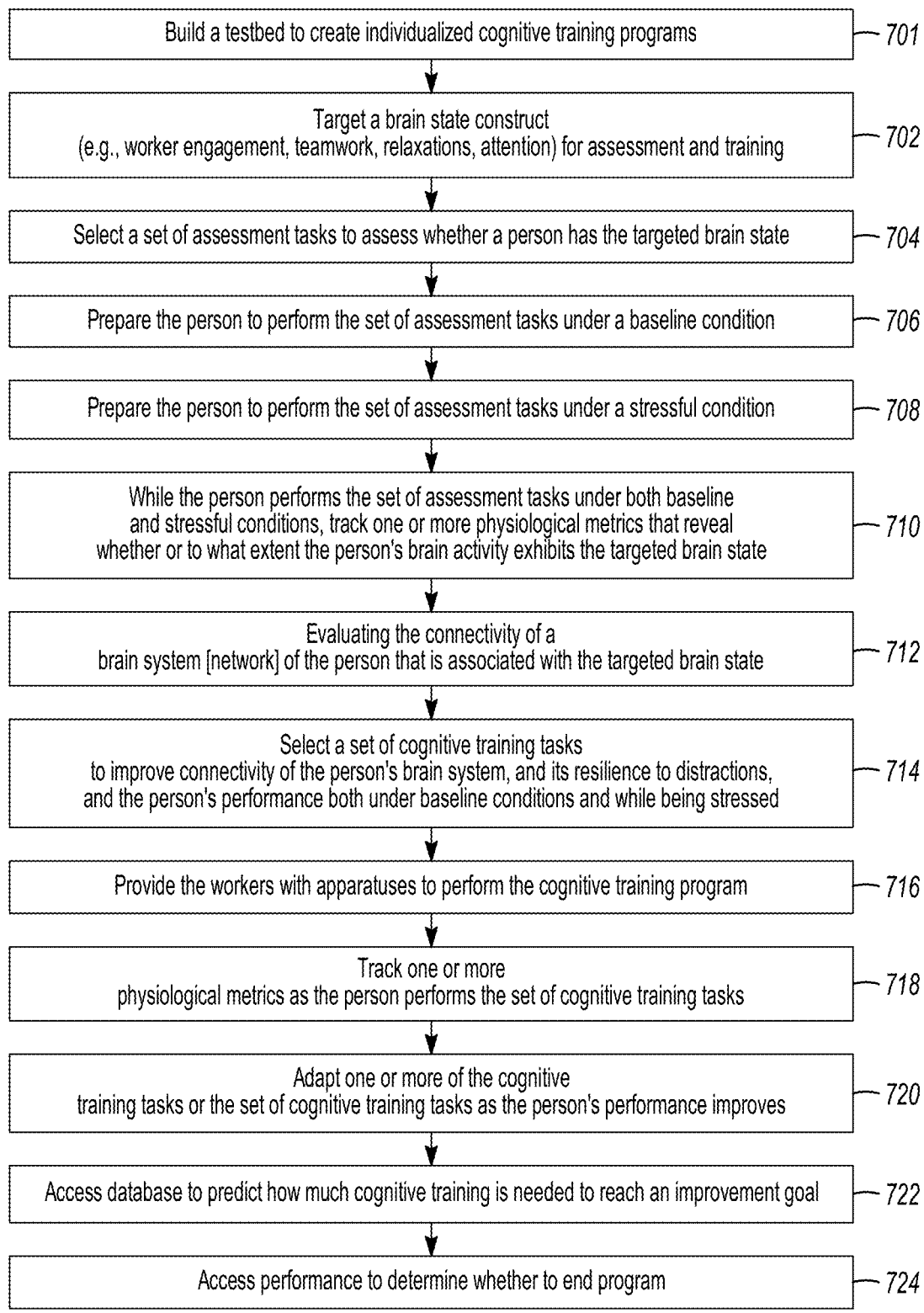
FIG. 21 is a chart illustrating a method of constructing an individualized cognitive training program for a person.

FIG. 21 illustrates a method 700 of constructing an individualized cognitive training program for a person. The components of FIG. 1 are described as "blocks" rather than "steps" because they need not be carried out in the exact order presented.

In block 701, assemble equipment into a testbed to use to create individualized cognitive training programs. In one implementation, the equipment set forth in Table 3 is contemplated.

TABLE 3

Exemplary set of testbed components

| Equipment | Provider | Description |
| --- | --- | --- |
| Quick 20 EEG Headset | Cognionics (San Diego, CA) | Mobile EEG hardware that includes 20 EEG sensors |
| M4 EEG Headset | Optios (San Diego, CA) | Focus signal |
| E4 Wristband | Empatica (Cambridge, MA) | PPG (measures blood volume pulse), GSR sensor (skin electrical properties), 3-axis accelerometer, infrared thermopile (skin temperature) |

TABLE 3-continued

Exemplary set of testbed components

| Equipment | Provider | Description |
| --- | --- | --- |
| Zephyr BioModule | Vandrico Solutions Inc. (North Vancouver, BC) | HR, HRV, Respiration Rate, Appx core temp. |
| NeuroTracker | CogniSens Inc. (Montreal, QB) | 3D visual perceptual training |
| Tobii | Tobii Inc. (Sweden) | Eye Tracking, Pupillometry |
| Unity | Unity3D (San Francisco, CA) | Game development platform |
| DANA Brain Modular | Platypus Institute (New York, NY) | Software |
| Gaming Laptop | ASUS (Taipei, TW) | IT hardware |
| HTC Vive-Pro | HTC (New Taipei City, TW) | VR headset |
| Sytlistic M532 | Fujitsu (Tokyo, JP) | Tablet |
| Video Camera/Tripod | Sony (Tokyo, JP) | — |

In block 702, one or more "brain state" constructs are targeted. A brain state construct (simply "brain state" for brevity) can be negative (e.g., irritable) or positive (e.g., creative, engaged). It includes both brain states that are widely accepted within the scientific community (e.g., attention, memory retrieval) and informally characterized (e.g., working well with the team). Previously presented Table 1 lists several exemplary brain state constructs ("brain states," for simplicity) along with psychophysiological metrics that can be obtained to characterize and detect those brain states.

In block 704, select or create a set of assessment tasks to assess whether a person has the one or more targeted brain states. In one implementation, one assessment task is a biological motion perception test that assesses the person's visual systems' capacity to recognize complex patterns and human movements that are presented as a pattern of a few moving dots. Another assessment task is a 3D multiple-object-tracking speed threshold task that distributes the person's attention among a number of moving targets among distractors presented on a large visual field, and that involves speed thresholds and binocular 3D cues (i.e., stereoscopic vision). In general, assessment tasks are selected or created that match the targeted brain state construct.

The assessment can also include survey questions, such as about the person's caffeine intake or hours slept.

In block 706, prepare the person to perform the set of assessment tasks under a baseline condition. A baseline condition is one that involves a relatively low workload and demands a relatively lower amount of engagement, compared to a training condition.

In block 708, prepare the person to perform the set of assessment tasks under a stressful condition, preferably at a different time of day. "Preparation" can be, for example, providing the person with a set of test implements (e.g., computing device and software) and/or challenging the person to take the assessment (e.g., reminders, coaching, counseling) at a given time.

In one implementation, a first assessment is taken in the morning, when the person is in a baseline (e.g., relaxed) condition. After the person has encountered several hours of various challenges (whether pre-planned, anticipated, or spontaneous), a second assessment is taken when the person is under stressful conditions.

Stressful conditions can be divided into the following categories: environmental stressors, increased task difficulty, and internal stressors. An environmental stressor could be background noise, uncomfortable working conditions, and other distractions imposed upon the person. Increased task difficulty could refer to any controllable parameter (e.g., required attention, speed, precision, and agility) that makes performance of a task more difficult. An internal stressor could be feeling group pressure, knowing that you are not performing to expectations, knowing that others are performing much better than you, or knowing that money is at stake. Other internal stressors include stress, fatigue or distraction that the person still feels over the challenges encountered earlier in the day.

In block 710, while the person performs the set of assessment tasks under both baseline and stressful conditions, track one or more physiological metrics that reveal whether or to what extent the person's brain activity exhibits the one or more targeted brain states. Table 3 above lists several examples of physiological sensors and equipment that can be used to track the one or more physiological metrics. For example, theta brain waves (4-7 Hz) are indicative of attention. Also, observations of eye position, dwell time and fatigue can contribute to detection of engagement, arousal and attentional state of the person.

One example of an assessment or training task is reading a text while a person's eye movements are tracked. By detecting the position of the person's pupil, one implementation of the NEPAS 100 determines, approximately, what portion of the text the person is reading or dwelling upon at any given moment. The NEPAS 100 also tags the text with shading or shapes that show approximate areas that were skimmed over too quickly or that the person dwelt upon. The sizes of the shaded areas or shaped can be used to indicate the amount of time taken to read them. Scores are assigned to the shaded areas or shapes that indicate the level of interest, engagement, and comprehension. NEPAS 100 then directs the person to review at least a portion of the shaded areas or shapes again.

In block 712, use the physiological data generated by the tracking to infer the connectivity of a brain system (i.e., a brain network) of the person that is associated with the targeted brain state. In block 714, select a set of cognitive training tasks to improve connectivity of the person's brain system, and its resilience to distractions, and the person's performance both under baseline conditions and while being stressed, wherein the cognitive training program comprises the set of cognitive training tasks. In one implementation, the cognitive training tasks are the same as the assessment tasks. In another implementation, the cognitive training tasks are more varied than the assessment tasks and include normal daily tasks or work tasks. The cognitive training tasks are designed with ample positive reinforcement to portray the challenges as opportunities rather than burdens, and to increase the person's motivation and emotional engagement with the training. In block 716, provide the person with an apparatus (such as software, EEG equipment, and/or an exercise or test facility) to perform the cognitive training program.

Blocks 718 and 720 illustrate further optional actions associated with operating the cognitive training program. In block 718, one or more physiological metrics are tracked as the person performs the set of cognitive training tasks. This is in addition to the physiological metrics tracked during assessments, as illustrated in block 710. It is not necessary that the same metrics used in the assessment also be used during performance of the cognitive training tasks. For example, an EEG utilizing a large number of sensors can be applied during the assessments, while a simpler EEG headset encompassing only a few sensors (i.e., as few as three) is worn by the person throughout the day between morning and evening assessments. In optional block 720, optionally adapt one or more of the cognitive training tasks or modify the set of cognitive training tasks as the person's performance improves. Examples of task adaptations are set forth in FIG. 19, blocks 682-696. Further adaptations can be in the form of stressors imposed upon the person while performing the tasks. Such task adaptations would be in addition to adaptions the person makes on his/her own to improve performance.

In block 722, access the database 141 (FIG. 1) to predict how much cognitive training is needed to reach a cognitive improvement goal. The prediction is based in part upon a correlation performed on data correlating a populations' brain activity metrics with that population's performance on baseline and training task assessments. The prediction is also based in part upon the person's own neurometric data and task performance. For example, detection of theta brain waves can be used to predict (i.e., assign a probability to) whether something encountered today will be remembered tomorrow. Such predictions can aid persons in becoming better managers of their time.

The actions illustrated in blocks 710 and 718 are optionally further enhanced by providing real-time feedback to the person regarding the person's brain activity while the person performs the cognitive training tasks. This real-time feedback could be, for example, in the form of a graphical representation of a brain and connections within a relevant brain network of the person, highlighting or otherwise providing an indication of the strength of those connections.

The actions illustrated in blocks 710 and 718 can also be optionally enhanced by providing visual feedback to the person regarding a relationship between the person's brain activity and the person's performance on the cognitive training tasks. This visual feedback could be, for example, in the form of a graph or a motion video showing a metric quantifying the strength of the network's connections and the corresponding performance of the person versus or over time.

In block 724, the cognitive training program is ended, according to one implementation, when (1) the person's performance or rate of performance improvement under baseline conditions exceeds a first threshold; or (2) the person's performance or rate of performance improvement under stress exceeds a second threshold. Another implementation is the same, except that the "or" is replaced with an "and." A third implementation ends the cognitive training program when the physiological data indicates that the connectivity within the system of the person's brain exceeds a targeted threshold or percentile. Many other implementations are contemplated.

The method 700 of FIG. 21 can be readily applied to improve workplace productivity. In one embodiment, one or more of the following brain states are targeted: attentiveness, memory, worker engagement, creativity, and teamwork. Under both baseline and stressful conditions, workplace workers perform a set of assessment tasks that assess the quality of brain networks involved in attention, memory, worker engagement, creativity, and/or teamwork. Physiological sensors such as EEG sensors track the workers while they perform the tasks in order to reveal whether or to what extent each worker's brain activity exhibits the targeted brain state. An individualized cognitive training program is prepared for each worker, comprising a set of training tasks selected to improve connectivity of the worker's relevant brain networks and their resilience to distractions, under both baseline and stressful conditions.

Employee Case Study

Various embodiments were applied to an employee case study. A description of the case study is found in the recently published paper, Miller, S. L., Chelian, S. E., McBurnett, W., Tsou, W., Kruse, A. A. "An investigation of computer-based brain training on the cognitive and EEG performance of employees," In Proceedings of the 41st IEEE International Engineering in Medicine and Biology Conference (2019), which is herein incorporated by reference. A description is also provided below.

Twenty-one employees of a multinational information technology and equipment services company underwent a neurocognitive training program that consisted of an initial assessment, a six week "boost" or intervention period, and then a re-assessment to track the progress of each individual participant. The employees were split into two training groups: six females and four males in a long-training group that averaged 30 hours of total training during the boost period; and five females and six males in a short-training group that averaged 7 hours of training. A pre-training assessment of neurocognitive performance revealed no statistically significant group differences in performance. After the training, the participants were re-assessed.

The post-training assessment revealed that training participants experienced three measurable positive impacts from the program: higher standardized behavioral metrics, reductions in brain workload required to perform the tasks, and positive self-reported data. Cognitive efficiency increased by 12% in the high-training group and 5% in the low-training group. Study participants also reported improvements in their productivity and mental performance post-study.

The brain-training program targeted four areas: brain speed, attention, people skills and intelligence. It lasted for 6 weeks and was made available on-line via computer, cellphone, etc. Participants worked on specified programs at least 3 times per week. Over the course of the training, participants in the long-training and short-training groups completed, on average, 824 and 201 levels of training, respectively.

The following assessments, both pre- and post-training, were performed with behavioral and electrophysiological data recording: Baseline Task of Eyes Open/Eyes Closed, the Eriksen flanker task, the DANA standard neurocognitive assessment (Table 1), and surveys on sleep, stress and emotional resilience:

EEG data were collected with Cognionics™ Q20 headsets that included 20 dry electrodes with a sampling rate of 500 Hz. EEG was recorded during all assessments except the surveys. Assessments took about 90 minutes.

Analysis of the pre- and post-test electrophysiological and behavioral test scores were performed using multivariate analysis of variances procedures. FIG. 27 illustrates some of the steps by which the EEG data were pre-processed and spectrally analyzed in order to produce measures of brain workload.

In preprocessing block 871, the data were filtered with low pass filtering to remove automated artifacts, such as eye and muscle motion. In block 872, the data were filtered with high pass filtering to remove bad channels and interpolate. In block 873, common average referencing was applied to the data to remove bad time windows.

In spectral analysis block 874, a power spectral density estimation was performed on the data to compute the employees' brain bandpower during tasks. In spectral analysis block 875, a relative spectral density estimation was obtained by computing bandpower ratios between active states and at-rest states.

Robust mean and robust standard error of the mean (SEM) values for the amount of time it took each training group to perform a task, both pre-training and post-training, were also calculated.

It was found that the ratio between beta and the sum of theta and alpha correlated with higher workloads. Also, the ratio between higher theta and beta correlated with better memory, whereas the ratio between lower theta and beta correlated with more attention.

Table 4 sets forth start (Time=1) and end (Time=2) cognitive efficiency data for the long-training and short-training groups, showing mean time to complete the tasks and standard errors (S.E.M.). Cognitive efficiency scores were generated as a function of both speed and accuracy. After brain training, significant ($p<0.05$) effects of time (Time 1 vs Time 2) were observed for all tasks, except for a memory search task (MS) and the final task, Simple Reaction Time 2 (SRT2). The long-training group showed significantly ($p<0.5$) larger training effects for the Procedural Reaction Time (PRT) and Go/NoGo Task (GNG).

TABLE 4

Pre- and Post-Training Performance by Group and Task Cognitive Efficiency Results (pre-training = 1; post-training = 2)

| Task | Group | Time | Mean | S.E.M. |
|---|---|---|---|---|
| SRT1 | Long Training Group | 1 | 154.823 | 7.398 |
| | | 2 | 171.665 | 5.951 |
| | Short Training Group | 1 | 152.527 | 6.940 |
| | | 2 | 164.847 | 5.582 |
| CSL | Long Training Group | 1 | 42.548 | 3.237 |
| | | 2 | 51.277 | 3.234 |
| | Short Training Group | 1 | 44.245 | 3.036 |
| | | 2 | 49.963 | 3.034 |
| PRT | Long Training Group | 1 | 102.120 | 4.225 |
| | | 2 | 114.085 | 3.855 |
| | Short Training Group | 1 | 104.855 | 3.964 |
| | | 2 | 108.720 | 3.616 |
| SP | Long Training Group | 1 | 32.883 | 2.835 |
| | | 2 | 39.220 | 3.010 |
| | Short Training Group | 1 | 32.683 | 2.660 |
| | | 2 | 36.239 | 2.824 |
| GNG | Long Training Group | 1 | 128.512 | 6.907 |
| | | 2 | 140.725 | 4.239 |
| | Short Training Group | 1 | 127.235 | 6.480 |
| | | 2 | 127.254 | 3.976 |
| M2S | Long Training Group | 1 | 39.623 | 3.969 |
| | | 2 | 39.648 | 3.423 |
| | Short Training Group | 1 | 39.684 | 3.723 |
| | | 2 | 39.448 | 3.211 |
| MS | Long Training Group | 1 | 54.973 | 4.286 |
| | | 2 | 76.083 | 5.346 |
| | Short Training Group | 1 | 54.838 | 4.021 |
| | | 2 | 65.805 | 5.015 |
| SRT2 | Long Training Group | 1 | 160.709 | 6.065 |
| | | 2 | 169.560 | 6.491 |
| | Short Training Group | 1 | 159.848 | 5.690 |
| | | 2 | 160.329 | 6.089 |

The sum of the cognitive efficiency scores for the long- and short-training groups was 716.2 and 715.9, respectively. After brain training, those scores improved 12% and 5%, respectively, to 801.3 and 752.6, respectively. Differences were more profound for the long-training group on the Procedural Reaction Time Task and the Go/No-Go. Both tasks require more cognitive control (rapid response selection) than a simple reaction time task.

Figure 28:
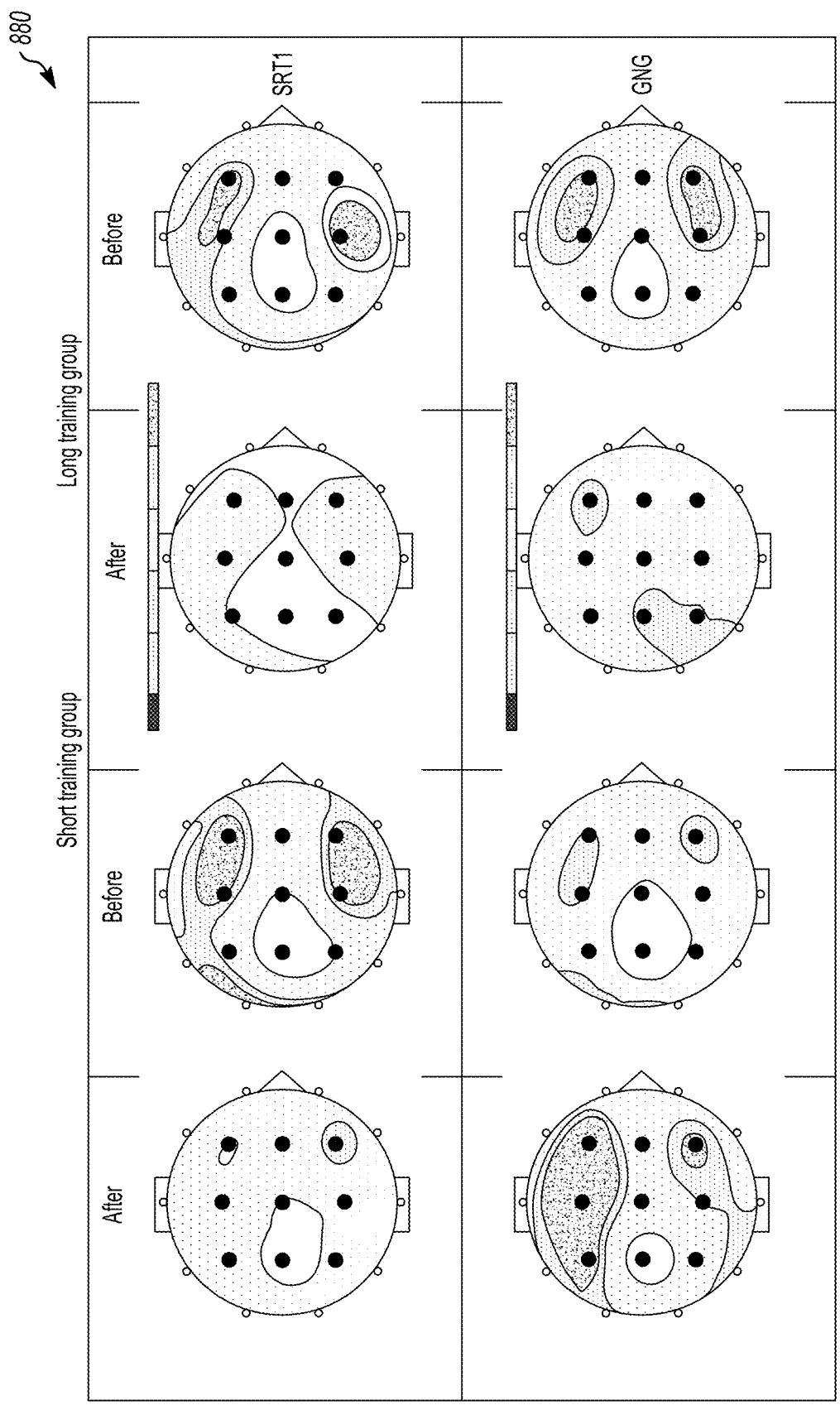
FIG. 28 illustrates major steps in the processing of electrophysical data.
Figure 29:
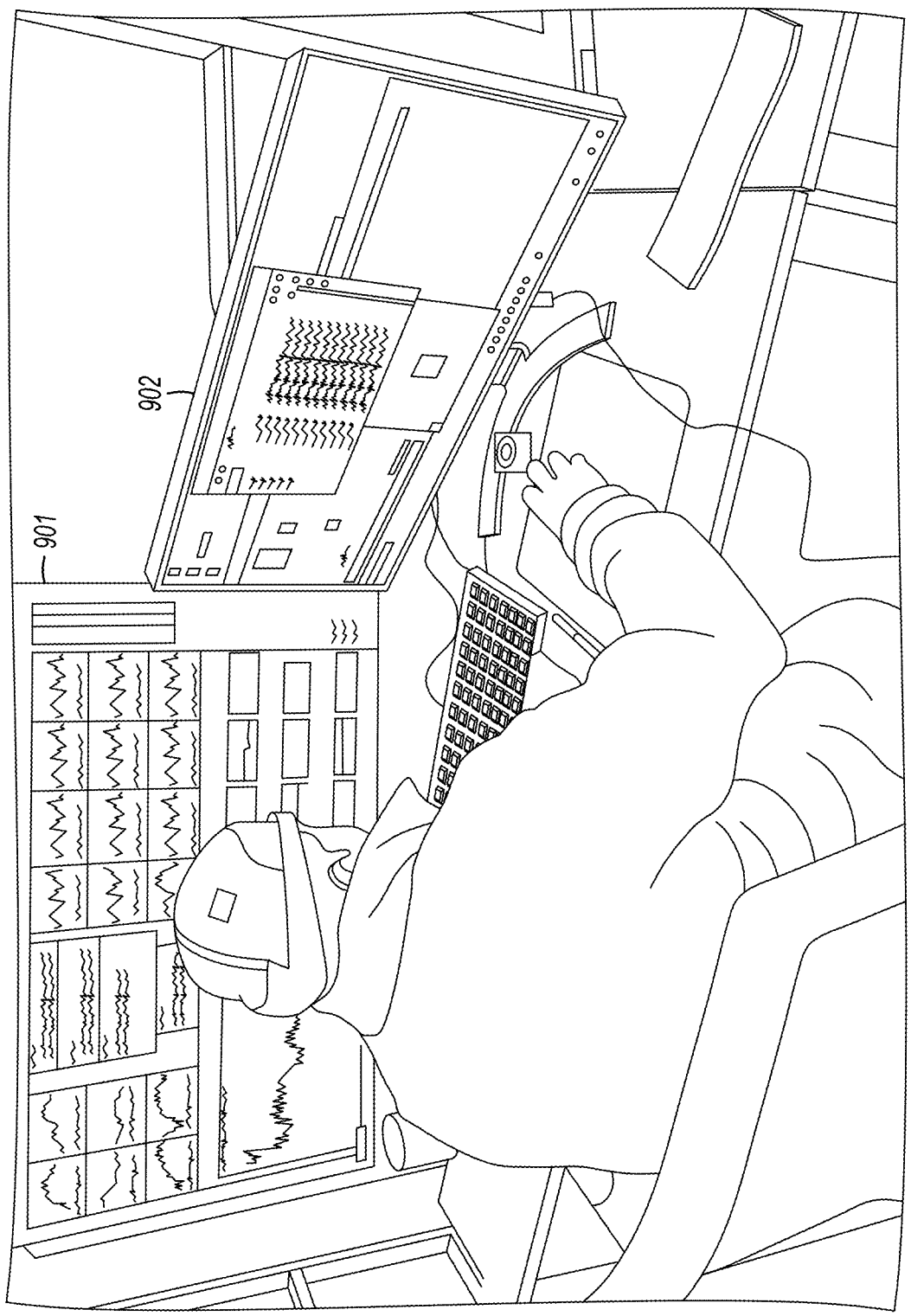
FIG. 29 illustrates a trader at a workstation in a case study.

FIG. 28 illustrates average workload EEG measures that were generated from the EEG data during the SRT1 and GNG tasks. Black and dark gray illustrate areas with high levels of activation. Mid-tones represent areas with moderate levels of activation. Light gray and white represent areas with low levels of activation.

Before training, both groups showed moderate bilateral prefrontal activation and low central/parietal activation. After training, for SRT1, both groups show smaller workload measurements across the head. For example, both groups show less bilateral prefrontal activation. This parallels the behavioral data-both groups performed the SRT1 task with greater efficiency after training. For the GNG task, however, the changes for each group were different. The long-training group showed decreases in the frontal regions while the short-training group showed increases in the same region. It appears that the long-training group was able to handle the task with less workload. The behavioral data showed that the long-training group performed the task better after training while the opposite for true for the short-training group. Thus, changes in behavioral data had corresponding changes in neural data.

Executive functions (information processing, sequencing, decision making, planning) are associated with employee performance. This case study demonstrated that independent computer-based brain assessment and training provide a scalable solution to evaluate and develop executive functions, functions that are malleable throughout the lifespan. Brain training increased brain processing speed on a variety of neurobehavioral tasks. The further elaboration of the neuroplastic mechanisms that can underly these behavioral changes appear to be clarified by an electrophysiological measure of workload, indicating that the use of a cognitive state measure like engagement or workload would be useful as a classifier for providing neural feedback for further optimizing brain training and neuroplasticity.

Overall, the corporate study demonstrated positive benefits for the group of participants in several areas of neuro-cognitive performance. Further, significantly higher gains were recorded in the long-training group with moderate gains in the short-training group. It is very clear that several mechanisms of neuroplasticity occurred as a direct result of the program.

More importantly, this study demonstrated that a cognitive state (e.g., workload performance) can support the further extension of real-time brain performance evaluations in the corporate environment. The loop of "measure-boost-track" was shown to be effective both qualitatively and quantitatively—and worthwhile results were seen with modest training, gains in attention, executive control and decision-making systems were present.

Portfolio Manager Case Study

A. Background and Setup

It has long been recognized, but little understood, that professional financial risk-takers go in and out of different mental "states" during their workdays, and that certain mental states are associated with more profitable decision-making than others. For example, many professional risk-takers are familiar with a feeling commonly described as "being in the zone." Qualitatively, when one is in the zone, time feels as if it slows down, and the risk-taker often has the sense that they can intuitively "feel" where the market is headed. Scientific evidence suggests this zone is not only a real phenomenon, but also tends to be associated with significantly better decision-making, and thus, superior financial performance to what is typically experienced in other mental states.

There are several well-described problematic mental states that risk-takers can also experience-including cognitive overload, the "fight or flight" response, and cognitive fatigue—each of which is associated with below-average market performance. However, it has been hard to determine risk-takers' mental states with any precision, making use of these states difficult to optimize.

In late 2018, Applicant conducted a research study to understand and characterize the impact that neurophysiological factors have on the financial performance of portfolio managers, who must make rapid, complex decisions under high-stress conditions. The specific intent was to identify measurable neurophysiological "states" that are reliably correlated with performance.

Four professional traders (also referred to as "portfolio managers" or "PMs") were provided with a minimum of $50,000 each to conduct transactions with and allocate to no more than ~10 positions. Each of the traders had extensive prior professional experience and were screened and recruited from a pool of more than one hundred applicants based on a variety of factors including their experience and track record. For their work, the traders were compensated solely on the basis of their performance—a percentage of the profits they generated—except for one trader, who was additionally compensated $5000/month for performing managerial activities.

In order to simplify the analysis, participants' trading activities were limited to liquid US equities and exchange-traded funds. The traders' activities generated over 9500 transactions—such as buy, sell, short sell, execute, cancel, and cancel/replace—over nearly 40 days of trading between mid-October 2018 and mid-December 2018, which incidentally happened to coincide with a highly volatile near-bear-market correction. Over 4000 of these transactions were executed and graded to measure the traders' performance. Table 5 lists the number of executions, average number of daily executions, and average number of securities traded daily for each of the traders.

TABLE 5

Transaction Summary

| Trader | Executions | Avg/Day | # Securities Traded | Dates |
|---|---|---|---|---|
| Subject 1 | 781 | 24 | 15 | Oct. 19, 2018-Dec. 14, 2018 |
| Subject 2 | 714 | 24 | 12 | Oct. 22, 2018-Dec. 14, 2018 |
| Subject 3 | 826 | 27 | 7 | Oct. 26, 2018-Dec. 14, 2018 |
| Subject 4 | 1683 | 89 | 12 | Nov. 14, 2018-Dec. 14, 2018 |
| Total | 4004 | 164 | 46 | Oct. 19, 2018-Dec. 14, 2018 |

The traders were provided with a room in which to perform the trades so that they could communicate with each other to better resemble typical trading conditions. Each trader had a dual-monitor trading platform 900 (FIG. 29): one monitor 901 presented a professional trading platform—the Lightspeed Sterling Trading Platform™—with charts, numbers, execution windows, etc., and the other monitor 902 enabled the trader to monitor financial news about the market and specific companies. The traders were encouraged to begin trading with the opening bell and continue trading through most or all of the day. Typically, the traders decided to close out their positions by the end of the day.

The study transpired against a backdrop of what is widely acknowledged to be one of the more difficult investment cycles of the last decade. To be specific, it took place in the midst of a broad market selloff that took the S&P 500 index from a late September high of 2930 to a Christmas Eve low of 2351. This approximate 20% correction was the largest such downward move for broad-based indices since the market collapse of 2008/2009. Over this same time period, the Chicago Board Options Exchange's Volatility Index (VIX), widely acknowledged as the benchmark barometer for the level of risk perceived to be present in the markets, rose by roughly 200%—from its September low of approximately 12 to its Christmas Eve apex of 36.

B. Data Collection

To collect physiological and transactional data, the traders were instrumented with electroencephalography (EEG) headsets, head-worn wireless eye-tracking glasses (with pupillometry), and galvanic skin sensors as they traded this real money and engaged in various types of transactions. A channel on the EEG headset provided heart rate (HR) and HR variability (HRV) data, which was considered preferable to using wrist/hand-worn sensors to perform that function. The EEG caps had twenty-four channels for continuous monitoring of brain activity, sufficient to track brain states that are represented in both space (functional anatomy) and spectra (frequency of brain activity). Eye tracking and monitoring sensors also collected data that was useful not only for filtering out artifacts in the EEG data but also tracking what the trader was looking at in the prelude to making a transaction.

Using the above-described equipment, continuous neurophysiological data were collected from the traders from the moment the markets opened until the conclusion of each day's session. Study personnel were on site continuously during the study to help with equipment set-up and cleanup. The data from these neurometric and physiological sensors were collected by a laptop computer, automatically time stamped, and combined through Lab Streaming Layer™ an open source piece of software that facilitates synchronization of physiological and neurophysiological signals with one another. In the study, synchronizing the physiological data with the transaction data was performed by hand. According to the present disclosure, this alignment can be performed automatically.

The transactional data collected included the time of the order and execution (if any), record ID, order ID, execution ID, type, price, quantity, status, Sterling log of the transaction, name of the trader, and identity of the bond, stock, security, or fund that was the subject of the transaction. Data about the profitability of the trades, market values (including volume weighted average price or VWAP), trading volumes, and market conditions were also collected. VWAP is a measure of the average price at which a transaction is executed over a specified time period as compared with a market-based average. It is routinely used in the financial industry as a measure of the efficiency and effectiveness of transaction executions. While 30-minute intervals were used for the study, other intervals, and even multiple intervals, could be selected for VWAP.

In addition, a team of general risk advisors monitored all positions and timing associated with transactions and provided daily summary reports for each trader. Further, each trader maintained a daily log of their experiences, including the trader's feelings, impressions, and observations of their own behavior during the course of the day.

C. Data Analysis and Findings

The initial focus of the data analysis was on the EEG data and, in particular, brain states modeled in the functional connectivity (FC) of the EEG space. The data analysis used a data-conditioning pipeline shown in FIG. 31, beginning with preprocessing 851 (also referred to as "cleaning") the input data 852 that is, the raw electroencephalogram (EEG) data that was collected. After the preprocessing 851, a functional connectivity state estimation (FCSE) 860 was applied to the preprocessed data. After the brain states that the traders occupied during their trading day were identified and characterized, subsequent analysis incorporated physiological sensor data and financial data (e.g., the trader's transactions in comparison with VWAP statistics) as well. This created a cohesive data set. A description of the methodology employed to process the data and characterize the traders' brain states is provided below.

The input data 852 comprised the raw data sampled by twenty sensors that the traders were equipped with. As such, the input data 852 comprised twenty dimensions, one dimension per sensor. The preprocessing 851 of the input data 852 involved several independent filtering steps (with respect to some of which steps, the order is not important). The raw data were filtered (854) through low-pass (<1 Hz), high-pass (<32 Hz) and notch (60 Hz) filters to remove slow-drift, high-frequency, and AC-voltage-induced line-noise artifacts. This was followed by standardization (856), which removed the effects of reference electrode placement. Electrodes close to the reference electrode tend to have low voltages and electrodes far from the reference electrode tend to have higher voltages. Standardization (856) made the range of measurements across the twenty electrodes more uniform.

A blind, unsupervised robust principal component analysis (PCA) 857 was also performed. Depending on the definition of PCA, the standardization 856 may be considered to be part of the PCA 857. The PCA 857 imposed a smoothness condition on the data, which removed, for example, anything in the data that was punctuated at just one single electrode. The PCA 857 refined the data into a data set that removed the big artifacts and approximated the multivariate data with a low-rank approximation that interpolated over deviations from smoothness. But most of the dimensions remained.

In this particular implementation, the PCA 857 performed as part of the preprocessing 851 was distinct from PCA 861 performed as part of the FCSE 860. In general, PCA 861 is a process for finding a dimension-reducing orthogonal linear transformation of a multi-dimensional data set whose components maximally contribute to the variance of the data. This process involves a number of steps: (1) multivariate signal data is arranged into a matrix of observed signals; (2) the mean and variance are computed of the data collected by each sampler over time; (3) the data is standardized so that it has a mean of 0 and a variance of 1; (4) the covariance between each of the variables is determined and used to construct a covariance matrix; (5) the eigenvectors and eigenvalues of the covariance matrix are found in order to identify the principal components of the data; (6) a selected number of components are chosen to represent the data in a PCA-transformed space; and (7) the signal data is mapped onto the PCA-transformed space.

In this implementation, the PCA 857 was not used for the primary purpose of reducing the dimensionality of the data. Rather, it decomposed the data into signal and noise. The PCA 857 removed sparse noise components and was effective at removing high amplitude transient artifacts.

PCA is often used to transform data from one coordinate space (for example, the sensor space) to another (that is, the PCA space). Here, the noise was removed in the PCA space, and the data thereafter transformed back into the sensor space.

Next, bad channel rejection 858 was performed. Bad channels may be defined as those channels whose power exceeds four standard deviations of the average channel. Similarly, bad sample rejection 859 was also performed. Bad samples may be defined as those samples whose power exceeded four standard deviations of the average power within the sample's channel.

After the preprocessing 851, the FCSE 860—to identify and characterize the brain states that the traders occupied—began with a machine learning program that, once again, was blind and unsupervised. In this particular case study, PCA 861 was once again used. In the alternative, ICA could be used. The data input into the study consisted of twenty dimensions of denoised time-domain sensor data.

Oftentimes, when PCA is performed, an a priori selection of the n-most principal components is made in which to further resolve the data. Alternatively, n is left open, dimensions are removed one dimension at a time, and a determination is made for when to stop. However, this alternative is computationally expensive. Early in this case study, a set of data was resolved into three, six, and nine principal components. The "knee point" in the PCA scree plot—which shows the cumulative explanatory power of the components, arranged in descending order—was consistently located between six and nine principal components. A "knee point" in a curve is a point where the curvature has a local maximum. The components accumulated up to this point explain most of the variability of the data. Any accumulation above nine principal components simply introduced noise. The use of anything less than three components did not yield enough information. Accordingly, it was decided, for reasons of computational efficiency, to use six principal components for the PCA 861.

As an unsupervised process, the PCA 861 transformed the traders' neurophysiological data into a space that efficiently represented their brain activity as a set of nodes. In block 862, each component of PCA-transformed data was filtered, via a band-pass filter, into four physiologically relevant frequency bands—namely, beta, alpha, theta and delta—in order to discover if any patterns emerged from the data. This band-pass filter block 862 transformed the data set from six dimensions (yielded by the six components) into twenty-four dimensions (i.e., the product of the six components and the four frequency bands), each dimension being represented by a sequence of data.

In block 863, each of the twenty-four data sequences was Hilbert transformed to calculate the "envelope" of each channel. Each of the twenty-four time-domain data sequences represented an oscillating signal. The "envelope" of an oscillating signal is a smooth, typically modulating curve outlining the amplitude of the signal. The envelope corresponds to the power within each of those bands and each of the principal components. Each of those envelopes is processed temporally. For each of the brain sources, it provides access to the temporal signals being generated by those sources. In block 866, the modulation of each envelope is calculated.

In block 864, the functional connectivity was estimated as the correlations of these frequency-specific and component-specific envelopes. 24×24 correlation matrices regarding the neural activity were computed using a sliding time window, which quantified the co-fluctuations (co-modulations) in the envelopes. Correlations between the envelopes does not equate to correlations between the underlying signal frequencies themselves, but rather to correlations in the slow-moving modulations of the amplitude or power of those signals. As such, correlations are representative of the connectivity between the nodes, and the generation of these correlation matrices yield distinct functional connectivity patterns. Block 864 made it possible to differentiate the traders' brain states based on whether or not they were exhibiting functional connectivity among specified brain regions.

Next, in block 865, cluster analysis was used to group the data of the correlation matrices into clusters, each of which can be characterized as representing a "brain state." While it is possible to rely on heuristics to define the clusters, in this implementation the well-known "k-means" algorithm was employed because it is particularly well-adapted to large data sets. There are many other common algorithms and various permutations thereof that can alternatively be employed in cluster analysis, including hierarchical, centroid-based, distribution-based, and density-based algorithms.

A decision was made to characterize each of the clusters as "brain states." These brain states were not defined in advance. Like the clusters themselves, they emerged from the PCA-transformed data. As it turned out, these brain states ranged from highly connected to loosely connected.

Figure 38:
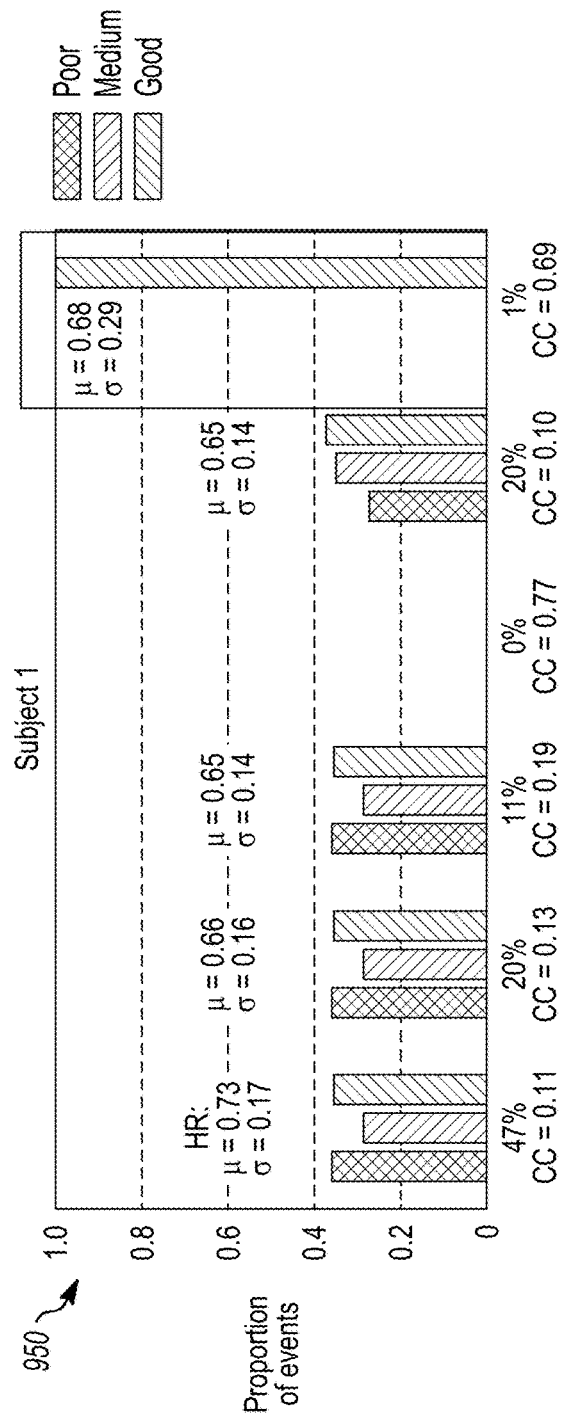
FIG. 38 is a clustered bar chart showing a first trader's proportions of "poor," "medium," and "good" trades as a function of the first trader's brain states.
Figure 39:
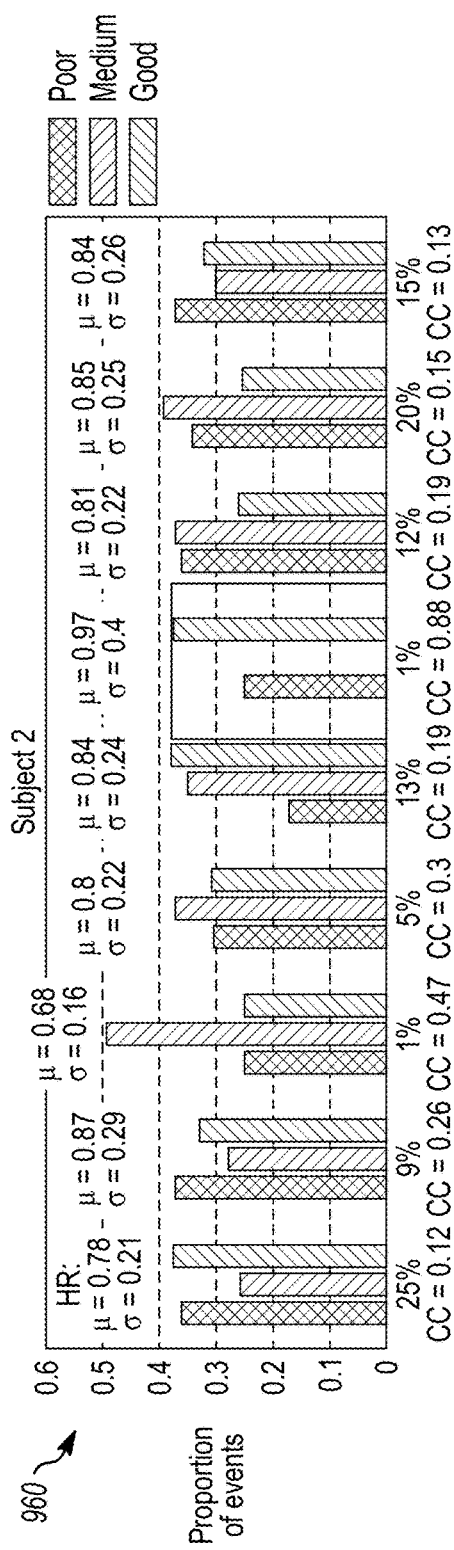
FIG. 39 is a clustered bar chart showing a second trader's proportions of "poor," "medium," and "good" trades as a function of the first trader's brain states.
Figure 40:
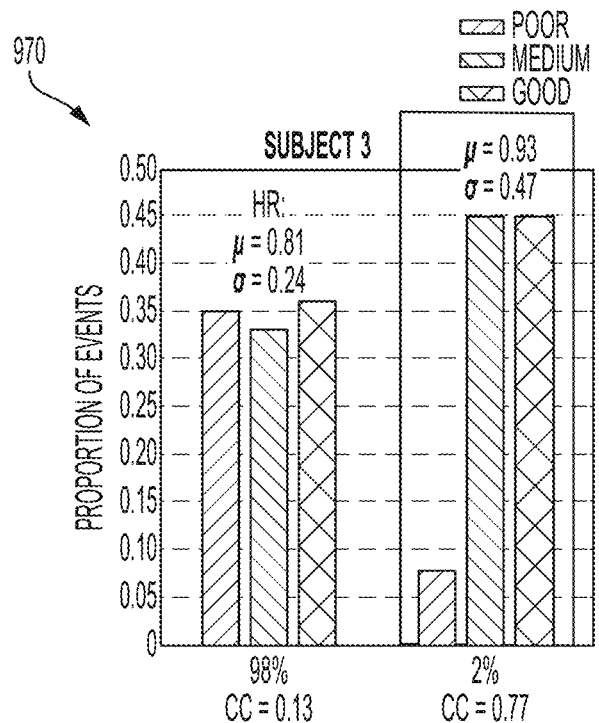
FIG. 40 is a clustered bar chart showing a third trader's proportions of "poor," "medium," and "good" trades as a function of the first trader's brain states.
Figure 41:
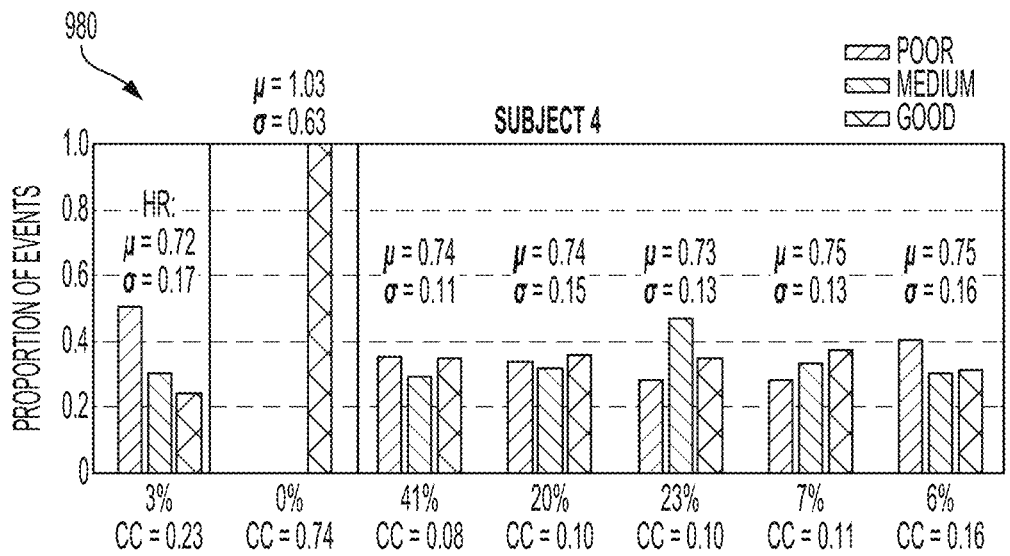
FIG. 41 is a clustered bar chart showing a fourth trader's proportions of "poor," "medium," and "good" trades as a function of the first trader's brain states.

The number of clusters is a function of both the data set (and whatever clusters emerge from the PCA transformation) and the heuristic or cluster algorithm and related constraints chosen to group the data. Here, the number of clusters identified was not determined a priori. Indeed, different numbers of clusters were identified for each of the traders. FIG. 38, for example, shows six sets of clustered bars, each set of which corresponds to an identified cluster in the data. FIGS. 39, 40, and 41, by contrast, show 9, 7, and 2 sets of clustered bars, respectively.

In this case study, initially only the EEG data were analyzed in the preprocessing PCA 857 and FCSE PCA 861. In an alternative embodiment, the input data 852 would be expanded to include data from other sensors, such as the heart rate. However, applying PCA or ICA to data from such disparate groups of sensors would cause the sensor data exhibiting the greatest variability to drive the PCA analysis. Therefore, analyzing data from just one set of sensors at a time makes it easier to identify brain states and other physiological states useful in predicting performance.

Figure 31:
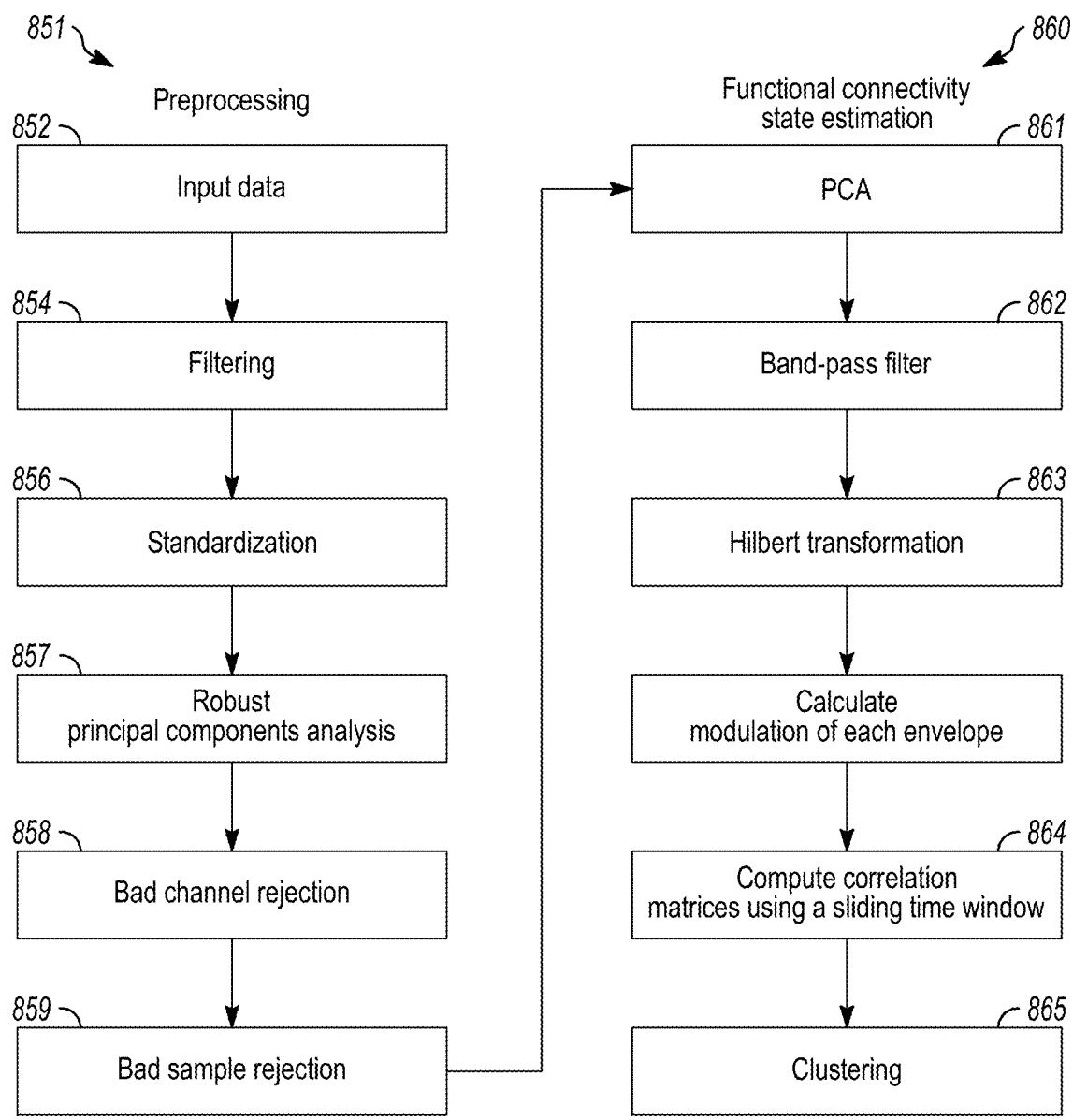
FIG. 31 is a flowchart illustrating steps of an EEG preprocessing and functional connectivity analysis.

Some of the method particulars performed in the data-conditioning pipeline 850 shown in FIG. 31 could be performed in a different order. Except for a claim, if any, that states otherwise, the disclosure is not limited to this particular data-conditioning pipeline 850, the particular order of the steps shown in the data-conditioning pipeline 850, and the various embodiments do not require each of the method particulars of the data-conditioning pipeline 850. Also, the invention encompasses adaptations of the data-conditioning pipeline 850 to other data sets, activities, and occupations.

In summary, the data-conditioning pipeline 850 comprises filtering signal data taken from an electrode space, transforming it into a principal-component space, identifying a temporal evolution of those spatial components, and finding the correlation between them.

Figure 34:
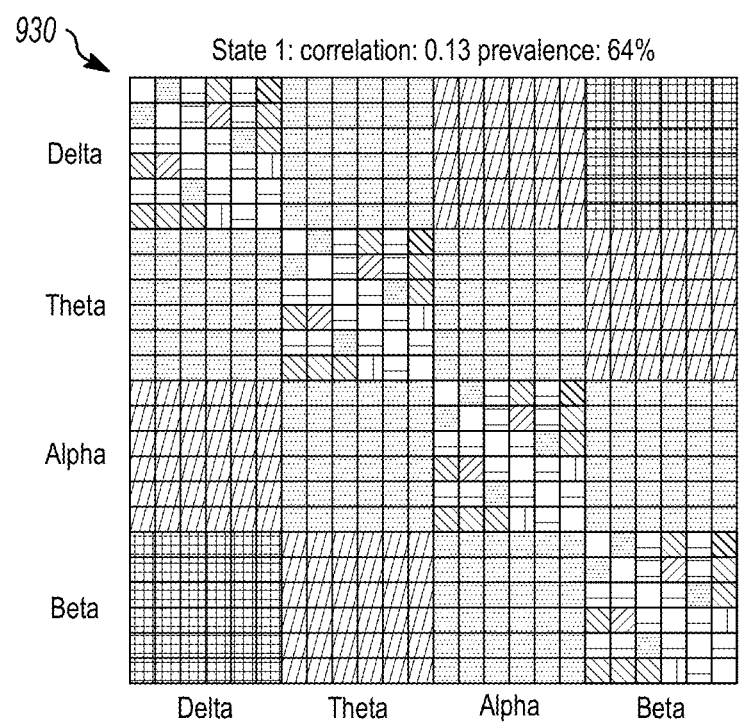
FIG. 34 is a symmetric functional connectivity plot revealing correlations between brain waves and correlations between PCA components of a first brain state.
Figure 35:
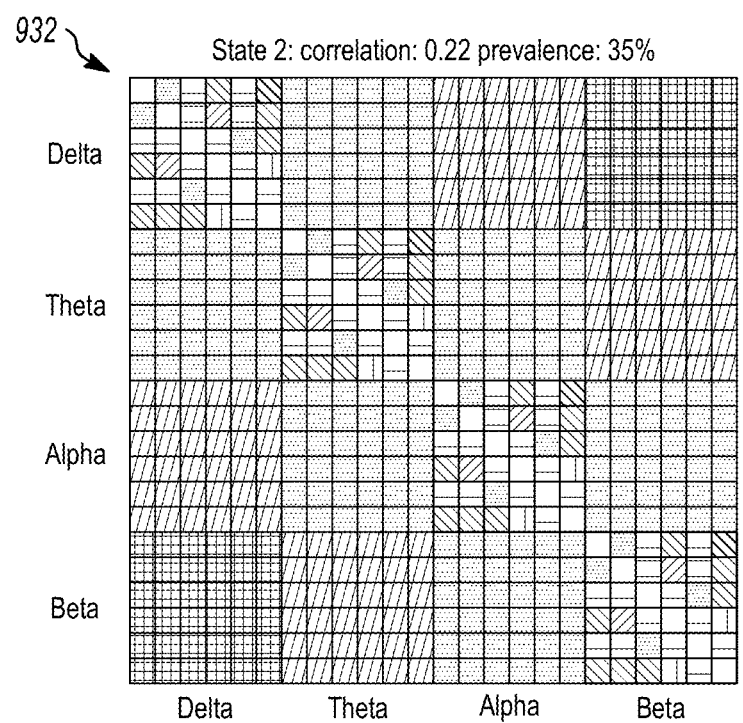
FIG. 35 is a plot like that of FIG. 34, but for a second brain state.
Figure 36A:
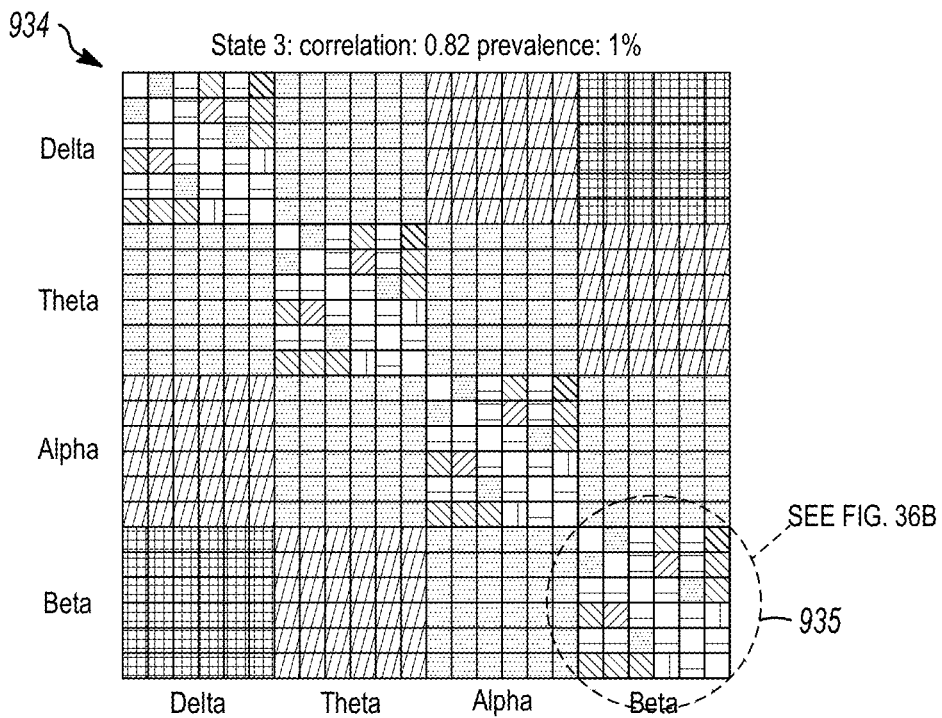
FIG. 36A is a plot like that of FIG. 34, but for a third brain state.
Figure 36B:
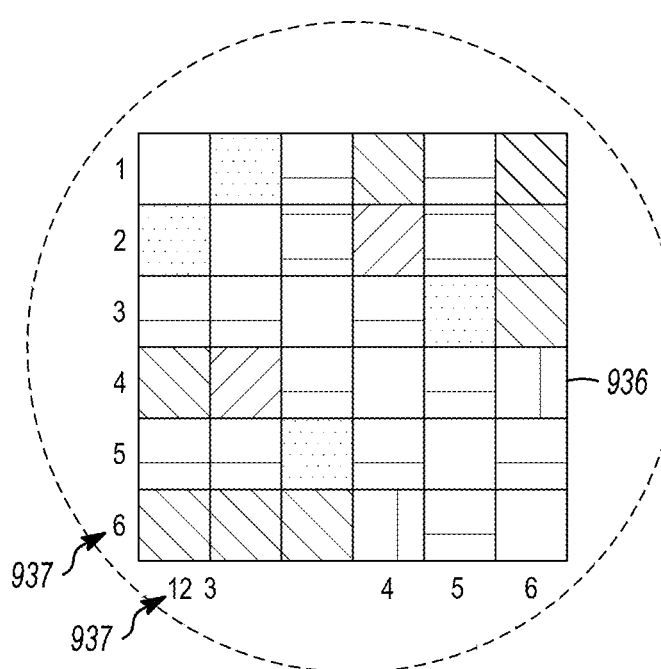
FIG. 36B is an expanded view of a portion of FIG. 36A.

FIGS. 34-36 illustrates three functional correlation "heat" maps for three data-driven brain states that were not defined a priori but rather emerged from the unsupervised PCA analysis using n=6 components. Each of the brain maps correspond to visually recognizable and algorithmically identifiable "clusters" of data in the PCA-transformed coordinate space. FIG. 34 illustrates a first state 930—representing a relatively unfocused and disengaged state—that was prevalent 64% of the time. There was only a low correlation (0.13) between brain waves. FIG. 35 illustrates a second state 932—representing a slightly more organized and engaged state—that was prevalent 35% of the time. Here, there was also a low correlation (0.22) between brain waves. FIG. 36, by contrast, illustrates a third state 934—representing the most organized and engaged and connected state—which exhibited a high correlation (0.82) between the alpha (8 to 12 Hz), beta/low gamma (12 to 38 Hz) and theta (4 to 8 Hz) brain waves. Delta waves—the lowest frequency (0.5 to 4 Hz)—were relatively uncorrelated with the other three brain waves. This third state was present only 1% of the time. Functional correlation is a technique for assessing functional connectivity of the brain of the subject. Any suitable technique and/or metric may be used to infer and/or measure functional connectivity of the brain of the subject, such as one or more of functional correlation, phase slope index, phase lag index, dynamic causal modeling, granger causality, and the like.

In each of the functional correlation heat maps 930, 932, 934, different intensities of connections between various frequencies (beta, alpha, theta, delta) and the components (illustrated in little boxes in each set of larger boxes) are represented by the relative darkness (meaning relatively uncorrelated) and relative lightness (meaning relatively correlated) of the large boxes 935 at the intersection of two different brain waves. The intersections between two of the same brain waves define an n×n set of smaller boxes 936, each of which illustrates the correlations between the six components 937 identified by the PCA. While in U.S. Provisional Patent App. No. 62/831,134, color was used to represent the different intensities—i.e., heat map with "hotter" colors (e.g., red) showed that the brain was exhibiting a higher degree of functional connectivity—here Visio®-generated patterns are used to represent relative levels of correlation, rather than shading, because for purposes of uniformity and form, colored and shaded drawings are discouraged within the Patent and Trademark Office. Patterns were selected based upon what appeared to be the ratio between white and black within the pattern. The darker the pattern, the less the correlation and functional connectivity. The lighter the pattern, the greater the functional connectivity. It is evident that the brain state represented by functional correlation heat map 934 exhibited a great deal more functional connectivity than the brain states represented by functional correlation heat maps 930 and 932.

Analysis of the traders individually produced similar graphs. In particular, the analysis identified one state for each trader in which the brain waves were highly correlated relative to the other states. A significant finding of the case study was that the functional connectivity (FC) pattern identified in the unsupervised analysis was remarkably consistent among the traders. This indicates that a signature could be derived from the patterns, representing a distribution of correlations that fall within bands (e.g., p=0.45 to 0.55)

Also, applying the PCA using fewer components (e.g., n=3) resulted in significantly less correlation than when six or nine components were evaluated, but there was comparatively little difference between using 6 and 9 components. While for simplicity, only a single set of graphs are illustrated in these drawings, additional patterns are illustrated in U.S. Provisional Patent App. No. 62/831,134, which is incorporated by reference.

The analysis next proceeded to evaluating the extent to which the brain states predicted the quality of the traders' transactions using VWAP as a metric. Since no information about the traders' VWAP scores was used to estimate the FC patterns (i.e., the method was unsupervised), transaction-level VWAP scores were grouped together as a function of the FC pattern the traders were experiencing when transactions were made. Time envelopes—e.g., 6 seconds—were selected around each transaction with which to associate the neurophysiological and VWAP performance data.

Figure 37:
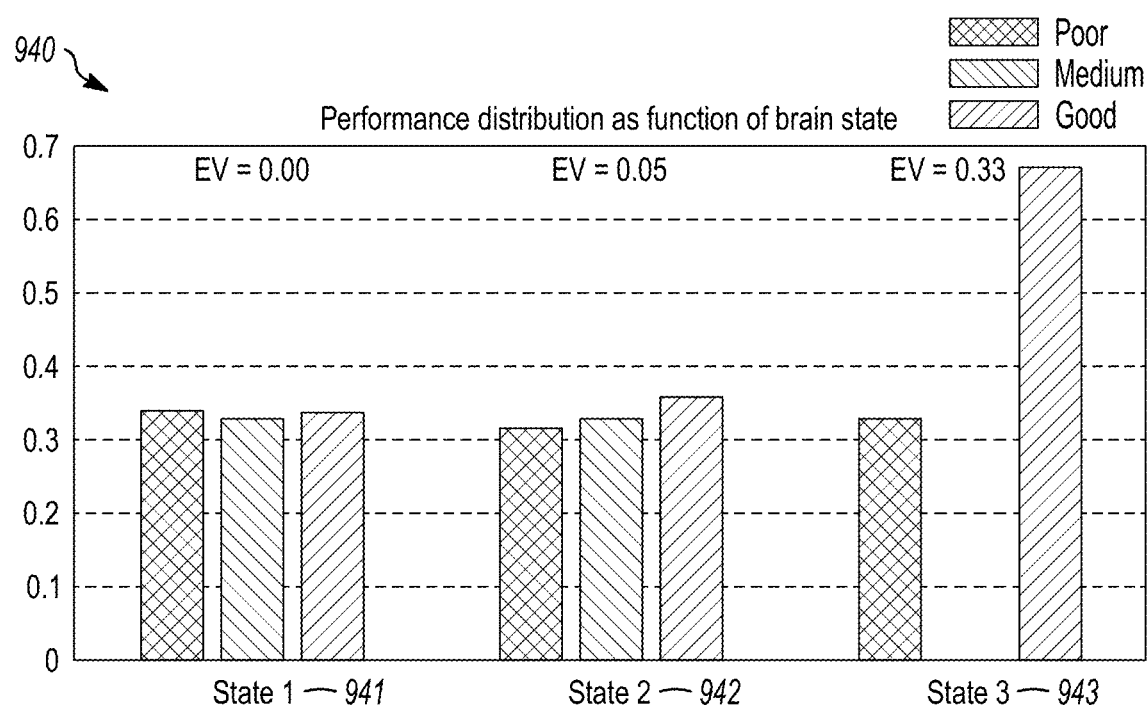
FIG. 37 is a clustered bar chart illustrating the proportions of "poor," "medium," and "good" trades as a function of brain state, for three brain states, along with the average or expected quality of trades for each of the three states.

FIG. 37 is a clustered bar chart 940 paralleling FIGS. 34-36 that illustrates how well the traders performed in each of the three identified states. Performance was graded as a function of the trader's trades in relation to the VWAP. Purchases and sales of securities whose prices were in a VWAP-centered band in FIG. 37 categorized as "medium," meaning that they fell into a middle—range-here, a middle tertile.

Sales whose prices were above that band and purchases whose prices were below that band were categorized as "good." Contrariwise, sales whose prices were below that band and purchases whose prices that were above that band were categorized as "poor."

The first state 941—representing transactions conducted while in a relatively unfocused and disengaged state—was statistically uniform across three grades, meaning that the traders' trades were evenly distributed across "poor," "medium" and "good." Note that other gradations are possible and fall within the scope of the various embodiments. State 1 exhibited no statistical effect on the trader's performance. The second state 942—representing transactions conducted while the trader's brain was in a slightly more organized and engaged state—was also fairly uniform across the three grades, exhibiting just a small positive effect on the trader's performance. The third state 943—which represented the high-connectivity state in FIG. 36 also exhibited a more significant positive effect on the trader's performance. However, only three transactions—two "good" and one "poor"—occurred while in state 3.

As reflected in FIGS. 38-41, the analysis was expanded to each of the traders: that is, Subjects 1-4, individually. The data were clustered into 6 states, 9 states, 7 states, and 2 states, respectively, for Subjects 1-4. Each clustered set of bars represents an identified brain state, and the label below each clustered set of bars indicates the prevalence of the brain state and the correlation coefficient between the brain wave patterns of that state. Above each clustered bar is data (mean and variance) about the trader's heart rate (HR) for each brain state, computed in seconds as the mean time between R—R intervals. In each figure, an elongated box is drawn around the cluster/brain state that exhibited the most positive performance. While the clustering of brain connectivity data into different states differed with each trader, the states could be rearranged in an order that progressively represent greater levels of brain connectivity.

The analysis found that high heart-rate variability (HRV)—the variance of the heart rate—was generally correlated with more highly connected brain states. For example, in FIG. 38, the HRV during the highest-FC brain state was 0.29, considerably higher than the values measured for the other states. In FIG. 39, the HRV during the highest-FC brain state was 0.4, once again larger than the HRVs measured for the other eight brain states. In FIGS. 40 and 41, the HRV during the highest-FC brain states (0.47, 0.63) were also larger than the HRVs (0.24, 0.17, 0.11, 0.15, 0.13, 0.13, 0.16) for the other states.

HRV—measured as the variance or standard deviation of the heart rate—is commonly associated with increased activity of the parasympathetic nervous system along with decreased sympathetic nervous system activity. Accordingly, high HRV data can be interpreted as a sign of decreasing arousal or stress. In Subject 1, the highest HRV (i.e., $\sigma=0.29$) was associated with the subject's best overall performing brain state. Likewise, for Subject 2, the highest HRV (i.e., $v=0.4$) was associated with the subject's best performing brain state. Subjects 3 and 4 had highest HRVs (i.e., $\sigma=0.47$ and $\sigma=0.63$, respectively) that were also associated with the subjects' best performing brain states. This demonstrates that HRV, quite apart from EEG, provides a useful way of predicting a trader's performance, and can even be substituted for EEG.

In summary, each subject exhibited at least one state strongly correlated with good or superior trading performance. The PCA involving six principal components provided better results than the PCA involving three or nine principal components. The inventors found that "good" brain states were generally associated with brain states having high mean absolute correlation and low prevalence. Moreover, high HRVs were also associated with better performance.

Applicant also analyzed the data using with max-kurtosis independent component analysis (ICA), which is fast and can handle large data arrays. However, there was so much noise in the data, in this particular case study, that it overly influenced what the components looked like. PCA tries to collapse things into components and essentially compress the data; ICA by contrast, provides maximal separation between components. Different case studies could very well produce better results using ICA.

For simplicity, these components can be categorized into two generalized brain states that each of the traders went in and out of during their trading day. After all, a "state" can represent any detectable and characteristic pattern or collection of data. Because differences between different detected unfocused states is not likely to be meaningful, it is useful to characterize the states other than the focused state as a single generalized unfocused state, thereby yielding just two brain states.

Figure 32:
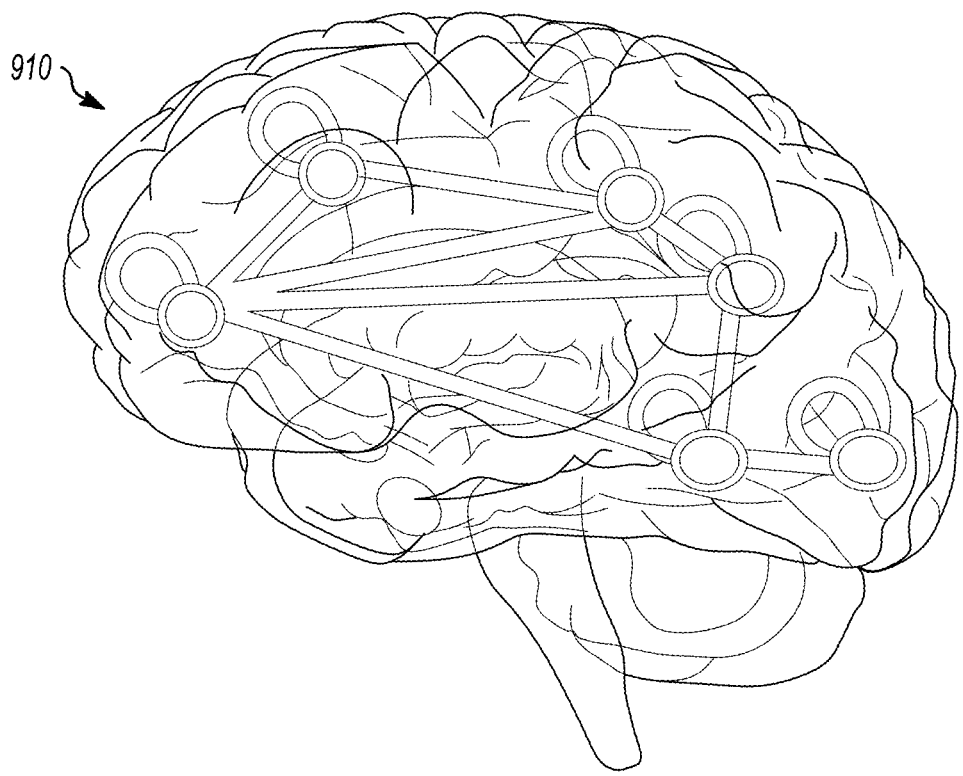
FIG. 32 illustrates a functional connectivity pattern that was associated with positive alpha.

In one of these states, the traders' brains demonstrated a high degree of "functional connectivity," meaning that several distinct regions within their brains were functionally interconnected and operating in synchrony with one another. In the other state, this type of functional connectivity was not present. A comparison of these states with transaction scores led to the discovery of a correlation between functional connectivity and profoundly differing levels of performance. In the highly connected state, each of the traders generated significant alpha, whereas in the other state, they tended to underperform the market. This is illustrated in FIGS. 32, which shows alpha as a function of these two generalized states.

The high-connectivity state-which was in evidence less than 10% of the time—was highly correlated with profitable transactions for all four of the traders as measured by VWAP. The low-connectivity brain state was associated with below-average performance. Statistical analysis showed a high degree of significance to these conclusions.

To test the statistical validity of the study findings, a Wilcoxon rank sum test was used for two unequal pooled measures where one pool consisted of the alpha values from all subjects during high connectivity states and the other was the pooled alphas from the subjects during low connectivity states. This analysis yielded a p value<0.05 and confirmed the statistical validity of the study's conclusions.

To access charts and execute transactions, traders used the Lightspeed/Sterling™ platform—a professional trading platform geared toward experienced professional traders. A risk advisor team monitored all positions and timing associated with transactions and provided daily summary reports for each trader. In addition, each participant maintained a daily log of their experience(s), specifically designed to record their feelings, impressions and observations of their own behavior during the course of the day.

The study benefitted in meaningful ways by taking place during a period of high volatility and general duress, as it allowed for the monitoring of both neurophysiological states and performance in scenarios that featured and often demanded cognitive attention at the upper ranges of what a typical risk-taker routinely experiences.

In the face of these market conditions, it was also clear that when measuring a trader's performance in association with individual transactions, it was important to factor out potentially confounding influences that the volatile market conditions might create. It was for this reason that trading performance was measured in comparison with the VWAP-a well-established trading metric that has broad validity even in highly volatile market conditions, making it an ideal baseline metric.

Figure 33:
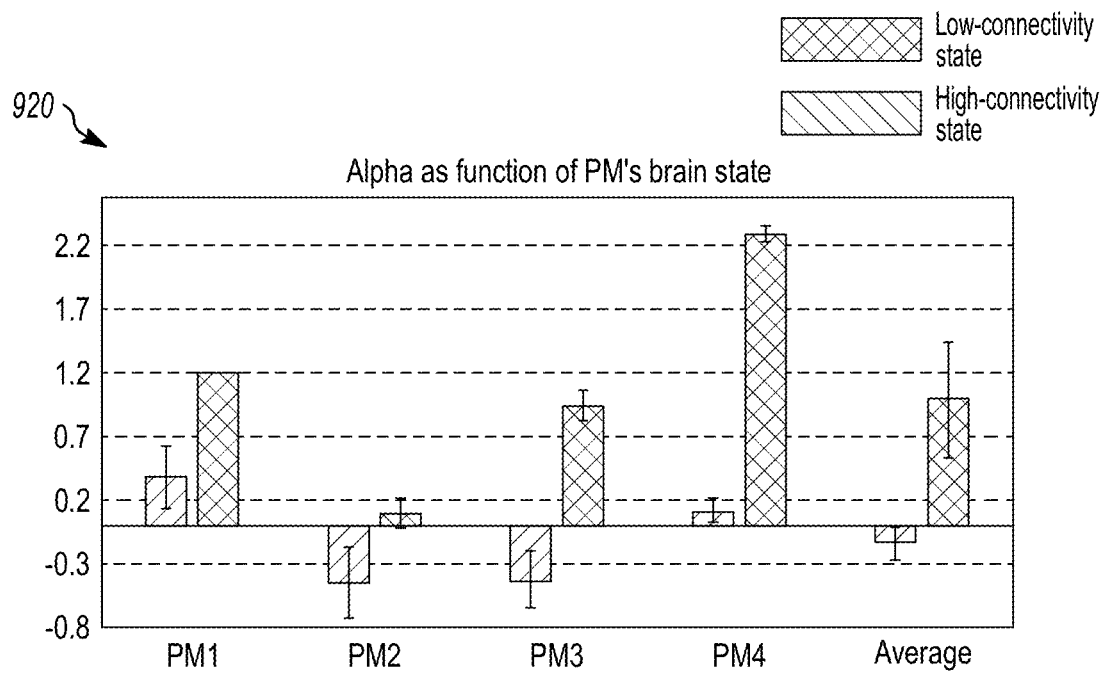
FIG. 33 illustrates the alpha of trades as a function of whether the trader had a high-connectivity or low-connectivity brain state.

To summarize, the study identified two distinct and measurable brain "states" that each of the traders went in and out of during their workdays. One of them was associated with high-alpha transactions (here, "alpha" refers to the performance in relation to VWAP scores, and is not to be confused with "alpha" brain waves) and the other was not (as illustrated in FIG. 33). The transactions that were associated with the high-connectivity state, while representing less than 10% of the total number of transactions, represented more than 100% of the total alpha generated in the study. This is a very significant finding. Table 6 below illustrates how good, medium, and poor transactions were distributed for the two brain states.

TABLE 6

Prevalence of good, medium, and poor transactions for different brain states

| Transaction quality | Low connectivity | High connectivity |
| --- | --- | --- |
| Good | 35% | 65% |
| Medium | 30% | 25% |
| Poor | 34% | 10% |

As also described earlier, the brain state that was associated with high-alpha transactions was characterized neurologically by a strong degree of connection and electrical synchronization between a number of brain regions that are commonly involved with complex decision-making. This functional connectivity pattern is illustrated in FIG. 31.

As illustrated by this study, it is possible to accurately measure and monitor, in real time, the brain states associated with both optimal and sub-optimal trading performance in a real-world setting.

D. Real-World Application

This information can be translated into real economic value. The research validates development of a finance-specific technological toolkit that reliably and materially enhances the profitability of—and offers a profound competitive advantage to—selected risk-taking organizations. The toolkit incorporates many elements of the experimental setup.

These inevitable neuroscience-based advances in the finance world are part of a broader evolutionary pattern. Since the advent of professional trading in the US under a buttonwood tree in lower Manhattan, a nonstop stream of technological breakthroughs-ranging from the invention of the tickertape, to the development of high-speed trading, to big data analytics—have steadily advanced the profession while offering those who take early advantage of them profound competitive advantages. Neuroscience represents a natural and critical next step in this evolutionary process and it, too, will offer early users a powerful competitive advantage.

In summary, the research study identified at least two distinct brain states that the traders went in and out of as they were working. One of these brain states—which was in evidence less than 10% of the time—was highly correlated with profitable transactions for all four of the traders as measured by an industry-standard metric commonly referred to as "Volume Weighted Average Price" (VWAP). The other brain state was associated with below-average performance. Statistical analysis showed a high degree of significance to these conclusions.

As a result of this study, the various embodiments include artificial intelligence, neural networks and machine learning to identify patterns and correlations between brain and/or other physiological state data and both optimal and sub-optimal/prime trading performance (or other high-risk decision-making), the use of neurometric feedback to predict such trading performance, the use by traders of neurometric feedback to enhance and motivate better brain states, and the use of neurometric data by risk managers and automated systems to determine whether a trader is having a bad day, whether to allow or block a transaction, and whether give the trader an intervention, etc.

Figure 30:
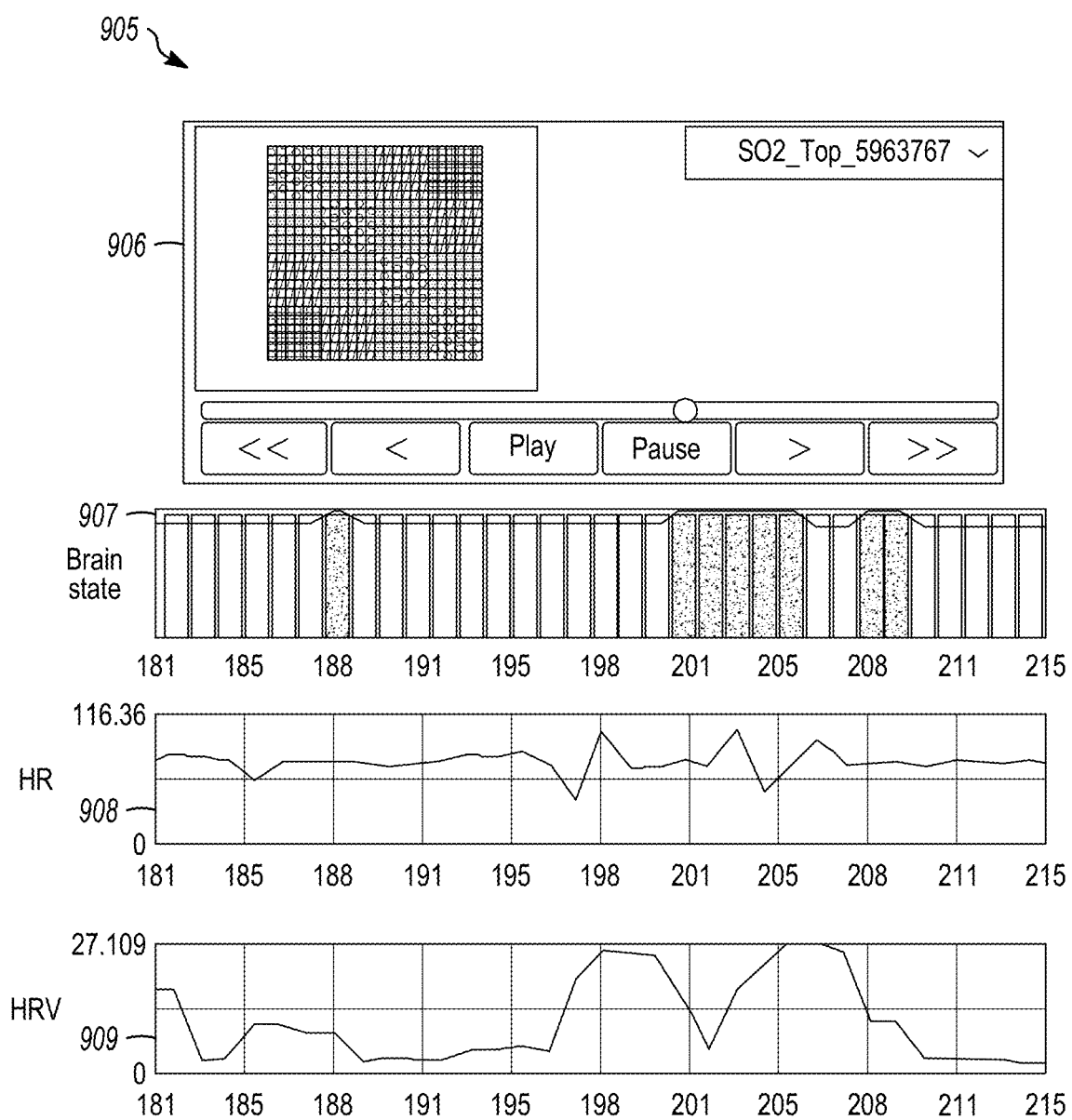
FIG. 30 illustrates a dashboard provided to traders.

FIG. 30 depicts an early version of a cognitive capture dashboard 905, which is an example of an interface that the trader can use in real-time to stay aware of their own brain states, pulse rates, pulse rate variability, and/or other physiological metrics. This embodiment of the cognitive capture dashboard 905 provides a moment-by-moment real-time "picture" of a brain state that the trader is in. This cognitive capture dashboard 905 provides a visual through a PCA matrix 906 (showing colored blocks) and/or a bar chart 907 that provides a moment-by-moment categorization of the state that the trader is in (via colors and bar heights). This cognitive capture dashboard 905 can also provide a running graphic 908 of the trader's heart rate and another running graphic 909 of the trader's heart rate variability. Advantageously, these live elements are time-synchronized or "aligned" with each other.

Furthermore, the cognitive capture dashboard 905 can provide a box or circle surrounding or a running eye gaze video displaying a focused view of the things (e.g., screen graphics, numbers, and text) that the trader is intensely focusing upon. The eye gaze feedback provides a focused visual reminder of what text, numbers, graphics, and/or surrounding elements the trader was looking at while contemplating a trade. It helps a trader assess what kinds of information triggered beneficial brain states, and what kinds of information tended to distract the trader.

When viewed in real time, the eye gaze feedback may not be necessary. But in another implementation, the trader can use the dashboard 905 to view a recording of clips of their transactions, much like a football or basketball team reviewing and studying footage of previous games. Such a dashboard could include one or more elements like those depicted in Illustration II (including the eye gaze feedback) as well as post-transaction feedback indicative of the goodness of the transaction.

Another embodiment of the dashboard 905 provides less detailed information, for example, a dial or red/green/yellow indicator regarding the trader's brain state. Yet another embodiment aligns the goodness of the transaction with the brain state and physiology in some dashboard-type form. In a managerial or supervisory embodiment of the dashboard, brain state and/or physiological signals and/or video feeds and/or goodness indicators of the trader or of several traders simultaneously are received and displayed to a manager or supervisor.

Many other refinements to the data analysis are contemplated. While the experimental data analysis focused on "states," finer-grained analysis is contemplated that focuses more on moment-by-moment or transaction-by-transaction physiological or neurophysiological signature. Also, while the "goodness" of a transaction was determined by its relation to VWAP, other measures of goodness—like profitability—are contemplated. Analysis is also contemplated to determine which kinds of information produce the best and worst reactions in a trader, and whether a trader tends to underreact or overreact to (or be overstimulated by) certain kinds of information, in order to better filter the data and dampen inputs that a trader receives and train the trader to react more optimally to information. Analysis is also contemplated to correlate brain states and physiological states (such as testosterone, adrenaline and cortisol levels and other arousal data) with trading performance data, informed by behavioral finance research such as described in John Coates The Hour Between Dog and Wolf: How Risk Taking Transforms Us, Body and Mind (2013), which is herein incorporated by reference. For example, it has been shown that periods of over-arousal correlate with bad decision making. Adrenaline comes on line first. Then stress hormones (e.g., cortisol) come online, mobilizing internal resources, etc. Decision making in high risk situations involves a combination of two of those. Applicant ultimately plans to combine the brain and the physiology data down to the transaction level.

Advantageously, the dimensionality-reduction of PCA can be used to identify sensors that can be removed because the data they collect is determined to be relatively less relevant to the determination of a trader's brain state, and a smaller subset of sensors is adequate to determine brain states relevant to contemplating and executing financial transactions.

As used in the specification, the term "brain" sometimes expediently refers to the entire central nervous system, including both the anatomical brain and the spinal cord. Unless the context dictates otherwise (e.g., by claims that recite both a brain and a spinal cord as if they were distinct entities), the term "brain" should be understood as including the spinal cord.

As used in the specification, a brain "system" "area" or "region" can either refer to an anatomical part of the brain or a functional network or system of the brain, unless the context dictates otherwise. Machine learning may in the future identify novel or different systems and pathways independent of those currently defined by the neuroscientific discipline.

Recapitulation

The methods and systems disclosed in this application have many applications. Accordingly, the invention as defined by the claims can be characterized in many different ways and realized in many different embodiments.

A first embodiment is a neurometric-enhanced performance assessment system comprises a neurometric interface, a behavioral task interface, a recorder, a statistical engine, a reporting engine, and a reporting engine. The neurometric interface that collects' neurometric data about a subject while the subject is performing a task and transmits the neurometric data to a computer for recording and analysis. The behavioral task interface collects performance data about a subject while the subject is performing the task. The recorder receives and records the neurometric data from the neurometric interface and performance data from the behavioral task interface. The statistical engine is configured to analyze both the neurometric data and the performance data of the subject and identify correlations between the performance data and the neurometric data. The reporting engine is configured to generate an assessment of the subject's performance and physiological characteristics from the performance data and the neurometric data.

In one implementation, the neurometric interface comprises a plurality of neurophysiological sensors arranged on a base, wherein the base is configured to be worn on the subject's head and to place the neurophysiological sensors in contact with the head.

Also, the base comprises a headband or a virtual reality headset. Furthermore, the neurometric interface further comprises a power supply and a transmitter that transmits neurometric data to the recorder.

In another implementation, the system comprises a synchronizer that synchronizes the neurometric data with the performance data, the synchronizer being communicatively coupled to both the neurometric interface and the behavioral task interface, and the synchronizer ensuring that neurometric signals are coordinated in time with corresponding performance data.

In another implementation, the system further comprises a mapper and a feedback display interface. The mapper maps a representation of the neurometric data onto a 3D-image of the brain. The feedback display interface, which is configured within viewing range of the subject, receives from the mapper map data representative of the 3D-image of the brain and is configured to display the 3D-image of the brain to the subject while the subject is performing the task. The feedback display interface also comprises a video headset worn by the subject.

In another implementation, the system further comprises a task controller that modifies, in real time, the task as a function of the performance data and the neurometric data.

In yet another implementation, the system further comprises a database interface to interface the apparatus to a database that collects physiological state and performance data from a plurality of subjects to identify patterns that statistically correlate performance data and sensed physiological characteristics across the plurality of subjects.

In a further implementation, the system further comprises a neurofeedback interface that provides at least one of the following stimuli or substances to the subject if the system detects that brain activity in a selected brain system has fallen below a threshold: (1) electrical stimulation administered to the subject's head; (2) a neurotropic administered orally or intravenously to the subject; (3) a tactile stimulation administered to the subject's body; (4) a transient sound; and (5) a transient light.

The various embodiments include a method of enhancing performance. The method comprises equipping a subject with one or more neurophysiological sensors of brain activity, selecting tasks for the subject to perform, and for at least one of the tasks, collecting neurometric data about a subject while the subject is performing the task and transmitting the neurometric data to a recorder. The method further comprises collecting performance data about a subject while the subject is performing the task and transmitting the performance data to the recorder, building a database of synchronized neurometric and performance data, and defining an expert performance level for the task. The method also comprises accessing the database to construct brain signatures associated with expert performance; identifying correlations between the performance data and the neurometric data; and generating an assessment of a physiological state of the subject based on the subject's performance and neurometric data.

In one implementation, the method further comprises mapping the neurometric data onto a 3D-image of the brain; and displaying the 3D-image of the brain to the subject while the subject is performing the tasks.

In another implementation, the method further comprises evaluating the neurophysiological data to assess the integrity of specific pathways of the brain. In a further implementation, the method further comprises evaluating the person's default mode network during a period for which person is asked to do nothing. In another implementation, the method further comprises building a predictive model of an individual's possible performance utilizing heuristics derived from time-correlated streams of sensor data and task results.

In another implementation, the method further comprises generating an intervention plan to help the person improve his/her performance on the tasks. The intervention plan can include one or more of the following: an assessment, insights for a coach or trainer, suggestions on diet and neurotropics, brain stimulation, and cognitive stimulation. In yet another implementation, the method further comprises detecting when the person's attention is waning and modifying or interrupting the task to regain the person's focus and engagement.

In another implementation, the method further comprises building and maintaining a database of data for a population of subjects; identifying experts from the population; and identifying brain signatures associated with expert performance across one or more cognitive domains. The signature can include a map that illustrates areas and/or pathways of the brain that are activated by a given task A third embodiment includes a system for enhancing a person's performance. The system comprises a behavioral task interface, a neurometric interface, a mapper, and a display. The behavioral task interface facilitates the person's performance of the task. The neurometric interface collects neurometric data while the person is performing a task. The mapper maps a representation of the neurophysiological data onto a spatial representation of a brain. The display reveals the mapped representation to the person while the person performs the task. The mapped representation assists the person in achieving a targeted brain state while the person is performing the task. In one implementation, the system further comprises a behavioral task interface, such as an exercise machine, simulator or computer exercise that facilitates the person's performance of the task.

A fourth embodiment is a method of enhancing a person's performance. The method comprises equipping a person with one or more neurophysiological sensors of brain activity; the person repeatedly performing a task to enhance the person's performance in a cognitively-related activity; measuring the person's performance on the task while simultaneously collecting neurophysiological data from the sensors; and while the person performs the one or more task, showing the person a visualization of the person's brain activity.

In one implementation, the one or more tasks are performed to prepare for the activity. Also, the one or more tasks and the activity are distinguishable in that they are: performed in simulation and not performed in simulation, respectively; machine-mediated and non-machine mediated, respectively; stationary and mobile, respectively; individual and team-based, respectively; non-competitive and competitive, respectfully, with respect to other persons; and/or indoor and outdoor, respectively.

In another implementation, the task preferentially activates one or more systems of the person's brain in a manner that is greater than and detectably distinguishable from other systems of the person's brain.

In another implementation, the visualization is a 3D representation of a model brain or of the person's brain superimposed with a representation of the person's brain activity, wherein the representation of the person's brain activity is derived from the neurophysiological data. In a fourth embodiment, the method further comprises showing the person an image of a normal, expert, or ideal brain's activity during the performance of the same task. In a further implementation, the method also comprises providing the person a predictive or aspirational 3D representation of the person's brain after the person completes a program of training. In another further implementation, the method also comprises providing the person 3D brain images contrasting an integrity of at least one of the brain's systems before and after performing the tasks over N repetitions, where N is greater than or equal to 1.

A fifth embodiment includes a method of enhancing a person's performance in an activity. The method comprises equipping a person with one or more neurophysiological sensors of brain activity; the person repeatedly performing one or more tasks in preparation for performing an activity, wherein the one or more tasks are different but cognitively-related to the activity, wherein both the tasks and the activity generate detectable electrical activity to an especial extent from a common portion or portions of the brain that are associated with a common cognitive domain; measuring the person's performance on the tasks while simultaneously collecting neurophysiological data from the one or more sensors; and while the person performs the one or more tasks, showing the person a visualization of the person's brain activity.

In one implementation, the method further comprises evaluating the person's default mode network during a period for which person is asked to do nothing and utilizing a representation of the person's brain activity when the default mode network is activated as a baseline against which the person's brain activity while performing the one or more tasks is measured.

In another implementation, the visualization is a 3D image of the person's brain superimposed with a representation of the person's brain activity that changes in real time. In yet another implementation, the visualization includes a comparative 3D image of a normal, ideal, or expert brain's activity during performance of an identical task. In a further implementation, the method comprises providing the person a predictive or aspirational 3D representation of the person's brain after the person completes a program of training. In another further implementation, the method further comprises contrasting a 3D representation of the person's brain activity before the person performs the task or a program of training with a 3D representation of the person's brain activity after the measuring the resulting brain changes and illustrating the resulting brain changes.

A sixth embodiment includes a method of enhancing a person's performance, the method comprising equipping the person with a neurometric monitor; collecting performance data about the person's performance on a baseline task while the person performs the task; and identifying systems of the person's brain that had a sub-optimal level of brain activity while the person performed the task. The method also comprises selecting a set of one or more training tasks that target said identified systems of the brain; collecting neurometric data about the person while the person performs the one or more training tasks; and providing the person with real-time feedback about the person's neurometric data and performance as the person performs the training task.

In one implementation, the method also comprises modifying the task for the person in real-time based on both the person's performance and physiological data/brain signatures. In another implementation, the method also includes producing speech to motivate and exhort the person in real time as the person performs the training task.

The seventh, eighth and ninth embodiments relate to methods of and systems for enhancing team preparation and coaching. The seventh embodiment is a method of enhancing a team's performance by equipping a plurality of team members with sets of one or more sensors, wherein each set includes at least one neurophysiological sensor of brain activity; selecting a set of tasks for each team member to complete which test the team member across a plurality of cognitive domains; and measuring the team members' performances on the tasks while simultaneously collecting neurophysiological data from the sensors. The method further involves, for each team member, synchronizing data from or derived from the sensors with behavioral task performance data and generating an assessment for each team member, the assessment indicating the team member's performances on the tasks and relating the team member's brain activity to those performances.

In one implementation, the method further comprises evaluating whether each team member might be more productive at a different position.

In another implementation, the method further comprises generating an intervention plan for a coach or trainer that provides suggestions on coaching or training adjustments for each team member. The intervention plan includes a program of exercises that preferentially activate selected systems and pathways of the brain and comprises suggestions for a coach or trainer to tailor the coach or trainer's interactions with the team member to improve that member's proficiency within an area of activity. The intervention plan can also include the administration of a neurotropic, oral substance, or intravenous substance.

In yet another implementation, the method further comprises building a predictive model of each team member's potential, wherein the predictive model predicts an improvement goal for each cognitive domain that is a function of both the team member's data and collective data indicating levels of improvement that other persons have achieved.

In a further implementation, the assessment also compares the team member's task performance to baselines for expert performance and/or the team's average performance across said plurality of cognitive domains.

In yet another implementation, at least one of the set of tasks differentially activate one or more parts of the brain. In a further implementation, at least one of the set of tasks is selected to produce a desired brain change in the team member in a targeted performance domain.

In another implementation, at least one of the set of tasks include a set of surveys that measure a team member's resilience to stress. In yet another implementation, the method further comprises evaluating the team member's default mode network during period for which the team member is asked to do nothing.

In another implementation, the set of tasks indicate the integrity of specific parts and/or pathways of the brain. In a further implementation, for at least one of the set of tasks, the visualization is a 3D image of the team member's brain in real time using the sensors. In another implementation, during at least one of the set of tasks, the method includes showing the team member a 3D image of an ideal or expert brain active during the performance of the same tasks.

In yet another implementation, the method further comprises providing the team member a graphic of what the team member's brains' 3D images should look like after the training.

In a further implementation, the method further comprises measuring the resulting brain changes and illustrating the resulting brain changes. In another implementation, the method further comprises detecting through evaluation of the team member's brain activity when the team member's attention is waning; and modifying or interrupting the task to remind and/or help the team member to regain focus and engagement.

In yet another implementation, the plurality of cognitive domains includes five or more of the following: processing speed and reaction time, pattern recognition, ability to sustain attention, learning speed, working memory, creativity, autonomic engagement in a task, emotional resilience, burnout, fatigue, and memory.

The eighth embodiment is a method of optimally utilizing a team's players. The method comprises equipping a plurality of players with sets of one or more sensors, wherein each set includes at least one neurophysiological sensor of brain activity and selecting a set of tasks cognitively related to team activities for each player to complete which test the player across a plurality of cognitive domains. A task is cognitively related to a team activity if it preferentially activates a common brain network. The method also comprises measuring the players' performances on the tasks while simultaneously collecting neurophysiological data from the sensors and, for each player, synchronizing data from or derived from the sensors with behavioral task performance data. The method further comprises generating an assessment for each player. The assessment indicates the player's performances on the tasks and explaining the team activities to which the tasks are cognitively related. The method also comprises generating a prediction of each player's capacity to achieve a predefined level of proficiency through practicing, including a predicted amount of time and/or training needed to achieve the predefined level of proficiency; and comparing the predictions generated for each player and identifying team roles on which the player could most contribute to the team.

The ninth embodiment is a method of optimally utilizing a team's players. The method comprises equipping a plurality of players with sets of one or more sensors, including at least one neurophysiological sensor of brain activity, and selecting a set of tasks cognitively related to team activities for each player to complete which test the player across a plurality of cognitive domains. A task is cognitively related to a team activity if it preferentially activates a common brain network. The method also comprises measuring the players' performances on the tasks while simultaneously collecting neurophysiological data from the sensors and, for each player, synchronizing data from or derived from the sensors with behavioral task performance data. The method further comprises generating an assessment for each player, the assessment indicating the player's performances on the tasks and explaining the team activities to which the tasks are cognitively related. The method includes predicting how the team would play if team positions were reassigned amongst the players. The prediction is based on the assessments and utilizes a predictive model. The further includes identifying an assignment of players to team positions that provide the greatest odds of making the team successful. This identification is done on the basis of the predictions, The tenth, eleventh, and twelfth embodiments are directed to construction of an integrity map of the brain's functional systems. The tenth embodiment is a method of constructing a functional system integrity map of a person's brain. The method comprises equipping the person with one or more neurophysiological sensors of brain activity; the person completing a set of tasks that test the person across a plurality of cognitive domains; and measuring the person's performance on the tasks while simultaneously collecting neurophysiological data from the sensors. The method also comprises generating a neurophysiological functional assessment of multiple systems and pathways in the person's brain; and constructing a spatial representation of the person's brain that illustrates the integrity of the brain's functional networks.

In one implementation, the one or more sensors includes EEG sensors distributed about both the right and left hemispheres of the brain. In another implementation, the one or more sensors produce data for determining frequencies associated with brain activity. In a yet another implementation, the method further comprises using data about the person's task performance results to assess the integrity of specific systems and/or pathways of the brain.

In another implementation, the set of tasks include both motor-behavioral and cognitively/neuropsychologically important tasks. In yet another implementation, at least one of the tasks is an experiential task that is performed in a real-world or virtual-reality setting. In a further implementation, at least one of the tasks activate one or more parts of the brain in a manner detectably distinguishable from other parts of the brain.

In one implementation, the plurality of domains includes five or more of the following: processing speed and reaction time, pattern recognition, ability to sustain attention, learning speed, working memory, creativity, autonomic engagement in a task, emotional resilience, burnout, fatigue, and memory.

In one implementation, the method uses a neural network, machine learning, artificial intelligence, PCA, ICA, sparse matrix decompositions, low-rank matrix decompositions, and/or t-Distributed Stochastic Neighbor Embedding (tSNE) to identify patterns of brain activity associated with specific tasks.

In another implementation, the method further comprises presenting a survey to the person and recording survey responses while simultaneously collecting neurophysiological data from the sensors, wherein the act of building a database also incorporates the person's survey results synchronized with the person's survey responses.

The eleventh embodiment is a system for constructing a functional system integrity map of a person's brain. The system comprises a set of neurophysiological sensors of brain activity configured to sense human brain activity; a set of assessment tasks to test the person's cognitive efficiency across a plurality of cognitive domains; and a data collector that stores data about the person's performance on the assessment tasks and neurophysiological data from the sensors. The system also includes a statistical engine that analyzes the performance data and neurophysiological data to identify correlations between the person's performance on the assessment tasks with the person's brain activity while performing the task. The system also includes a database of performance data and neurophysiological data from a population and an evaluation engine that compares the person's performance and brain activity on the assessment tasks with the performance data and neurophysiological data from the population to generate a neurophysiological functional assessment of multiple systems and pathways in the person's brain. Furthermore, the system includes a reporting engine that constructs a spatial representation of the systems and pathways in the person's brain that illustrates the integrity of the brain's functional systems.

In one implementation, the set of neurophysiological sensors comprise EEG sensors arranged to be distributed about both the right and left hemispheres of the brain. In another implementation, the set of neurophysiological sensors produce data for determining frequencies associated with brain activity.

In a further implementation, the data collector is an interface between the sensors and the database that passes sensor signals from the sensors to the database. In another implementation, at least one of the tasks is an experiential task that is performed in a real-world or virtual-reality setting.

In one implementation, the set of tasks are configured to activate one or more parts of a human brain in a manner detectably distinguishable from other parts of the human brain. In a further implementation, the system includes a neural network configured to identify patterns of brain activity associated with specific tasks.

The twelfth embodiment is a method of training oneself's brain activity while performing tasks. The method comprises availing oneself of neurometric equipment, including one or more neurophysiological sensors, that is configured to measure one's performance on the tasks while simultaneously collecting neurophysiological data from the sensors, to generate a neurophysiological functional assessment of one self s brain networks, and to construct a spatial representation of one self s brain networks. The method further includes equipping oneself with the one or more neurophysiological sensors and completing a set of tasks that test oneself across a plurality of cognitive domains while the neurometric equipment measures and generates data of one's brain activity and collects and analyzes the brain activity data. The method also includes receiving the spatial representation of oneself's brain networks from the neurometric equipment, wherein the spatial representation is derived from the brain activity data.

In one implementation, the method further comprises reviewing real-time imagery (or other derivatives thereof, e.g., a mapping into sounds, tactile stimulation, text, etc.) of oneself s brain activity while performing the tasks. In another implementation, the method comprises performing many repetitions of the set of tasks over a period of multiple days to train oneself's brain to become more proficient at performing the set of tasks.

The thirteenth through fifteenth embodiments are directed to a system and method for identifying signatures of task-driven brain activity. The thirteenth embodiment is a method of identifying one or more signatures of task-driven brain activity. The method involves equipping each of a population of human subjects with one or more sensors, including at least one neurophysiological sensor of brain activity. Each subject completes a set of tasks that test or quantify the efficiency of at least one of the subject's cognitive domains. The method also involves measuring each subject's task performance while simultaneously collecting brain activity data correlated with the subject's task performance. The method also includes building a database of the task performance and brain activity data from the population of subjects; analyzing the task performance and brain activity data to identify correlations between task performance and brain activity across the population; and constructing one or more signatures of task-driven brain activity, derived from the analysis, wherein the one or more signatures comprise characteristic levels of brain activity in different brain networks for different performance levels.

In one implementation, the machine learning apparatus produces a matrix correlating a plurality of variables, including task performance, with quantitative representations of the brain systems' functional integrities.

In another implementation, each of the one or more signatures are associated with corresponding tasks from the set of tasks. In yet another implementation, each of the one or more signatures is a representation of one or more brain systems and/or pathways between the brain systems that are differentially activated by the task. In a further implementation, each of the one or more signatures quantifies levels of brain activity across a distribution of task performance levels, wherein the levels indicate a range of times and/or accuracy levels with which the task is performed.

In one implementation, the method further comprises inputting the database of task performance and brain activity data into a machine learning apparatus that identifies brain systems and/or pathways between the brain systems that are activated by each of the tasks and that further identifies degrees to which activity in said brain systems and/or pathways are correlated with task performance. The plurality of variables can include survey responses and/or metrics on performance of tasks in which the brain systems and/or pathways between the brain systems are differentially activated with respect to other brain systems and pathways.

In a related implementation, the method comprises inputting data relating to several subjects' performances in practical, real-world activities into the machine learning apparatus. The machine learning apparatus produces a matrix correlating a plurality of variables, including performance in tasks and performance in practical, real-world activities, with brain activity. The machine learning apparatus also generates a prediction heuristic from the correlation matrix for generating a prediction of a person's performance in a selected one of the practical, real-world activities as a function of the person's brain activity and performance of a task.

In another implementation, the method further comprises collecting task performance and brain activity from a subject, wherein the subject is or is not a part of the population of subjects; and comparing the subject's brain activity and task performance with the one or more signatures to construct a neurophysiological functional assessment of multiple functional systems and pathways in the subject's brain. Furthermore, a spatial representation of the systems and pathways in the person's brain is constructed that provides a functional integrity representation of the brain's functional systems.

In one implementation, the plurality of domains includes five or more of the following: processing speed and reaction time, pattern recognition, ability to sustain attention, learning speed, working memory, creativity, autonomic engagement in a task, emotional resilience, burnout, fatigue, and memory. In another implementation, the set of tasks include both motor-behavioral and neuropsychological tasks.

In an economizing implementation, the method further comprises identifying a minimal number of neurophysiological sensors necessary to detect and distinguish different levels of brain activity in different brain networks.

The fourteenth embodiment comprises a system for identifying relationships between physiological characteristics and performance of specific tasks. The system comprises a task-performance monitor that monitors a plurality of persons' performances at one or more tasks; a plurality of physiological sensors that sense one or more physiological characteristics of the plurality of persons while the persons are performing the one or more tasks; and a database that receives data about the one or more physiological characteristics from the plurality of physiological sensors for the plurality of persons and stores the data in a predefined format.

In one implementation, the system further comprises a reporting engine that issues queries to the database and produces graphical and textual reports about a selected person's performance of a task and correlated physiological data. In another implementation, the system further comprises a portal interfaced with the report generating engine, the portal enabling the one or more persons and/or an evaluator to view the selected person's graphical and textual reports. In yet another implementation, the plurality of sensors includes one or more of a fMRI, an EEG, a MEG, a PET, and a fNIR.

The fifteenth embodiment is a system for identifying relationships between physiological characteristics and performance of specific tasks. This system comprises a task-performance monitor that monitors a plurality of persons' performances at one or more tasks; a plurality of neurophysiological sensors that sense brain activity across multiple brain networks of the plurality of persons while the persons are performing the one or more tasks; and a database that receives data about persons' performances along with the persons' brain activity and stores the data in a predefined format. The database stores information about the activity of several brain networks of the persons, such as the dorsal and/or ventral attentional networks. The system also includes a statistical engine comparing brain activity information with performance data to generate models of brain activity associated with the specific tasks.

The sixteenth through eighteenth embodiments are directed to a predictive model of performance based on neurometrics and related methods. The sixteenth embodiment is a method of predicting an individual's performance. The method comprises, in one aspect, accessing a database that includes data about performance and brain activity for a population of subjects that have performed a training program on a first set of tasks, wherein the brain activity data includes chronologies of brain activity of one or more brain networks that are characterized by stronger connections when subjects repeatedly perform the first set of tasks over a period of several days, weeks, or months. In another aspect, the method comprises prompting an individual other than the population of subjects to complete a set of screening tasks while equipped with a set of brain activity sensors and measuring the individual's performance on the set of screening tasks while simultaneously collecting data about the individual's brain activity from the sensors. In yet another aspect, the method comprises predicting an amount of time that the individual will need to train to improve their performance to a predefined level of performance on the basis of the individual's performance on, and brain activity during performance on, the set of screening tasks, in relation to the data about performance and brain activity for the population of subjects.

In one implementation, the first set of tasks include the screening tasks. In another implementation, the method comprises selecting a set of practical tasks for the individual to perform as part of a training regimen, wherein the selection is made as a function of the individual's screening task performance, the individual's brain activity data, and the data about performance and brain activity for the population of subjects. In yet another implementation, the set of practical tasks are distinct from but cognitively related to the set of screening tasks.

In one implementation, the database includes data from the population that performed the training program regarding their completion of the first set of tasks the first time, their completion of a training program, and their completion of the first set of tasks a second time. The method further comprises comparing the population's first-time and second-time performances of the first set of tasks and corresponding brain activity data; and, on the basis of the comparison, predicting how much the individual's performance in the screening task will improve upon completion of a training regimen (demographics, surveys and other individual factors may also be used in the prediction).

The seventeenth embodiment is a method of predicting a person's fitness at performing one or more roles in a team effort. The method comprises prompting the person to complete a set of screening tasks while equipped with a set of brain activity sensors; accessing data that identifies brain networks that are most active in proficient performance of each of several different roles in the team effort; and measuring the person's performances on the set of screening tasks while simultaneously collecting data about activity in the identified brain networks of the person. The method also comprises predicting the person's fitness at performing the one or more roles in the team effort, wherein the prediction is statistically based and a function of the individual's performance, brain activity data, and data identifying brain networks most important in proficient performance of different roles in the team effort.

In one implementation, the method further comprises performing the foregoing steps on a plurality of persons, including said person, that are contributing or available to contributing the team; and predicting a distribution of team roles among the plurality of persons that would make an optimally productive use of the plurality of person's relative talents as identified by their performance and brain activity data.

In another implementation, the method further comprises performing the foregoing steps on candidates, including the person, for the one or more roles on the team; comparing the statistically-based predictions of the candidate's fitness as performing the one or more roles on the team effort; and selecting one of the candidates over another of the candidates to perform the one or more roles on the team on the basis of the comparison.

In yet another implementation, the method further comprises predicting how much and what types of training would be needed by the person to raise their fitness to perform the one or more roles in the team effort to a predefined level, wherein the how-much-training prediction is statistically-based and a function of the individual's performance on, and brain activity during performance on, the set of screening tasks, in relation to the data about performance and brain activity for a previous population of subjects. The prediction can also be a function of the person's predicted emotional commitment to raise their fitness, wherein the emotional-commitment prediction is based on brain activity data of brain networks of the person that are associated with arousal and commitment (demographics, surveys and other individual factors may also be used in the prediction).

The eighteenth embodiment is a method of predicting an individual's performance on the basis of performance result data and brain activity data of a previous population of subjects. The method comprises equipping the population of subjects with at least one neurophysiological sensor of brain activity; challenging each subject to complete a first set of tasks; and measuring each subject's performance on the first set of tasks while simultaneously collecting brain activity data from the sensors. The method further comprises constructing a database of data derived from the brain activity data synchronized with task performance results collected from the population of subjects and identifying patterns between task performance results and brain activity in one or more brain systems and pathways between those systems. The method also comprises challenging an individual to complete diagnostic tasks while equipped with the at least one neurophysiological sensor; measuring the individual's performance on the diagnostic tasks while simultaneously collecting brain activity data from the sensors; and constructing a predictive heuristic model of the individual's probable performance on a training set of tasks, based on the individual's screening task performance, the individual's synchronized brain activity data, and the patterns identified between performance on the first set of tasks and brain activity in the population of subjects.

In one implementation, the diagnostic tasks include at least one of the first set of tasks. In another implementation, the training set of tasks include at least one of the diagnostic tasks. In yet another implementation, the training set of tasks include at least one task that is distinct from all of the diagnostic tasks but cognitively related to at least one of the diagnostic tasks. In a further implementation, the first set of tasks test performance across a plurality of cognitive domains. The plurality of domains can include five or more of the following: processing speed and reaction time, pattern recognition, ability to sustain attention, learning speed, working memory, creativity, autonomic engagement in a task, emotional resilience, burnout, fatigue, and memory.

In another implementation, the one or more sensors includes EEG sensors distributed about both the right and left hemispheres of the brain. In yet another implementation, the method further comprises feeding data from the database into a statistical engine that uses an analysis technique, of which a neural network is a non-limiting example, to identify said patterns. The neural network identifies pathways in the brain, including their speed and an approximation of a number of links or bandwidth in the pathway. In yet another embodiment, the method further provides the individual with an achievement goal which includes an illustration of the individual's potential post-training activity level of various brain systems and pathways between those systems.

The nineteenth through twenty-first embodiments are directed to an attention-monitoring system and method to improve cognitive efficiency. The nineteenth embodiment is a method of helping a person to stay engaged during performance of a task. The method comprises equipping a person with one or more physiological sensors configured to monitor engagement as a function of brain activity in attentional and emotional networks of the person's brain; evaluating physiological data produced by the sensors to quantify and assess an engagement level of the person while performing the task; and modifying the task as a function of the person's engagement level in pursuit of maintaining the person's engagement level above a threshold value.

In one implementation, the method further comprises interrupting the task to prompt the person to regain focus and stay attentive during the rest of the task performance. In another implementation, the method further comprises the direct tracking of engagement per unit time during the task presentation; maintaining a database of low and high engagement epochs in the task for later re-viewing; and replaying the tasks at a speed conducive to higher task engagement. In yet another implementation, the method further comprises assessing the functional integrity of the neuroscience system of the person's brain based upon both the neurophysiological data and data about the performance of the person on the task. In a further implementation, the method further comprises evaluating the person's brain activity during a period for which person is asked to do nothing.

In one implementation, the task selectively activates a brain system in a manner detectably distinguishable from other brain systems. For example, the task can test one or more of the following: processing speed and reaction time, pattern recognition, ability to sustain attention, learning speed, working memory, creativity, autonomic engagement in a task, emotional resilience, burnout, fatigue, and memory.

In another implementation, the method further comprises showing the person a visualization of the person's brain activity while the person performs the task. The visualization can be a 3D image of the person's brain in real time using the sensors. In an enhanced implementation, the method further comprises showing the person a 3D image of an ideal or expert brain active during the performance of the task. In a further implementation, the method comprises providing the person a mockup of what the person's brains' 3D image should look like after completing a program of training. In a yet further implementation, the method also comprises measuring the brain changes resulting from the person's completion of a program of training and illustrating the resulting brain changes.

In another implementation, the method comprises directing a stimulus to the person if the engagement level falls below the threshold. The stimulus can comprise a modification or interruption of a video stream, or an audible, visible, or haptic feedback, or combination thereof, to the person. In yet another implementation, the method also comprises generating an intervention plan that includes one or more of the following: an assessment of the person's brain activity and task performance, a training program involving repetitive performance of a selected set of tasks, insights for a coach or trainer, suggestions on diet and neurotropics, brain stimulation, and cognitive stimulation.

The twentieth embodiment comprises attention-stimulating equipment for helping a person to stay attentive during performance of a task. The equipment comprises one or more neurophysiological sensors, a processor, and a controller. The one or more neurophysiological sensors are configured to monitor and generate data of brain activity of an attentional network of the person's brain (such as the dorsal attentional network or the ventral attentional network) as well as of what is generally characterized as the default network of the person's brain. The processor analyzes the brain activity data of the default network to assess whether the person is performing a cognitive task. The processor analyzes the brain activity data of the attentional network to assess whether the person is paying sufficient attention to performing the task, wherein sufficiency of attention is a function of a degree of brain activity in the attentional network. The controller alerts the person with a sensory stimulus—such as haptic feedback, a light, or a sound—when the assessment indicates that the person is not paying sufficient attention to performing the task.

In one implementation, the processor quantifies the attentiveness of the person while performing the task on the basis of the brain activity of the person's attentional network. When the person's attentiveness falls below a threshold, the processor triggers the sensory stimulus output to the person.

The twenty-first embodiment is attention-stimulating equipment for helping a person to stay attentive during performance of a task. The equipment comprises one or more neurophysiological sensors, a processor, and an electrical or neurotropic controller and connection to the person. The one or more neurophysiological sensors are configured to monitor and generate data of brain activity of an attentional network of the person's brain as well as of what is generally characterized as the default network of the person's brain. The processor analyzes the brain activity data of the brain activity data of the attentional network to assess whether the person is paying sufficient attention to performing the task, wherein sufficiency of attention is a function of a degree of brain activity in the attentional network. The electrical or neurotropic controller and connection to the person provides an electrical or neurotropic stimulus to the person's brain when the person's attention is insufficient.

The twenty-second through twenty-fourth embodiments are directed to a method of and apparatus for revealing functional systems of the brain. The twenty-first embodiment is a method of revealing targeted functional networks of the brain. The method comprises equipping a person with one or more neurophysiological sensors of brain activity; exposing the person to stimulus materials for a targeted functional brain network; collecting neurophysiological signal data about the person's brain activity from the sensors; decomposing and bandpassing the signal data into multiple components across multiple frequency bands, and finding correlations between characteristics of the components. The characteristic, in one implementation, refers to envelopes of the decomposed and bandpassed signal data so that the identified correlations are between the envelopes.

In one implementation, the method further comprises measuring a variability in a number of brain states recorded in the person's brain while the person is exposed to the stimulus materials and comparing the variability in the number of brain states recorded in the person's brain while the person is exposed to the stimulus materials to a variability in a number of brain states recorded in the person's brain while the person's functional brain network is at rest.

In another implementation, the method further comprises generating an assessment for the person that compares the person's brain activity with normative measures of brain activity collected from of a larger population of persons who have performed the set of tasks.

In yet another implementation, the method further comprises generating an intervention plan for the person to improve the person's proficiency within an area of activity that includes exercises that activate selected networks of the person's brain. The intervention plan can include electrical or magnetic brain stimulation or administration of a neurotropic or oral or intravenous supplement. The intervention plan can also include insights for a coach or trainer to tailor his/her coaching or training interactions with the person. The intervention plan can also include a program of training tasks tailored to improve the functional integrity of the brain networks of the person that are activated to perform activities cognitively related to the set of tasks.

In a further implementation, the method includes predicting how long the person will need to practice the training tasks to achieve a predefined level of proficiency with the training tasks. Types of training are also predicted. As the person performs the training tasks, updated predictions are generated of how much longer or what types of training the person will need to practice the training tasks to achieve the predefined level of proficiency.

The twenty-third embodiment is a method of evaluating functional systems of a brain of a professional in comparison with the functional systems of the brains of a professional population of persons, wherein both the professional and the professional population are engaged in a common skilled profession, and wherein both the professional and professional population complete a set of tasks while their brains are being monitored. The method comprises equipping the professional person with one or more neurophysiological sensors of brain activity; challenging the professional to complete the set of tasks, which test the professional across a plurality of cognitive domains; and measuring the professional's performances on the tasks while simultaneously collecting neurophysiological data from the sensors. The method further comprises synchronizing data from or derived from the sensors with behavioral task performance data; comparing task performance and corresponding brain activity metrics of the professional with a population-wide brain activity metric (e.g., a median or average value or a distribution) for other professionals who have performed at an approximately equal level as the professional; and, on the basis of the comparison, generating an assessment that grades the professional's brain networks. As non-limiting examples, the profession can be an athletic sport or a profession such as finance.

In one implementation, the method further comprises generating an intervention plan for the professional to improve the professional's proficiency within the skilled profession, the intervention plan including exercises that preferentially activate selected networks of the professional's brain.

In another implementation, the method further comprises predicting how long the person will need to practice the exercises to achieve a predefined level of proficiency with the training tasks. The method also optionally includes generating updated predictions, as the person performs the training tasks, of how much longer the person will need to practice the training tasks to achieve the predefined level of proficiency.

The twenty-fourth embodiment is a performance tracking apparatus for a subject. The performance tracking apparatus comprises a set of one or more transducers and sensors that track the subject's performance on an activity and generate performance data; a neurometric interface that collects neurometric data about the subject while the subject is performing the activity; and an analytical engine that analyzes both the neurometric data and the performance data of the subject, identifies correlations between the performance data and the neurometric data, and produces a real-time assessment of the subject's performance and that performance's relationship to a physiological state of the subject, wherein the physiological state is determined by the neurometric data.

In one implementation, the performance tracking apparatus has a form of a video headset, including a video display, and the performance tracking apparatus provides an image of a brain superimposed with a representation of the person's brain activity based on the neurometric data. In another implementation, the analytical engine supplies feedback based on the real-time assessment to the video headset. The transducers and sensors can be arranged on an item of apparel.

The twenty-fifth through twenty-eighth embodiments are directed to a closed-loop adaptive training system and method using neurofeedback. The twenty-fifth embodiment is a method of using neurofeedback to attain a specific brain state (such as "flow" or "being in the zone" for a particular task or behavioral skill). The method comprises equipping a subject with one or more neurometric sensors; monitoring and producing neurometric data of brain activity while the subject performs a targeted task or skill; and quantifying and ranking the neurometric data on a scale from a previous population of people performing the targeted task or skill.

In one implementation, the method further comprises defining a targeted attentional and/or neurocognitive state on the basis of the attentional and/or neurocognitive states of the previous population of people; selecting a training task for the person to perform while equipped with the neurometric sensors; analyzing data from the neurometric sensors to determine whether the subject is performing at the targeted attentional and/or neurocognitive state; and adapting the training task to steer the subject toward an enhanced attentional and/or neurocognitive state while performing the targeted task or skill. For example, the training task can be studying film of athletes playing a sport on a playing court or field. The targeted attentional and/or neurocognitive state can also be defined based on previously measured peak attentional and/or neurocognitive states of the training subject.

In various implementations, the adaptation to the training task is to: present an image of the training subject's brain activity in real time as the training subject performs the training task; increase or decrease a difficulty level of sequences of the training task where the training subject's attentional and/or neurocognitive performance is sub-par; and/or interrupt or pause the training task when the training subject's attentional and/or neurocognitive state crosses a threshold.

In another implementation, the adaptation is an interruption in the form of a startling light, sound, or haptic feedback. In yet another implementation, the adaptation of the training task is administration of a neurotropic, brain stimulation, or a cognitively stimulating alternative task. In a further implementation, the adaptation of the training task is selective removal of sequences of the film where watching was performed with sub-par attentional states. Alternatively, this technique is used to prune alphanumeric text streams (e.g., news articles, stock ticker information), audio, and other information (however conveyed).

In one implementation, the adaptation of the training task is re-presentation of sequences of the film that were watched with less than the targeted attentional and/or neurocognitive state. In a further implementation, the adaptation of the training task is re-arrangement of sequences of the film that were watched with less than the targeted attentional and/or neurocognitive state.

In another implementation, the method comprises grading a relative importance of different sequences of the training task with respect to each other and with respect to a role that the training subject performs in a group activity, by identifying particular sequences of the training task that preferentially activate particular brain systems that are also preferentially activated by the training subject's role in the group activity. The adaptation of the training task can be selective removal of sequences in which (a) the training subject's attentional state was inferior to the targeted attentional and/or neurocognitive state and (b) the selectively removed sequences have a relatively low-importance grade.

The twenty-sixth embodiment is a method of adapting a training system using neurofeedback. The method comprises equipping a training subject with one or more neurofeedback sensors that monitor and produce data of brain activity of a plurality of brain networks; producing neurophysiological data that monitors the training subject's brain activity with the neurofeedback sensors while the training subject performs a training task; analyzing the neurofeedback data to detect negative changes in attentional and/or neurocognitive states when the training subject is performing the training task; and responsively adapting the training task to improve the training subject's attentional state while performing the training task.

In one implementation, the adaptation of the training task is to interrupt or pause the training task when the training subject's attentional and/or neurocognitive state crosses a threshold.

In another implementation, the training task is studying film of athletes playing a sport on a playing court or field and the adaptation of the training task is selective removal of sequences of the film where watching was performed with sub-par attentional and/or neurocognitive states.

In yet another implementation, the training task is studying film of athletes playing a sport on a playing court or field, memorizing playbooks or positional sets on a tablet, or recognizing pitches. In the case of film-watching, the adaptation of the training task is representation of sequences of the film that were watched with sub-par attentional and/or neurocognitive states. In the case of memorizing playbooks or positional sets or pitch recognition, this technique is used to prune the information being conveyed (however conveyed).

The twenty-seventh embodiment is a neurometric apparatus for enhancing a subject's performance. The neurometric apparatus comprises a neurometric interface, a behavioral task interface, a statistical engine, and a task controller. The neurometric interface collects neurometric data about the subject while the subject is performing a task and transmits the neurometric data to a computer for recording and analysis. The behavioral task interface prompts the subject to perform one or more tasks and collect performance data about a subject while the subject is performing the task. The statistical engine analyzes both the neurometric data and the performance data of the subject, identifies correlations between the performance data and the neurometric data, and produces a real-time assessment of the subject's performance and that performance's relationship to a physiological state of the subject, wherein the physiological state is determined by the neurometric data. The task controller adaptively modifies aspects of the task in response to the real-time assessment.

In one implementation, the neurometric apparatus further comprises a decision engine that identifies changes in a running average of neurophysiological data that exceed a predetermined threshold, wherein the task controller responsively modifies the task that subject is performing.

The twenty-eighth embodiment is a system to enhance a person's performance. The system comprises a neurometric interface and a controller. The neurometric interface collects neurometric data about a subject while the subject is performing a task and transmits the neurometric and behavioral data to a computer for recording and analysis processing. The controller modifies the task as a function of the processed neurometric data to improve the neurometric model for enhanced task performance.

The twenty-ninth through thirty-third embodiments are directed to a neurocognitive testbed and related method. The twenty-ninth embodiment is a method of constructing a cognitive training program to attain a targeted cognitive state under both relaxed and stressful conditions. The method comprises exposing the person to neurocognitive stimulus materials including a task both when the person is experiencing a relaxed condition and when the person is experiencing a stressful condition; monitoring the person's brain activity while the person is exposed to the neurocognitive stimulus materials; and evaluating whether or to what extent the person's brain activity exhibits the targeted cognitive state.

In one implementation, the method further comprises selecting a set of cognitive training tasks to improve brain activity in a brain network associated with the targeted cognitive state under the relaxed and stressful conditions; and incorporating the set of cognitive training tasks into a cognitive training program. In a more detailed implementation, the method also comprises operating the cognitive training program by tracking one or more physiological metrics of the person while the person performs the set of cognitive training tasks and adapting one or more of the cognitive training tasks in the set of cognitive training tasks as the person's performance improves. In an alternative more detailed implementation, the method further comprises operating the cognitive training program by ending the cognitive training program when the person's performance or rate of performance improvement under baseline conditions exceeds a first threshold and the person's performance or rate of performance improvement under stress exceeds a second threshold. In a second alternative more detailed implementation, the method further comprises operating the cognitive training program by ending the cognitive training program when the physiological data indicates that a level of connectivity detected within the brain network exceeds a targeted threshold. In a third alternative more detailed implementation, the method further comprises providing real-time visual feedback to the person regarding the person's brain activity while the person performs the cognitive training tasks.

In various implementations, the cognitive state is one or more of the following: worker engagement, creativity, teamwork, emotional regulation, emotional valence, engagement, perception, attention, memory encoding and retrieval, narrative comprehension, positive emotions, relaxation, arousal, empathy, workload, visual imagery, and kinesthetic imagery.

In one implementation, the set of selected cognitive training tasks includes a plurality of the following: a biological motion perception test that assesses a capacity of a person's visual systems to recognize complex patterns that are presented as a pattern of moving dots; a visual perceptual task; and a 3D multiple-object-tracking speed threshold task that presents a number of moving targets with among distractors in a large visual field, thereby enabling neurometric identification of mental abilities including attention and memory skills when a person processes the scenes.

In another implementation, the method also comprises monitoring one or more of the following: heart rate variability, affective state classifier, midline theta, heart rate, mu suppression, prefrontal gamma, workload classification, left occipital alpha slow suppression, right occipital alpha slow suppression, left parietal alpha slow suppression, and right parietal alpha slow suppression.

The thirtieth embodiment is a method of evaluating a speed of an individual's brain in acquiring new information. The method comprises exposing the individual to stimulus materials that include new information, monitoring the subject's physiological responses while exposing the individual to the stimulus materials, collecting data from the physiological recording devices, and analyzing the data.

A thirty-first embodiment is a method of constructing an assessment system to predict an individual or team's performance under pressure. The method comprises selecting a set of behavioral tasks that differ in processing requirements, differ in decision-making requirements, and differ in perceived stress. The method further comprises exposing the individual or team to the selected set of behavioral tasks while monitoring the individual's or team's physiological responses and predicting an individual or team performance under pressure as a function of the individual's or team's physiological responses.

In one implementation, the method further comprises directly measuring brain activity in emotional and executive neural networks of the individual's brain or the team's brains, wherein the prediction is a function of said direct measurements.

A thirty-second embodiment is a method of constructing a cognitive training program for a person. The method comprises targeting a brain network for assessment and training, selecting a set of assessment tasks to assess the performance of the person's targeted brain network, and preparing the person to perform the set of assessment tasks under a baseline condition. The method also comprises, tracking one or more physiological metrics, while the person performs the set of assessment tasks under the baseline condition, that reveal an extent of a person's brain activity in the targeted network. The method further comprises preparing the person to perform the set of assessment tasks under a stressful conditions, and while the person performs the set of assessment tasks under the stressful condition, tracking one or more physiological metrics that reveal whether or to what extent the person's brain activity exhibits the targeted cognitive state. The method additionally comprises using physiological data generated by the tracking, assessing the connectivity of a brain network of the person that is associated with the targeted cognitive state and selecting a set of cognitive training tasks to improve connectivity of the person's brain network under baseline conditions and while being stressed, wherein the cognitive training program comprises the set of cognitive training tasks.

In various implementation, the step of preparing the person comprises providing the person with equipment that directs the tasks, providing the person with physiological sensors to wear while performing the tasks, and motivating the person with exhortation or motivational information. In various implementations, the equipment is at least one exercise machine and/or a computer with a program running on it that directs the assessment tasks.

A thirty-third embodiment is a method of improving workplace productivity. The method comprises targeting one or more brain networks for assessment and training of attentiveness, memory, worker engagement, creativity, and/or teamwork; selecting a set of assessment tasks to assess a quality of the targeted brain networks; and selecting workers to perform the set of assessment tasks. The method further comprises tracking, for each worker and while each worker performs the set of assessment tasks, one or more physiological metrics that reveal brain activity and connectivity in brain networks associated with attentiveness, memory, worker engagement, creativity and/or teamwork. The method additionally comprises selecting, for each worker, a set of cognitive training tasks to improve connectivity of the worker's targeted brain networks associated with attentiveness, memory, worker engagement, creativity and/or teamwork. The method also comprises incorporating, for each worker, the set of cognitive training tasks into a cognitive training program customized for that worker and providing equipment for each worker to perform the cognitive training program.

In one implementation, the method further comprises operating the cognitive training program by tracking, for each worker, one or more physiological metrics as the worker performs the set of cognitive training tasks and adapting, for each worker, one or more of the cognitive training tasks or the set of cognitive training tasks as the worker's performance improves.

In another implementation, the method further comprises operating each worker's cognitive training program by ending the cognitive training program when physiological data indicates that a level of connectivity detected within the worker's targeted one or more brain networks exceeds corresponding targeted thresholds for the brain networks.

In yet another implementation, the set of selected cognitive training tasks includes a biological motion perception test, a visual perceptual task, and a 3D multiple-object tracking threshold task. The biological motion perception test assesses a capacity of a person's visual systems to recognize complex patterns that are presented as a pattern of moving dots. The 3D multiple-object-tracking speed threshold task presents a number of moving targets with among distractors in a large visual field, thereby enabling neurometric identification of mental abilities including attention and memory skills when a person processes the scenes.

The thirty-fourth through the thirty-sixth embodiments are directed to increasing cognitive performance and brain health in company employees and executives. The thirty-fourth embodiment is a method of improving cognitive efficiency in company employees. The method comprises equipping the company employees with a plurality of neurocognitive sensors that measure electrical activity in the brain; administering a pre-training assessment comprising a plurality of assessment tasks to the company employees while the neurocognitive sensors collect data about electrical activity in the company employees' brains; and selecting training tasks for each of the employees to complete. The method also includes, after the employees complete their training tasks, again equipping the company employees with the plurality of neurocognitive sensors and administering a post-training assessment to the company employees after they complete the selected training tasks. Meanwhile, the neurocognitive sensors collect data about electrical activity in the company employees' brains. The post-training assessment comprises the plurality of assessment tasks administered during the pre-training assessment. After each administering step, the collected data is processed through a data conditioning pipeline to generate spatial maps of cognitive workload across the brain. A report is also generated that contrasts the cognitive workload maps generated from the pre-training assessment with the cognitive workload maps generated from the post-training assessment.

In one implementation, during both the pre-training and post-training assessments, the employees are directed to assume an inactive at-rest state. The neurocognitive sensors collect data about the electrical activity while the employees are in the inactive, at-rest state. In another implementation, the data-processing pipeline computes bandpower ratios between active states during which the employees executed assessment tasks and at-rest states.

In yet another implementation, the data conditioning pipeline comprises a preprocessing stage that filters anomalies from the data. The preprocessing stage can include low and high pass filtering to remove eye and muscle motion artifacts. The preprocessing stage can also remove bad channels and bad time windows.

In one implementation, the data conditioning pipeline comprises a pattern-identifying stage that analyzes the data to find patterns of brain activity. For example, the pattern-identifying stage can comprise a power spectral density estimation performed on the data to compute the employees' brain bandpower during tasks.

In another implementation, the data is decomposed into alpha, beta, theta, and delta frequency bands. Also, in one example, the ratio between beta and the sum of theta and alpha is used as a proxy for workload. In another example, a ratio between higher theta and beta is used as a proxy for memory engagement. In yet another example, a ratio between lower theta and beta is used as a proxy for attention.

In another implementation, the company employees are surveyed to self-assess their efficiency in performing employee-related tasks during both the pre-training assessment and post-training assessment. The report that is generated also contrasts the employees' self-assessments.

In a further implementation, the plurality of tasks assessment includes one or more work-related tasks that the employees routinely perform for the company in their employee occupation. For example, the work-related tasks can include at least one of the following: typing, data entry, filing, researching, performing a calculation, creating a summary, preparing a letter, assisting a customer, and resolving a technical problem.

The thirty-fifth embodiment is a method of improving cognitive efficiency in company employees. The method comprises equipping the company employees with a plurality of neurocognitive sensors that measure electrical activity in the brain; administering a pre-training assessment comprising a plurality of assessment tasks to the company employees while the neurocognitive sensors collect data about electrical activity in the company employees' brains; and selecting training tasks for each of the employees to complete. After the employees complete their training tasks, they are again equipped with the plurality of neurocognitive sensors so that they can be administered a post-training assessment. As the employees complete the post-training assessment, which includes the same plurality of assessment tasks administered during the pre-training assessment, the neurocognitive sensors collect data about electrical activity in the company employees' brains. After each administering step, processing the collected data through a data conditioning pipeline to generate spatial maps of cognitive workload across the brain. The data conditioning pipeline comprises a preprocessing step to filter the data and a pattern-identifying step that identifies brain states or signatures in the filtered data.

In one implementation, the pattern-identifying stage comprises a power spectral density estimation performed on the data to compute the employees' brain bandpower during tasks. In another implementation, the pattern-identifying step comprises decomposing the filtered data into frequency bands, for example, the alpha, beta, theta, and delta frequency bands. In a further implementation, the method comprises: using a ratio between beta and the sum of theta and alpha as a proxy for workload; using a ratio between higher theta and beta as a proxy for memory engagement; and/or using a ratio between lower theta and beta as a proxy for attention.

The thirty-sixth embodiment is a system for improving cognitive efficiency in company employees. The system comprises a data processor; a plurality of neurocognitive sensors, an assessment program, a program of training tasks, a data processing pipeline, and a reporting program. The plurality of neurocognitive sensors are configured to be applied to the company employees to measure electrical activity in their brains and to be communicatively coupled with the data processor. The assessment program is stored on a computer medium and configured for computer execution to visually, audibly and/or tactilely present a plurality of assessment tasks to the company employees and receive responses from the company employees while the neurocognitive sensors collect data about electrical activity in the company employees' brains. The program of training tasks stored on a computer medium and configured for computer execution to provide audibly, visually, and/or tactilely stimulation to employees to direct and aid their performance of the training tasks. The data processing pipeline processes the collected data to generate spatial maps of cognitive workload across the brain. The reporting program stored on a computer medium contrasts the cognitive workload maps generated from the pre-training assessment with the cognitive workload maps generated from the post-training assessment. As used herein, "program" can be a routine or subroutine of a larger program.

The thirty-seventh through the forty-third embodiments are directed to a neurological and biological feedback method and system of analysis, training and management of high-risk operations. The thirty-seventh embodiment is a method of tracking, training and/or management of a real or prospective investor's or trader's brain states while trading real or simulated securities. The method comprises collecting electroencephalography (EEG) data from the investor or trader as they engage in buy, sell, market and/or limit order transactions involving real or simulated financial instruments, including but not limited to securities, funds, and currencies; collecting transactional data regarding the buy, sell, market and/or limit order transactions; and grading the transactional data to generate an assessment of the investor or trader's trading performance over time. The method also comprises processing the EEG and transactional data to identify patterns between the investor or trader's brain states and trading performance, including any correlations between brain states and superior performance and between brain states and inferior performance.

In one implementation, after the correlations are found, the method further comprises continuing to collect EEG data from the investor or trader and generating an alert in real time when the prospective investor's or trader's brain state exhibits a brain state associated with either inferior performance, superior performance, or both.

In another implementation, the method further comprises collecting real or simulated market data regarding the securities and synchronizing over a time window the EEG and transactional data. The market data includes a measure of, or data supporting a measure of, the alpha of the transaction, which can be measured in relation to the volume-weighted average price data. The market data can also include a measure of profitability of the transactions, market conditions at the time the transactions were made, and trading volumes.

In another implementation, the method further comprises generating a summary of the investor's or trader's trading performance that also indicates any correlations between detected brain states of the investor or trader and their trading performance. The trading performance can, for example, be determined as a function of volume-weighted average price data. The method can also comprise providing the summary to a risk manager to help the risk manager (or other decision maker) assess whether to allow or reject a trade or to engage in an intervention with the investor or trader to help motivate them into a brain state more optimal for trading.

In one implementation, the method comprises preprocessing the EEG data to remove artifactual data such as eye blink and motion artifacts and slow-drift and 60 Hz artifacts. In another implementation, the step of processing the EEG data includes performing functional connectivity state estimation on the EEG data to identify brain states that are indicative of functional connectivity in particular areas of the brain. The step of processing the data can include principal component analysis (PCA) or max-kurtosis independent components analysis (ICA) of the EEG data.

In another implementation, the method comprises equipping the investor or trader with an EEG headset or cap that collects data over a sufficient number of channels to track brain states that are represented in both space and frequency spectra. In a further implementation, the method comprises collecting physiological data other than brain states as they engage in buy, sell, market and/or limit order transactions involving real or simulated securities. For example, in various implementations, the physiological data includes heart rate, pupillometry with eye tracking, data received from galvanic skin sensors.

In another implementation, the method further comprises collecting media information that comprises information presented to the trader or investor before the investor or trader submitted their subtractions. This can include categorizing the media information by type and analyzing which, if any, types of media information engender superior performance and which, if any, types of media information engender inferior performance. It can also include analyzing which, if any, types of media information engender a brain state associated with superior performance and which, if any, types of media information engender a brain state associated with inferior performance.

In yet another implementation, the method further comprises categorizing the media information by type and analyzing which, if any, types of media information engender a brain state associated with overstimulation in the trader or investor and which, if any, types of media information engender a brain state associated with under-stimulation of the trader or investor.

The thirty-eighth embodiment is a method of training and/or management of a real or prospective investor's or trader's physiological states while trading real or simulated securities. The method comprises collecting physiological data from the investor or trader as they engage in buy, sell, market and/or limit order transactions involving real or simulated securities; collecting transactional data regarding the buy, sell, market and/or limit order transactions; and grading the transactional data to generate an assessment of the investor or trader's trading performance over time. The method also comprises processing the physiological and transactional data to identify patterns between the investor or trader's physiological states and trading performance, including any correlations between physiological states and superior performance and between physiological states and inferior performance. In one implementation, the physiological data is electrocardiogram (ECG/EKG) data.

The thirty-ninth embodiment is a security trading apparatus comprising an electroencephalography (EEG) headset or cap, a computer or computers, and a transducer. The electroencephalography (EEG) headset or cap collects EEG data from an investor or trader as they engage in buy, sell, market and/or limit order transactions involving real or simulated securities. The computer or computers are configured to collect transactional data regarding the buy, sell, market and/or limit order transactions, grade the transactional data to generate an assessment of the investor or trader's trading performance over time, and process the EEG and transactional data to identify patterns between the investor or trader's brain states and trading performance, including any correlations between brain states and superior performance and between brain states (or physiological states) and inferior performance. The transducer is configured to generate real-time alerts, after patterns have been identified, when subsequently collected EEG data from the investor or trader indicates that their brain state (or physiological state) is associated with either inferior performance, superior performance, or both.

The fortieth embodiment is a security trading apparatus comprising a monitor (i.e., a physiological data-collecting accoutrement) that collects physiological data from an investor or trader as they engage in buy, sell, market and/or limit order transactions involving real or simulated securities, a computer or computers, and a transducer. The computer or computers are configured to collect transactional data regarding the buy, sell, market and/or limit order transactions, grade the transactional data to generate an assessment of the investor or trader's trading performance over time, and process the physiological and transactional data to identify patterns between the investor or trader's physiological states and trading performance, including any correlations between physiological states and superior performance and between physiological states and inferior performance. The transducer is configured to generate real-time alerts, after patterns have been identified, when subsequently collected physiological data from the investor or trader indicates that their physiological state is associated with either inferior performance, superior performance, or both.

The forty-first embodiment is a security trading apparatus comprising a neurometric interface or physiological data-collecting accoutrement, a data analysis program, and a transaction gatekeeper. The neurometric interface or physiological data-collecting accoutrement collects neurological functional activity data about a human transaction-maker as the transaction-maker takes actions or abstains from taking actions to implement transactions involving real or simulated financial instruments. The data analysis program processes the collected neurological functional activity data to identify one or more brain states of the transaction-maker and automatically generates, in near real-time, information about the transaction-maker's contemporaneous brain states (measured in terms of functional connectivity of the transaction-maker's brain) when the transaction-maker performs or abstains from performing actions to implement said transactions. The transaction gatekeeper comprises at least one of the following: (a) a program or a circuit that conditionally enables transactions to proceed on the basis of the transaction-maker's contemporaneous brain state; and (b) an annunciator configured to convey the information to a human authorized to stop the transaction from proceeding or authorized to manage the transaction-maker.

In one implementation, the annunciator is a user-customizable dashboard panel on a digital display. The security trading apparatus further comprises a user-interface that enables a person to select one or more items of informative stimuli to incorporate into a panel area of the digital display, which is configured to provide near real-time feedback. The near real-time feedback allows for delays of a period of no more than a few seconds in obtaining and computer-analyzing the data. The feedback is viewable by the transaction-maker while the transaction-maker is contemplating said transactions.

In another implementation, the security trading apparatus further comprises an optical display device in a form of a headset, goggles, or other human-wearable or human-mountable optical display platform. The security trading apparatus further comprises a processor programmed to perform principal component analysis (PCA), independent component analysis (ICA), sparse matrix decompositions, low-rank matrix decompositions, and/or t-Distributed Stochastic Neighbor Embedding (tSNE) on the neurological functional activity data to identify the transaction-maker's brain states.

In further implementations, the human who is authorized to stop the transaction is the transaction-maker, fund manager, or portfolio manager.

The forty-second embodiment is a method of predicting whether a person is in a physiological state that is conducive to making or performing high-quality or highly accurate decisions or actions. The method comprises equipping the person with one or more physiological sensors; collecting sensor data from the one or more physiological sensors during time windows preceding the person making a plurality of decisions and/or performing a plurality of actions; measuring the quality or accuracy of the decisions or actions; identifying correlations between the sensor data or derivatives of the physiological data and the quality or accuracy of the decisions or actions; and using subsequent collections of sensor data and the identified correlations to predict whether the person is likely to make a high-quality or highly accurate decision or action in response to an opportunity to decide or act.

In one implementation, the method further comprises presenting the prediction to the person before the person decides or acts. In another implementation, the method further comprises processing the sensor data to identify a physiological state that is correlated with above-average decisions or actions. In yet another implementation, the processing of the physiological data includes a set of procedures for preprocessing the sensor data. In a further implementation, the set of procedures for preprocessing the data includes filtering the data.

In one implementation, the set of procedures for preprocessing the data includes standardizing the data. In another implementation, the set of procedures for preprocessing the data includes a robust principal component analysis (PCA) of the data. In yet another implementation, the set of procedures for preprocessing the data includes identifying and rejecting bad channels. In a further implementation, the set of procedures for preprocessing the data includes identifying and rejecting bad sample in the data.

In a more detailed implementation, the processing of the physiological data includes performing a functional connection state estimation (FCSE) on the data. In another implementation, the FCSE of the data comprises transforming the physiological data into principal component channels of data. In a further implementation, the FCSE of the data comprises bandpass filtering the principal component channels of data into discrete frequency bands. In yet another implementation, the FCSE of the data further comprises usage of a Hilbert transformation of the principal component channels for each discrete frequency band to identify envelopes enclosing data signals of each of the principal component and frequency band channels. The statistical engine is configured to decompose and bandpass sensor data into components that extend across frequency bands and identify a first set of correlations between characteristics of the decomposed and bandpassed data in order to identify a first set of physiological states. The statistical engine is also configured to measure and quantify the person's performance with respect to the tasks and identify correlations between the first set of physiological states and the person's performance on the first set of tasks. Moreover, the statistical engine is configured to identify a second set of correlations between the sensor data or derivatives of the sensor data and the person's performance on the first set of tasks. The statistical engine, now trained with the person's physiological and performance data, later receives a new set of sensor data from the one or more physiological sensors, again during time windows preceding the person measuring the person's performance on a set of decisions or actions to take. As before, the statistical engine decomposes and bandpasses the new set of sensor data, identifies a current physiological state from the new set of sensor data, compares the current physiological state with the first set of physiological states, and, based on that comparison, generates an expected value of the person's performance on the second set of decisions or actions, before the person makes or performs the second set of decisions or actions.

In one implementation, the method further comprises computing correlation matrices between the envelopes using a sliding time window in order to identify co-modulations between the frequency bands along each principal component. In another implementation, the method further comprises clustering data of the correlation matrices using k-means.

The forty-third embodiment is an apparatus for predicting whether a person is in a physiological state that is conducive to making or performing high-quality or highly accurate decisions or actions. The apparatus comprises one or more physiological sensors, analog-to-digital converters, memory, electrical connectors, behavioral interface, and feed of comparative data. The one or more physiological sensors transduce signals received from the head or body of the person. The one or more analog to digital converters convert analog signals from the physiological sensors into digital signals. The memory stores the digital signals as sensor data. The behavioral interface facilitates the person's performance of one or more tasks and also quantifies the task results. The feed of comparative data might comprise a feed of stock market data A first processor under the direction of a data collection routine collects sensor data from the one or more physiological sensors during time windows preceding the person making a plurality of decisions and/or performing a plurality of actions. A performance analyzer measures the quality or accuracy of the decisions or actions. The first or a second processor under the direction of a correlation-determining routine identifies correlations between the sensor data or derivatives of the physiological data and the quality or accuracy of the decisions or actions. The first, second, or a third processor under the direction of a predictive routine uses subsequent collections of sensor data and the identified correlations to predict whether the person is likely to make a high-quality or highly accurate decision or action in response to an opportunity to decide or act.

The forty-fourth through forty-fifth embodiments are directed to a system and method for identifying physiological states that predict a person's performance and characterizing a person's performance as a function of physiological state. The forty-fourth embodiment is a system that comprises a physiological interface, a behavioral interface, and a data processing pipeline. The physiological interface includes one or more physiological sensors attached to the person that generate physiological data about the person while performing a task or real-world activity. The behavioral interface generates performance data about the person while the person is performing the task or real-world activity. The data processing pipeline collects the physiological data from the physiological interface, the performance data from the behavioral interface, and reference data from a population of people performing the same or similar tasks or real-world activities. The data processing pipeline also identifies characteristic physiological states derived from the physiological data, grades the performance data, compares the graded performance data to the characteristic physiological states, and identifies statistical relationships between the characteristic physiological states and levels of performance.

In one implementation, the physiological data is neurophysiological data. Furthermore, in various implementations, the characteristic physiological states are distributions of workload across the brain and/or brain states. In another implementation, the data processing pipeline identifies characteristic physiological states by decomposing the physiological data by preprocessing and transforming the physiological data to identify components associated with variances in or sources of the physiological data, bandpassing the components across several frequency bands, finding correlations between envelopes of the bandpassed components, and clustering the correlation data. In another implementation, the person is an equity trader, the grade is of the person's performance in making security executions, and the reference data is market data about the executed securities. In yet another implementation, the reference data is the volume weighted average price (VWAP) of the securities in a window of time around when the executions were made. In a further implementation, the method further comprises a database configured to store the reference data and to update the reference data with the person's physiological data and performance data.

In one implementation, the statistical engine uses two principal components analyses (PCAs), one to preprocess the physiological data and the other to transform the physiological data into frequency bandsourced components. In another implementation, the reference data includes information about characteristic levels of progress as a function of training and the statistical engine is configured to use an assessment of the person and the reference data to predict an amount of training needed to raise the person's level of performance to a goal. In a further implementation, the system includes a monitor that displays neuroimaging feedback to the person illustrating activation of brain regions and/or pathways as the person performs the task or real-world activity.

The forty-fifth embodiment is a method for identifying physiological states that predict a person's performance. The method comprises using a physiological interface that includes one or more physiological sensors attached to the person to generate physiological data about the person while performing a task or real-world activity, using a behavioral interface to generate performance data about the person while the person is performing the task or real-world activity, and collecting the physiological data from the physiological interface, the performance data from the behavioral interface, and comparative data from a population of people performing the same or similar tasks or real-world activities. The method also comprises identifying characteristic physiological states from the decomposed data, grading the performance data, comparing the graded performance data to the characteristic physiological states, and identifying statistical relationships between the characteristic physiological states and levels of performance.

In one implementation, the physiological data is neurophysiological data.

Furthermore, in various implementations, the characteristic physiological states are distributions of workload across the brain and/or brain states. In another implementation, the data processing pipeline identifies characteristic physiological states, which includes: decomposing the data by preprocessing and transforming the physiological data to identify components associated with variances in or sources of the physiological data; bandpassing the components across several frequency bands; finding correlations between envelopes of the bandpassed components; and clustering the correlation data. In another implementation, the person is a trader, the grade is of the person's performance in making security executions, and the reference data is market data about the executed securities. In a further implementation, the statistical engine uses two principal components analyses (PCAs), one to preprocess the physiological data and the other to transform the physiological data into frequency bandsourced components.

In one implementation, the method further comprises storing the reference data in a database and updating the reference data with the person's physiological data and performance data. The reference data includes information about characteristic levels of progress as a function of training and the statistical engine is configured to use an assessment of the person and the reference data to predict an amount of training needed to raise the person's level of performance to a goal.

In another implementation, the method further comprises displaying neuroimaging feedback to the person illustrating activation of brain regions and/or pathways as the person performs the task or real-world activity. In a further implementation, the method comprises selecting a set of brain training tasks for the person to perform as a function of the person's performance on a plurality of assessment tasks.

The various embodiments can take many forms and expressions. In one such form and expression, a method and system are provided for augmenting or negating a decision or action based on the monitored acuity of a person. One such form of "acuity" refers to the instantaneous functional connectivity of the person's brain at the time a decision or action is made. Another form of "acuity" refers to a sequence of brain states, preferable brain functional connectivity states, leading up to the decision or action.

Because functional connectivity graphs represent a significant amount of data, potentially putting practical applications using current technology out of reach, data processing manipulations have been devised and are disclosed herein that (1) efficiently represent brain activity data using matrices that characteristically indicate correlations between different brain regions and brain wave frequencies; (2) "alphabetize" the characteristic states represented by the matrices; (3) use artificial intelligence (aka machine learning) to recognize probabilistic relationships between sequences of brain states and objective measures of the quality or performance achieved by the decision; (4) apply that learning to predict performance on subsequent decisions or conscious actions; and (5) conditionally interfere with those decisions or actions on the basis of those predictions.

The various embodiments of the present disclosure are not limited to the characterization and analysis of brain states. Other physiological markers, such as heart rate, respiration rate, galvanic or skin conductance response, skin temperature, blood oxygen level, perspiration, muscle flexion, facial expression, blinking frequency, pupil dilation, cortisol level, adrenaline level, and/or other hormone level, may in some applications be as accurate as or less expensive than neurophysiological markers such as EEG waves. The various embodiments also have applications, and are novel with respect to, outside of predictions and interferences with decisions and actions.

Accordingly, in one embodiment, the system comprises a decision-making platform, such as a financial trading platform, that uses physiological signals to identify states, on-line and in real-time, that represent different levels of concentration and/or integrated brain activity, including highly integrated brain activity that is hypothesized to underly optimal decision making. In one implementation, the physiological states comprise neurophysiological states, namely brain states identified from electroencephalographic data.

Structurally, the system comprises (1) hardware to measure EEG signals (in one implementation, a plurality (e.g., 24) of electrodes sampled at 256 Hz or another frequency per electrode), (2) hardware and software that integrates and synchronizes flows of neurophysiological signals with third-party supplied financial data streams and behavior data stream generated by the trader (e.g., button press, keyboard commands, verbal commands, etc.) and running on the trader's computer-based trading platform, and (3) custom analysis software that carries out a number of complex and computationally intensive data filtering and transformation steps.

The analysis software performs or generates: (a) a spatial decomposition that identifies spatial filters given electrodes (in one implementation, using Principal Component Analysis (PCA)), (b) a frequency domain decomposition of the signals after spatial filtering (in one implementation, a Fourier Transform) (c) a correlation matrix across spatial and frequency components (in one implementation, using Pearson's correlation) across PCA components grouped into (in one implementation) four frequency bands of delta (1-4 Hz), theta (4-8 Hz), alpha (8-12 Hz) and beta (12-20 Hz), and (d) a clustering step which groups correlation matrices (currently k-means clustering) into a smaller set of representative states.

The clustering step (d) results in a simplified set of states for the individual. These states are tracked in time (in one implementation, at 5 sec intervals) with specific states mapped to time in to a predicted "quality" of a decision. "Quality" is considered within the context of the financial transaction (e.g., profit and loss, volume weighted average price (VWAP)). These decisions are tagged with the predicted quality of the decision, given the state and this information is used to update and/or change the transaction (e.g., increase position, negate trade, alert risk manager, etc.) The system has been shown to identify both trader specific states as well as states that are common across all traders and thus can be seen as offering a personalized solution that also yields general results that can be validated and transferred across a larger population, for example via transfer learning.

Various implementations of this embodiment represent modifications, augmentations and/or changes to modify or add additional functionality and/or options for the different components of the data acquisition and analysis.

For example, in one implementation, the hardware component (1) includes not just EEG but other physiological sensors that enable measurement of eye tracking, pupillometry, heart rate, and electrodermal activity which can be used to validate EEG measures or contribute to the state inference. These sensors contribute information that is analyzed according to an understanding of how the peripheral and autonomic nervous system modulates the central nervous system in particular with respect to how arousal, stress and fatigue affect decision making.

In another implementation, hardware component (1) is modified in terms of the type and number of sensors of the EEG system. It is believed that given the nature of the approach employed by the system (extracting spatial filters), it is unlikely a system with less than 7-8 electrodes would yield practical information (or reasonable performance).

In yet another implantations, the hardware and software components (2) are augmented with additional data streams that include real-time news (e.g., CNBC) as well as data of video representing what the trader is looking at, for each moment in time (e.g., data extracted from forward looking sensors in an eyetracker, such as provided in Tobii 3D glasses.)

In further implementations, the analysis software (3) is constructed and configured so that: in 3.a, independent component analysis (ICA) is used instead of PCA or another form of spatial decomposition, include those that are non-linear, such as that produced by a deep learning auto encoder; in 3.b, frequency domain decomposition uses wavelet decompositions or other time frequency decomposition; in 3.c, the correlations are constructed using mutual information or other measures of relating signals to one another; and in 3.d, Gaussian mixture models or other linear or non-linear clustering methods are employed.

In another implementation, the Analysis component (3) is modified/augmented to include a step that learns state sequences for the traders and relates these to transaction quality. For example, dynamic state space models (DSSM) are used to learn sequences of states which span 10 s of seconds, minutes or hours, that are predictive of decision quality. These DSSM models are based on Markov dynamics or learned via deep learning methods such as long-short term memory models (LSTMs). The resulting models can be used not just to predict the quality of trade but also characterize the decision-making process of a given trader and relate it to other traders.

In another embodiment, the steps identify states in which performance is likely to be better or worse. From an analysis of these states and state dynamics to characterize a plurality of trading executions and decisions, a determination is made to indicate an optimal time for the trader to make a trade execution or decision.

In one embodiment, a supervised long short-term memory (LSTM) model of machine learning to analyze the "state" sequence produced. It relates brain states based on functional connectivity over time to produce statistics based only a snapshot of brain states preceding or accompanying execution of a transaction or a transaction decision. This decomposition across spatial and temporal domains enhances the quality of the predictions.

In additional embodiments, the methods described and incorporated herein are also applied to brain synchrony across team members for the explicit goal of optimizing performance in settings that are not limited to finance.

Figure 42A:
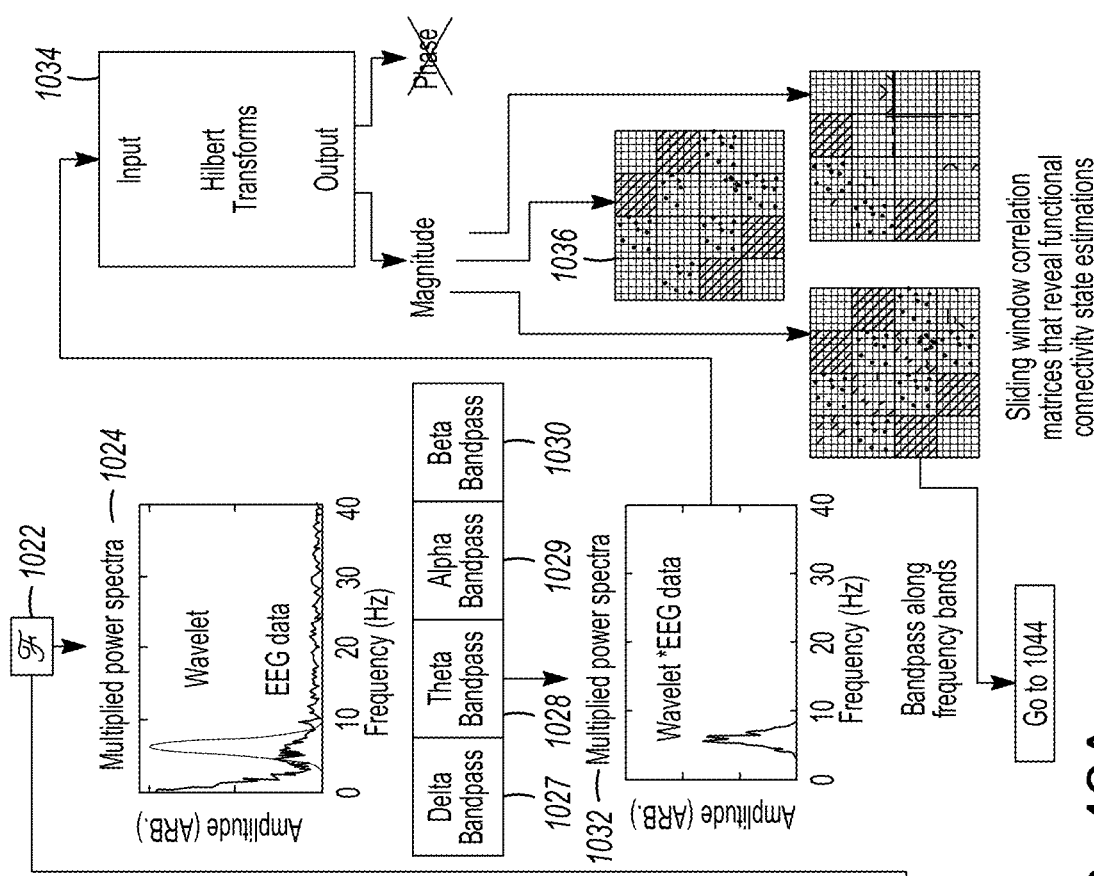
FIG. 42A is the first panel of a graphical illustration of one embodiment of a system and process for improving decision-making or performance on a conscious activity.
Figure 42B:
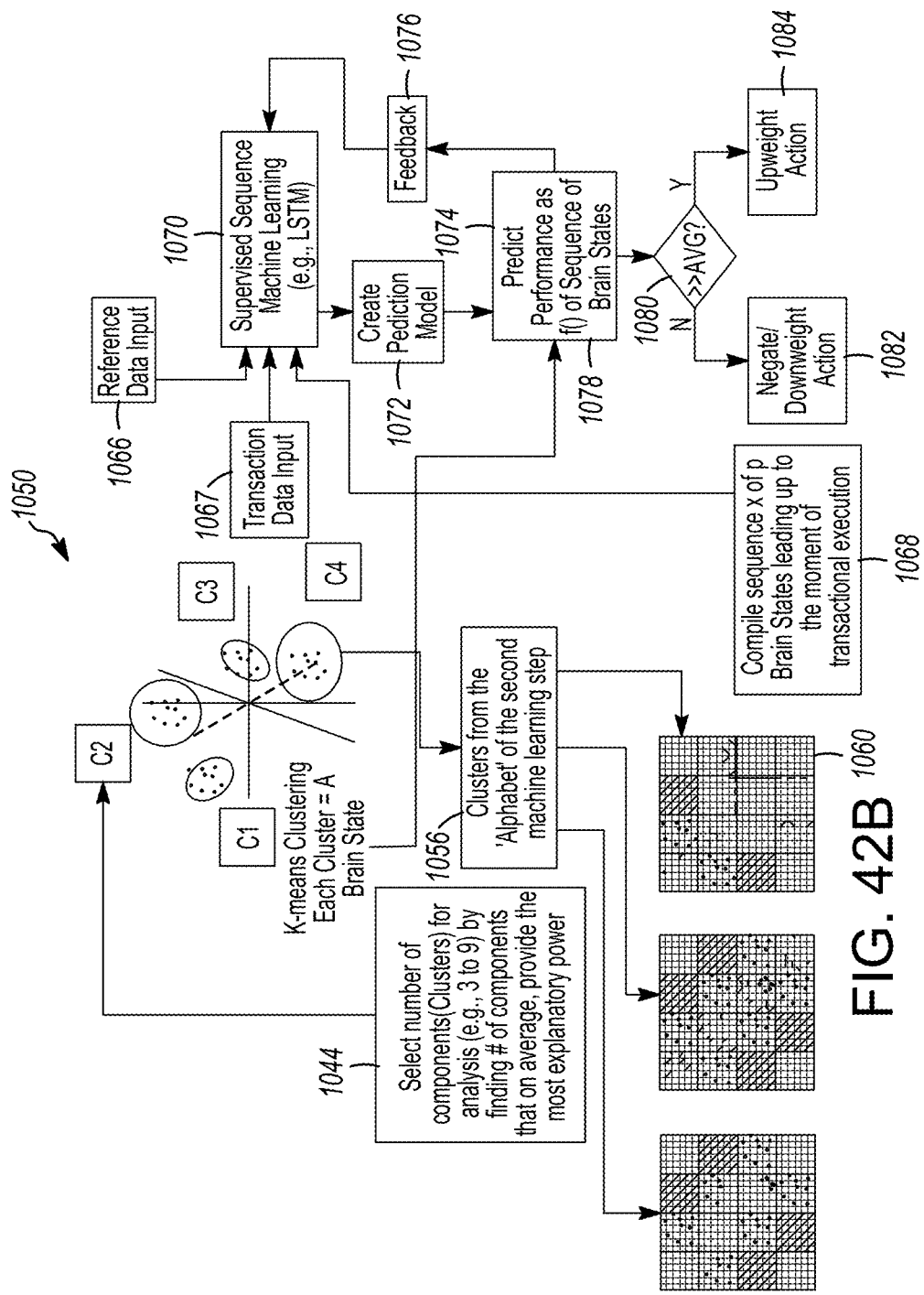
FIG. 42B is the second panel of the graphical illustration of one embodiment of a system and process for improving decision-making or performance on a conscious activity.

Together, FIGS. 42A and 42B illustrates a system and process for improving decision-making or performance on a conscious activity. A person is equipped with neurophysiological sensors 1010, such as EEG electrodes, each of which detects microvolt-scale voltages related to brain activity in the region of the electrode. The data is collected before and while the person is making a particular type of decision (e.g., whether to execute a buy or sell order) or performing a conscious activity. In the EEG example, multiple temporally spaced signals are taken from each electrode, and each signal-associated sample comprises an amplitude value and is identified by the electrode from which it belongs and a time during which it was collected. That is, each sample contains or is organized to have sufficient information 1012 to identify the electrode and the amplitude and time of the signal. Therefore, a set of N by M amplitude samples are taken, where N is the number of electrodes and M is the number of samples. Table 1014 visualizes one way in which the sample data may be organized.

The raw set of EEG data samples is then filtered to remove artifacts and noise using a PCA filter 1016. The PCA filter 1016 decomposes the EEG data into signal and noise.

A second PCA 1018 is applied to the filtered data. This PCA 1018 transforms the representation of the EEG data from electrode space into component space 1020, which corresponds in part to distinct regions of the brain (illustrated by brain connectivity model 1038). The number of components can be determined algorithmically, but this is, for the time being, computationally expensive. Experimentation can be more practical at identifying a suitable number of components for a first data set and then using that identified number of components in subsequent runs of the process.

A Fourier Transform 1022 is applied to the component data, transforming the filtered time-series-based sample data set into a frequency-based data set representative of the person's brainwaves.

Subsequently, the Fourier-transformed data set is independently bandpass filtered four times 27-30 to separate the data into its delta, theta, alpha and beta components. The graph 1024 illustrates a pre-bandpassed brain wave. The graph 1032 illustrates a post-bandpassed brain wave after the data of graph 1024 is convoluted with a theta-frequency (~4-10 Hz) bandpass wavelet.

Next, Hilbert transforms 1034 are applied to the data. Hilbert transforms yield both magnitude and phase outputs. Here, the phase output is disregarded. Data revealing the magnitude of each Hilbert transform envelope, however, is used to construct sliding window correlation matrices 1036 (or their numeric equivalents). Each correlation matrix 36 reveals a functional connectivity state estimation (FCSE).

Flow proceeds to block 1044 in FIG. 42B. In block 1044, cluster analysis is performed on the FSCEs 1036 produced by the earlier data processing. The number of components that, on average, provide the most explanatory power is determined. This can be done over several implementations of the process of FIGS. 42A and 42B. The optimal number of components may vary from one implementation to another but should fall within a fairly tight range. In its own experiments, Applicant found that between three and nine components provided suitable explanatory power, and thus selected six components for subsequent analysis. FIG. 42B illustrates a multidimensional space with three conventional axes x, y and z along with a fourth dimensional axis, illustrated in dotted lines. In this context, the dots represent FCSEs mapped within that space. Most of the dots are clustered within one of clusters C1, C2, C3 and C4, so these clusters are illustrated with ovals surrounding their respective dot clusters. For the sake of simplicity, only four clusters are illustrated. A more representative graph for a six-component clustering operation would illustrate six different clusters.

Previously, two PCAs were performed to filter the data and to transform the EEG data from the electrode space in which it was collected to a component space in which FCSE analysis can be performed. A k-means clustering 1050 is performed on the data after selecting the number of components (i.e., the number of clusters) with which to organize the data. K-means clustering is deeply related to PCA, and thus it can be said that a third PCA is performed in conjunction with or the service of the k-means clustering 1050 process.

In block 1056, the clusters formed from the k-means cluster are characterized, in their simplest form, as an "alphabet" representing characteristic aspects of the brain states detected by earlier processing steps. This "alphabet" concept is discussed further below in connection with FIG. 43. FIG. 42B illustrates characteristic "cluster" brain states/FSCEs 1060 associated with the alphabet. They are similar to the brain states/FSCEs 1036 of FIG. 42A because the "cluster" brain states/FSCEs 1060 are centralizing approximations (e.g., average, median, mode) of the brain connections represented by all of the dots of the cluster.

In block 1068 (near bottom of FIG. 42B), historical compilations of neurophysiological and assessment data from the person are analyzed to identify sequences of brain states leading up to the moment of each transaction and/or decision (these are not mutually exclusive). This analysis- along with behavioral/transactional data 1067 and reference data 1066—are fed into a supervised machine learning system 1070 (e.g., LSTM or logistic regression model), which after being fed a statistically significant amount of data generates a prediction model 1072.

Once the prediction model 1072 is generated, subsequent compilations of neurophysiological and assessment data from the person is matched to the closest clusters and its sequence of representative symbols recorded. In block 1074, these sequences of representative symbols are fed into the prediction model generating a prediction 1078 of the person's performance on their action and/or decision.

In an extension of FIGS. 42A and 42B, the prediction is used in some desirable way. For example, a prediction of subpar performance triggers actions to negate and down weight the person's decision or action, as illustrated in block 1082. A prediction of significantly superior performance (e.g., >> average, as in block 1080), on the other hand, triggers actions to augment or upweight the decision or action, as illustrated in block 1084.

FIG. 42A also illustrates a system and process for improving decision-making or performance on a conscious activity. A first neurophysiological sensors 1010 (here, an EEG) provides signals of electrical activity originating in the brain. A second human-machine interface 1015—such as a trading desk, a vehicle, or a joystick controller—produces behavioral and/or transactional data about an activity or decision. (No suggestion is made by the foregoing verbiage to suggest that transactions and actions are mutually exclusive or that decisions and activities are mutually exclusive. Rather, behavioral information includes information on transactions, and that detectable decisions are a kind of activity.)

The neurophysiological data 1011 is fed to a first machine learning system 1025, which generates functional connectivity state estimates (FCSEs) 1035. The FCSEs are clustered 1050, Hilbert-transformed 1034, "alphabetized" 1056, and then fed to a second machine learning system 1070, along with assessments 1065. Being "alphabetized" means that FCSEs 1035 are represented with a series of efficient, succinct symbols (numbers, letters, etc.)—like an alphabet—that identify complex FCSEs. Because the state "alphabet" is extracted from the training data set in an unsupervised way, data can be extracted from the active data set. Therefore, a sequence decoder, trained on the training data set, can make predictions on the second dataset.

While one element of the system is evaluating the neurophysiological data 1011, another element evaluates the behavioral and/or transactional data 67 being collected from the second human-machine interface 1015. The behavioral and/or transactional data is compared with reference data 1066—which could be a personalized or a population—wide number reflecting an average performance, a best performance, or a target performance—in order to produce assessments 1065. The assessments 1065 are fed to the second machine learning system 1070 along with the alphabetically represented brain state sequences leading up to the decisions and/or actions that have been assessed.

The second human-machine interface 1070 trains on the temporal sequences of alphabetized FCSEs 1056 and the assessments 1065 until it can recognize brain state sequences associated with outperformance and underperformance. It recognizes brain state sequence associations with performance by correlating different patterns of said states with probabilities of performing the activity well. The second machine learning system 1070 uses these correlations to build a prediction model 1073 that, after evaluating a new sequence of alphabetized FCSEs 1056 leading up to a decision or action, outputs a prediction 1075 or probability distribution representing the likelihood(s) of the following decision or action creating an outperforming and/or underperforming result. The training is done with the neurophysiological data or sequences, the transactional data, if any, and also with the assessments or the behavioral and reference data.

Figure 43:
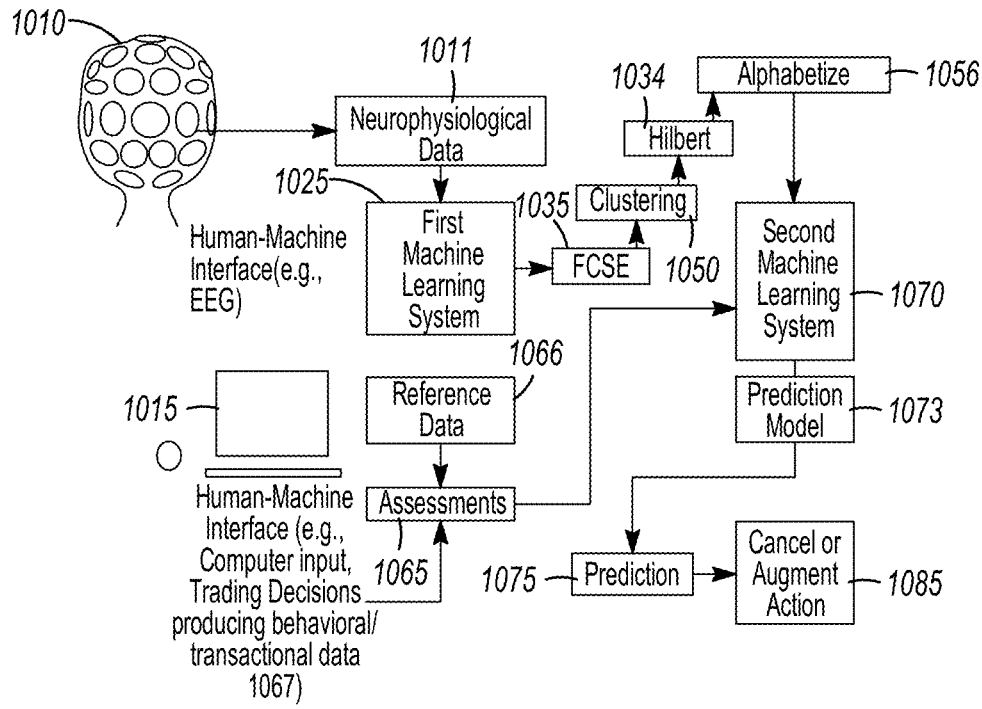
FIG. 43 is another graphical illustration of one embodiment of a system and process for improving decision-making or performance on a conscious activity.

FIG. 43 also illustrates that the prediction can be used to improve a positive outcome or mitigate a negative outcome. For example, in a security trading context, a decision to execute a buy order on X dollars of securities could be augmented to mX dollars (where m=a multiple) by a decision interface where the prediction model 1073 predicts, on the basis of the brain state sequence leading up to the decision, that the transaction has a very high probability of market outperformance. On the other hand, if the prediction model 1073 predicts, on the basis of the brain state sequence leading up to the decision, that the transaction has a very low probability of market outperformance or a long and fat tail of negative probabilities, then the decision interface could cancel or negate the transaction or even do a reverse (e.g., a short-sale) of the transaction.

Figure 44:
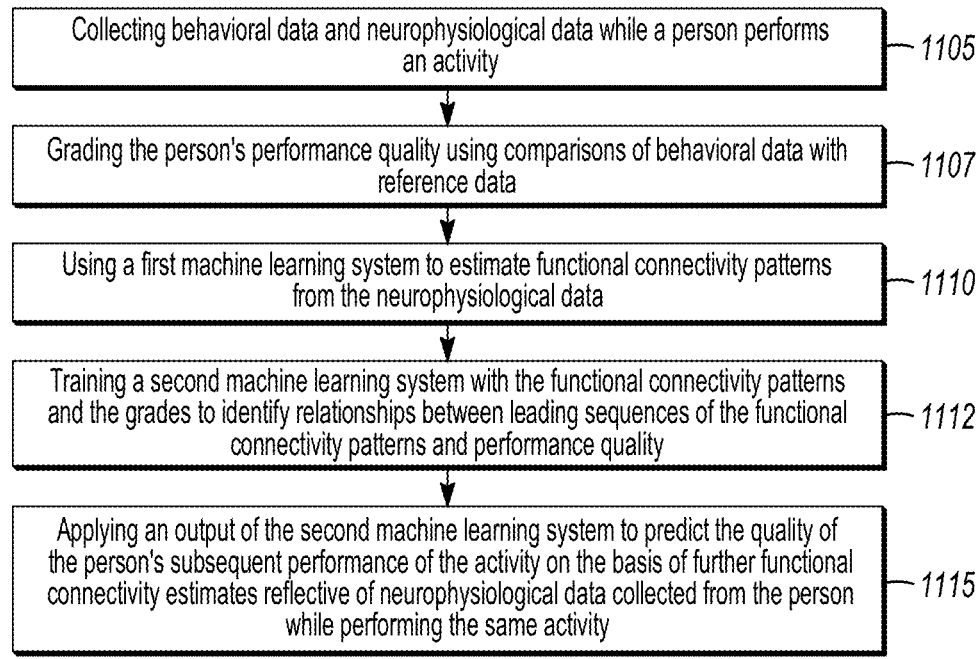
FIG. 44 illustrates one embodiment of a method for identifying sequences of brain states predictive of a quality of decision-making or performance on a conscious activity.

FIG. 44 illustrates a method 1100 for identifying sequences of brain states predictive of a quality of decision-making or performance on a conscious activity. The method comprises, in block 1105, collecting behavioral data and neurophysiological data while a person performs the activity, and in block 1107, grading the person's performance quality using comparisons of behavioral data with reference data. In block 1110, a first machine learning system is used to estimate functional connectivity patterns from the neurophysiological data.

The foregoing involves decomposing the behavioral data and neurophysiological data into spatial and temporal components that reflect a functional connectivity state at an instant of time; repeating said decomposing step for a sequence of instances; and clustering a plurality of functional connectivity matrices into a set of discrete steps. Stated differently, characteristic neurophysiological states are identified by: decomposing the neurophysiological data; identifying components associated with variances in or sources of the neurophysiological data; bandpassing the components across several frequency bands; finding correlations between envelopes of the bandpassed components; and clustering the correlation data.

In block 1112, a second machine learning system receives functional connectivity patterns and the grades as inputs to identify relationships between the functional connectivity patterns and performance quality. In block 1115, an output of the second machine learning system is applied to predict the quality of the person's subsequent performance of the activity as a function of further FCSEs based on neurophysiological data collected from the person.

Figure 45:
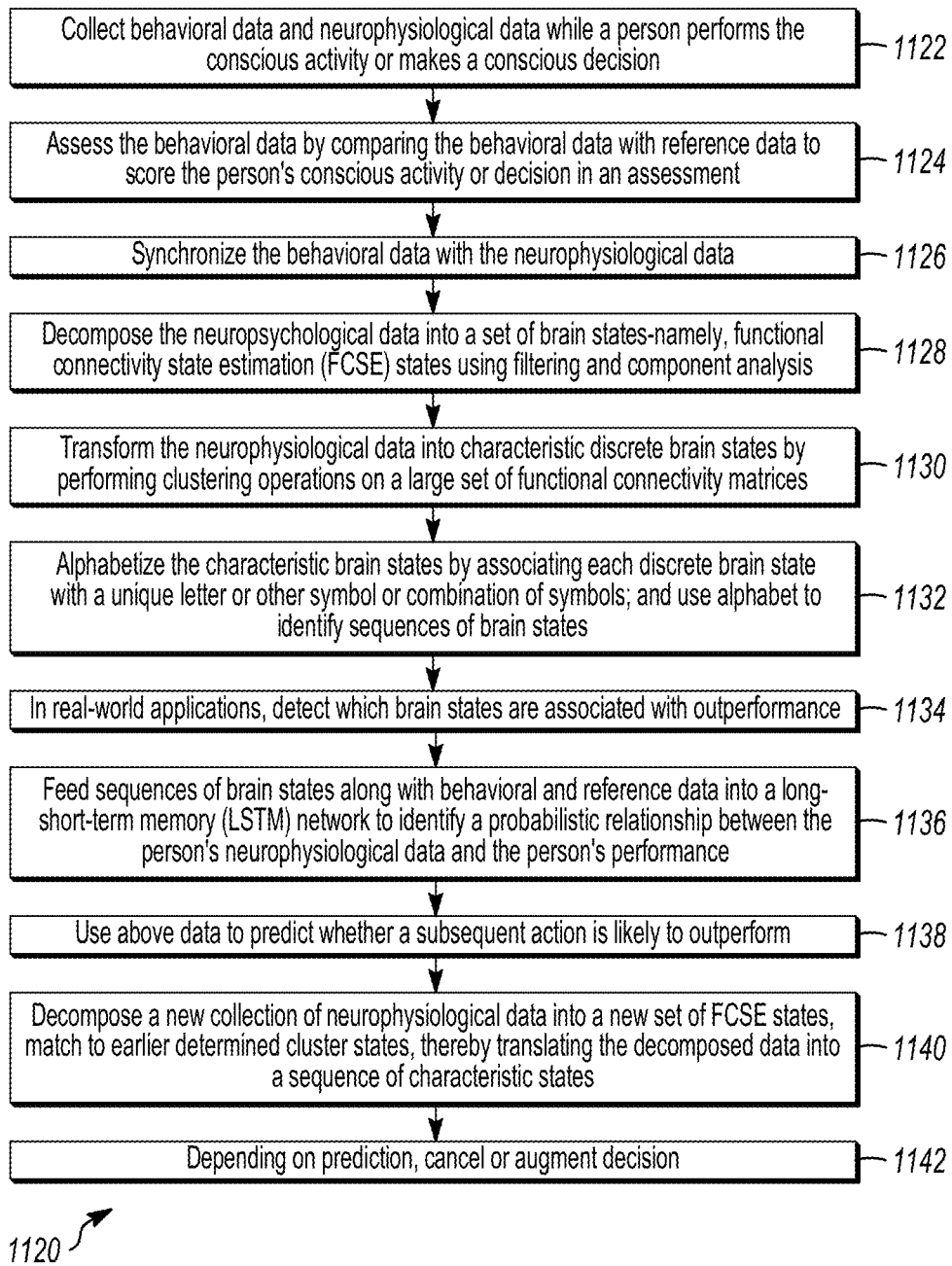
FIG. 45 illustrates a second embodiment of a method for identifying sequences of brain states predictive of a quality of decision-making or performance on a conscious activity.

FIG. 45 illustrates a method for 1120 identifying sequences of brain states predictive of a quality of decision-making or performance on a conscious activity. The method 1120 may be stated alternatively as a method for improving performance on a conscious activity (e.g., cognition while making security trading decisions). The method comprises, in block 1122, collecting behavioral data and neurophysiological data while a person performs a conscious activity or makes a conscious decision. The method further comprises, in block 1124, assessing the behavioral data by comparing the behavioral data with reference data to score the person's conscious activity in an assessment. In block 1126, the behavioral data is synchronized with the neurophysiological data.

In block 1128, the neurophysiological data, at least, and optionally also behavioral/transactional data, reference data, and/or assessment data is fed into a first machine learning system, where the neurophysiological data is decomposed into a set of brain states-namely, functional connectivity state estimation (FCSE) states-using filtering and component analysis. Alternatively stated, the process of decomposing the neurophysiological data identifies brain states from the neurophysiological data. In block 1130, the neurophysiological data is transformed into discrete brain states by performing a clustering operation on a large set of functional connectivity matrices. As each cluster has a functional connectivity matrix formed from centralized statistics (e.g., weighted average or median) about the members of the cluster, the cluster's statistically central functional connectivity matrix constitutes a "characteristic" brain state or FCSE state or matrix.

In block 1132, the characteristic brain states are essentially alphabetized by associating each discrete brain state with a unique letter or other symbol or combination of symbols. This alphabet is used to identify sequences of brain states. In block 1136, the sequences of brain states, along with behavioral and reference data, are fed into a second machine learning system, such as a long-short term memory (LSTM) network or a logistic regression model. Alternatively, block 1136 feeds behavioral and/or performance assessments previously done in block 1134 into the second machine learning system. With either of these equivalent alternatives, the LSTM network identifies a probabilistic relationship between the person's neurophysiological data and the person's performance. More particularly, the second machine learning system is taught to identify brain states associated with over- and under-performance (block 1136).

The number of differentiated brain states may equal the number of clusters selected in block 130, in that the subsequently detected brain states are matched to one, and thereby differentiated into one, of a set of N states (e.g., N=6 for 6 clusters). Alternatively, the prediction model is simplified to a 2-state model: wherein the two states respectively indicate whether or whether not whether a detected brain state satisfies a minimally acceptable set of thresholds of connectivity between brain regions and components. Whether N=2 or N>2, each of the N different brain states is represented by a unique identifier so that the set of N different brain states corresponds to a set of unique identifiers.

Block 1138 extends the foregoing analysis along a further dimension-time, as punctuated by sequences of brain states. Sequences of brain states leading up to actions and/or decisions are fed into a Long-Short Term Memory network (which is a type of machine learning) to identify a probabilistic relationship between the person's neurophysiological data and the person's performance. In block 1140—which is a sub-block of block 1138—this data is used to generate a prediction model of whether a subsequent action is likely to outperform. In another sub-block of block 138 (not shown), the method further comprises collecting and training the machine learning system with behavioral and neurophysiological data from a plurality of persons performing the activity.

The prediction model resulting from block 1138 enables a score of the person's subsequent conscious decision or activity to be predicted as a function of the person's neurophysiological activity leading up to said subsequent conscious activity. Block 1142 applies the foregoing analysis in a practical way. Depending on the prediction, the decision or action is negated, mitigated, validated, or augmented.

Figure 46:
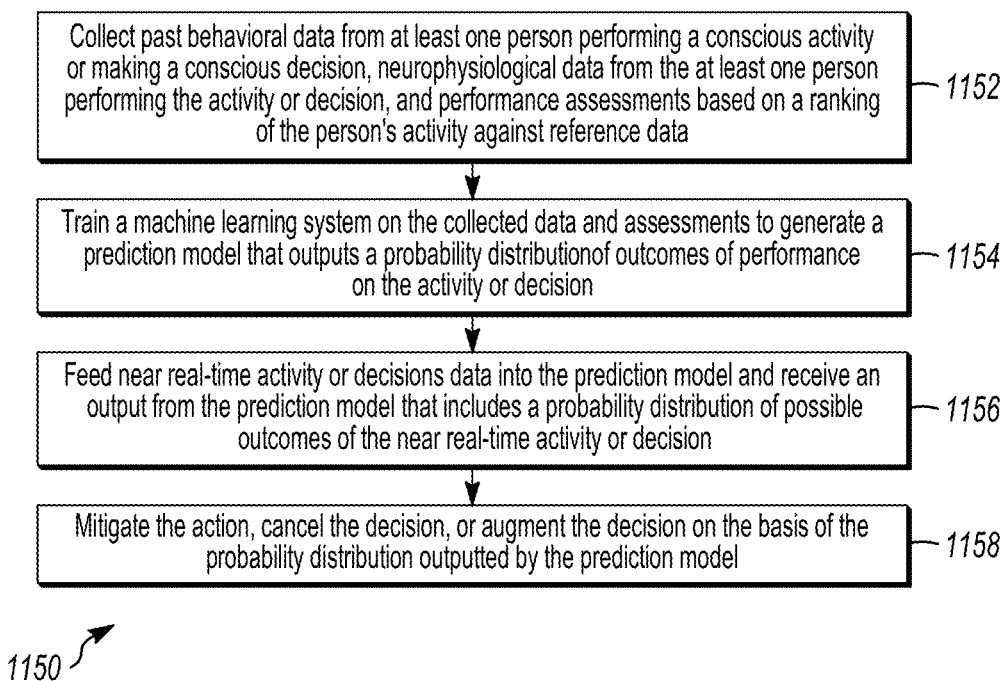
FIG. 46 illustrates an embodiment of a method for training a machine learning system to output a probability distribution of outcomes for a decision or action based upon a sequence of brain states detected leading up to the decision or action.

FIG. 46 illustrates a method for training a machine learning system to output a probability distribution of outcomes for a decision or action based upon a sequence of brain states detected leading up to the decision or action. In block 1152, past behavioral data is collected from at least one person performing a conscious activity or making a conscious decision. Neurophysiological data is collected from the at least one person performing the activity or decision. Furthermore, performance assessments are generated or collected based on a ranking of the person's activity against reference data. In block 1154, these are then used to train a machine learning system on the collected data and assessments in order to generate the prediction model that outputs a probability distribution of outcomes of performance on the activity or decision. In block 1156, After the prediction model is generated, the prediction model, when fed with data about the near real time activity or decision data, outputs a probability distribution of possible outcomes of the near real time activity or decision. Accordingly, real-time activity or decisions data is fed into the prediction model, which subsequently outputs a probability distribution of possible outcomes of the near real time activity or decision. In block 1158, an application system mitigates the action, cancels the decision, or augments the decision on the basis of the probability distribution outputted by the prediction model.

Figure 47B:
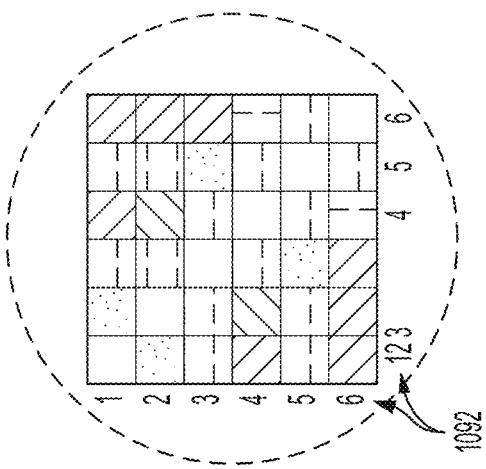
FIG. 47B is an expanded view of the illustration of FIG. 47A.
Figure 47A:
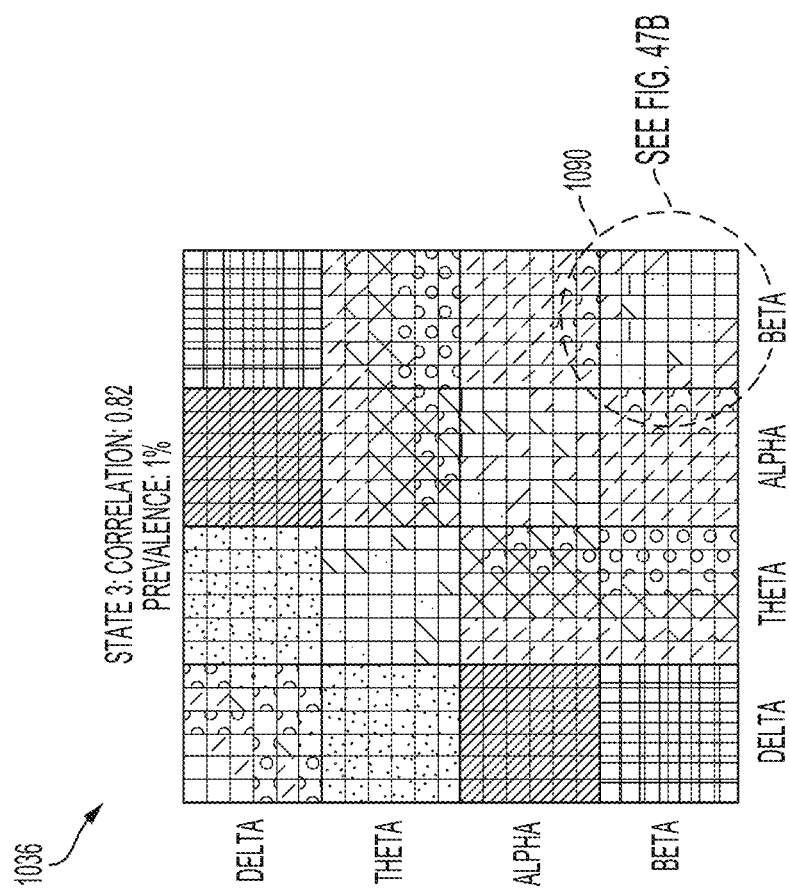
FIG. 47A is an illustration of a sliding window correlation matrix, or a representation of a cluster of sliding window correlation matrix, that illustrates correlations between frequency bands (large squares) and components (small squares).

FIG. 47A is an illustration of a sliding window correlation matrix 1036, or a representation of a cluster of sliding window correlation matrices, that illustrates correlations between frequency bands (large squares 1090) and between components 1092 (small squares). FIG. 47B is an expanded view of the illustration of FIG. 47A, as indicated in FIG. 47A by a dashed circle.

Figure 48:
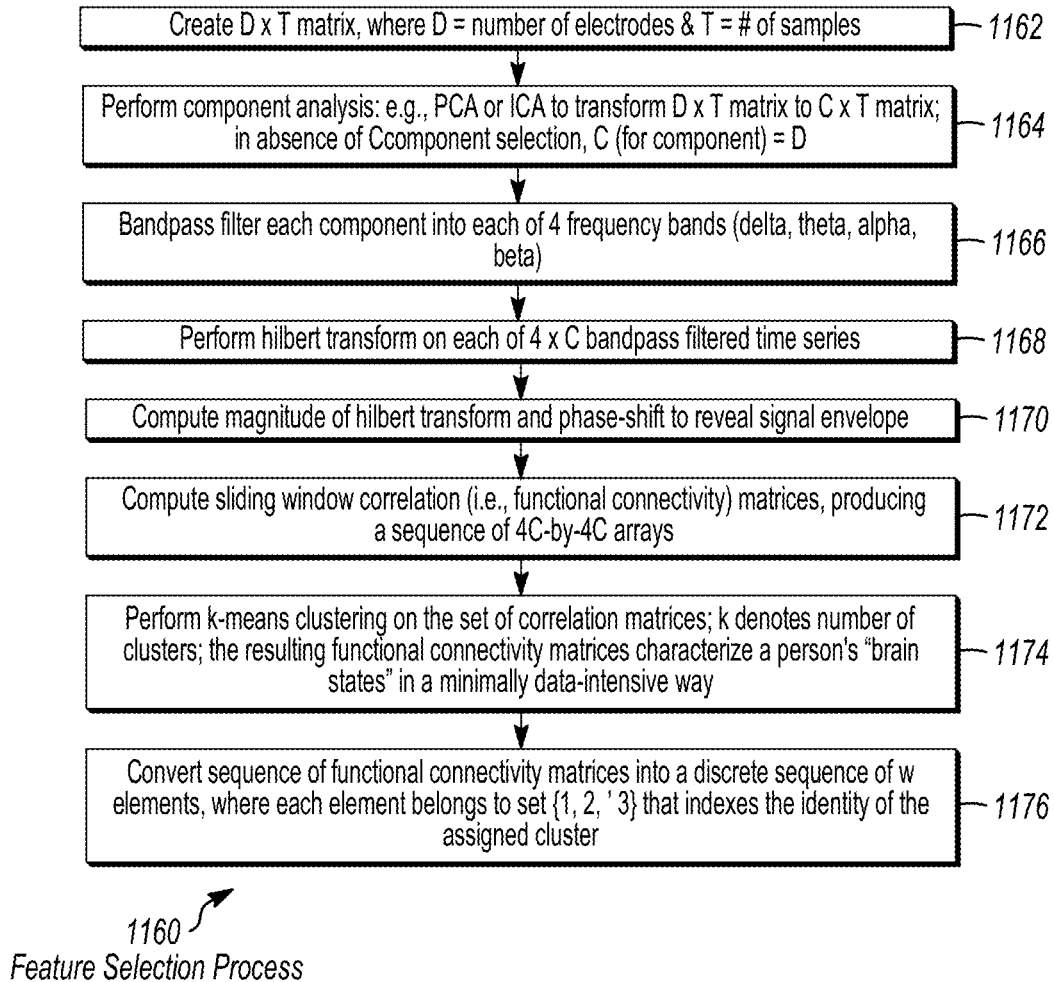
FIG. 48 illustrates an embodiment of a feature selection process incorporated into a method for improving decision-making or performance on a conscious activity.

FIG. 48 illustrates a feature selection process incorporated into a method for improving decision-making or performance on a conscious activity. The feature selection process involves a non-trivial series of derivations, transformations, convolutions, and extrapolations that require a fair amount of computing power and latency. In block 1162, the neurophysiological data from a set of D electrodes is sampled T times, producing a D×T data set and matrix. In block 1164, component analysis, such as PCA or ICA, is performed to transform the electrode-space realm of the D×T matrix into a component space realm of data organized into a C×T matrix, where C comprises the number of components (in one embodiment, six) selected to represent the transformed data.

In block 1166, each of the C components of the data of the C×T matrix is bandpass filtered into four separate frequency bands, corresponding to delta, theta, alpha and beta brainwave frequencies, resulting in twenty-four components times T number of samples organized into a 4C×T matrix or a 4×C×T matrix.

In block 1168, each 4×C bandpass filtered time series is Hilbert transformed. Because the transform populates each of 24 channels oscillating signals, the Hilbert transformation allows an envelope of each oscillating signal of the channels to be determined. As indicated by block 1170, the envelope constitutes a modulating curve outlining the amplitude of the signal and representing an approximation of the power of each of the bands, and is derived from the absolute value of the magnitude computed by the Hilbert transform, offset by a $+\pi/2$ phase shift.

In block 1172, sliding window correlation (i.e., functional connectivity) matrices are computed, producing a sequence of 4C by 4C arrays, wherein C is the number of spatial components and four is the number of frequency components.

In block 1174, k-means clustering is performed on the set of correlation matrices created in block 1172. k denotes the number of clusters. The resulting functional connectivity matrices characterize a person's "brain states" in a minimally data-intensive way In block 1176, the sequence of functional connectivity matrices is converted into a discrete sequence of W elements, where each element belongs to an "alphabetical"-like set {1, 2, . . . 3} that indexes the identity of the assigned cluster, producing an even more minimalistic characterization of the person's brain states.

Figure 49:
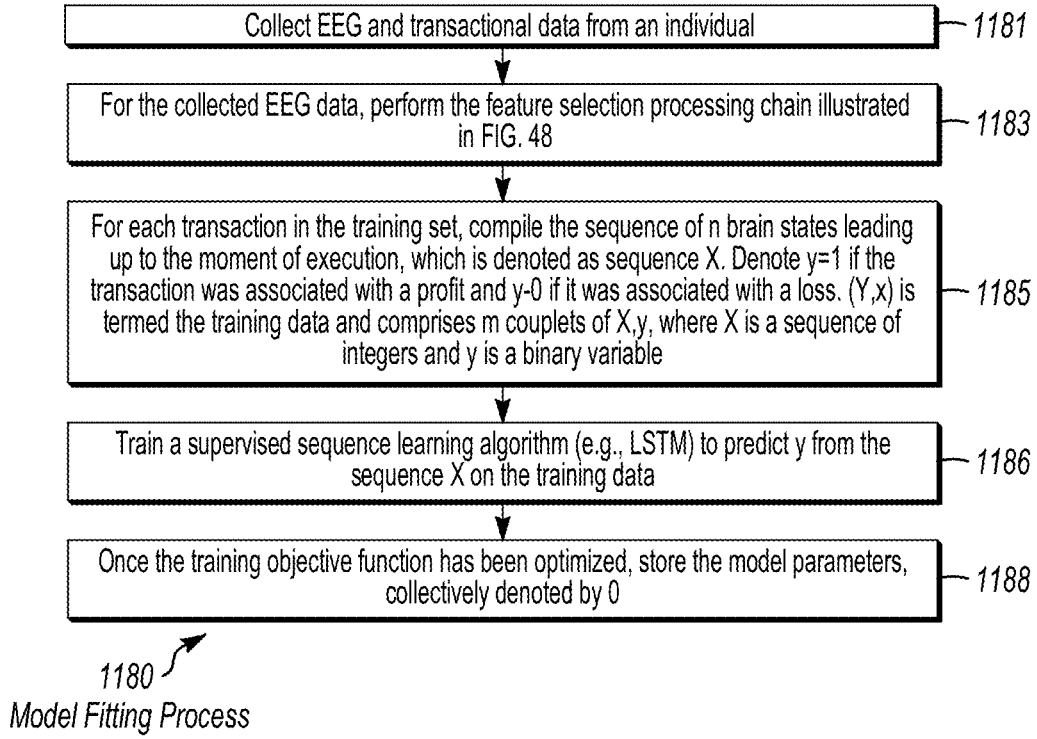
FIG. 49 illustrates an embodiment of a model-fitting process incorporated into a method for improving decision-making or performance on a conscious activity.

FIG. 49 illustrates a model-fitting process 1180 incorporated into a method for improving decision-making or performance on a conscious activity. In block 1181, EEG and transactional data—i.e., the "training set"—are collected from an individual. In block 1183, the feature selection processing depicted in FIG. 48 is begun on the collected EEG data. In block 1185, for each transaction in the training set, the sequence of N brain states leading up to the moment of execution is compiled and denoted as sequence X. In a maximally minimalistic characterization of the person's brain states, the transaction is denoted y=1 if the transaction was associated with a profit and y=0 if it was associated with a loss. (Y, x) refers to training data and comprises M couplets of X, y, where X is a sequence of integers and y is a binary variable.

In block 1186, a supervised sequence learning algorithm (e.g., LSTM) is trained to predict y from the sequence X on the training data. In block 1188, once the training objective function (i.e., prediction model) has been optimized, the model parameters, collectively denoted by θ, are stored.

Figure 50:
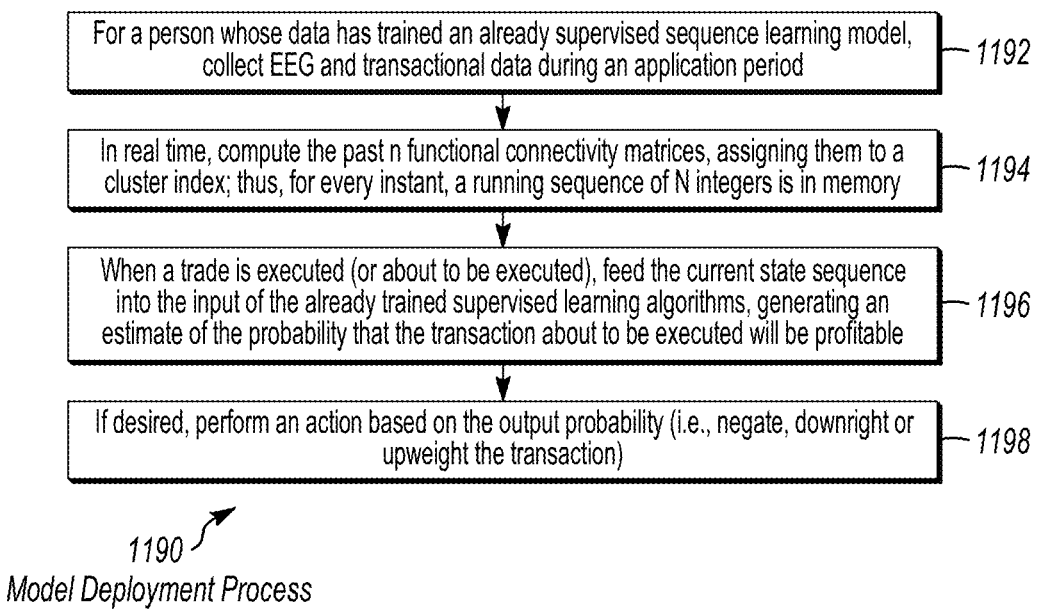
FIG. 50 illustrates an embodiment of a model-deployment process incorporated into a method for improving decision-making or performance on a conscious activity.
Figure 51A:
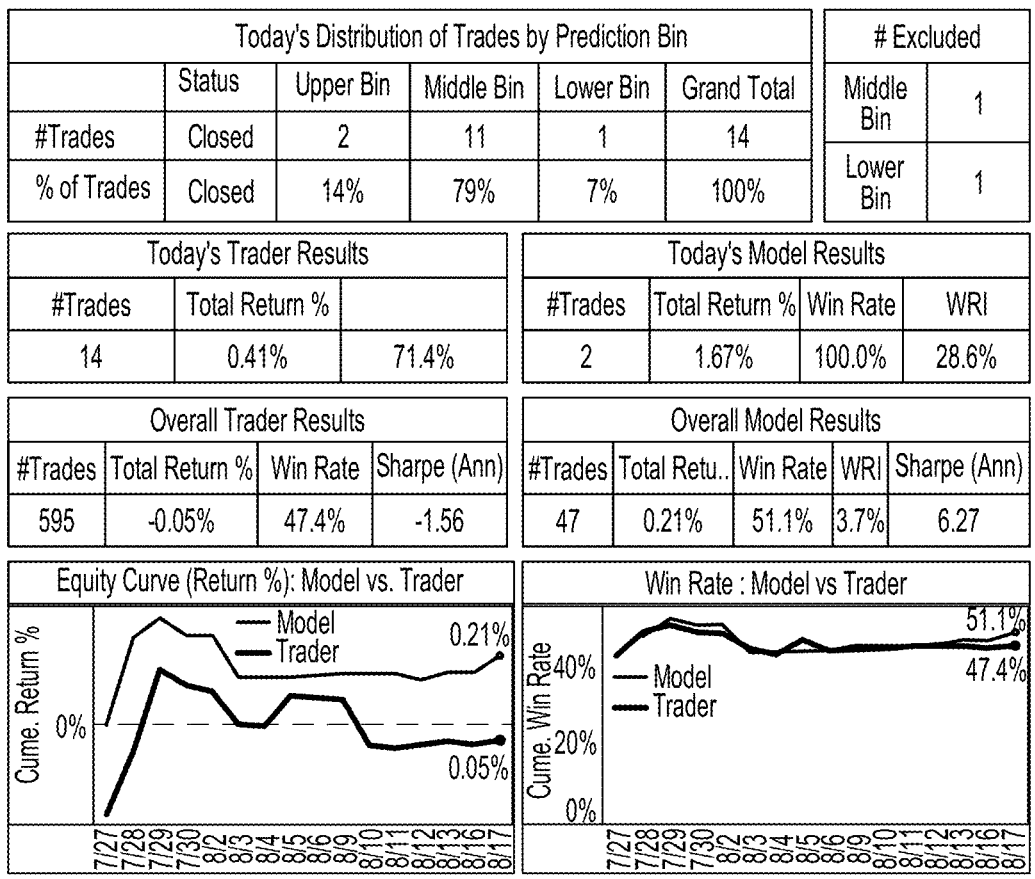
Figure 51B:
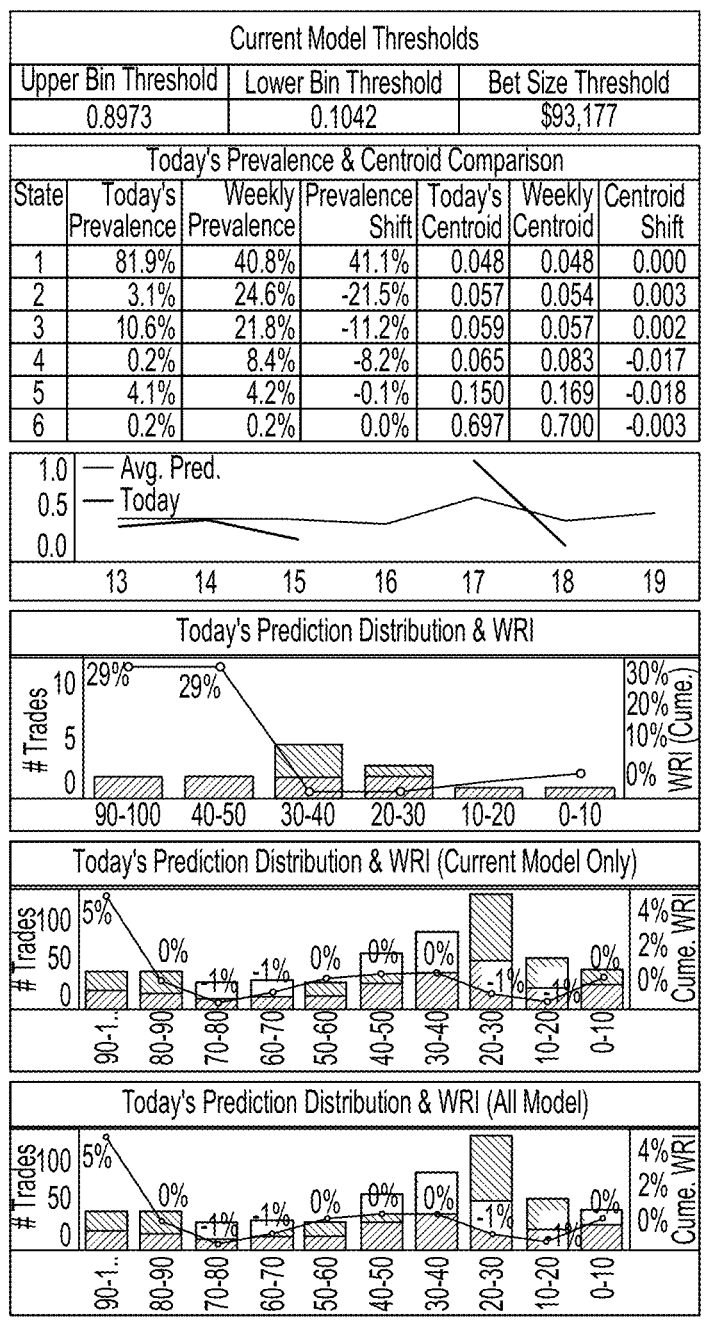
Figure 53A:
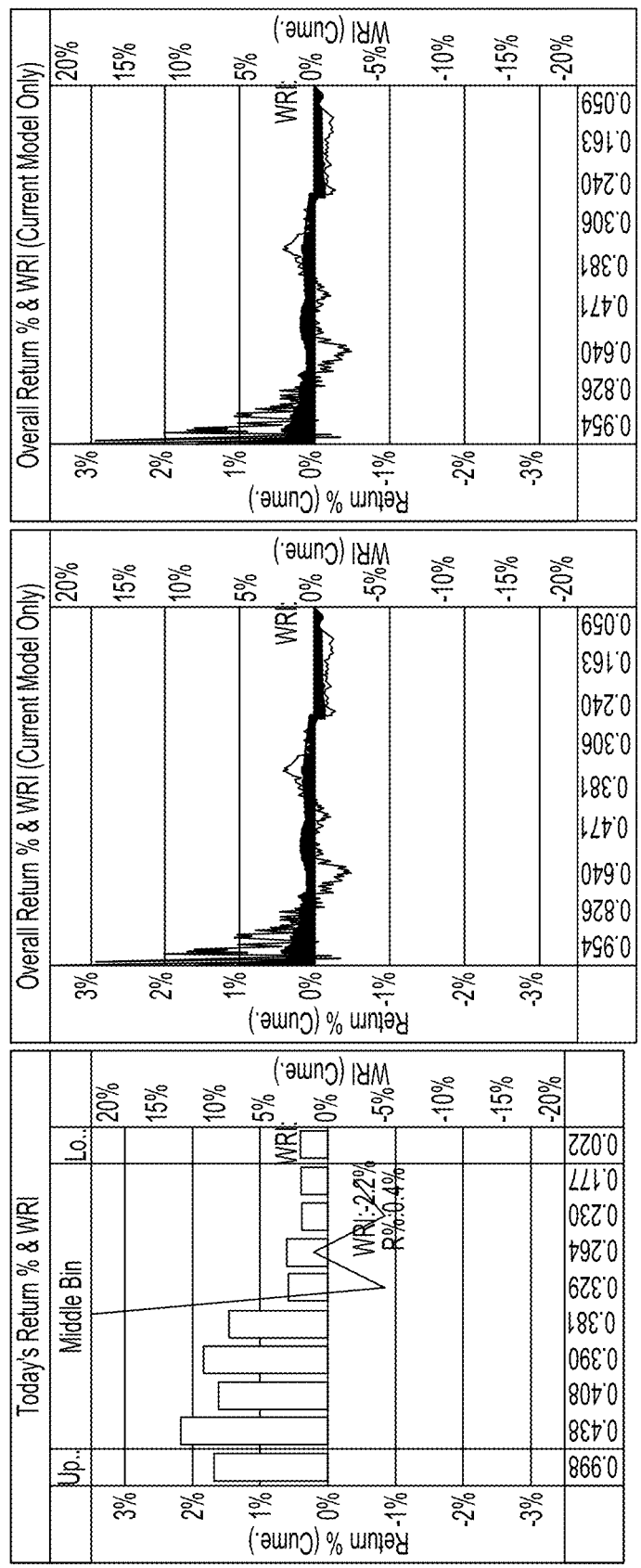
FIGS. 53A-53C together illustrate an embodiment of a user interface output depicting model recommendations and performance metrics.
Figure 53B:
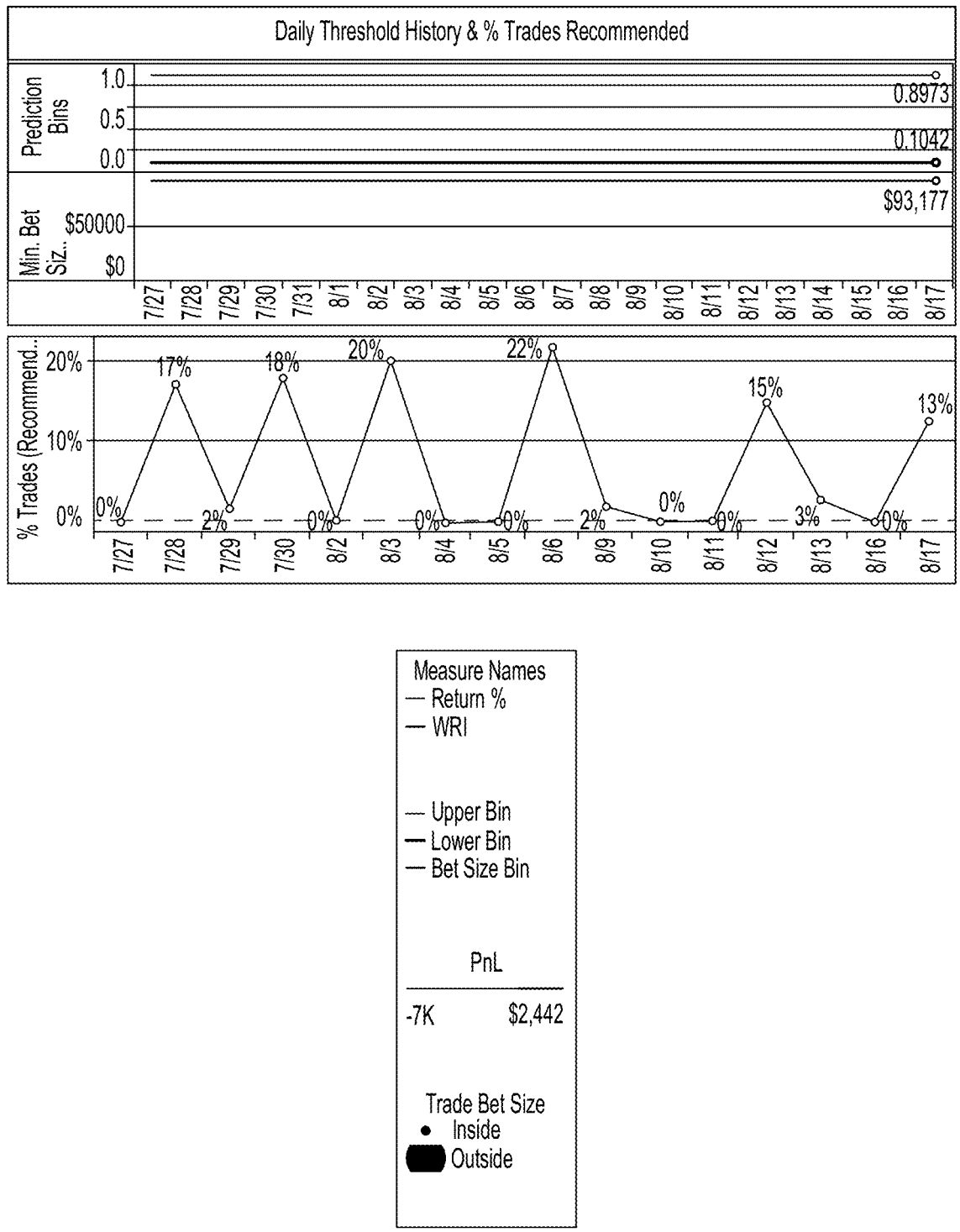
Figure 53C:
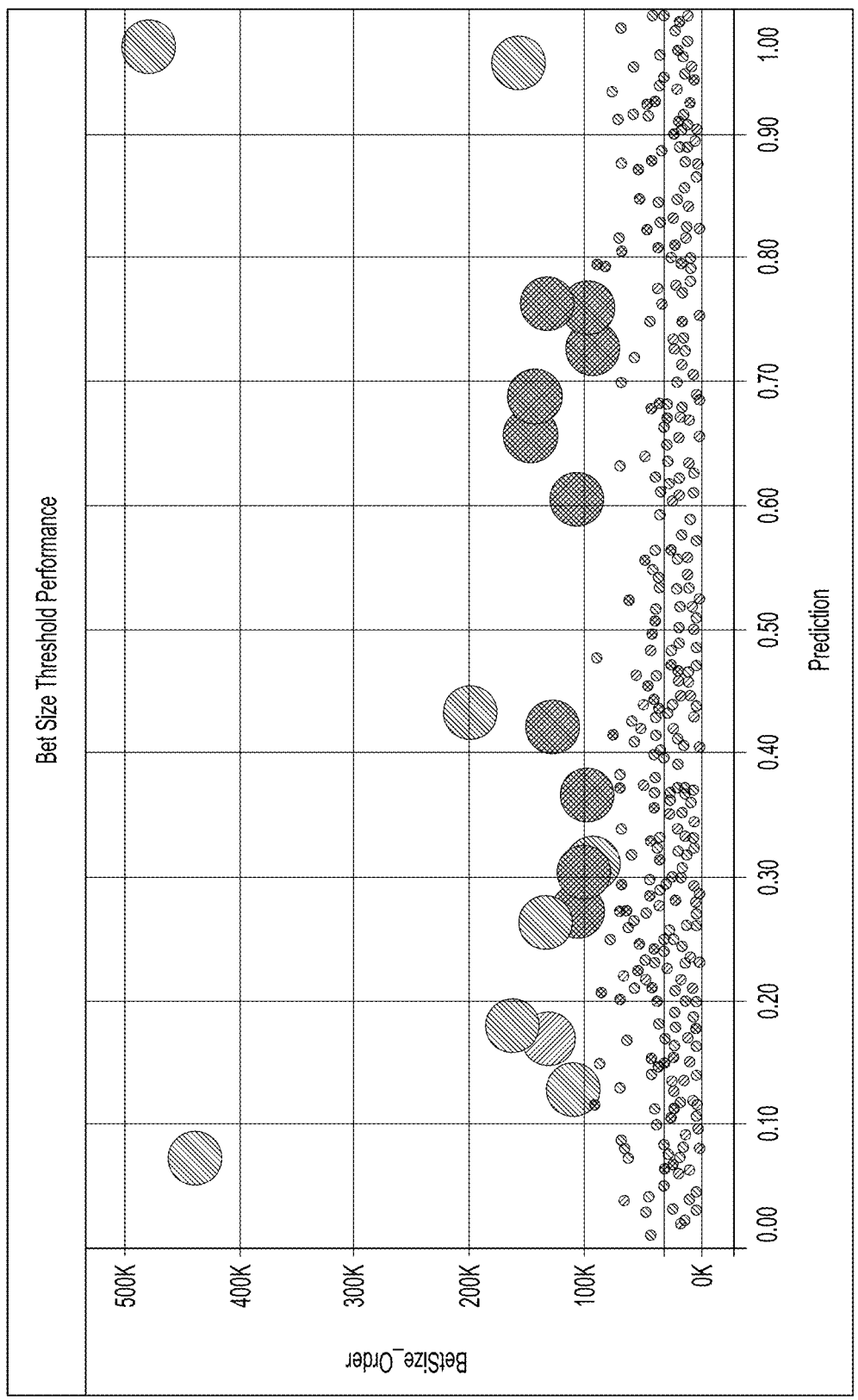
Figure 54A:
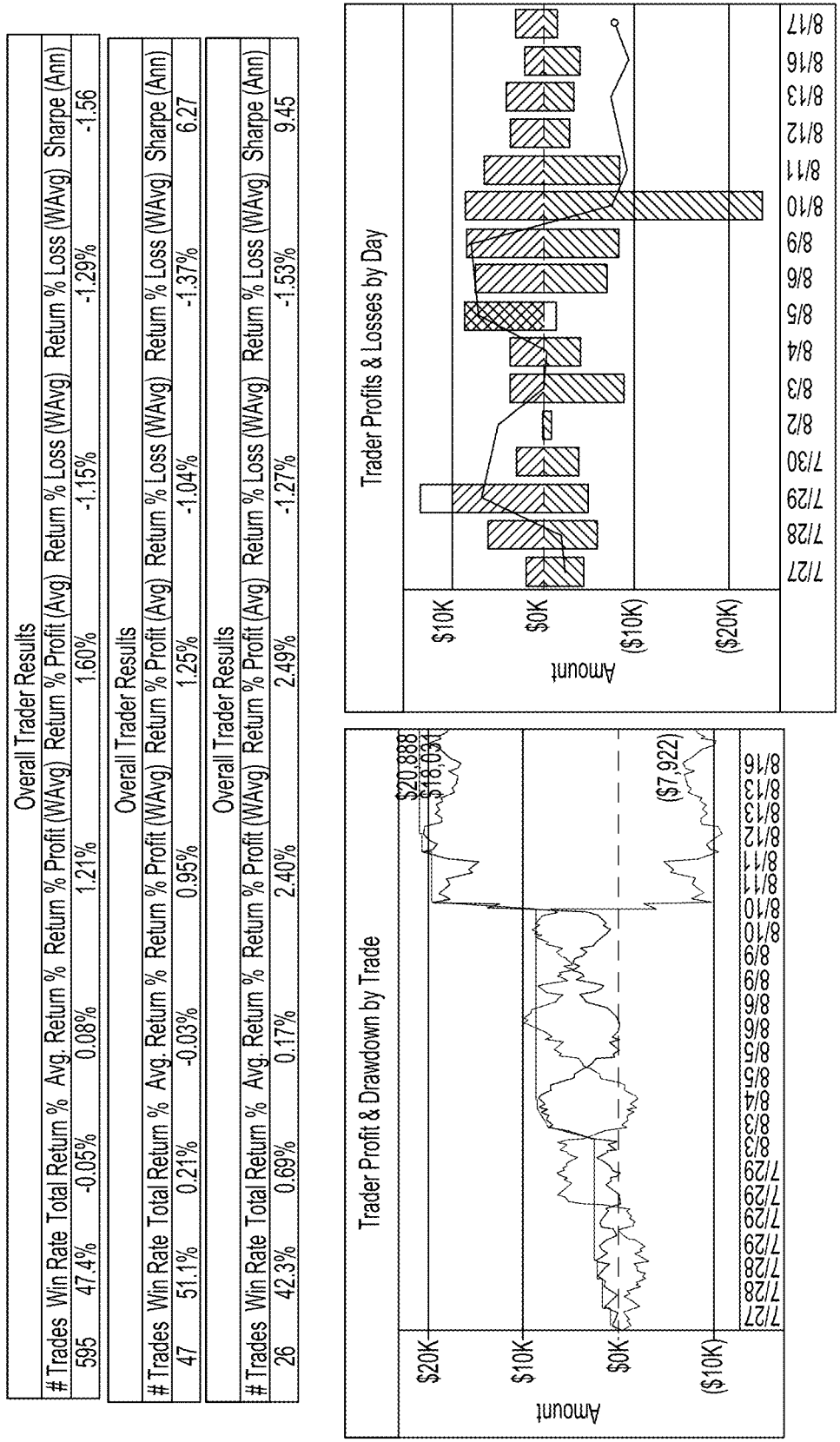

FIG. 50 illustrates a model-deployment process 1190 incorporated into a method for improving decision-making or performance on a conscious activity. In block 1192, EEG and transactional data during an application period is collected for a person for which an already optimized supervised sequence learning model—i.e., active data—has been developed. In block 1194, in real time, a running sequence of N integers is computed for the past N functional connectivity matrices, assigning them to a cluster index; thus, for every instant, a running sequence of N integers is in memory.

In block 1196, when a trade is executed (or about to be executed), the current state sequence is fed into the input of the already trained supervised learning algorithms, generating an estimate of the probability that the transaction about to be executed will be profitable In block 1198 (optional), a mediating action to mediate or alter the person's decision or action is performed, based on the output probability (i.e., negate, downright or upweight the transaction).

It will be understood that many modifications could be made to the embodiments disclosed herein without departing from the spirit of the various embodiments disclosed herein. In some embodiments, certain actions may be done in a foreign country in service of and for the benefit of acts taking place in the United States. For example, a decision model can be created in a foreign country using exclusively foreign subjects. Alternatively, a machine learning system that accepts inputs from US subjects could perform all of the number-crunching on a foreign computer system, generating optimal decisions (such as optimal trade executions) that are applied domestically. To capture this subject matter, some embodiments may be framed in terms of domestic uses and applications of an analysis. While the use in the U.S. of the analysis (or a product of the analysis) is an element of the claim, the analysis may itself not be an element of the claim.

As used in this specification, "engine" refers to a program or system of programs comprising code stored on a non-transitory medium, computer, or processor that, when executed, performs the recited functions.

The disclosures contained in the drawings are examples only and various other alternatives, adaptations, and modifications can be made within the scope of the present disclosure. Accordingly, the present disclosure is not limited to the specific embodiments illustrated herein but is limited only by the following claims.

Many modifications could be made to the embodiments disclosed herein without departing from the spirit of the disclosure. For example, FIG. 21 could be modified to utilize neurometric sensors only when the person is performing an assessment (i.e., not when performing cognitive training).

In embodiments of the present disclosure, a predictive EEG platform may perform real-time, and/or substantially real-time, calculations and monitoring to increase the overall trading returns, such as equity or other financial trading.

In embodiments of the present disclosure, a predictive model may be created for the purpose of identifying and measuring brain states associated with optimal human performance. In an example of one type of model that may be deployed within the neurometric-enhanced performance assessment system (NEPAS), brain states may be constructed via 24×24 matrices, built by 4 EEG amplitude bands (condensed from 20 channels) broken into 6 principal components. Offline, k-means clustering may be used on acquired EEG data to identify 6 discrete clusters, 'states' into which the matrices can fall, out of this state clustering there may be centroids. In real-time, or substantially real-time, each FC matrix generated (per second) may be given a state label based on minimal centroid distance to one of the 6 offline calculated states. Such real-time, or substantially real-time, state labeling may be used by the NEPAS to output a prediction of profit in real-time. In embodiments, logistic modeling may be used whereby discrete brain states may predict dichotomous profit or loss of a FIFO return dependent variable. Parameter weights from this model may be used to identify the state(s) that most reliably predicts profit, reliably predicts loss, and those states that are not associated with either. In real-time, or substantially real-time, functional connectivity matrices of EEG signals may be generated at an interval, such as every second, and at any given second, specifically tied to the moment of a trader's order. A prediction of profit may be sent to a mirror account of that order based on the probability of profit that is generated by the 300 second window of labeled brain states that immediately preceded the order. The online calculation is such that, when the model has seen this type of 300 second sequence of states before, it predicted profit x % of the time.

In embodiments, a model may be updated (i.e., retrained) at an interval, such as weekly, with new data. Model training may include, for example, the most recent week's data being used as a holdout set (e.g., for center book threshold setting) with the prior week (e.g., brain+finance data concatenated .mat data) used as inputs to the model. In an example, prior to weekly model implementation, a model may be tested for sufficient model accuracy, prediction value distribution, and holdout threshold performance in center book simulation (i.e., model fit at the level of center book). To verify the quality of an EEG signal, a combination of manual/automatic checks may be done across various time horizons (e.g., real-time/daily/weekly).

In embodiments, the NEPAS may utilize financial performance data from traders via direct access to a financial institution's system, and the NEPAS predictive system may use direct data feeds of trading information including: including: trade value (bet size), time stamp of trade, trader making the trade, asset traded, value of asset traded, units traded, or some other information type. Real-time market data may be streamed and saved along with institution-provided end-of-day reports (e.g., as back-ups). Daily finance data may be used for tableau-derived daily reports and model training. In the listing below, selected NEPAS processing steps, failure points and solutions are shown:

TABLE 7

| Processing Step | Failure Point | Solution |
| --- | --- | --- |
| Set up client/Check impedance prior to acquisition | High impedance (red) | Additional gel/electrode adjustment, time to saturate (early set up) |
| Continuous stream Monitoring | high noise/extended bet size alerts/extended neutral | Vis stream continuous monitoring and/or manual electrode adjustment. For bet size, prediction or recommendation issues, take |

TABLE 7-continued

| Processing Step | Failure Point | Solution |
| --- | --- | --- |
| | recommendations/no recommendations | note and confer with tech support/ (Beau)/EOD daily report and do not send recommendation to client dashboard |
| XDF upload | XDF incomplete file | Verify xdf size (including multiple XDFs if labkit was stopped and restarted) and dropbox upload per subject |
| EOD automatic preprocessing (EEG) | Preprocessing scripts unavailable/corrupt | Update script |
| Multi-taper spectrogram for each data segment | Bad segments of data (exceed spectogram threshold) | Remove segments that exceed threshold |
| Compute percent of outliers zeroed out, compare against predetermined thresholds | XX % outliers | Decision whether or not to include this days data in next week's training set |
| Visually inspect time-series (raw and preprocessed) for signal quality | Overall poor data quality (combined with above steps based on XX number of poor segments/outliers) | Decision in daily report meeting whether to include current day in next week training set |

In embodiments of the present disclosure, real-time data collection and the real time EEG predictive modeling may be integrated into a single system. The prediction generated from this integrated system may flow into a client dashboard and include a system to mitigate large center book losses. In embodiments, the NEPAS may use live trader data.

In an example embodiment, the NEPAS may include a systematic collection process of trading data for a plurality of traders, where each trader in this example needs at least 500 trades during the collection period. Data collected by the NEPAS may include:

Equity traded
Real time EEG data provided by the ABM X-24
Time traded
Value of trade
Units traded
Associated trader The NEPAS may use buying decision data (e.g., entries and adds) collected from the plurality of traders to train a selected optimal model to predict the outcome of a trade (profit or loss). After a training phase of the model, the NEPAS may collect trading data from a financial institution's training system. Trade data from the training system may be processed in real-time, or substantially real-time, and assigned a predictive accuracy score. This score may range from 0%-100%. 0% indicates no confidence of a good buying decision and 100% indicating complete confidence that the buying decision was a good decision.

In embodiments, upon the occurrence of a trade, detailed data (e.g., units, total value, trader, and time) may be transferred to the NEPAS in real-time, or substantially real-time. The predictive model may process each trade from each trader and assign a predictive assessment for buy trades in real-time, or substantially real-time. The NEPAS may deliver a predictive assessment, for example back to a client, in real-time, or substantially real-time. If the model detects data or predictive anomalies, an alert system of the NEPAS may notify the team for additional investigation. If a data stream or process required for this NEPAS system to work are disrupted, an alert may be provided for additional investigation.

In embodiments, the NEPAS may create a real-time dashboard that may be used to make center book trading decisions. The trade data (e.g., ticker, units, total spend, buy/add) and its associated probability for profit generated by the real-time analysis of the NEPAS may be displayed in this dashboard. Additional user interfaces may replicate this dashboard. User interfaces may differ in that one dashboard may show the percentage (confidence level) associated with each prediction whereas an alternate dashboard, such as a client dashboard, may use a color coding to indicate recommended predictions, versus those that are not recommended, to support decision making. In an example, the colors may consist of green (recommend) and red (do not recommend). Green/red bin thresholds may be defined as follows: Using a model trained on the entire set of trade data available (per trader) less a defined hold set period, evaluate model performance using the hold set by, for example, the following criteria:

Find where % of Total Trades >=10%;
Find where WRI %>=5%; THEN
If WRI % decreases by more than 2× the increase in % of Total Trades (2× Δ Rate is negative), use previous Prediction value; ELSE Prediction >=0.60

In embodiments, the NEPAS may include a separate system to prevent substantial downside financial performance of a client's center book. This system may monitor data streams with preset triggers that signal alerts and/or events, including but limited to the examples shown in the table below:

TABLE 8

| Parameter/Trigger | Action(s) |
| --- | --- |
| ABM/REDI stream drops | Restart stream, autosave timestamp of drop for EEG/trade data removal at EOD [confirm autosave and auto-reconnect with Beau] |
| [EEG signal] online post-processed signal saturation exceeds quality threshold of current brain state window (300 s) | Predictions tied to current brain state window is excluded or turned to yellow regardless of prediction value until time window contains only clean signal |

TABLE 8-continued

| Parameter/Trigger | Action(s) |
| --- | --- |
| [Brain State] Green/Yellow/Red Prediction Equivalents based on Subject's Hold set Prediction performance | Thresholds derived from HOLD set (or TBD) for each Subject that determine the minimum Prediction value for Green/Upper Bin and the maximum Prediction value for Red/Lower Bin |
| [Financial] Subject's Bet Size is in low-confidence/high-risk cluster (defined as Bet Size >2*Stdev from Median) | Display warning message noting trade's Bet Size is outside of the model's Prediction confidence on internal dashboard<br>Prediction not sent to customer dashboard<br>Log TRUE value to database field BetSize_msg |

In embodiments of the present disclosure, the neurometric-enhanced performance assessment system NEPAS 100 may perform real-time, and/or substantially real-time, calculations and monitoring to increase the overall trading returns, such as equities or other financial trading, based at least in part on predictive modeling that may be created for the purpose of identifying and measuring brain states associated with preferred human performance outcomes.

In embodiments, the NEPAS 100 may utilize brain state data, trading/financial market data, environmental data, or some other type of data to build and maintain a plurality of predictive training models indicating the degree of association between a plurality of brain states, of a plurality of traders, and wanted/unwanted trading and/or other performance outcomes, such as trades that result in profits versus trades that result in losses. The NEPAS 100 may simultaneously build, update, and maintain a plurality of predictive models, continuously utilizing traders' brain state data, trading/financial market data and other data. Models may include predictive thresholds including, but not limited to brain state thresholds where a trader transitions from a Brain State 1 to a Brain State 2, where the Brain State 2 is a desired brain state that is associated with a wanted performance outcome, such as executing a profitable trade. Conversely, the NEPAS 100 models may include predictive thresholds including, but not limited to brain state thresholds where a trader transitions from a Brain State 2 to a Brain State 1, where the Brain State 1 is a brain state that is associated with a negative performance outcome, such as executing a trade that results in a financial loss. The plurality of predictive models that the NEPAS 100 simultaneously builds, updates, and maintains may comprise a competitive modeling environment in which the NEPAS 100 continuously monitors the relative performance of each model (including the potential need to introduce a new model(s) to the mix of competitive models) to identify which among the models is performing best given a day's (or other time frame's) market and environmental conditions. Contextual data including, but not limited to, financial trading volumes, sector performance, financial news, overall market trends, oversees market data, environmental data including, but not limited to, micro-level local financial trading desk data and macro-level national or international economic data, trading strategy, including the strategy(ies) used by a center book, risk preferences, available leverage, or some other type of data may be continuously added, removed and/or utilized as variables in the NEPAS 100 predictive models to determine the effect (e.g., statistical significance) that the inclusion or exclusion of certain data fields has on the associations and predictive power of the brain state models. As a model begins to outperform the other models that the NEPAS 100 simultaneously builds, updates, and maintains, the NEPAS 100 may substitute a new better-performing model as the "live" model on which a user/trader relies for brain state guidance for executing trades while in a preferred brain state(s).

In a simplified example, the NEPAS 100 may build, update, and maintain three competing predicative models, where the principal predictive outcome is a wanted/unwanted financial trading outcome, and the principal predictive variable is a trader's brain state, controlling for a plurality of other data relating to financial market data, environmental data, micro- and macro-economic data, financial news, or some other type of data. Continuing the example, among the three competing predictive models, there may be a Model 1, referred to in this example as the "Normative Trading Day Model," that may be based on and weighted towards reliance on 3 target brain states (Brain State 1, Brain State 2, and Brain State 3) and market data that is derived from trading sessions that closely mirror the trading activity of a long-term market average (e.g., average in terms of trading volumes, the relative absence of large market swings, such as Dow Jones Industrial Average intra-day price volatility less than 5%, and the like). A Model 2, referred to in this example as the "Trending Market Model," may be based on and weighted towards reliance on Brain States 1, 2 and 3 and market data that is derived from trading sessions that closely mirror the trading activity of a trending market average (e.g., in terms of intra-day trading volume upward or downward spikes, the presence of significant macro-market price movements (positive or negative), such as Dow Jones Industrial Average intra-day price increase/decrease greater than 5%, and the like). A Model 3, referred to in this example as the "Breaking News Model," may be based on and weighted towards reliance on Brain States 1, 2 and 3 and market data that is derived from trading sessions occurring during periods of high-volatility, such as volatility that is based at least in part on uncertainty introduced by newsworthy events, be they financial news, political news or some other type of news impacting market behavior and pricing (positive or negative), such as an underperforming IPO rollout, a terrorist attack, an unexpectedly high earnings announcement in a market sector, the introduction of legislation, or some other news or event impacting financial markets. Continuing the example, a New York-based trader may begin a trading session at the market opening on a Wednesday morning. In this example, the trading thus far during this week (i.e., trading on Monday and Tuesday, including overnight trading in international markets) has been normative trading insofar as there has been little market volatility in terms of longer-term market volume and/or pricing averages on the Dow Jones Industrial Average, overnight on the Hang Seng and/or other markets of interest. At the opening of the trading session, the NEPAS 100 may continuously run Models 1, 2, and 3 to determine which is showing the best performance characteristics at that moment on Wednesday morning. Because the early morning trading indicates a normative, low-volatility market, Model 1, the "Normative Trading Day Model," is activated as the "live" predictive model on which actual trading/brain state evaluations and recommendations may be presented to a user/trader in real time for the purposes of evaluating trading timing and options. Trading options may include, but are not limited to, a trader opening a position, expanding a position, reducing a position, exiting a position, optioning a position, placing a trading option on a "watch list" (or other means of tracking its specific trading/pricing activity for future reference), or some other type of trading activity. With a dashboard associated with the NEPAS 100 a trader, floor manager or other entity (including an automated decision-making entity) may set a confidence level at, or above which a trading/brain state recommendation must meet, based on the predicted likelihood of success generated by the "Normative Trading Day Model." As the trader utilizes the trading/brain state recommendations, the NEPAS 100 may continue to run Models 2 and 3 to compare their relative performance to Model 1. In an embodiment, the recommendations may be utilized by a center book manager, or other type of trading strategy manager, including a third party, to build a center book or other manifestation of trading strategy to deploy among traders. Continuing the example, over the course of Monday morning, the trading markets begin showing a trend of increased trading volume and greater pricing volatility. As this trend manifests, the NEPAS 100 measures a degradation in Model 1's performance, and an improvement in Models 2 and 3, although Model 1 retains an optimal performance relative to Models 2 and 3. Because Model 1 is performing the best, it remains the "live" predictive model presented to the user/trader. At noon on the same day, Wednesday, the Financial Times breaks a story out of Hong Kong that a multinational bank subsidiary there has uncovered a rogue trader that has exposed the bank to multibillion dollar losses and called into question the recent price increases in equities of a group of technology companies in which this rogue trader has taken large positions. As the news hits, the markets react with a marked increase in market trading volumes, and in significant downward trends in the equity pricing of technology sector stocks. As this trend manifests, Model 1's performance may markedly degrade and the NEPAS 100 may indicate that Model 3, the "Breaking News Model," is performing the best among the three Models, and the NEPAS 100 may replace Model 1 with Model 3 as the "live" predictive model on which trading/brain state recommendations are made.

The Model 3 in this example, as well as the other Models, is evaluating market data as part of determining brain states that are associated with desired performance outcomes, but that the Models are also accounting for, and are weighted by, the context in which the brain states are measured. For example, in a normative trading day/pattern a given brain state as, for example, measured by EEG, may be given less weight in a NEPAS predictive model because that brain state is more frequently obtained and maintained in a trading environment that is considered relatively typical. This same brain state when obtained and measured in a relatively hectic trading condition, such as in the current example where negative news is dramatically impacting trading activity, may be given greater predictive weight because it is, stated colloquially, a quantitative indicator of grace under pressure and may be indicative and predictive of a trader that has not "lost her cool," but rather remains able to keep her focus and judgement when executing trades, which is of greater value in a hectic market, relative to the same brain state during a normative trading day. In embodiments, the same or similar brain state may further be advantageous and preferred in one environmental context (e.g., market condition), but unpreferred in a different environmental context. In embodiments, there may be interpersonal differences in traders in the degree of predictive validity that the brain state-to-performance outcome obtains. Stated differently, a similar brain state, for example as measured by EEG, in Person 1 may be highly predictive of beneficial trades in Market Condition X, but of only weak predictive power for Person 2 in the same Market Condition X. The same brain state that functions well for Person 1 in Market Condition X, may not function well in Market Condition Y. The NEPAS 100, by continuously building, updating, and maintaining competing models, utilizing machine learning techniques, including but not limited to mixture of experts techniques, may be able to select the optimum predictive model to a user/trader based at least in part on data known about that user/trader, the current market conditions, or some other type of data relevant to financial trading.

In embodiments, the NEPAS 100 may time-synchronize events, such as market events, with brain state and other environmental data so that multivariate modeling may be performed to determine which variables are most relevant to predictive modeling of a given outcome of interest. Events may be utilized as independent variables in modeling, or sequences of events and/or brain states may be used in time series or other modeling types to determine event and/or brain state ordering that are predictive of performance outcomes of interest. Such modeling may enable the predictive models to be operationalized in a trading environment. For example, the predictive modeling and recommendations may be operationalized for a user/trading by presenting within a dashboard visual feedback guiding and informing the user/trader when he is in a preferred brain state that is associated with a performance outcome of interest. Additionally, the predictive modeling and recommendations may be operationalized for an automated trading system, for example, where an automated trading system executes a trade or a series of trades based on the trading activity of a human trader, or group of human traders, that is in a preferred brain state(s) that is associated with a performance outcome of interest. In embodiments, an automated trading process may take users/traders offline and restrict them from having permission to execute trades when the NEPAS 100 indicates that the user/trader is in a brain state that is associated with an unwanted performance outcome and the NEPAS 100 may bring them back online with permission to once again execute trades only once the user/trader obtains a brain state that is associated with a performance outcome of interest. A dashboard associated with the NEPAS 100 may provide cues, stimuli, feedback (including biofeedback or other sensory impulses), or other data to the user/trader that are predictive of assisting a human in reaching a desired brain state, and knowing once she is in a desired brain state. Once a user/trader obtains a desired brain state that is associated with a wanted performance outcome, the NEPAS 100 may require the user/trader to demonstrate an ability to remain in that brain state for a stated period of time before the user/trader is granted trading privileges. Trading privileges may be graduated based on the user's/trader's brain state and/or duration of maintaining a brain state. For example, as a user demonstrates an ability to remain in a preferred brain state that is associated with the wanted performance outcome, and as that time duration of the user/trader remaining in that preferred brain state increases, the NEPAS 100 may coordinate with a trading platform to graduate the permissions associated with the user/trader so that the longer the trader maintains the preferred brain state, the greater the value of the permitted trades she is allowed to make.

In embodiments, the NEPAS 100 may customize predictive models to individuals, such as traders or other financial industry users, so that a plurality of brain states are modeled for wanted/unwanted performance indicators. Individual traders may employ a plurality of trading strategies and the NEPAS 100 may customize predictive models to individuals and those individuals' plurality of trading strategies, so that a plurality of brain states are modeled for wanted/unwanted performance indicators within a plurality of trading contexts in which traders are executing trades using multiple types of trading strategies. In an example, the NEPAS 100 dashboard or other facility may include a means for a user/trader to indicate the type of trading strategy they intend to use for a given session. Based at least in part on this data the NEPAS may make "live" the predicative model that has shown the greatest predictive utility for this trading strategy. This may be based on data know about this particular trader using this trading strategy, or it may be based on a plurality of traders who have used the trading strategy. As described herein, although one particular predictive model may be selected as the "live" model from which data and recommendations are presented to a user/trader, the plurality of alternate models may continue to be run by the NEPAS 100 in a competitive manner to continuously monitor performance and maintain the ability to swap out an underperforming predicative model for a better performing predictive model, for example, as might occur during changes of trading conditions, strategies and the like.

In an example of one type of model that may be deployed within NEPAS 100, brain states may be constructed via 24×24 matrices, built by 4 EEG amplitude bands (condensed from 20 channels) broken into 6 principal components. Offline, k-means clustering may be used on acquired EEG data to identify 6 discrete clusters, 'states' into which the matrices can fall, out of this state clustering there may be centroids. In real-time, or substantially real-time, each FC matrix generated (per second) may be given a state label based on minimal centroid distance to one of the 6 offline calculated states. Such real-time, or substantially real-time, state labeling may be used by the NEPAS to output a prediction of profit in real-time. In embodiments, logistic modeling may be used whereby discrete brain states may predict dichotomous profit or loss of a FIFO return dependent variable. Parameter weights from this model may be used to identify the state(s) that most reliably predicts profit, reliably predicts loss, and those states that are not associated with either. In real-time, or substantially real-time, functional connectivity matrices of EEG signals may be generated at an interval, such as every second, and at any given second, specifically tied to the moment of a trader's order. A prediction of profit may be sent to a mirror account of that order based on the probability of profit that is generated by the 300 second window of labeled brain states that immediately preceded the order. The online calculation is such that, when the model has seen this type of 300 second sequence of states before, it predicted profit x % of the time.

In embodiments, a model may be updated (i.e., retrained) at an interval, such as weekly, with new data. Model training may include, for example, the most recent week's data being used as a holdout set (e.g., for center book threshold setting) with the prior week (e.g., brain+finance data concatenated .mat data) used as inputs to the model. In an example, prior to weekly model implementation, a model may be tested for sufficient model accuracy, prediction value distribution, and holdout threshold performance in center book simulation (i.e., model fit at the level of center book). To verify the quality of an EEG signal, a combination of manual/automatic checks may be done across various time horizons (e.g., real-time/daily/weekly).

In embodiments, the NEPAS 100 may utilize financial performance data from traders via direct access to a financial institution's system, and the NEPAS predictive system may use direct data feeds of trading information including: trade value (bet size), time stamp of trade, trader making the trade, asset traded, value of asset traded, units traded, or some other information type. Real-time market data may be streamed and saved along with institution-provided end-of-day reports (e.g., as back-ups). Daily finance data may be used for tableau-derived daily reports and model training. In the listing below, selected NEPAS processing steps, failure points and solutions are shown:

TABLE 9

| Processing Step | Failure Point | Solution |
| --- | --- | --- |
| Set up client/Check impedance prior to acquisition | High impedance (red) | Additional gel/electrode adjustment, time to saturate (early set up) |
| Continuous stream Monitoring | high noise/extended bet size alerts/extended neutral recommendations/no recommendations | Vis stream continuous monitoring and/or manual electrode adjustment. For bet size, prediction or recommendation issues, take note and confer with tech support/(Beau)/EOD daily report and do not send recommendation to client dashboard |
| XDF upload | XDF incomplete file | Verify xdf size (including multiple XDFs if labkit was stopped and restarted) and dropbox upload per subject |
| EOD automatic preprocessing (EEG) | Preprocessing scripts unavailable/corrupt | Update script |
| Multi-taper spectrogram for each data segment | Bad segments of data (exceed spectogram threshold) | Remove segments that exceed threshold |
| Compute percent of outliers zeroed out, compare against predetermined thresholds | XX % outliers | Decision whether or not to include this days data in next week's training set |
| Visually inspect time-series (raw and preprocessed) for signal quality | Overall poor data quality (combined with above steps based on XX number of poor segments/outliers) | Decision in daily report meeting whether to include current day in next week training set |

In embodiments of the present disclosure, real-time data collection and the real time EEG predictive modeling may be integrated into a single system. The prediction generated from this integrated system may flow into a client dashboard and include a system to mitigate large center book losses. In embodiments, the NEPAS 100 may use live trader data.

In an example embodiment, the NEPAS 100 may include a systematic collection process of trading data for a plurality of traders, where each trader in this example needs at least 500 trades during the collection period. Data collected by the NEPAS 100 may include: Equity traded; Real time EEG data provided by the ABM X-24; Time traded; Value of trade; Units traded; Associated trader; Heart rate; Electrodermal activity (EDA); Pupillometry; Eye gaze; and/or Functional near infrared spectroscopy (fNIRS).

The NEPAS 100 may use buying decision data (e.g., entries and adds) collected from the plurality of traders to train a selected optimal model to predict the outcome of a trade (profit or loss). After a training phase of the model, the NEPAS may collect trading data from a financial institution's training system. Trade data from the training system may be processed in real-time, or substantially real-time, and assigned a predictive accuracy score. This score may range from 0%-100%. 0% indicates no confidence of a good buying decision and 100% indicating complete confidence that the buying decision was a good decision.

In embodiments, upon the occurrence of a trade, detailed data (e.g., units, total value, trader, and time) may be transferred to the NEPAS 100 in real-time, or substantially real-time. The predictive model may process each trade from each trader and assign a predictive assessment for buy trades in real-time, or substantially real-time. The NEPAS 100 may deliver a predictive assessment, for example back to a client, in real-time, or substantially real-time. If the model detects data or predictive anomalies, an alert system of the NEPAS 100 may notify the team for additional investigation. If a data stream or process required for this NEPAS 100 system to work are disrupted, an alert may be provided for additional investigation.

In embodiments, the NEPAS 100 may create a real-time dashboard that may be used to make center book trading decisions. The trade data (e.g., ticker, units, total spend, buy/add) and its associated probability for profit generated by the real-time analysis of the NEPAS 100 may be displayed in this dashboard. Additional user interfaces may replicate this dashboard. User interfaces may differ in that one dashboard may show the percentage (confidence level) associated with each prediction whereas an alternate dashboard, such as a client dashboard, may use a color coding to indicate recommended predictions, versus those that are not recommended, to support decision making. In an example, the colors may consist of green (recommend) and red (do not recommend). Green/red bin thresholds may be defined as follows: Using a model trained on the entire set of trade data available (per trader) less a defined hold set period, evaluate model performance using the hold set by, for example, the following criteria:

Find where % of Total Trades >=10%;

Find where WRI %>=5%; THEN

If WRI % decreases by more than 2× the increase in % of Total Trades (2× Δ Rate is negative), use previous Prediction value; ELSE Prediction >=0.60

In embodiments, the NEPAS 100 may include a separate system to prevent substantial downside financial performance of a client's center book. This system may monitor data streams with preset triggers that signal alerts and/or events including but limited to the examples shown in the table below:

TABLE 10

| Parameter/Trigger | Action(s) |
| --- | --- |
| ABM/REDI stream drops | Restart stream, autosave timestamp of drop for EEG/trade data removal at EOD [confirm autosave and auto-reconnect with Beau] |
| [EEG signal] online post-processed signal saturation exceeds quality threshold of current brain state window (300 s) | Predictions tied to current brain state window are excluded or turned to yellow regardless of prediction value until time window contains only clean signal |
| [Brain State] Green/Yellow/Red Prediction Equivalents based on Subject's Hold set Prediction performance | Thresholds derived from HOLD set (or TBD) for each Subject that determine the minimum Prediction value for Green/Upper Bin and the maximum Prediction value for Red/Lower Bin |
| [Financial] Subject's Bet Size is in low-confidence/high-risk cluster (defined as Bet Size >2*Stdev from Median) | Display warning message noting trade's Bet Size is outside of the model's Prediction confidence on internal dashboard Prediction not sent to customer dashboard Log TRUE value to database field BetSize_msg |

FIGS. 51 through 54 illustrate exemplary embodiments of the user interface of the NEPAS 100, the user interface showing a comparison of actual trades executed by a trader to optimal trades determined by one or more of the predictive models. In embodiments, the user interface may include one or more of a distribution of trades by prediction bin, model thresholds, trader results, model results, and a prevalence and centroid comparison. The distribution of trades by prediction bin may include metrics (# of trades, % of trades, etc.) related to a plurality of predictive bins, such as an upper bin, a middle bin, and a lower bin. The model thresholds may include metrics related to an upper bin threshold, a lower bin threshold, and/or a bet size threshold. The trader results may include daily trader metrics and/or overall trader metrics, and the trader metrics may be one or more of a number of trades completed, a percentage of return on completed trades, and a win rate. The model results may include daily model metrics and/or overall metrics for one or more predictive models, and the model metrics may be one or more of a number of trades predicted/suggested, a percentage of return on predicted/suggested trades, and win rate for predicted/suggested trades, and a WRI value for predicted/suggested trades versus trades made by the trader. The prevalence and centroid comparison may include one or more of a prevalence over a period of time, a shift in prevalence, a centroid over a period of time, and a shift in centroid across a plurality of brain states.

In embodiments, the user interface may include a plurality of charts and/or graphs. The charts and/or graphs may display visual data indicative of one or more of an equity curve, model vs. trader win rate, trader profit and drawdown, model profit and drawdown, and prediction distribution and WRI. The equity curve chart may include a visual representation of return percentage by date for one or more predictive models and for the trader. The model vs. trader win rate chart may include a visual representation of win rates by date for one or more predictive models and for the trader. The trader profit and drawdown chart may include one or more visualizations of profit and drawdown amounts by the trader over a period of time. The model profit and drawdown chart may include one or more visualizations of profit and drawdown amounts by the model over a period of time. The prediction distribution and WRI chart may include time-based (e.g., daily, weekly, total) prediction distributions for one or more models, and may include visualized WRI metrics for the distributed predictions.

In embodiments, the user interface may include one or more performance reports for the trader. The performance reports may be based on time, periods, such as daily, weekly, or overall trade performance, and may include trader, model, and/or center book metrics. The performance reports may include one or more metrics such as open or closed trade status, number of trades, whether trades aligned with model predictions/recommendations, currency amount invested, return percentage, win rate, WRI, and the like. The performance reports may be disclosed via the user interface as tables, charts, graphs and/or a plurality thereof.

In embodiments, the neurometric-enhanced performance assessment system (NEPAS) 100, as described herein, may select or create a set of assessment tasks to assess whether a set of brain states of a set of persons, such as a group of expert workers, is related to the workers' performance and/or a plurality of desired task outcomes. In one implementation, the NEPAS 100 may select or create a set of assessment tasks to assess whether a set of brain states of a set of persons, such as a group of expert workers, is related to the workers' performance and/or a plurality of desired task outcomes. In one implementation, an assessment task may be an enterprise activity involving a set of decisions by a first set of expert workers, where the operational performance model includes at least a set of input data sets, a set of data processing workflows operating on the input data sets, and a set of decision outputs resulting from interaction of expert workers with a user interface representing the operational performance model. A brain state model may be generated representing a sequential set of brain states of the first set of expert workers that characterize brain states measured during the interactions of the expert workers with the user interface representing the operational performance model, and the quality of the decision outputs may be assessed based at least in part on assessing the quality of the decision outputs, determining a preferred pattern of brain state sequences, and modifying a subsequent enterprise activity based on determining the preferred pattern of brain state sequences.

In embodiments, modifying the subsequent enterprise activity may include iteratively adjusting guidance to the expert workers and measuring resulting patterns of brain states across a set of enterprise activity sessions to result in an improved set of guidance for the enterprise activity and an improved model of preferred expert worker brain state patterns for the enterprise activity.

In embodiments, modifying the subsequent enterprise activity may include mirroring the decisions of a selected subset of the first set of expert workers across a set of enterprise activities other than the ones in which the first set of workers is engaged.

In embodiments, modifying the subsequent enterprise activity may include preferentially using decisions made by expert workers during periods when they manifest brain states that correspond to the preferred pattern of brain sequences.

In embodiments, modifying the subsequent enterprise activity may include undertaking a set of actions to induce the preferred pattern of brain states before or during performance of the enterprise activity by a set of workers.

In embodiments, modifying the subsequent enterprise activity may include providing a set of simulations of the enterprise activity during which the set of expert workers is trained to induce the preferred pattern of brain states.

In embodiments, modifying the subsequent enterprise activity may include providing a set of simulations of the enterprise activity during which the set of expert workers is trained to recognize the preferred pattern of brain states.

In embodiments, the assessment of the quality of the decision outputs may include measuring a set of outcomes resulting from the set of decisions.

In embodiments, the assessment of the quality of the decision outputs may include rating the set of decisions based on their alignment to a decision-making model.

In embodiments, the assessment of the quality of the decision outputs may include a set of self-assessments by the set of expert workers of the set of decisions.

In embodiments, the assessment of the quality of the decision outputs may include a set of expert ratings of the set of decisions.

In embodiments, a trading performance model may be generated by the NEPAS 100 for a trading activity involving a set of decisions by a first set of expert traders, where the trading performance model includes a set of input data sets, a set of data processing workflows operating on the input data sets, and a set of trading decision outputs resulting from interaction of expert traders with a user interface representing the trading performance model. The NEPAS may generate a brain state model representing a sequential set of brain states of the first set of expert traders that characterize brain states measured during the interactions of the expert traders with the user interface representing the trading performance model, and assess the quality of the trading decisions based at least in part on assessing the quality of the trading decisions, determining a preferred pattern of trader brain state sequences, and modifying a subsequent trading activity based on determining the preferred pattern of brain state sequences.

In embodiments, the assessment of the quality of the decision outputs may include measuring a set of financial outcomes resulting from the set of trades resulting from the trading decisions.

In embodiments, the assessment of the quality of the decision outputs may include rating the set of trading decisions based on their alignment to a trade decision-making model.

In embodiments, the assessment of the quality of the decision outputs may include a set of self-assessments by the set of expert traders of the set of trading decisions.

In embodiments, the assessment of the quality of the decision outputs may include a set of expert ratings of the set of trading decisions.

In embodiments, modifying the subsequent enterprise activity may include iteratively adjusting trading guidance to the expert traders and measuring resulting patterns of brain states across a set of trading sessions to result in an improved set of trading instructions and an improved model of preferred brain state patterns for the trading activity.

In embodiments, modifying the subsequent enterprise activity may include mirroring the decisions of a selected subset of the first set of expert traders in a different set of trading activities of the enterprise.

In embodiments, modifying the subsequent enterprise activity may include preferentially executing trades recommended by expert traders during periods when they manifest brain states that correspond to the preferred pattern of brain sequences.

In embodiments, modifying the subsequent enterprise activity may include undertaking a set of actions to induce the preferred pattern of brain state sequences before or during performance of trading by the expert traders.

In embodiments, modifying the subsequent enterprise activity may include providing a set of simulations of the trading activity during which the set of expert traders is trained to induce the preferred pattern of brain states.

In embodiments, modifying the subsequent enterprise activity may include providing a set of simulations of the trading activity during which the set of expert traders is trained to recognize the preferred pattern of brain states.

In embodiments, the NEPAS 100 may challenge, prompt, or persuade an expert population of subjects, such as financial traders, to complete a set of tasks (e.g., executing financial trades) while being monitored by a set of sensors associated with the NEPAS 100, in order to measure the experts' performance on the tasks while simultaneously collecting brain activity data from the sensors that are monitoring the expert subjects.

In embodiments, the NEPAS 100 may build an operational performance model based at least in part on the data derived from monitoring the expert subjects. The operational performance model may include a set of input data sets, a set of data processing workflows operating on the input data sets, and a set of decision outputs resulting from interaction of expert workers with a user interface representing the operational performance model. A brain state model may be generated representing a sequential set of brain states of the set of expert workers that characterize brain states measured during the interactions of the expert workers with the NEPAS 100 user interface representing the operational performance model, and a preferred pattern of brain state sequences may be identified. The NEPAS 100 may compare an individual's brain state, sequence of brain states and/or performance with the models based on the expert population of subjects. Based at least in part on that comparison, the NEPAS 100 may predict how an individual will perform in a real-world financial trading activity, for example, either with or without completing a training program. In one implementation, the prediction relates to how well the person will most likely perform the tasks that he/she trained upon after completing a training program, such as a trading simulation environment. Also or alternatively, the NEPAS 100 may predict an amount of time that the individual will need to train to improve their performance to a level approximating the performance of the experts on the basis of the individual's performance on, and brain activity during performance on, a set of screening tasks, in relation to the data about performance and brain activity for the population of expert subjects.

In embodiments, the degree to which a novice subject is able to approximate the performance and brain activity for the population of expert subjects may be used to determine the efficacy of a training program, one purpose of which may be to assist novice subjects in identifying, obtaining, and maintaining preferred brain states achieved by the population of experts when executing preferred financial trades. The NEPAS 100 may use this data to construct a predictive heuristic model based at least in part on a sub-population of subjects within a training program, trading simulation or the like, after completing trading screening tasks a first time, and before completing the trading screening tasks a second time, while collecting brain activity data from the sub-population both the first and second times. The NEPAS 100 may construct a second predictive heuristic model that predicts the expected efficacy of a trading training or trading simulation regimen, based at least in part on a comparison of the first-time and second-time performances on the screening task, along with corresponding brain activity data, and the degree of approximation to the performance and brain activity for the population of expert subjects. The second predictive heuristic model may be used to predict the degree to which a trading training or trading simulation regimen is enhancing novice subjects with the skills shown by the expert subjects.

Integrated Financial Trading Platform

In various implementations, the NEPAS 100 may be integrated with the trading platform 900 to enhance the ability of the NEPAS 100 and/or the trading platform 900 to efficiently interact with financial markets and/or predict the future performance of financial instruments. Generally, traders may be provided with neurometric interfaces 120. As the trader interacts with the integrated trading platform 900, the NEPAS 100 continuously monitors the brain state of the trader, capturing a snapshot of the trader's brain state at critical times, such as the moment the trader an event occurs—for example, the event may be the trader initiating a trade order. The NEPAS 100 transforms the captured brain state into a brain state score according to any of the methods in this disclosure.

In various implementations, the integrated trading platform 900 uses the brain state score to enhance its functionality. For example, the trading platform 900 may use machine learning models and/or other methods to perform any of the functions listed below in Table 11.

TABLE 11

Example Functionality of the Trading Platform 900

Determine an optimal entry and exit point for any given financial instrument
Determine an optimal exchange or venue on which to trade a given financial instrument
Determine when to cross a bid-ask spread for a given financial instrument
Automatically adjust order characteristics such as the bid price, ask price, or exchange on which to trade a given financial instrument according to real-time and/or historical market data
Use bid/ask prices on venues to determine aggression levels for orders
Use "print data" on venues to determine aggression levels for orders
Use market data for a given financial instrument and/or related financial instruments to determine aggression levels for orders
Use options print data to determine aggression levels for orders TABLE 11-continued Example Functionality of the Trading Platform 900

Scrape news feeds to determine potential short-term catalysts for underlying movements
Determine performance characteristics for any given financial instrument based on time of day
Determine how to manage orders for a given financial instrument based on total volume and/or
standard forms and filings The trading platform 900 may use the captured brain score generated by the NEPAS 100 to enhance any of the functionality described in Table 11 above.

In various implementations, the NEPAS 100, the trading platform 900, or an integrated combination of the NEPAS 100 and the trading platform 900 may determine and/or automatically initiate an optimal sequence of events based on the trade order initiated by the trader, the brain state score, and/or any underlying data about the traded financial instrument or financial market.

Flowcharts and Message Sequence Charts

Figure 55:
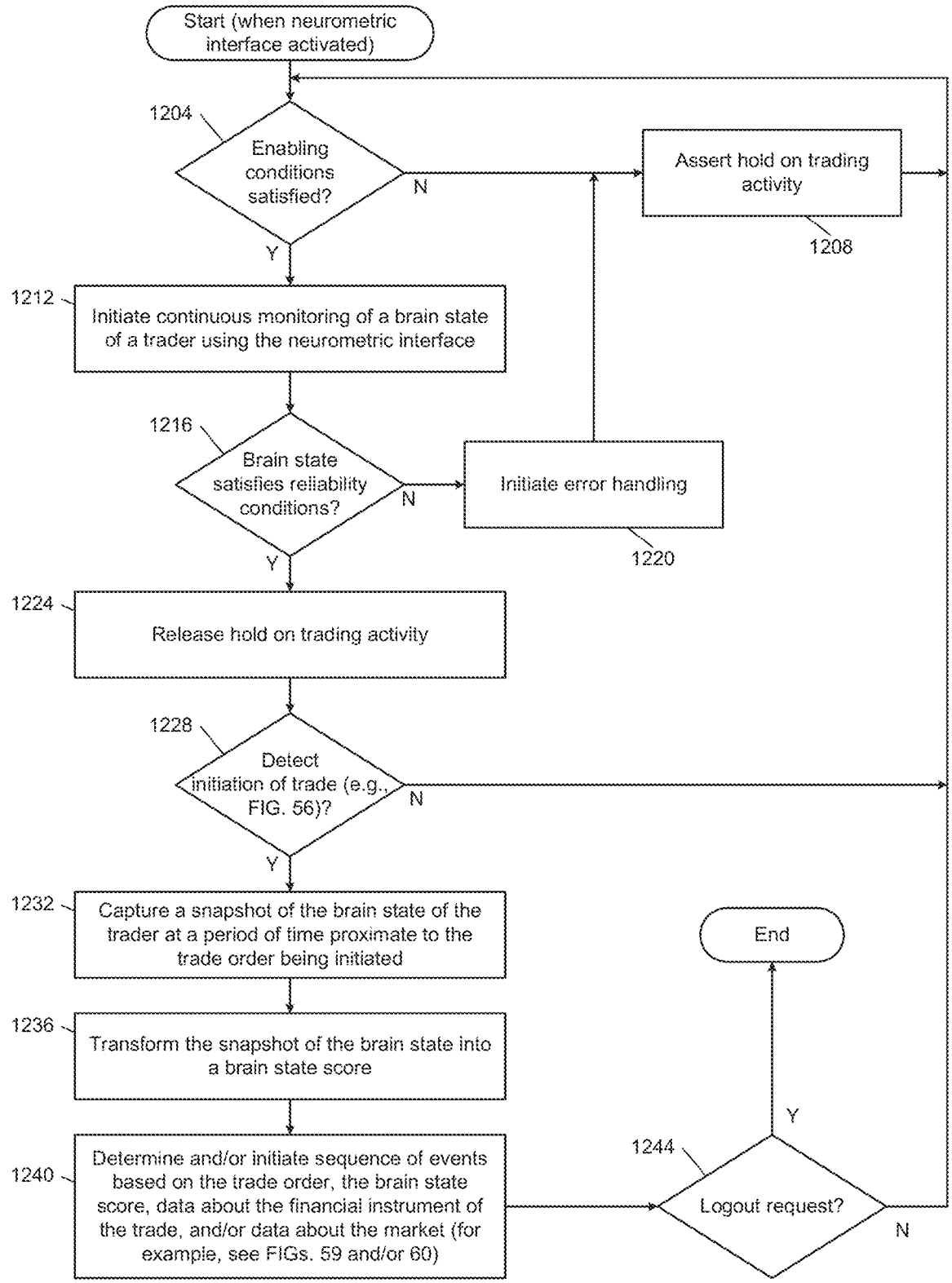
FIG. 55 is a flowchart of an example method of determining and/or initiating an optimal sequence of events based on a calculated brain state score and other data.

FIG. 55 is a flowchart of an example method of determining and/or initiating an optimal sequence of events based on the calculated brain state score and other data. In FIG. 55, control begins at 1204 in response to activation of a neurometric interface, such as neurometric interface 120. For example, a trader may be equipped with the neurometric interface 120, and the NEPAS 100 and the neurometric interface 120 may be initialized. At 1204, control determines whether enabling conditions for the NEPAS 100 and/or neurometric interface 120 are satisfied. In various implementations, these enabling conditions may include whether or not certain privacy conditions are satisfied. For example, the enabling conditions may include whether or not the trader has provided informed consent for his or her neural data to be monitored, recorded, and/or used. In various implementations, the enabling conditions may include whether or not the trader has given a generalized consent for his or her activities on the NEPAS 100 and/or trading platform 900 to be monitored and/or recorded. In various implementations, the enabling conditions may be satisfied by the trader providing consent through a user interface generated by the NEPAS 100 and/or the trading platform 900. If at 1204, the enabling conditions are not satisfied, control proceeds to 1208. At 1208, control may place a restriction on trading activity. For example, the NEPAS 100 may generate and send a signal to the trading platform 900 to prevent the trader from initiating or executing any trades. In other implementations, the restriction may be a limit on total dollar amount of the order, a prevention of trades of any security having more than a threshold risk of volatility, the requirement that some or all trades be approved by a second set of eyes, etc. From 1208, control proceeds back to 1204. If at 1204, the enabling conditions are satisfied, control proceeds to 1212.

At 1212, control initiates continuous monitoring of a brain state of the trader using the neurometric interface 120. For example, the NEPAS 100 may continuously receive brain state signals from the neurometric interface 120 and record them to memory hardware. For example, the brain state signals may be stored in a circular buffer structure such that brain state signals are retained for a certain period of time before being replaced by newer signals. The size of the circular buffer may be dependent on system latency, such that greater latency requires a larger buffer.

Control proceeds to 1216. At 1216, control determines whether the brain state signals received at 1212 satisfy reliability conditions. For example, control may determine whether the brain state signals meet certain quality and/or strength conditions. Poor signal quality and/or strength may be indicative of the neurometric interface 120 being improperly positioned on the trader, and/or of poor physical or wireless connections between the neurometric interface 120 and the NEPAS 100. If the signal quality and/or strength from the neurometric interface 120 is below a quality threshold, then the NEPAS 100 may determine that the brain state signals do not satisfy reliability conditions. If at 1216, the brain state signal does not satisfy reliability conditions, control proceeds to initiate error handling at 1220.

At 1220, error handling is initiated. For example, error handling may include the NEPAS 100 generating and transforming a user interface to display troubleshooting steps. In various implementations, the NEPAS 100 may generate and output audible troubleshooting steps through a digital-to-analog converter (DAC), an amplifier, and speakers and/or headphones. In various implementations, the troubleshooting steps may instruct the trader to remove and reposition the neurometric interface 120 on the trader's body, adjust the position of the neurometric interface 120 on the trader's body, physically adjust or reconnect connection points between the neurometric interface 120 and the NEPAS 100, and/or re-pair or wirelessly reconnect the neurometric interface 120 and the NEPAS 100. In various implementations, the NEPAS 100 may automatically re-pair or wirelessly reconnect the neurometric interface 120 and the NEPAS. Once the NEPAS 100 initiates error handling though in some implementations without waiting for the error handling to conclude control transfers to 1208.

If, at 1216, the NEPAS 100 determines that the brain state signal satisfies reliability conditions, control proceeds to 1224. At 1224, the NEPAS 100 releases any holds on trading activity. For example, the NEPAS 100 may generate and send a signal to the trading platform 900 to permit the trader to initiate and/or execute trades. Control proceeds to 1228. At 1228, the NEPAS 100 and/or the trading platform 900 detect whether the trader has initiated a trade for a financial instrument on the trading platform 900. If at 1228, the NEPAS 100 and/or the trading platform 900 detects that the trader has not initiated a trade, control proceeds back to 1204. If at 1228 the NEPAS 100 and/or the trading platform 900 detects that the trader has initiated a trade, control proceeds to capture a snapshot of the brain state of the trader at a time corresponding to the time the trade order was initiated at 1232.

At 1232, the trading platform 900 may generate and send a trade signal including a timestamp of when the trade was initiated. In various implementations, the trading platform 900 may generate and send a trade package including details about the initiated trade. For example, the details may include data about the financial instrument traded, the price of the trade, the quantity of the trade, a timestamp of when the trade was initiated, historical data about the trader, historical data about the financial instrument, and/or historical data about the market. After receiving the trade signal and/or the trade package, the NEPAS 100 may extract the timestamp indicative of when the trade was initiated and identify the relevant data from the captured brain state signal stored on the non-transitory storage medium corresponding to the trader's brain state at a period of time proximate to the trade being initiated. The NEPAS 100 may extract the relevant data from the captured brain state signal and save the extracted data as a snapshot of the brain state of the trader at the time the trade was initiated. In various implementations, the captured snapshot may include data indicative of the trader's brain state at the precise moment the trade was initiated. In various implementations, the captured snapshot may include data from a period of time before the trade was initiated and/or a period of time following the trade. Control proceeds to 1236.

At 1236, the NEPAS 100 transforms the snapshot of the brain state into a brain state score according to any of the previously described methods. Control then proceeds to 1240. At 1240, the NEPAS 100, the trading platform 900, or the integrated combination of the NEPAS 100 and the trading platform 900 may determine and/or automatically initiate a sequence of events based on data from the trade order, the brain state score of the trader, data about the financial instrument traded, and/or data about the market. Control then proceeds to 1244, where the NEPAS 100 and/or the trading platform 900 monitors for a logout request from the trader. If at 1244, the NEPAS 100 and/or the trading platform 900 detects a logout request, the trader is logged out of the NEPAS 100 and/or the trading platform 900 as appropriate, and the process ends. Otherwise, control proceeds back to 1204.

Figure 56:
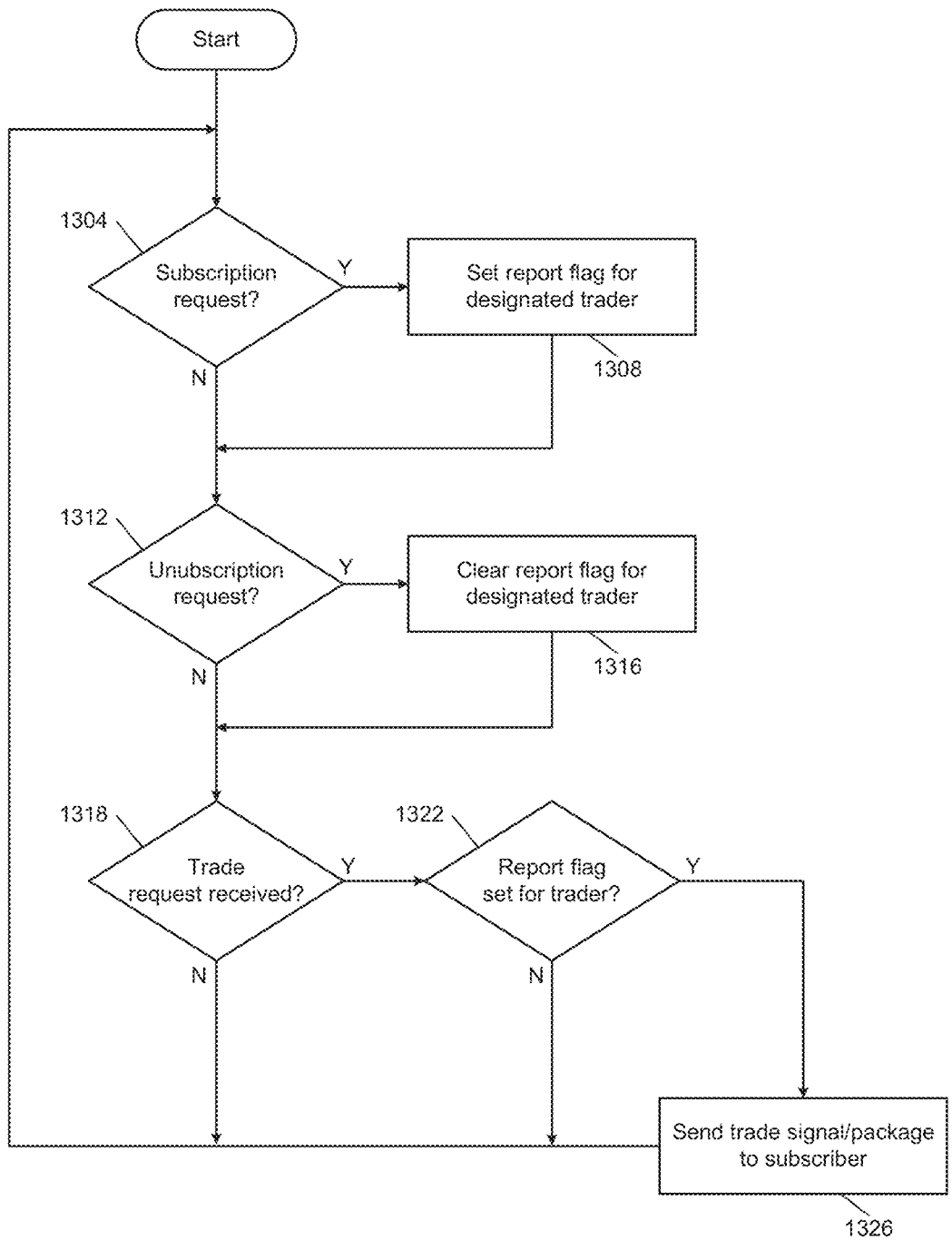
FIG. 56 is a flowchart of an example method of detecting the initiation of a trade.

FIG. 56 is a flowchart of an example method of detecting the initiation of a trade at 1228 of FIG. 55. At 1304, the trading platform 900 monitors for a subscription request from the NEPAS 100. In various implementations, the subscription request includes identifiers for the trader whose brain state is being monitored by the neurometric interface 120, and data indicating that the trader's trades should be flagged. If at 1304, the trading platform 900 receives the subscription request, the trading platform 900 sets a report flag for the designated trader at 1308. The report flag may be a marker or an indicator associated with the persona of the designated trader in the trading platform 900. The report flag may indicate that data about the trades of the designated trader should be sent to the NEPAS 100. Control proceeds to 1312. If at 1304 the trading platform 900 has not received the subscription request, control proceeds to 1312. At 1312, the trading platform 900 monitors for an unsubscription request from the NEPAS 100. In various implementations, the unsubscription request includes identifiers for the trader whose brain state is being monitored by the neurometric interface and data indicating that the trader's trades should no longer be flagged. If at 1312 the trading system receives an unsubscription request, control proceeds to 1316. Otherwise, control proceeds to 1318. At 1316, the trading platform 900 removes the report flag from the persona of the trader and proceeds to 1318.

At 1318, the trading platform 900 determines whether a trade request has been received. If at 1318 the trading platform 900 determines that a trade request has been received, control proceeds to 1322. Otherwise, control proceeds back to 1304. At 1322, the trading platform 900 parses the trade request and determines whether a trade flag is present in the persona of the trader initiating the trade. If at 1322 the trading platform 900 detects a trade flag in the persona of the trader, control proceeds to 1326. Otherwise, control proceeds back to 1304. At 1326, the trading platform 900 sends the trade signal and/or trade package to the subscriber (such as the NEPAS 100).

Figure 57:
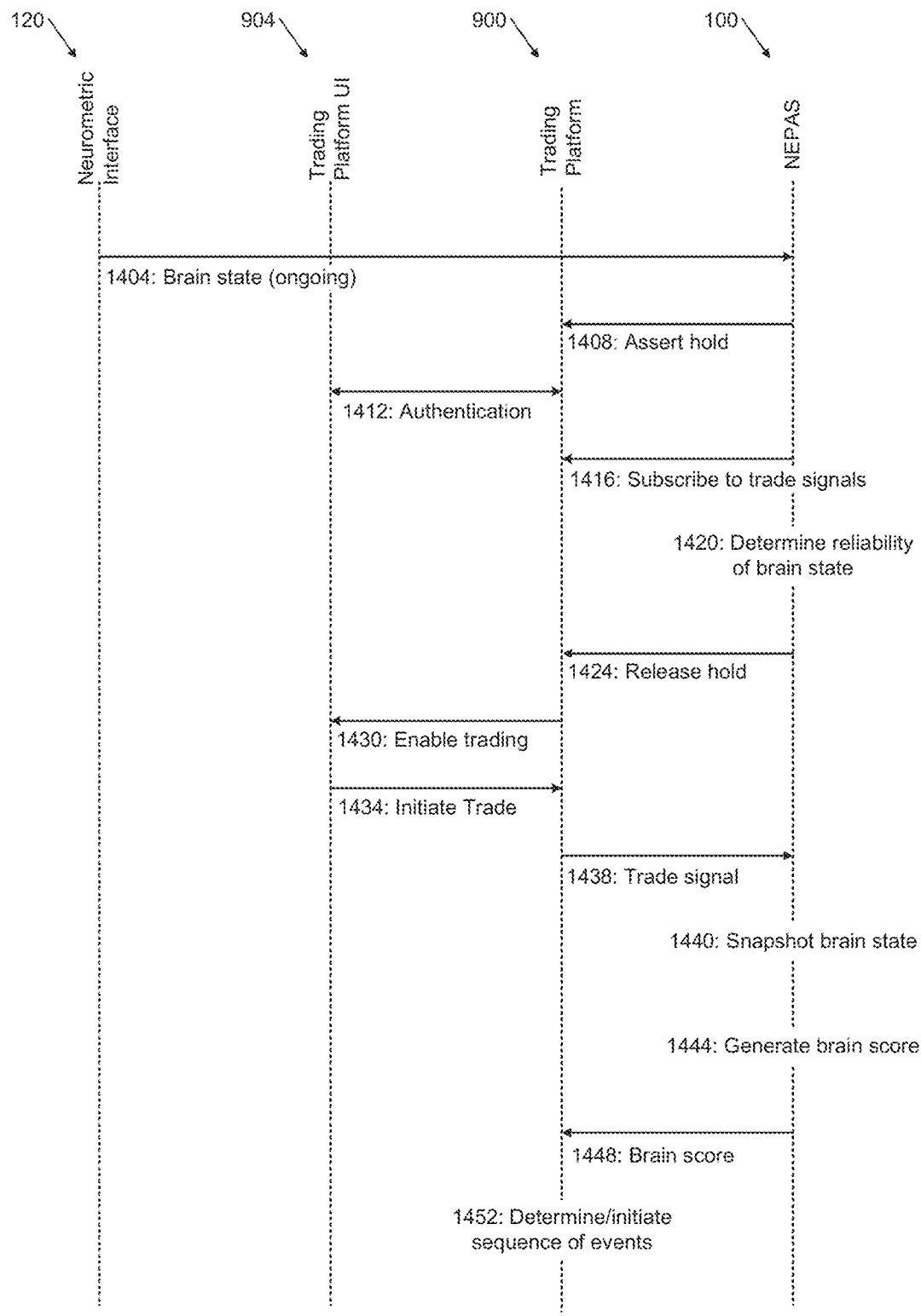
FIG. 57 is a message sequence chart illustrating example interactions between a neurometric interface, a trading platform user interface, a trading platform, and a neurometric-enhanced performance assessment system.

FIG. 57 is a message sequence chart illustrating example interactions between the neurometric interface 120, a trading platform user interface 904, the trading platform 900, and the NEPAS 100. FIG. 57 captures some examples of interactions that may occur during the execution of the method of FIG. 55. At 1404, the neurometric interface 120 monitors the brain state of the trader and provides brain state signals to the NEPAS 100. At 1408, the NEPAS 100 generates and sends the signal to the trading platform 900, asserting a hold on any trading activities for the trader. At 1412, the trading platform user interface 904 generates user interface elements that allow for the trader to input his or her trading platform 900 credentials. The trading platform user interface 904 passes the credentials back to the trading platform 900. Periodically, the trading platform 900 may generate new requests via the trading platform user interface 904 for the trader to revalidate the credentials. At 1416, the NEPAS 100 sends a subscription request to the trading platform 900.

At 1420, the NEPAS 100 determines the reliability of the brain state signals received from the neurometric interface 120. At 1424, after the NEPAS 100 determines that the brain state signals satisfy the reliability conditions, the NEPAS 100 sends the signal to the trading platform 900 to release any holds on trading activity for the trader. At 1430, the trading platform 900 sends a signal to the trading platform user interface 904 for the trading platform user interface 904 to transform and alert the trader that he or she is eligible to commence trading activities. At 1434, the trader inputs a trade request into the trading platform user interface 904, and the trading platform user interface 904 sends a signal initiating the trade request to the trading platform 900. At 1438, the trading platform 900 sends the trade signal to the NEPAS 100. At 1440, the NEPAS 100 captures the snapshot of the brain state of the trader at the period of time proximate to the trade order being initiated. At 1448, the NEPAS 100 transforms the snapshot of the brain state of the trader into a brain score and sends the brain score to the trading platform 900. At 1452, the trading platform 900 determines and/or automatically initiates a sequence of events based on data from the trade order, the brain state score of the trader, data about the financial instrument traded, and/or data about the market.

Figure 58:
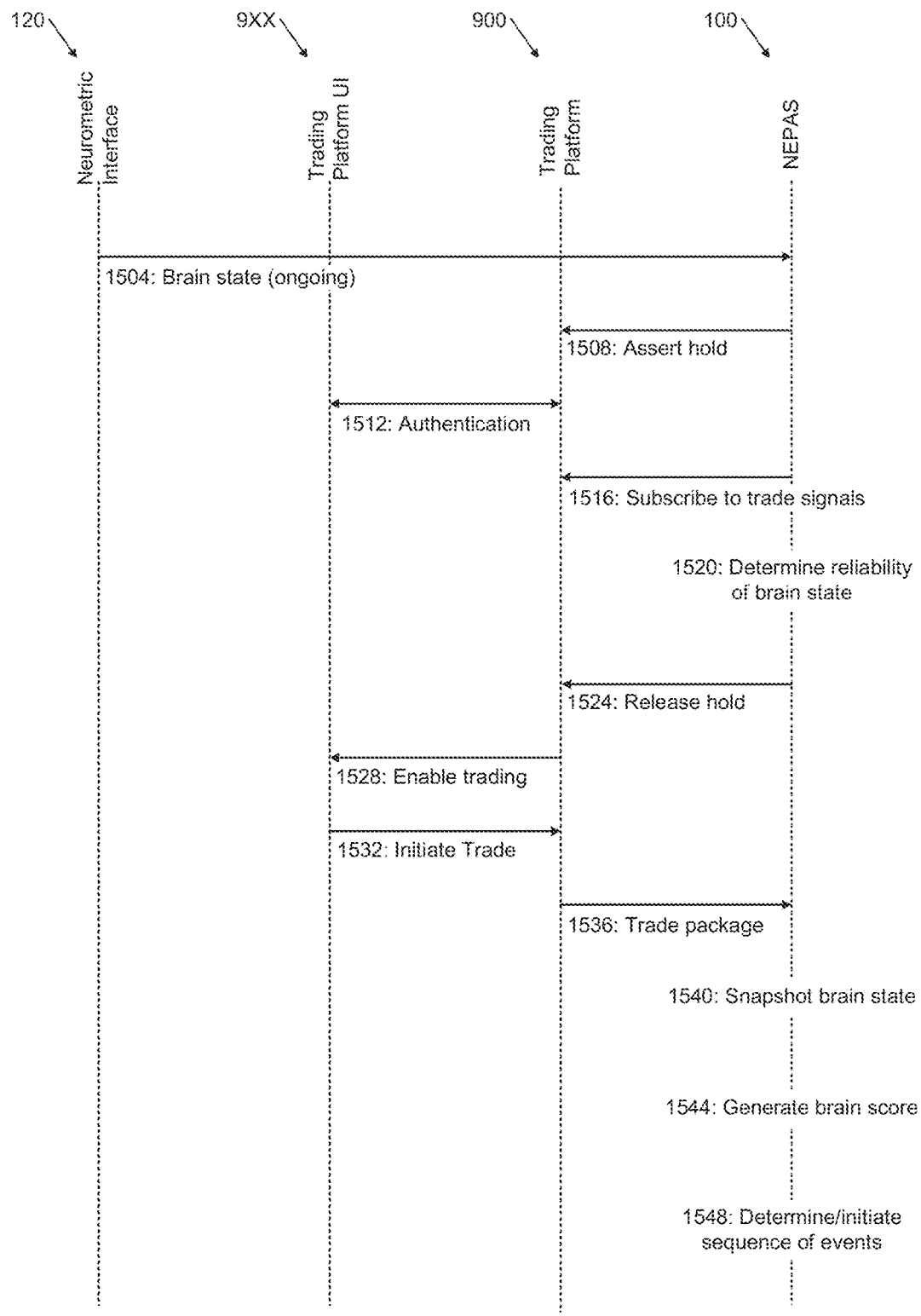
FIG. 58 is a message sequence chart illustrating example interactions between a neurometric interface, a trading platform user interface, a trading platform, and a neurometric-enhanced performance assessment system.

FIG. 58 is a message sequence chart illustrating example interactions between the neurometric interface 120, a trading platform user interface 904, the trading platform 900, and the NEPAS 100. FIG. 58 captures some examples of interactions that may occur during the execution of the method of FIG. 55. At 1504, the neurometric interface 120 monitors the brain state of the trader and provides brain state signals to the NEPAS 100. At 1508, the NEPAS 100 generates and sends the signal to the trading platform 900 asserting a hold on any trading activities for the trader. At 1512, the trading platform user interface 904 generates user interface elements that allow the trader to input his or her trading platform 900 credentials. The trading platform user interface 904 passes the credentials back to the trading platform 900. Periodically, the trading platform 900 may generate new requests via the trading platform user interface 904 for the trader to revalidate the credentials. At 1516, the NEPAS 100 sends a subscription request to the trading platform 900.

At 1520, the NEPAS 100 determines the reliability of the brain state signals received from the neurometric interface 120. At 1524, after the NEPAS 100 determines that the brain state signals satisfy the reliability conditions, the NEPAS 100 sends the signal to the trading platform 900 to release any holds on trading activity for the trader. At 1530, the trading platform 900 sends a signal to the trading platform user interface 904 for the trading platform user interface 904 to transform and alert the trader that he or she is eligible to commence trading activities. At 1534, the trader inputs a trade request into the trading platform user interface 904 and the trading platform user interface 904 sends a signal initiating the trade request to the trading platform 900. At 1538, the trading platform 900 sends the trade package to the NEPAS 100. At 1540, the NEPAS 100 captures the snapshot of the brain state of the trader at the period of time proximate to the trade order being initiated. At 1544, the NEPAS 100 transforms the snapshot of the brain state of the trader into a brain score and sends the brain score to the trading platform 900. At 1548, the NEPAS 100 determines and/or automatically initiates a sequence of events based on the trade package and/or data from the trade order, the brain state score of the trader, data about the financial instrument traded, and/or data about the market.

Figure 59:
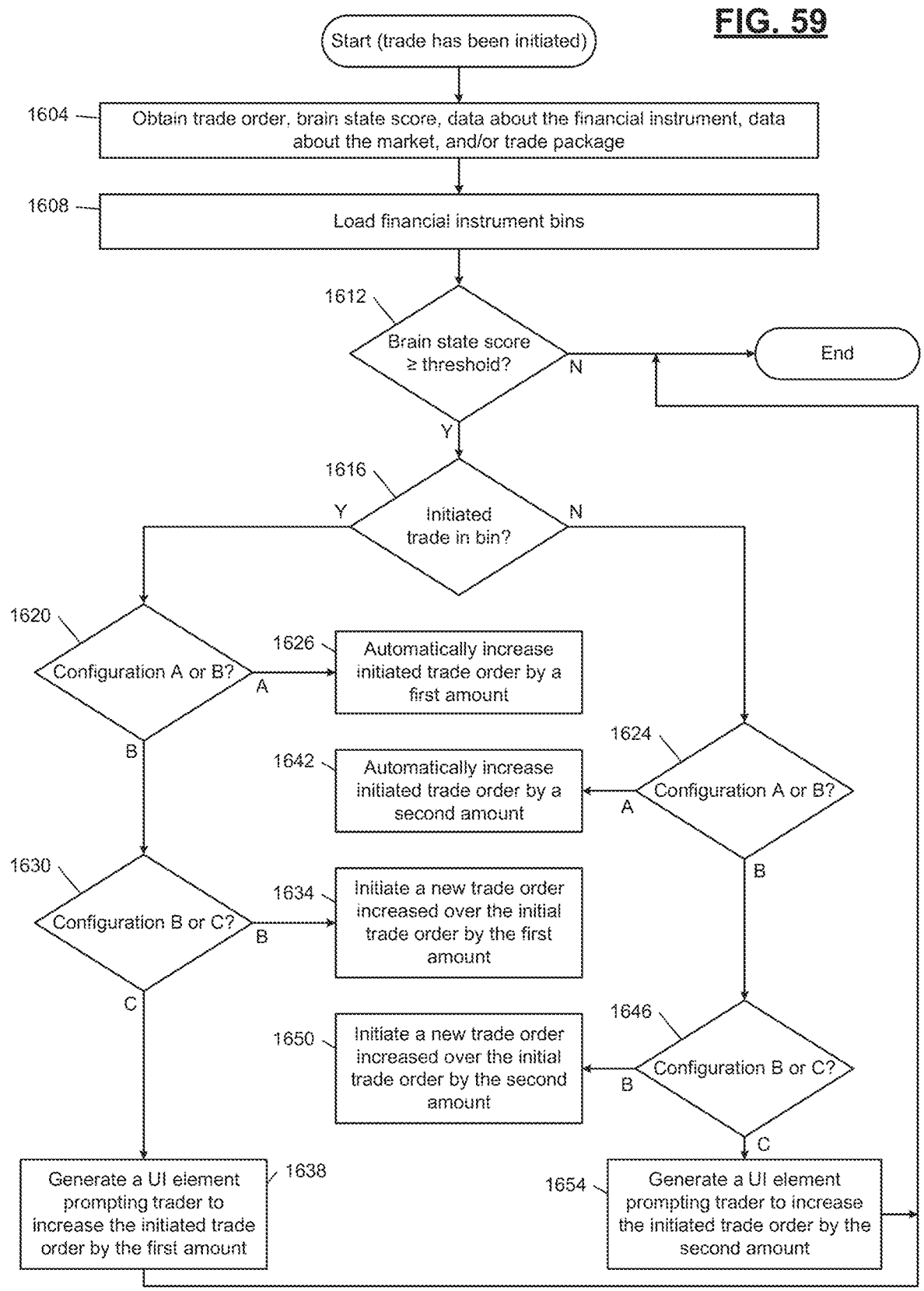
FIG. 59 is a flowchart of an example method of determining and/or automatically initiating an optimal sequence of events based on a trade order, a brain state score, data about the financial instruments of the trade, and/or data about the market.

FIG. 59 is a flowchart of an example method of determining and/or automatically initiating an optimal sequence of events based on the trade order, the brain state score, data about the financial instruments of the trade, and/or data about the market. FIG. 59 illustrates examples of steps that may be performed at 1240 of FIG. 55. At 1604, after the trade request has been initiated by the trader, the NEPAS 100 and/or the trading platform 900 obtains the trade order (including the financial instrument being traded, the bid price of the instrument, and the quantity of the instrument), the brain state score, data about the financial instrument, data about the market, and/or the trade package. Control proceeds to 1608. At 1608, the NEPAS 100 and/or the trading platform 900 loads financial instrument bins. In various implementations, the financial instrument bins bin or divide financial instruments into various categories. For example, certain financial instruments may be binned into an "aggressive strategy" category, while other financial instruments may be binned into a "conservative strategy" category. Control proceeds to 1612.

At 1612, the NEPAS 100 and/or the trading platform 900 determines whether the brain state score obtained at 1604 meets or exceeds a threshold. If at 1612 the brain state score does not meet or exceed the threshold, the process ends. If at 1612 the brain state score meets or exceeds the threshold, control proceeds to 1616. At 1616, the NEPAS 100 and/or the trading platform 900 determines whether the financial instrument in the trade order obtained at 1604 is within a selected bin (loaded at 1608). If at 1616, the financial instrument is within the selected bin, control proceeds to 1620. Otherwise, control proceeds to 1624. At 1620, control determines whether the NEPAS 100 and/or the trading platform 900 has been configured in Configuration A or Configuration B. In Configuration A, the NEPAS 100 and/or the trading platform 900 will automatically increase the initiated trade order based on the brain state score. In Configuration B, the NEPAS 100 and/or the trading platform 900 will automatically initiate a new trade order based on the brain state score. If at 1620 the NEPAS 100 and/or the trading platform 900 is in Configuration A, control proceeds to 1626 where the NEPAS 100 and/or the trading platform 900 automatically increases the trade order initiated by the trader by a first amount. If at 1620 the NEPAS 100 and/or the trading platform 900 is in Configuration B, control proceeds to 1630.

At 1630, control determines whether the NEPAS 100 and/or the trading platform 900 is in Configuration B or Configuration C. If at 1630 the NEPAS 100 and/or the trading platform 900 is in Configuration B, the NEPAS 100 and/or the trading platform 900 initiates a new trade order for the financial instrument. The new trade order is increased over the initial trade order placed by the trader by the first amount. If at 1630 the NEPAS and/or the trading platform 900 is in Configuration C, the NEPAS 100 and/or the trading platform 900 generates a user interface element—for example, at the trading platform user interface 904— prompting the trader to increase the initiated trade order by the first amount. After 1638, the process ends.

At 1624, control determines whether the NEPAS 100 and/or the trading platform 900 is in Configuration A or Configuration B. If at 1624, the NEPAS 100 and/or the trading platform 900 is in Configuration A, control proceeds to 1642, where the NEPAS 100 and/or the trading platform 900 automatically increases the trade order initiated by the trader by a second amount. In various implementations, if the bin identified at 1616 is the "aggressive strategy" category, the first amount may be larger or more than the second amount. In various implementations, if the bin identified at 1616 is the "conservative strategy" category, the first amount may be smaller or less than the second amount. If at 1624, the NEPAS 100 and/or the trading platform 900 is in Configuration B, control proceeds to 1646. At 1646, control determines whether the NEPAS 100 and/or the trading platform 900 is in Configuration C. If at 1646, the NEPAS 100 and/or the trading platform 900 is in Configuration B, control proceeds to 1650, where the NEPAS 100 and/or the trading platform 900 initiates a new trade order increased over the initial trade order placed by the trader by the second amount. If at 1646 the NEPAS 100 and/or the trading platform 900 is in Configuration C, the NEPAS 100 and/or the trading platform generates a user interface element prompting the trader to increase the initiated trade order by the second amount. After 1654, the process ends.

Figure 60:
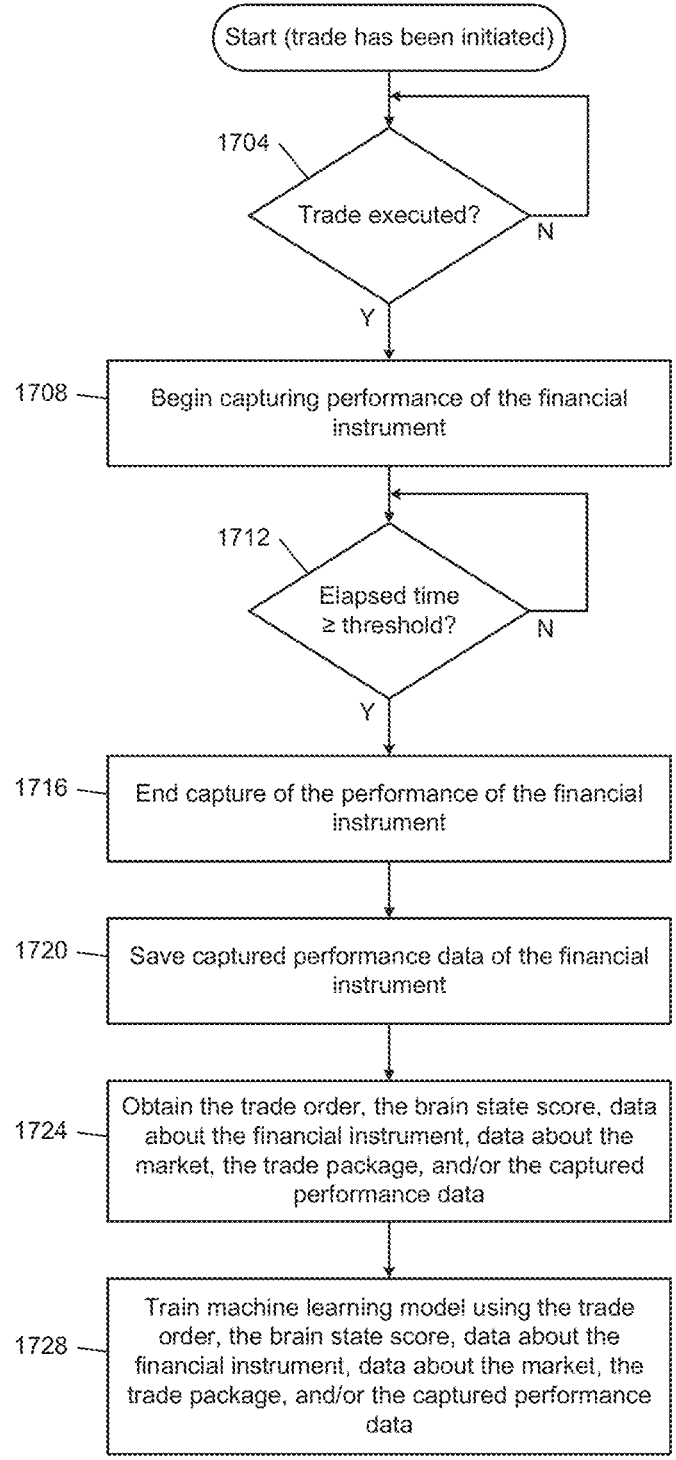
FIG. 60 is a flowchart of an example method of determining and/or automatically initiating an optimal sequence of events based on a trade order, a brain state score, data about the financial instruments of the trade, and/or data about the market.

FIG. 60 is a flowchart of an example method of determining and/or automatically initiating an optimal sequence of events based on the trade order, the brain state score, data about the financial instruments of the trade, and/or data about the market. FIG. 60 illustrates examples of some steps that may be performed at 1240 of FIG. 55. At 1704, after the trade request has been initiated by the trader, the NEPAS 100 and/or the trading platform 900 determines whether the trade has been successfully completed or executed. If at 1704 the trade has been successfully executed, control proceeds to 1708. Otherwise, control returns back to 1704 to await execution of the trade. At 1708, the NEPAS 100 and/or the trading platform 900 begins capturing the performance of the traded financial instrument. Control proceeds to 1712. At 1712, the NEPAS 100 and/or the trading platform 900 determines whether an elapsed time from when the NEPAS 100 and/or the trading platform 900 began capturing the performance of the traded financial instrument at 1708 meets or exceeds a threshold. If at 1712 the answer is yes, control proceeds to 1716. Otherwise, control returns back to 1712.

At 1716, the NEPAS 100 and/or the trading platform 900 stops the capture of the performance of the financial instrument. Control proceeds at 1720, where the NEPAS 100 and/or the trading platform 900 saves the captured performance of the financial instrument as captured performance data. In various implementations, the NEPAS 100 and/or the trading platform 900 saves the captured performance data to a non-transitory storage medium. In various implementations, the captured performance data represents the performance of the financial instrument for a period of time following execution of the trade. Control proceeds to 1724. At 1724, the NEPAS 100 and/or the trading platform 900 obtains the trade order initiated by the trader, the brain state score, data about the financial instrument, data about the market, the trade package, and/or the captured performance data. Control proceeds to 1728. At 1728, the NEPAS 100 and/or the trading platform 900 trains a machine learning model using the trade order, the brain state score, data about the financial instrument, data about the market, the trade package, and/or the captured performance data. In various implementations, the machine learning model may be any of those previously described with reference to Table 11.

Figure 61:
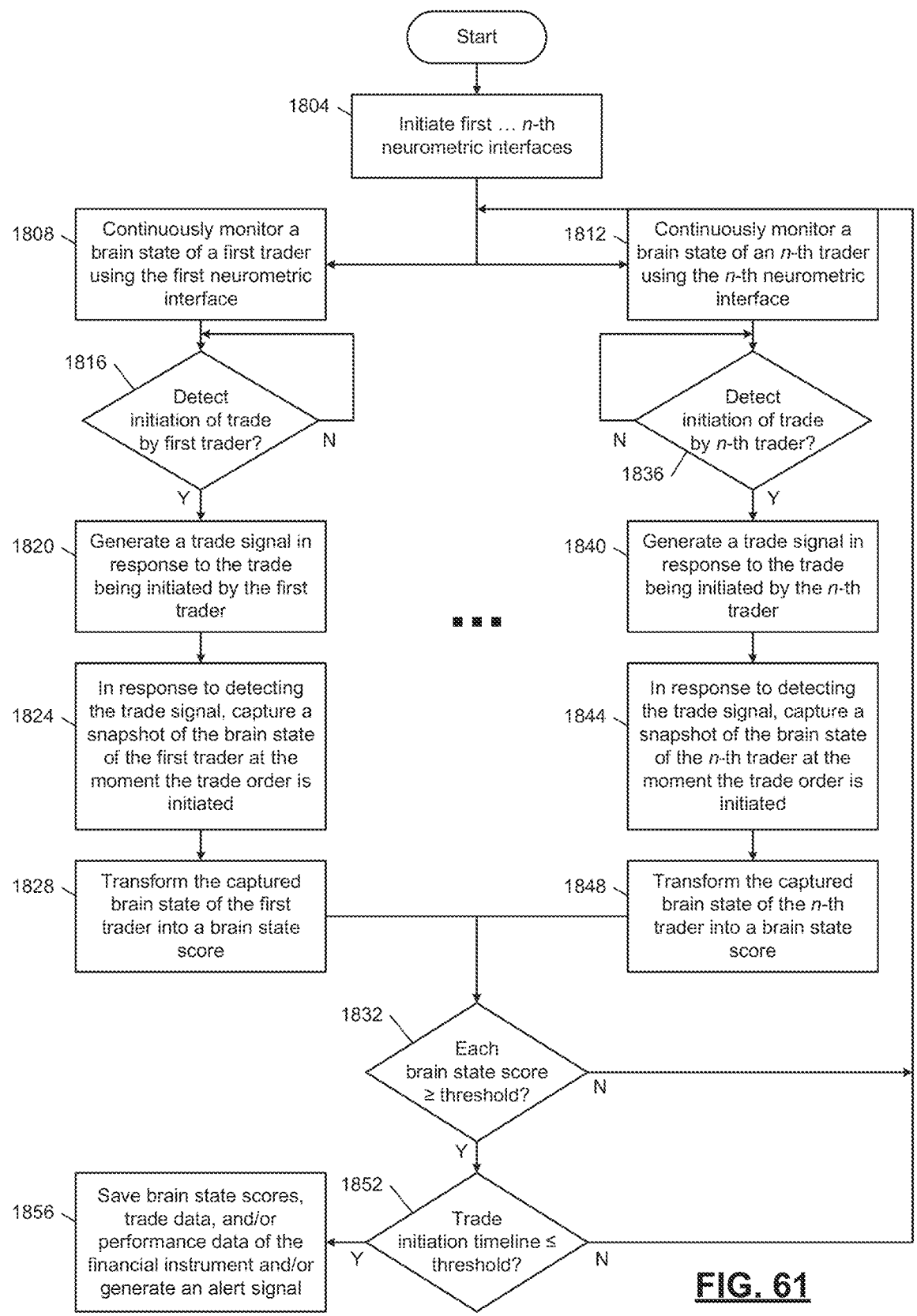
FIG. 61 is a flowchart of an example method of determining and/or initiating an optimal sequence of events based on brain state scores generated from signals captured by multiple neuromeric interfaces.

FIG. 61 is a flowchart of an example method of determining and/or initiating an optimal sequence of events based on brain state scores generated from signals captured by multiple neuromeric interfaces. At 1804, the NEPAS 100 initiates the first through n-th neurometric interfaces 120. Control proceeds to 1808 through 1812. At 1808, the NEPAS 100 continuously monitors a brain state of a first trader using the first neurometric interface 120. At 1812, the NEPAS 100 continuously monitors a brain state of an n-th trader using the n-th neurometric interface 120. From 1808, control proceeds to 1816. At 1816, the trading platform 900 detects the initiation of a trade for a given financial instrument by the first trader. If the trading platform 900 detects the first trader initiating a trade for the given financial instrument, control proceeds to 1820. Otherwise, control returns to 1816. At 1820, the trading platform 900 generates the trade signal in response to the trade for the given financial instrument being initiated by the first trader. In various implementations, the trading platform 900 sends the trade signal to the NEPAS 100. Control proceeds to 1824. At 1824, in response to detecting the trade signal, the NEPAS 100 captures a snapshot of the brain state of the first trader at the moment the trade order is initiated. Control proceeds to 1828. At 1828, the NEPAS 100 transforms the captured brain state of the first trader into a brain state score. Control proceeds to 1832.

From 1812, control proceeds to 1836. At 1836, the trading platform 900 detects the initiation of a trade for the given financial instrument by the n-th trader. In various implementations, the given financial instrument for the n-th trader is the same as the given financial instrument for the first trader. If the trading platform 900 detects the n-th trader initiating a trade for the given financial instrument, control proceeds to 1840. Otherwise, control returns to 1836. At 1840, the trading platform 900 generates the trade signal in response to the trade for the given financial instrument being initiated by the n-th trader. In various implementations, the trading platform 900 sends the trade signal to the NEPAS 100. Control proceeds to 1844. At 1844, in response to detecting the trade signal, the NEPAS 100 captures a snapshot of the brain state of the n-th trader at the moment the trade order is initiated. Control proceeds to 1848. At 1848, the NEPAS 100 transforms the captured brain state of the first trader into a brain state score. Control proceeds to 1832. While FIG. 61 depicts a brain state score being generated for only the first trader and the n-th trader, n may be any number, and a brain state score may be generated for each trader between the first trader and the n-th trader according to processes analogous to those described for the first and the n-th traders.

At 1832, the NEPAS 100 and/or the trading platform 900 determines whether the brain state score for each of the first through n-th traders exceeds a threshold. If at 1832 the brain state score for each of the first through n-th traders exceeds the threshold, control proceeds to 1852. Otherwise, control proceeds back to 1808 and 1812. At 1852, the NEPAS 100 and/or the trading platform 900 determines whether each trade order initiated by the first through n-th traders is at or below a threshold. If yes, control proceeds to 1856. Otherwise, control proceeds back to 1808 and 1812. At 1856, the NEPAS 100 and/or the trading platform 900 saves the brain state scores, trade data, and/or performance data of the financial instrument. In various implementations, the NEPAS 100 and/or the trading platform 900 generates an alert signal.

Figure 62:
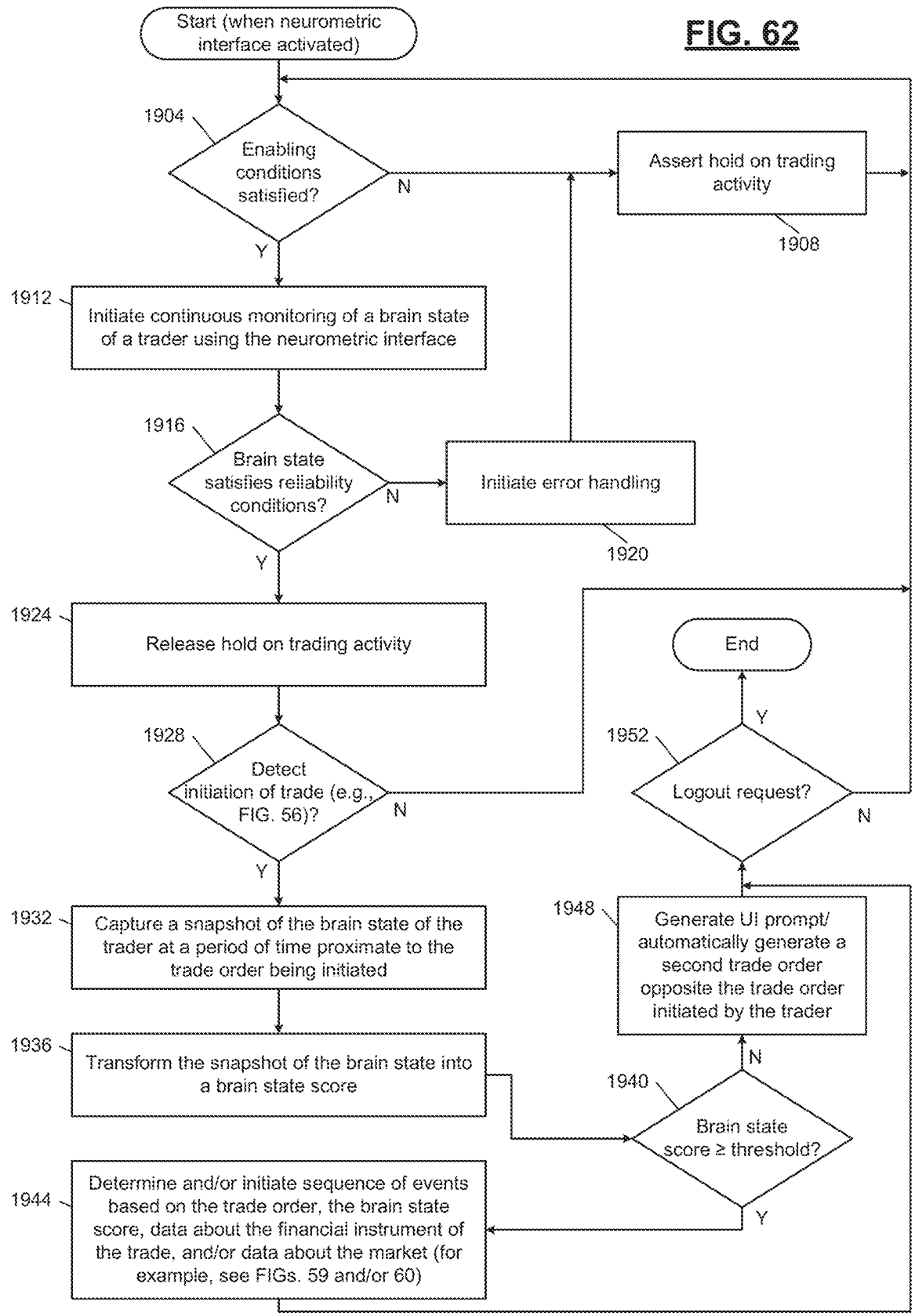
FIG. 62 is a flowchart of an example method of determining and/or initiating an optimal sequence of events based on a calculated brain state score and other data.

FIG. 62 is a flowchart of an example method of determining and/or initiating an optimal sequence of events based on the calculated brain state score and other data. Steps 1904-1936 of FIG. 62 are substantially similar to steps 1204-1236 of FIG. 55, respectively. After 1936, control proceeds to 1940. At 1940, the NEPAS 100 and/or the trading platform 900 determines whether the brain state score meets or exceeds a threshold. If at 1940 the brain state score meets or exceeds the threshold, control proceeds to 1944. Step 1944 of FIG. 62 is substantially similar to 1240 of FIG. 55. If at 1940 the brain state score does not meet or exceed the threshold, control proceeds to 1948. At 1948, in various implementations, the NEPAS 100 and/or the trading platform 900 generates a user interface element prompting the trader to place a second trade order opposite the trade order initially detected at 1928. In various implementations, the NEPAS 100 and/or the trading platform 900 automatically generates and/or places a second trade order opposite the trade order initially detected at 1928. For example, if the trade order initially detected at 1928 was purchase order, then the second trade order may be for a short sell of the same financial instrument. Control proceeds to 1952. 1952 may be substantially similar to 1244 of FIG. 55.

In various implementations, the trading platform 900 can connect to and trade on U.S. equity venues. In various implementations, the computer code for the trading platform 900 may be written in C++, and the code may be documented on a code base. In various implementations, the trading platform 900 may be a scalable system capable of handling many traders and transactions. In various implementations, the trading platform 900 may include trading optimization technology. In various implementations, the trading platform 900 may include automated risk management systems that view positions on both individual traders and at a macro-position level. In various implementations, the trading platform 900 includes a market data processing platform capable of normalizing market data. In various implementations, the trading platform 900 includes algorithm and/or machine-learning-based trade entries and exits. In various implementations, the trading platform 900 includes algorithm and/or machine-learning-based equity evaluation platforms. In various implementations, the trading platform 900 is capable of trading and/or clearing trades through multiple clearing firms. In various implementations, the trading platform 900 is capable of automated order generation and management. In various implementations, the trading platform 900 is capable of performing automated daily reporting on risk, profit and loss, and open positions for licensed and registered individuals of an organization. In various implementations, the trading platform 900 is capable of pulling real-time trade execution and order entry data. In various implementations, the trading platform 900 includes error-checking or unusual-order-detection logic, and may be able to automatically shut down the system based on the error-checking or unusual-order-detection logic. In various implementations, the trading platform 900 includes manual-override features allowing users to manually manage risk or disable the system.

Competitive Athlete Scenario

There are many ways in which the NEPAS 100 may be used to produce measureable performance improvements in elite personnel operating in high-stakes settings. For example, as applied to the world of professional baseball, the NEPAS 100 may be used to develop and deploy powerful and unique neural performance metrics that allow teams to asses baseball players "from the neck up" (e.g., mental performance in addition to physical performance). Applications for neural performance metrics measured and/or generated by the NEPAS 100 include: (1) informing game-day managerial decision related to player development based on a player's cognitive "fitness" immediately prior to a game; (2) predicting player "slumps" (e.g., periods of declined cognitive and/or physical performance) more quickly than traditional statistical measures; (3) generating control signals and outputs that can be used to drive interventions aimed at eliminating player "slumps"; (4) integrating neural metrics into player selection and development, particularly in young athletes whose brains are still developing and are primed for optimization.

Applications for neural interventions generated by the NEPAS 100 include: (1) providing a neuro-feedback system that helps players (such as batters) get "into the zone" before stepping into the batter's box/as the player is in the batter's box; (2) providing a neuro-modulation system that improves the player's ability to inhibit their swings on selected pitches; (3) and providing a neural training system that shortens the amount of time required for a player's brain to recognize a pitch.

In various implementations, the NEPAS 100 may be implemented in state-of-the-art neural performance assessment and training programs that are integrated in professional baseball teams' player assessment and training systems. In various implementations, the NEPAS 100 may provide a proprietary suite of neuro-metrics that have been validated to predict player performance more accurately than conventional technologies. In various implementations, the NEPAS 100 may provide field-tested player assessment tools that are grounded in neuro-metrics, adding measureable value to baseball teams' performance. In various implementations, the NEPAS 100 may provide validated and proprietary neural interventions that measurably improve player performance. In various implementations, the NEPAS 100 may provide continuous improvement of a professional baseball team's neuro-performance assessment and training program. In various implementations, the NEPAS 100 (including any neuro-assessment tools) may be fully integrated into professional baseball teams' neuro-performance systems. In various implementations, the NEPAS 100 may include field-tested and proven neural interventions that are broadly deployed with professional baseball teams. In various implementations, the NEPAS 100 may form part of the continued improvement of a professional baseball team's training and assessment programs.

Baseball player performance has traditionally been interpreted and managed using metrics that are observable at the macro level. These include conventional (e.g., batting average, earned run average) and sabermetric (e.g., OPS, WHIP) statistics, as well as (subjective) expert observations, sometimes referred to as the "eye-test." More recently, with the advent of wearable sensing devices, baseball teams have begun to investigate whether or not physiological data (e.g., heart rate, heart rate variability, eye tracking, galvanic skin response, etc.) can add additional value to their analytical capabilities. The above-listed metrics can be useful but given the fact that they are all in widespread use by professional baseball teams, it's difficult today for any professional team to achieve a meaningful, proprietary competitive advantage when using them. Modern neuroscience techniques now allow us, for the first time, to look into the brain and obtain novel metrics about its performance. Because of their cutting-edge nature as well as the critical importance of the brain to sports performance in contrast to the above-listed metrics neuroscience-based metrics can very realistically offer teams a meaningful competitive advantage.

The NEPAS 100 may be used to provide many brain-based metrics that can be used by professional baseball teams to improve player performance. Some metrics include: (1) "the speed with which a batter's brain can "recognize" a pitch"; (2) "visuo-motor connectivity"; and (3) "ocular efficiency." With respect to (1) "the speed with which a batter's brain can "recognize" a pitch," these metrics may be very predictive of a player's batting averages (on game days and over time). This metric can be reliably assessed using the NEPAS 100 to measure EEG-based evoked responses. With respect to (2) "visuo-motor connectivity," visuo-motor connectivity levels in player's brains could be highly predictive of player's athletic performance. These connectivity levels could be assayed by combining visual stimulation cues with transcranial stimulation of player's motor cortices. With respect to (3) "ocular efficiency," eye movement patterns, particularly when coupled with other neurophysiological measures (e.g., heart rate), can be highly predictive of athletic performance, both in baseball and other sports. Nonetheless, there are no commercially available tools that allow baseball teams to capture this information in a scientifically valid and actionable manner. The NEPAS 100 may include a tablet-based app that captures player's eye movements (as well as other physiological measures) when they watch game footage that could quickly and reliably measure cognitive fatigue and predict player's game-day performance.

Because player's physical skills have historically been easier to measure and train than their cognitive ones (notwithstanding how important mental performance is to the game), "brain training" has historically taken a back-seat to physical training in baseball. Given how powerful brain training can be, using the NEPAS 100 in a professional baseball practical application can have a dramatic and sustainable impact on a professional baseball team's performance. In various implementations, the NEPAS 100 may exploit brain plasticity and optimize brain circuitry as it relates to baseball performance. For example, the NEPAS 100 may be used to improve visual processing speed, train players so their brain efficiently "re-wires" to remove bad movement habits/patterns, and "re-wire" a player's brain to manage anxiety in certain game-day scenarios. The NEPAS 100 may be used as/as a part of a neurofeedback training tool that would help players to materially improve their batting performance. For example, the NEPAS 100 may be used to identify/induce a brain state that is "in the zone" (e.g., particularly conducive to batting performance). In various implementations, the NEPAS 100 may be used to reliably train batters' brains to get into an optimal mental state when they step up to the batter's mound.

The NEPAS 100 may provide brain stimulation techniques that act directly on the central nervous system to rapidly and dramatically improve performance. In various implementations, non-invasive electrical, magnetic or ultrasonic brain stimulation techniques can be used to positively affect brain function and promote learning and memory. For example, the NEPAS 100 can be used to apply transcranial stimulation over the pre-supplementary motor cortex (pSMA), which would induce plastic changes that dramatically improve hitter's ability to inhibit their swing on a pitch. In testing, pSMA has been shown to be more active in players than in control subjects, and may be the site of motor inhibition. This would translate into improved batting percentages. In various implementations, the NEPAS 100 can be used to apply transcranial stimulation to the fusiform gyrus (FG) to induce plasticity and promote pitch trajectory learning and representation. This would result in quicker pitch recognition and better batting averages. The the fusiform gyrus represents pitch trajectories in hitters and is a privileged area that promotes fast responses and actions.

In various implementations, the NEPAS 100 may use photobiomodulation (PBM) to improve player performance in general. This is an emerging technique that delivers near-infrared light to the brain with the goal of increasing energy metabolism. The presumed mechanism of action is the absorption of photons by a mitochondrial enzyme, leading to elevated ATP levels. PBM of the muscle has already been shown to aid in sports performance and recovery. Here, transcranial PBM, which has been shown to increase functional connectivity in the human brain, would be employed to deliver energy to brain regions identified to be metabolically demanding during gameplay. All brain circuits require a steady supply of ATP for proper functioning (signaling), and it is expected that increased cerebral energy metabolism will enhance performance. One benefit of PBM is that it can be applied in a minimally invasive and potentially concealed fashion, e.g., using light emitting diodes (LEDs) that are located on the inside of a baseball cap.

In various implementations, the NEPAS 100 identifies neural markers of when a hitter recognizes a pitch. For example, the NEPAS 100 enables a user to track when, during a trajectory of a pitch, the batter recognizes a pitch they are "sitting on." Several studies have shown that knowing what pitch is coming can effectively increase one's batting average by 100 points. Thus, the NEPAS 100 may be used as an assessment tool that provides a neural marker of "knowing what's coming." The system can be used for assessment at the minor league level and as a training metric for hitters at all levels. The information from the NEPAS 100 can be integrated into current analytics platforms to provide more frequently sampled and additional information to track a hitter.

In various implementations, the NEPAS 100 may be used in a desktop environment with simulated pitches or using a pitch tracker/statcast data. The NEPAS 100 may be fully or partially deployed to a more ecological and naturalistic environment by using a portable instrumentation suite (e.g., a suit suitable for use in live batting practice or in a batting cage). For example, the NEPAS 100 may include a batting cage compatible instrumentation suite (e.g., an EEG, ECG, eye-tracker, forward facing camera, 3D glasses, and synced video). The NEPAS 100 may be used in a framework including a programmed pitching machine. Software professing may enable real-time decoding and visualization of results.

In various implementations, the NEPAS 100 may provide longitudinal tracking of players' performance together with causality analysis to determine if future batting stats are predicted by metrics output by the NEPAS 100. The NEPAS 100 may include a virtual reality system that integrates real pitcher mechanics, arm angles, release point etc. within a standing/batting experience.

In various implementations, the NEPAS 100 may be used to quiet activity in the prefrontal cortex (which is the site of executive function) of a pitcher or batter.

In various implementations, the NEPAS 100 may include a user interface interface outputting measured spatial distributions of EEG power as a signature of the "quiet mind" (e.g., reduced activity in prefrontal cortex). In various implementations, the NEPAS 100 may be used to synchronize pitch delivery with signatures of reduced prefrontal activity, and compare the signatures to signatures during those times when prefrontal activity is high (this can be performed post-hoc). The pitch type will be detected earlier in the pitch trajectory and response times will be faster, when prefrontal activity is reduced.

Neuro-modulation, via non-invasive electrical, magnetic or ultrasonic stimulation, has been shown to positively affect brain function, promote learning and memory. In the professional baseball context, TES stimulation over pre supplementary motor cortex (pSMA) will induce plastic changes that improve a hitters ability to inhibit their swing on a pitch. pSMA is more active in players than controls and is the site of motor inhibition. This would translate into an improved batting average. TES applied to fusiform gyrus (FG) would induce plasticity and promote pitch trajectory learning and representation. This leads to higher batting averages. The fusiform gyrus represents pitch trajectories in hitters and is a privileged area that promotes fast responses and actions.

Athletic performance is conventionally captured with metrics that are observable at the macro level, via both conventional (e.g., batting average, earned run average) and sabermetric (e.g., OPS, WHIP) statistical measures. Complementing these objective measures are the observations of experts, sometimes referred to as the "eye-test." The NEPAS 100 is employed to capture neural markers associated with both positive and negative performance. These markers provide information that is only visible at a micro level, for example the connectivity of the brain, as well as systemic physiological variables such as levels of arousal, concentration, and fatigue. Capturing these variables requires the employment of non-invasive techniques such as EEG, EMG, NIRS, optical heart rate sensors, or eye trackers.

With the NEPAS 100, neural interventions are devised and tailored to the objective of maximizing athletic performance. Interventions can act directly on the central nervous system by delivering energy in the form of electric fields (transcranial direct current stimulation or TDCS), magnetic fields (transcranial magnetic stimulation or TMS), or near-infrared light (termed "photobiomodulation") to the brain. Alternatively, neural sensing technologies may be employed in a feedback loop with the athlete to increase awareness of physiological states associated with positive and negative performance. The design of neural interventions relies on the knowledge gained from the collected neural markers. For example, if the excitability of the prefrontal cortex is discovered via EEG to predict poor performance, then inhibitory TMS may target the prefrontal cortex in an intervention that is applied prior to practice or gameday.

Application: "Slump Busters"

A "slump" refers to a sustained duration of decreased performance. It is widely accepted that there is a prominent psychological component to slumps. There are neurophysiological changes that have occurred leading up to and during the slump for example, neural pathways that promote good performance may have been downregulated in favor of other, less favorable pathways. The pathways here can either be perceptual (i.e., pitch recognition), cognitive (i.e., pitch selection), or sensorimotor (i.e., hand-eye coordination).

The ability to recognize slumps earlier, and potentially intervene, could exert a substantial impact on player performance.

Neural signals can identify slumps earlier than statistical measures, and can provide a control signal that can be used to tune interventions aimed at slump termination. Relatedly brain stimulation techniques may be employed during slumps to stimulate neural plasticity and shorten slump duration.

Neural marker: EEG. Patterns of functional connectivity that capture spatial and spectral relationships among brain regions are expected to relate to athletic performance. The rationale for this hypothesis is based on previous reports of functional connectivity predicting sustained attention and fatigue. To identify neural changes associated with slumps, the NEPAS 100 can record resting-state EEG in a longitudinal fashion. An ergonomic, self-donning EEG headset will be worn by the athlete for a short time (for example, in a 5-10 minute period in between practice and game time) regularly throughout the season. This will provide a set of neural snapshots that would then be related to subsequent performance. Machine learning (e.g., regression) will be used to identify resting state EEG features that predict player outcomes that are minimally driven by chance and are "closest" to the neurophysiology (e.g., exit velocity, launch angle).

A similar approach may be employed but with players viewing film or engaged in a game simulation (perhaps video game play) while neural activity is captured. Here, stimulus-evoked activity (e.g., visual evoked responses) may be measured, and both the latency and amplitude of the neural response may be used in a learning model that predicts same-day performance.

In either case, it is expected that the EEG signature of an emerging slump (e.g., increased connectivity between prefrontal and premotor cortex) will manifest earlier than the resulting macro-level performance degradations. The predictions of the machine learning model may be made available to the player to increase his awareness of mental state.

Neural Intervention: TMS. Transcranial magnetic stimulation (TMS) is an FDA-approved non-invasive brain stimulation technique that uses rapidly switching magnetic fields to induce action potentials in the cerebral cortex. Repetitive TMS (rTMS) is employed in order to produce plastic changes in the brain, for example targeting the dorsolateral prefrontal cortex (DLPFC) which has been implicated in major depression. The types of plastic changes that occur in depression patients can be produced in the sensorimotor systems of athletes. Importantly, TMS can be pulsed at either low or high frequency, with low frequency stimulation generally producing inhibitory effects and high frequency producing excitation. Thus, the stimulation may be tuned depending on the nature of the neural correlates (hyperactivity or hypoactivity).

In the context of player slumps, a natural target is the supplementary motor area, which has a crucial role in motor planning. Alternatively, brain regions associated with self-awareness or mind-wandering (e.g., prefrontal cortex) may be targeted with inhibitory TMS to promote greater focus. Treatment could be applied at the onset of a slump and be continued as long as desired, with stimulation occurring prior to game time. In the case of motor cortex stimulation, it may also be possible to combine TMS application with measurements of motor-evoked potentials that indicate the excitability of the corticospinal tract. In this way, a form of feedback may be provided, and this can be used to guide coil placement and stimulation waveform.

Application: Gameday Neural Assessments

The central idea here is that micro-level features may be collected on gameday and utilized to inform managerial decisions related to situational player deployment. The conventional approach to in-game decisions is to utilize a combination of analytics, intuition, strategy, and player self-reports. These conventional sources of information may be supplemented with neurophysiological assays that have been acquired on game day.

The assays could extend beyond the EEG functional connectivity described above. For example, players could interact with an app running on a tablet to capture eye movements elicited by watching previous game footage. The peripheral signals captured by smart watches provide auxiliary information on heart rate and heart rate variability that may also bear a relationship with subsequent performance, particularly in the case of player fatigue.

The collected assays would first be processed by a machine learning algorithm, and then curated to produce a collection of visuals that summarize the player's expected gameday performance, as predicted by the neurophysiological assay. This would then be made available to the manager, and may be taken into account when making decisions related to the starting lineup, bullpen management, pinch hitting, and defensive substitutions. Such a technology would integrate seamlessly into the existing database of (macro-level) analytics that are already available to managers.

Application: Accelerated Calming

The psychological aspect of athletic performance is widely considered to be critical. Elite athletes have been reported to expend substantial effort to achieve specific mental states prior to performing. We hypothesize that brain stimulation techniques may be employed to facilitate the achievement of brain states that are conducive to good performance. Both TMS and transcranial direct current stimulation (TDCS) may be utilized leading up to gametime in regimes that are currently employed to promote anxiety relief and increased concentration. It is also possible to combine these brain stimulation techniques with widely used mindfulness meditation applications9, perhaps resulting in a synergistic effect. The application of brain stimulation may be coupled with neural sensing in an open-loop manner to identify the neurophysiological changes produced by the stimulation.

In addition to TMS and TDCS, photobiomodulation (PBM) is an emerging technique that delivers near-infrared light to the brain with the goal of increasing energy metabolism10. The presumed mechanism of action is the absorption of photons by a mitochondrial enzyme, leading to elevated ATP levels. PBM of the muscle has already been investigated to aid in sports performance and recovery11. Here, transcranial PBM, which has been shown to increase functional connectivity in the human brain12, may be employed to deliver energy to brain regions identified to be metabolically demanding during gameplay. All brain circuits require a steady supply of ATP for proper functioning (signaling), and it is expected that increased cerebral energy metabolism will enhance performance. A benefit of PBM is that it can be applied in a minimally invasive and potentially concealed fashion: stimulation may be delivered with light emitting diodes (LEDs) that are located on the inside of a garment (headband) or baseball cap.

Application: Tracking Visuomotor Connectivity

TMS has been previously employed to measure functional connectivity13, including between the visual and motor systems. For example: (i) visuomotor connectivity is a strong correlate of athletic performance; and (ii) visuomotor connectivity may be assayed by combining visual stimulation cues with TMS of the motor cortex. Strong visuomotor connectivity is expected to translate to a large modulation in the TMS-evoked motor evoked potential. This assay may then be used to measure and monitor the state of the athlete's visuomotor pathways throughout the season. It may also be employed in a player development environment to forecast long-term player performance.

Figure 63:
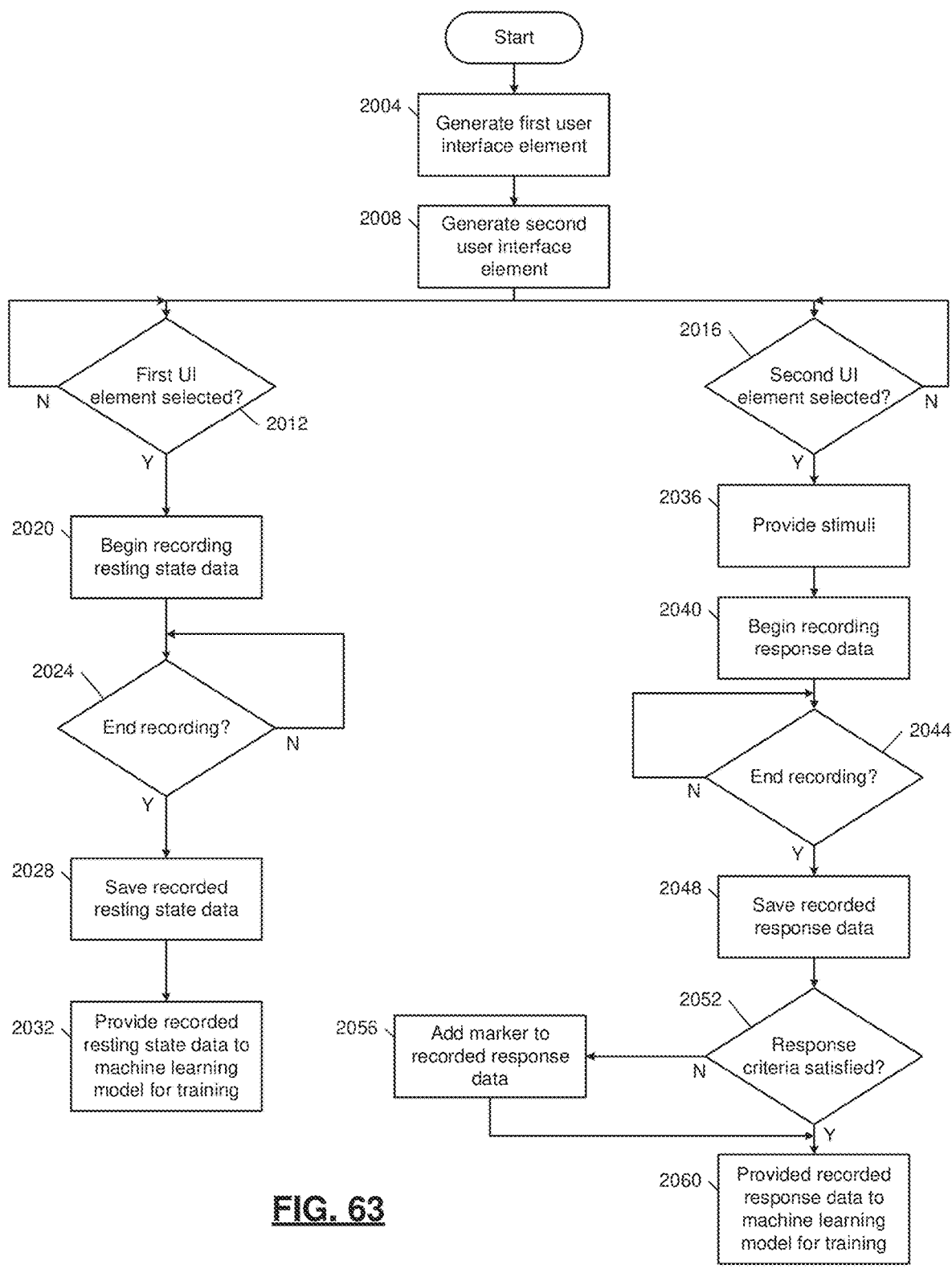
FIG. 63 is a flowchart of an example process of a system used in a professional baseball context to record brain state data for training a machine learning model.

FIG. 63 is a flowchart of an example process of the NEPAS 100 used in a professional baseball context to record brain state data for training a machine learning model. At 2004, the NEPAS 100 may generate a first user interface element. Control proceeds to 2008. At 2008, the NEPAS 100 may generate a second user interface element. Control proceeds to 2012 and 2016. At 2012, control determines whether the first user interface element was selected. If at 2012, control determines that the first user interface element was selected, control proceeds to 2020. Otherwise, control proceeds back to 2012. At 2020, the NEPAS 100 begins recording resting state data. Control proceeds to 2024. At 2024, control determines whether to end the recording (e.g., after an elapsed time as passed, a condition is satisfied, or in response to a user request). If at 2024, control determines that the recording should be ended, control proceeds to 2028, where the NEPAS 100 saves the recorded resting state data and proceeds to 2032. At 2032, control provides the recorded resting state data to a machine learning model for training.

At 2016, control determines whether the second user interface element was selected. If at 2016 the answer is yes, control proceeds to 2036. Otherwise, control proceeds back to 2016. At 2036, the NEPAS 100 provides stimuli (e.g., a player is provided with a pitch via a pitching machine, a player watches tape of a pitch, etc.) to a player. Control proceeds to 2040. At 2040, the NEPAS 100 begins recording brain and physiological response data. Control proceeds to 2044. At 2044, control decides whether to end recording. If at 2044 the answer is yes, control proceeds to 2048. Otherwise, control proceeds back to 2044. At 2048, the NEPAS 100 saves the recorded response data and proceeds to 2052. At 2052, if the NEPAS 100 determines that the response criteria is satisfied (e.g., the player reacted by performing a "good" hit on the pitched ball), control proceeds to 2060. Otherwise, control proceeds to 2056. At 2056, control adds a marker to the recorded response data (e.g., a marker indicative of a "bad" hit) and proceeds to 2060. At 2060, the NEPAS 100 provides the recorded response data to a machine learning model for training.

Figure 64:
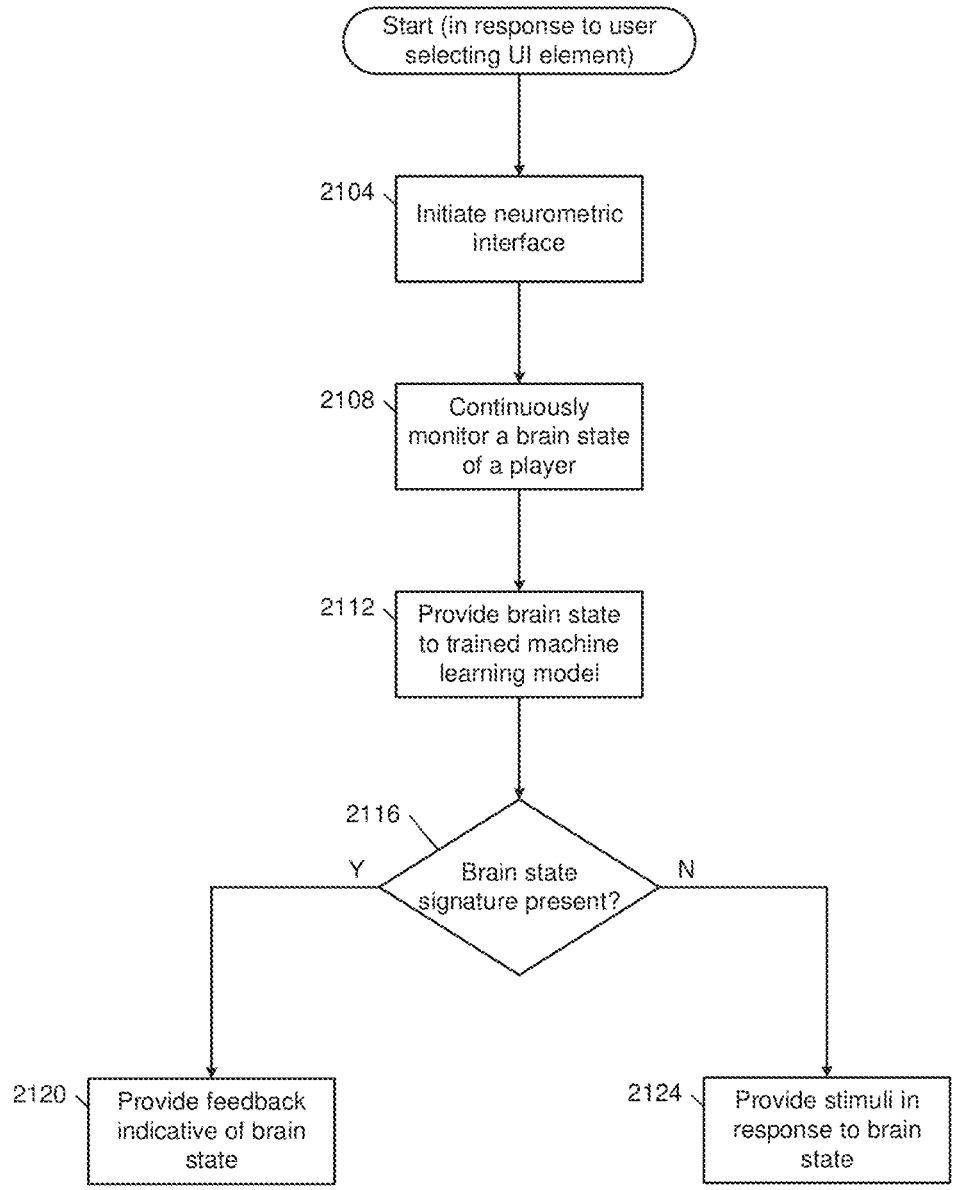
FIG. 64 is a flowchart of a system used in a professional baseball context.

FIG. 64 is a flowchart of the NEPAS 100 used in a professional baseball context. For example, control begins in response to a user selecting a user interface element. At 2104, the NEPAS 100 initiates the neurometric interface 120 and proceeds to 2108. At 2108, the NEPAS 100 continuously monitors a brain state of a player. Control proceeds to 2112. At 2112, the NEPAS 100 provides the brain state of the player to a trained machine learning model. Control proceeds to 2116. At 2116, the NEPAS 100 (e.g., at the trained machine learning model) determines whether a brain signature indicative of a brain state conducive to hitting a pitch is present. If at 2116 the answer is yes, the NEPAS 100 provides positive feedback via the neuro feedback interface 145 and/or the feedback display interface 135 at 2120. If at 2116, the answer is no, the NEPAS 100 provides stimuli in response to the brain state (e.g., via TMS, rTMS, the neuro feedback interface 145, and/or the feedback display interface 135) at 2124.

Figure 65:
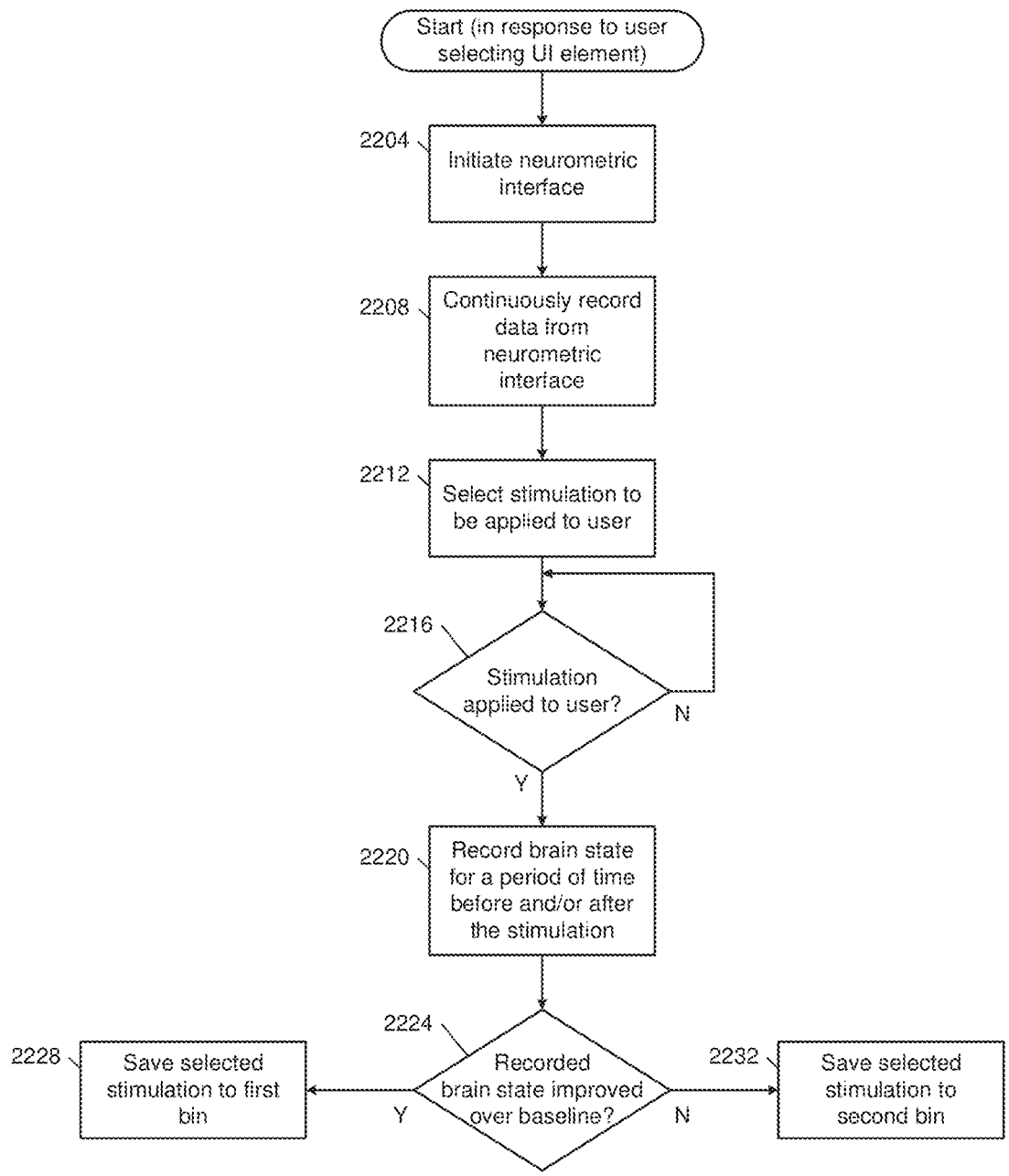
FIG. 65 is a flowchart of a system used in a professional baseball context to generate and bin brain states for training a machine learning model.

FIG. 65 is a flowchart of the NEPAS 100 used in a professional baseball context to generate and bin brain states for training a machine learning model. Control begins at 2204 in response to a user selecting a user interface element. At 2204, the NEPAS 100 initiates a neurometric interface 120. Control proceeds to 2208. At 2208, the NEPAS 100 continuously records data from the neurometric interface 120. Control proceeds to 2212. At 2212, the NEPAS 100 selects stimulation to be applied to a user. For example, the NEPAS 100 can select a video of a batter connecting with the ball on a pitch and/or a TMS/rTMS stimulation. Control proceeds to 2216, where the NEPAS 100 determines whether the stimulation was applied to the user. If at 2216 the answer is yes, control proceeds to 2220. Otherwise, control proceeds to 2216. At 2220, the NEPAS 100 records the brain state for a period of time before and/or after the stimulation. Control proceeds to 2224. At 2224, control determines whether the recorded brain state has improved over a baseline brain state. If at 2224 the answer is yes, control proceeds to save the stimulation selected at 2212 to a first bin (indicative of useful stimulations). Otherwise, control proceeds to 2232 to save the stimulation selected at 2212 to a second bin (indicative of not-necessarily-useful stimulations).

Integrated Financial Trading Platform

Improved Machine Learning Model

Referring back to FIGS. 50 and 55, at steps 1236 and/or 1196, the NEPAS 100 and/or the trading platform 900 can transform the snapshot of the brain state into a brain state score by inputting the snapshot into a trained machine learning model. In various implementations (and as previously described), the snapshot of the brain state may be a connectivity matrix. In various implementations, the trained machine learning model may be a novel, improved logistic regression model with a smoothing parameter. In various implementations, the improved logistic regression model may be represented by Equation 1 below:

$$p(y=1 \mid x; w) = \alpha\frac{1}{2} + (1-\alpha)\frac{1}{1+e^{-w^T x}} \qquad (1)$$

The output of Equation 1 represents the probability p of a data label y being 1 for any given explanatory variable, such as data instance x. In various implementations, the data instance x may be the previously described connectivity matrix. In various implementations, the data label y may be 1 when the data instance x is indicative of a brain state that will generate a favorable decision, such as one that is likely to lead to a profitable trade. Thus, in some embodiments, the probability p indicates the probability of the brain state represented by the data instance x generating a profitable trade. In various implementations, the classifier w may be a coefficient or weight indicative of the weight of the data instance x. When used in the right side of Equation 1, the classifier w may be a matrix, and $w^T$ may be the transpose of matrix w. In various implementations, $\alpha$ may be a smoothing parameter in a range of between 0 and 1. If $\alpha$ is 0, then the output p of Equation 1 will not be smoothed. If $\alpha$ is 1, then Equation 1 will be completely smoothed, and p will always be 0.5. Thus when a is 1, Equation 1 ignores data instance x. Conversely, when $\alpha$ is 0, the output p is determined entirely by data instance x and the classifier $w^T$ (and not affected by $\alpha$).

In various implementations, the smoothing parameter $\alpha$ may be used because the data instances x—such as connectivity matrices—may be noisy, rendering conventional logistic regression models unsuitable for predicting p. Generally, conventional logistic regression models assume and require input explanatory variables such as data instances x to be noise free, or at least largely so. In the current model, noisy data instances x are accounted for with the inclusion of the smoothing parameter α in Equation 1. In various implementations, α may be about 0.8. With α set to 0.8, the output p of Equation 1 will be limited to between 0.4 and 0.8. Thus, an α of greater than 0 but less than or equal to 0 will not allow the smoothed machine learning model represented by Equation 1 to overpredict the likelihood that data instance x will generate a profitable trade (because x is noisy). In various implementations, a may be varied based on how noisy or reliable data instances x are.

In various implementations, the value of the classifier w may be automatically determined through machine learning. In various implementations, w may be determined by minimizing the log-likelihood function L(w) represented by Equation 2 below:

$$L(w) = \sum \log\left(\alpha\frac{1}{2} + (1-\alpha)\frac{1}{1 + e^{-y_n(w^T x_n)}}\right) \quad (2)$$

In various implementations, w may be determined using a training data set $(x_n, y_n)$. Equation 2 represents a summation over the training data set $(x_n, y_n)$. With regularization, optimization problem of Equation 2 may be expressed by Equation 3 below:

$$w^* = \arg\min L(w) + \lambda_1 \|w\|_1 + \lambda_2 \|w\|_2 \quad (3)$$

In Equation 3, $\|w\|$ represents the norm of matrix vector or matrix w, and can be expressed as Equation 4 below:

$$\|w\|_1 = |w_1| + |w_2| + \ldots |w_D| \quad (4)$$

Because the absolute value function in Equation 4 has sharp edges at zero, it is not differentiable. Thus, optimization algorithms such as gradient descent which rely on differentiation may not be suited to solving the optimization problem of Equations 2 and 3. However, optimization algorithms suitable for performing lasso regression ("L1 regularization" or "$\lambda_1$ regularization") and/or ridge regression ("L2 regularization" or "$\lambda_2$ regularization") may be used to minimize L(w) in Equations 2 and 3 and determine w. In various implementations, $\lambda_1$ regularization may be performed on L(w) by using a neural network to determine w.

More generally, the NEPAS 100 and/or the trading platform 900 (and the machine learning models described in this specification) may be tuned to capture temporal frequencies, temporal convolutions, or temperatures—such as frequency heat maps of—the EEG sensors. Generally, the pattern of connections in the brain may be important. In various implementations, the machine learning models described in this specification may use a temporal filter in addition to or in lieu of the spatial filter (e.g., the PCA filter). In various implementations, the machine learning models described in this specification may be trained using data or metrics capturing the relative amplitudes of the EEG signals. In various implementations, the machine learning models described in this specification may be trained using data or metrics capturing the patterns of connections formed in the brain.

More generally, the NEPAS 100 and/or the trading platform 900 may include a contextual anterior model. The contextual anterior model may be a trained machine learning model. In various implementations, the contextual anterior model may be trained with data that captures the research performed by traders for a period of time leading up to a trade. In various implementations, this data may include the brain state of the trader as well as other behavioral characteristics of the trader.

Improved Error Handling

Figure 66:
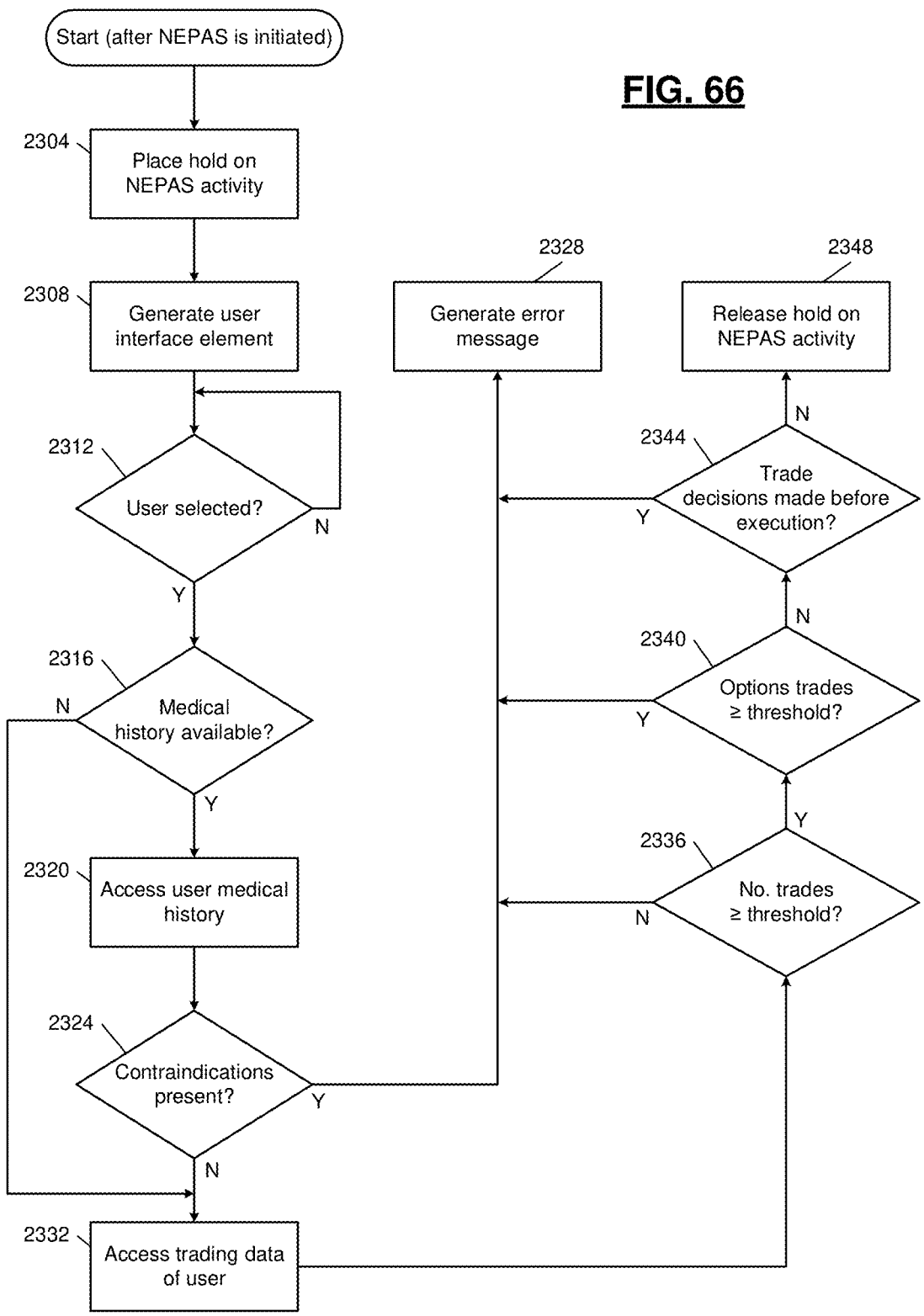
FIG. 66 is a flowchart of an example error-checking process for a neurometric-enhanced performance assessment system and/or a trading platform.

FIG. 66 is a flowchart of an example error-checking process for the NEPAS 100 and/or the trading platform 900. The process begins after the NEPAS 100 and/or the trading platform 900 is initialized. At 2304, control places a hold on activity on the NEPAS 100 and/or the trading platform 900. Control proceeds to 2308. At 2308, the NEPAS 100 and/or the trading platform 900 generates a user interface element on a user interface and proceeds to 2312. At 2312, control determines whether a user has been selected on the user interface generated at 2308. If at 2312 the user has been selected, control proceeds to 2316. Otherwise, control proceeds back to 2312 to await selection of the user. At 2316, the NEPAS 100 and/or the trading platform 900 determines whether medical history of the selected user is available. At 2316, if medical history is available, control proceeds to 2320. Otherwise, if medical history is not available, control proceeds to 2332. At 2320, the NEPAS 100 and/or the trading platform 900 accesses the medical history of the user and proceeds to 2324.

At 2324, the NEPAS 100 and/or the trading platform 900 parses the medical history and determines if the if data in the medical history indicates that EEG measurement is contraindicated. For example, the medical history may contain a data marker indicating that EEG measurement is contraindicated. In various implementations, the NEPAS 100 and/or the trading platform 900 may infer that EEG measurement is contraindicated if the medical history contains data indicating that the user has low blood sugar, is prescribed or taking sedatives, is undergoing a recent change in caffeine consumption patterns, is using hair product, has a raised level of intracranial pressure, has had an MRI within the past three months, and/or has a detached retina. If at 2324 the NEPAS 100 and/or the trading platform 900 determines that data in the medical history indicates that EEG measurement is contraindicated, control proceeds to 2328. Otherwise, control proceeds to 2332.

At 2328, the NEPAS 100 and/or trading platform 900 generates and outputs an error message via the user interface. In various implementations, the error message may indicate that EEG measurement is contraindicated for the user. At 2332, the NEPAS 100 and/or the trading platform 900 accesses trading data of the user. For example, the NEPAS 100 and/or the trading platform 900 may access a trading history of the user. In various implementations, the trading history may be the dataset to be used to train any of the machine learning models described in this specification. In various implementations, the trading history may be the dataset used to train the machine learning model used by the NEPAS 100 and/or the trading platform 900 to determine whether a brain state is likely to lead to a favorable decision, such as one that should generate a profitable trade. In various implementations, each trade in the trading history may be associated with a brain state at the time the trade was performed as well as an outcome of the trade. Control proceeds to 2336. At 2336, the NEPAS 100 and/or the trading platform 900 determines whether a number of trades present in the trading history meets or exceeds a threshold. In various implementations, the threshold may be about 500 trades. If at 2336, if the NEPAS 100 and/or the trading platform 900 determines that the number of trades does not exceed the threshold, control proceeds to 2328. At 2328, the NEPAS 100 and/or the trading platform 900 generates an error message. In various implementations, the error message may indicate that there is insufficient trading history for the user. Otherwise, if at 2336, the NEPAS 100 and/or the trading platform 900 determines that the number of trades equals or exceeds the threshold, control proceeds to 2340.

At 2340, the NEPAS 100 and/or the trading platform 900 parses the trading history and determines whether a number or percentage of options trades in the trading history meets or exceeds a threshold. If at 2340, the NEPAS 100 and/or the trading platform 900 determines that the number or percentage of options trades in the trading history meets or exceeds the threshold, control proceeds to 2328, where the NEPAS 100 and/or the trading platform 900 generates an error message. In various implementations, the error message may indicate that the user trades too many options. If at 2340 the NEPAS 100 and/or the trading platform 900 determines that the number of percentage or options trades in the trading history does not meet or exceed the threshold, control proceeds to 2344. At 2344, the NEPAS 100 and/or the trading platform 900 determines whether the trader's decisions in the trading history were made before execution of the trade. In various implementations, after each trade order is placed and/or executed, the NEPAS 100 and/or the trading platform 900 can generate a user interface prompt asking the trader how long prior to placing the trade order the user decided to place the trade. This data may be saved as part of the trading history. In various implementations, the NEPAS 100 and/or the trading platform 900 can generate user interface prompts surveying the trader whether trading decisions were made in advance of the trade order or contemporaneously. The NEPAS 100 and/or the trading platform 900 may parse the trading history in order to determine whether the trader's trading decisions are generally made before the trade, in advance of the trade, or contemporaneously with the trade. In examples where at least a subset of trading decisions were made in advance, the NEPAS 100 and/or the trading platform 900 may in embodiments parse the trading history in order to determine when, during the timeline before the trade, the trading decisions were typically made (including identifying patterns in the timing of trading decisions that were successful or not successful). If at 2344 the NEPAS 100 and/or the trading platform 900 determines that the trading decisions are made well before placing or executing the trade (and trading outcomes appear to be adversely affected), control proceeds to generate a message at 2328 indicating that the trader makes (or may be making) trading decisions too far in advance of placing trades. Conversely, if at the 2344 the NEPAS 100 and/or the trading platform 900 determines that the trading decisions are made contemporaneously with trading and trading outcomes appear to be adversely affected as a result, control proceeds to generate a message indicating that the trader makes (or may be making) trading decisions too late with respect to the trades. If no message is needed with respect to the timing of trading, control proceeds to 2348. At 2348, the NEPAS 100 and/or the trading platform 900 releases the hold placed on NEPAS 100 and/or trading platform 900 activity at 2304.

Generating Synthetic Datasets for Training Machine Learning Models

Figure 67:
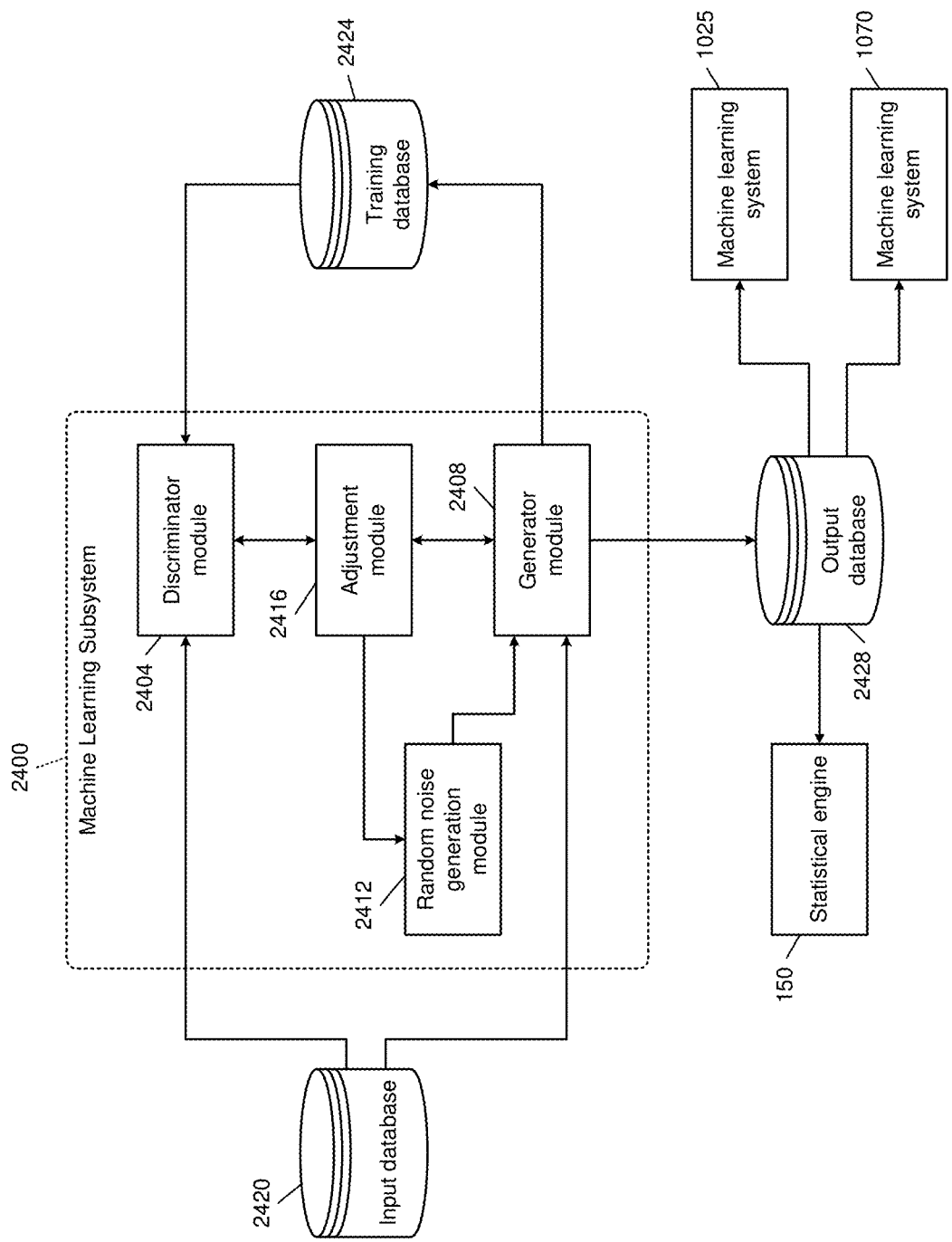
FIG. 67 is a functional block diagram of an example machine learning subsystem for generating synthetic datasets for training machine learning models.

FIG. 67 is a functional block diagram of an example machine learning subsystem 2400 for generating synthetic datasets for training machine learning models. In various implementations, the machine learning subsystem 2400 may use a smaller set of real-world data—such as raw EEG data or connectivity matrices—to build a larger synthetic dataset for training any of the machine learning models described in this specification. As illustrated in FIG. 67, the machine learning subsystem 2400 may include a discriminator module 2404, a generator module 2408, a random noise generation module 2412, and an adjustment module 2416. The discriminator module 2404 may be a machine learning model, such as a neural network. The generator module 2408 may be a machine learning model, such as a neural network. The random noise generation module 2412 may generate random input vectors that are input to the generator module 2408. In various implementations, an input database 2420 contains samples of real-world data, such as raw EEG data or connectivity matrices. The samples of real-world data may be read from the input database 2420 and input to the discriminator module 2404 and/or the generator module 2408. The adjustment module 2416 may adjust parameters of the discriminator module 2404 and/or the generator module 2408.

The generator module 2408 may generate and output synthetic datasets to the training database 2424 and/or output database 2428. Synthetic datasets output by the generator module 2408 and saved to the training database 2424 may be input to the discriminator module 2404. Synthetic datasets output by the generator module 2408 and saved to the output database 2428 may be input to any of the machine learning models previously described, such as the statistical engine 150, the machine learning system 1025, and/or the machine learning system 1070.

Figure 68:
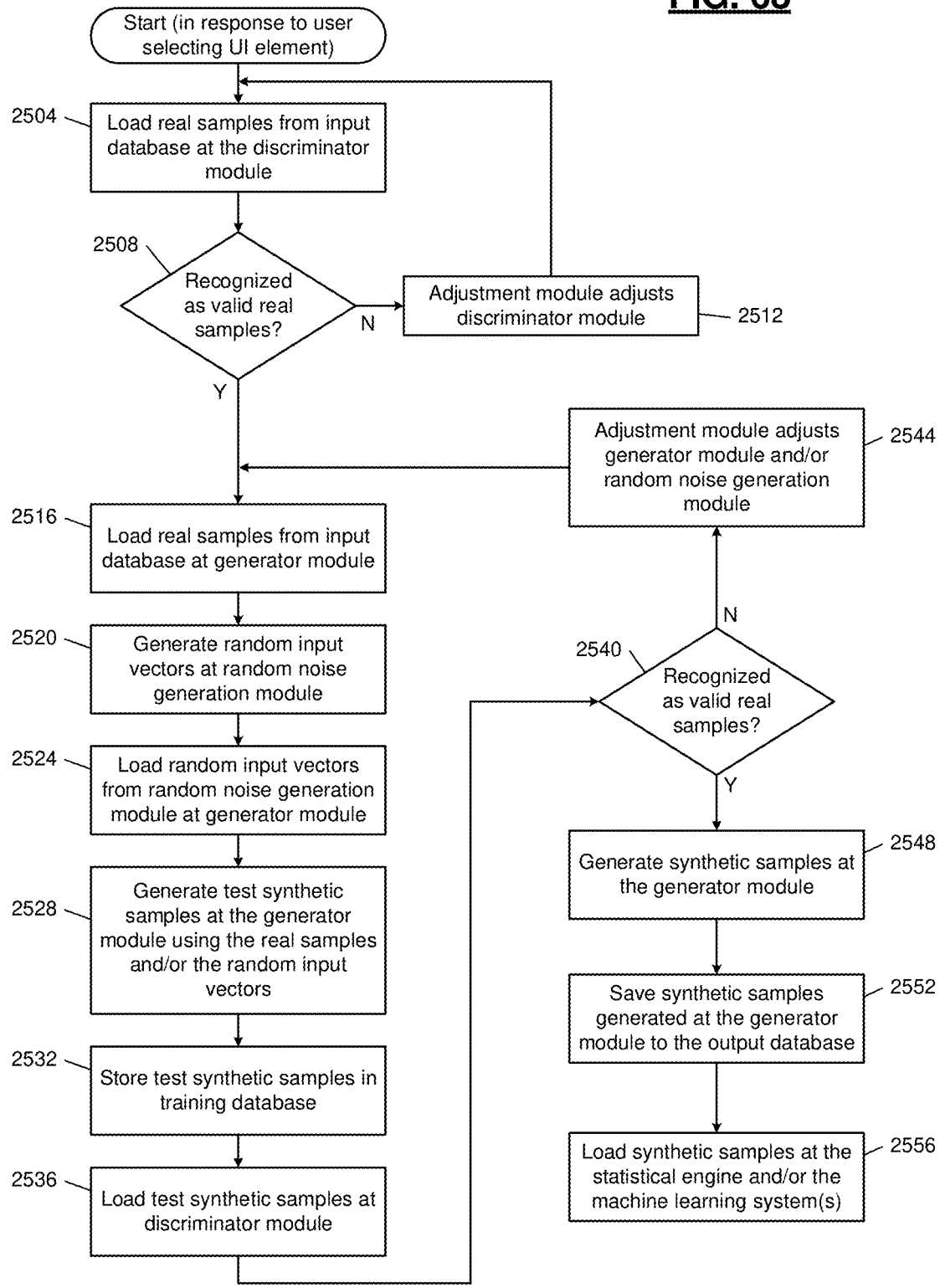
FIG. 68 is a flowchart of an example process of training a machine learning subsystem and generating synthetic datasets for use by machine learning models.

FIG. 68 is a flowchart of an example process of training the machine learning subsystem 2400 of FIG. 67 and generating synthetic datasets for use by machine learning models (such as those discussed in this specification). In various implementations, the process may begin in response to a user selecting a user interface element on a user interface generated by the NEPAS 100, the trading platform 900, and/or the machine learning subsystem. At 2504, real samples, such as the samples of real-world raw EEG data or connectivity matrices stored in input database 2420, are loaded at the discriminator module 2404. Control proceeds to 2508. At 2508, the discriminator module 2404 and/or the adjustment module 2416 determines whether the discriminator module 2404 recognized the real samples from the input database 2420 as valid real samples. For example, the real samples are input to the discriminator module 2404, and the discriminator module 2404 outputs whether the real samples are real or not real. If at 2508 the discriminator module 2404 does not recognize the real samples as valid real samples, control proceeds to 2512. At 2512, the adjustment module 2416 adjusts parameters of the discriminator module 2404. Control proceeds back to 2504.

If at 2508 the discriminator module 2404 recognizes the real samples as valid real samples, then the discriminator module 2404 may be considered trained, and control proceeds to 2516. At 2516, the real samples from the input database 2420 may be loaded at the generator module 2408. Control proceeds to 2520. At 2520, noise, such as random input vectors, may be generated at the random noise generation module 2412. Control proceeds to 2524. At 2524, the random input vectors generated at the random noise generation module 2412 may be loaded at the generator module 2408. Control proceeds to 2528. At 2528, the generator module 2408 generates a set of test synthetic samples using the real samples and/or the random input vectors. Control proceeds to 2532. At 2532, the test synthetic samples may be stored in the training database 2424. Control proceeds to 2536. At 2536, the discriminator module 2404 loads the test synthetic samples from the training database 2424. The discriminator module 2404 loads the test synthetic samples as inputs, and outputs a result indicative of whether or not the discriminator module 2404 recognizes the test synthetic samples as valid real samples. Control proceeds to 2540. At 2540, the discriminator module 2404 and/or the adjustment module 2416 determines whether the discriminator module 2404 recognized the test synthetic samples as valid real samples. If at 2540 the discriminator module 2404 does not recognize the test synthetic samples as valid real samples, control proceeds to 2544. If at 2540 the discriminator module 2404 recognizes the test synthetic samples as valid real samples, then the generator module 2408 is considered trained, and control proceeds to 2548.

At 2544, the adjustment module 2416 adjusts parameters of the generator module 2408 and/or the random noise generation module 2412. Control proceeds back to 2516. At 2548, the trained generator module 2408 generates a set of synthetic samples. In various implementations, these synthetic samples may be indistinguishable to the discriminator module 2404 from real-world raw EEG data and/or connectivity matrices. Control proceeds to save the synthetic samples generated at 2548 to the output database 2428 at 2552. Control proceeds to 2556. At 2556, the synthetic samples saved to the output database 2428 may be loaded by the statistical engine 150, the machine learning system 1025, the machine learning system 1070, and/or any of the machine learning models described in this specification.

The machine learning subsystem 2400 addresses problems in training machine learning models in scenarios where the real-world dataset is relatively small. As previously described, the machine learning subsystem 2400 may generate a substantially larger set robust of synthetic data for training any of the machine learning models described in this specification.

In various implementations, instead of or in addition to using the machine learning subsystem 2400, synthetic samples may be generated by using an LSTM and simulation data to simulate desirable brain states (e.g., brain states indicative of being "in the zone" for a given activity). In various implementations, the LSTM may be implemented on a spike-based platform.

Generally, in various implementations, instead of or in addition to using the machine learning subsystem 2400, additional samples may be generated by immersing users in simulations of real-world scenarios. Desirable EEG data and/or connectivity matrices may be captured during the simulations and correlated to positive outcomes for the users.

Generally, in various implementations, instead of or in addition to using the machine learning subsystem 2400, training libraries of brain states may be built by capturing brain states during periods of high market volatility. These training variables may define brain states that are not just tied to profit or loss, but also to other contextual variables.

Evaluating Machine Learning Models

Figure 69:
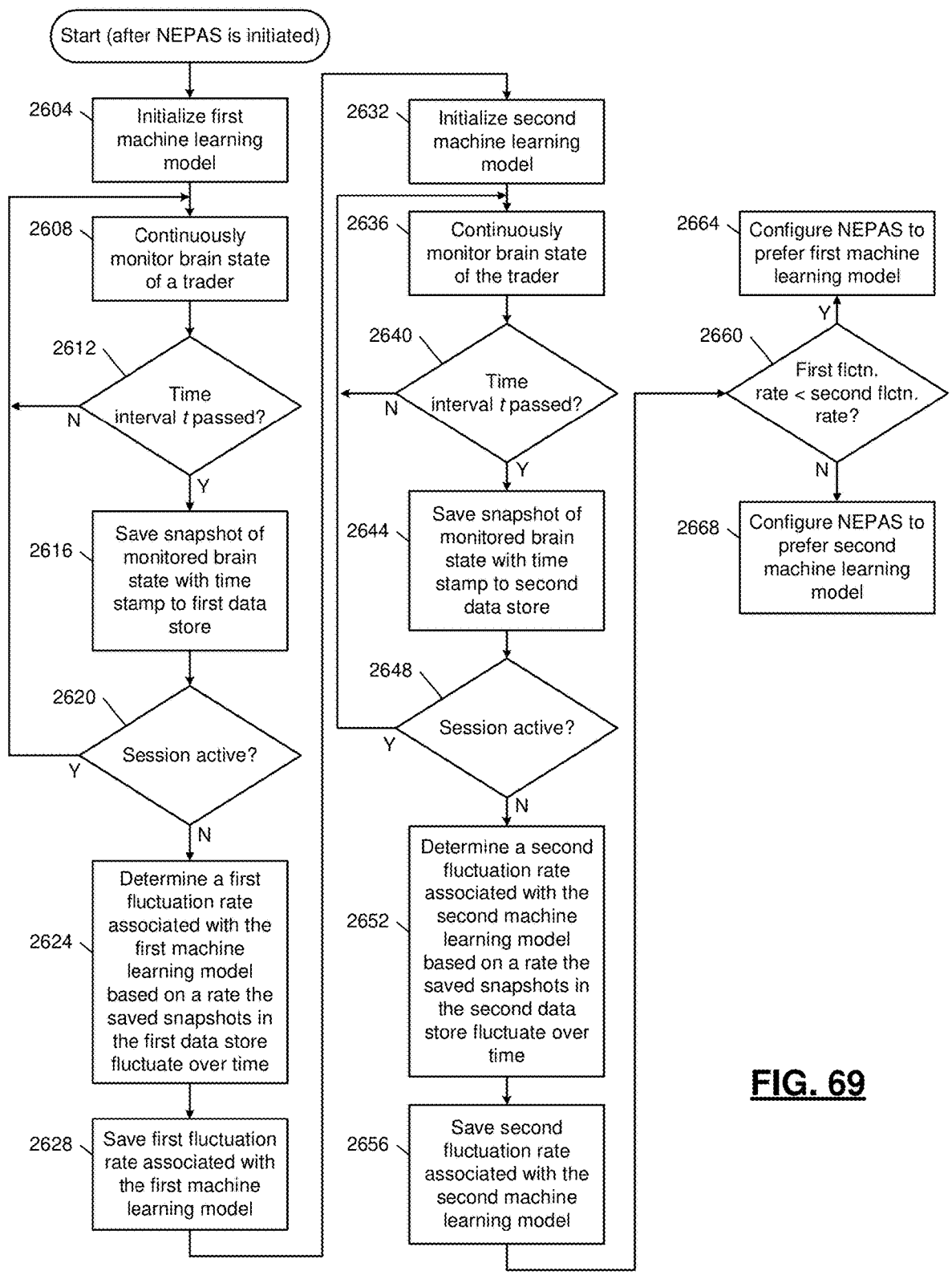
FIG. 69 is a flowchart of a process for evaluating the performance of machine learning models used by a neurometric-enhanced performance assessment system and/or a trading platform.

FIG. 69 is a flowchart of a process for evaluating the performance of machine learning models used by the NEPAS 100 and/or the trading platform 900. Generally, if machine learning models used to generate brain state scores have similar performance characteristics (e.g., accuracy of predictions), the process may determine which machine learning model is preferable. While two machine learning models are shown in FIG. 69, the concepts of the process may be scaled and applied to any number of machine learning models. In various implementations, the process begins after the NEPAS 100 is initialized. At 2604, the NEPAS 100 and/or the trading platform 900 initializes a first machine learning model and proceeds to 2608. At 2608, the NEPAS 100 and/or the trading platform 900 continuously monitors the brain state of a trader. In various implementations, the brain state monitored at 2608 may be generated and output by the first machine learning model. Control proceeds to 2612. At 2612, the NEPAS 100 and/or the trading platform 900 determines whether an elapsed time interval t has passed. If at 2612 the answer is no, control proceeds back to 2608. If at 2612 the answer is yes, control proceeds to 2616. At 2616, the NEPAS 100 and/or the trading platform 900 captures and saves a snapshot of the monitored brain state along with an associated time stamp to a first data store. Control proceeds to 2620. At 2620, control determines whether the NEPAS 100 and/or trading platform 900 session is still active. If at 2620 the answer is yes, control resets the elapsed time interval counter and proceeds back to 2608. If at 2620 the answer is no, control resets the elapsed time interval counter and proceeds to 2624.

At 2624, the NEPAS 100 and/or the trading platform 900 determines a first fluctuation rate associated with the first machine learning model. The first fluctuation rate may be determined based on a rate that the saved snapshots of the trader's brain state stored in the first data store fluctuate between a state exceeding a threshold and a state not exceeding the threshold over time. For example, the first fluctuation rate may be determined based on a rate the saved snapshots in the first data store fluctuate between a state indicative of a profitable trade and a state not indicative of a profitable trade. Control proceeds to 2628. At 2628, the NEPAS 100 and/or the trading platform 900 saves the first fluctuation rate associated with the first machine learning model. Control proceeds to 2632. At 2632, the NEPAS 100 and/or the trading platform 900 initializes a second machine learning model and proceeds to 2636. At 2636, the NEPAS 100 and/or the trading platform 900 continuously monitors the brain state of the trader. In various implementations, the brain state monitored at 2636 may be generated and output by the second machine learning model. Control proceeds to 2640. At 2640, the NEPAS 100 and/or the trading platform 900 determines whether the elapsed time interval t has passed. If at 2640 the answer is no, control proceeds back to 2636. If at 2640 the answer is yes, control proceeds to 2644. At 2644, the NEPAS 100 and/or the trading platform 900 captures and saves a snapshot of the monitored brain state along with an associated time stamp to a second data store. Control proceeds to 2648. At 2648, control determines whether the NEPAS 100 and/or trading platform 900 session is still active. If at 2648 the answer is yes, control proceeds back to 2636. If at 2648 the answer is no, control proceeds to 2652.

At 2652, the NEPAS 100 and/or the trading platform 900 determines a second fluctuation rate associated with the second machine learning model. The second fluctuation rate may be determined based on a rate that the saved snapshots of the trader's brain state stored in the second data store fluctuates between a state exceeding a threshold and a state not exceeding the threshold over time. For example, the second fluctuation rate may be determined based on a rate the saved snapshots in the second data store fluctuates between a state indicative of a profitable trade and a state not indicative of a profitable trade. Control proceeds to 2656. At 2656, the NEPAS 100 and/or the trading platform 900 saves the second fluctuation rate associated with the second machine learning model. Control proceeds to 2660. At 2660, the NEPAS 100 and/or the trading platform 900 compares the first fluctuation rate to the second fluctuation rate. If at 2660 the NEPAS 100 and/or the trading platform 900 determines that the first fluctuation rate is less than the second fluctuation rate, control proceeds to 2664. Otherwise, if at 2660 the NEPAS 100 and/or the trading platform 900 determines that the second fluctuation rate is not less than the first fluctuation rate, control proceeds to 2668. At 2664, control configures the NEPAS 100 and/or the trading platform 900 to prefer the first machine learning model. At 2668, control configures the NEPAS 100 and/or the trading platform 900 to prefer the second machine learning model.

Competitive Golf System with Sensor Fusion

Figure 70:
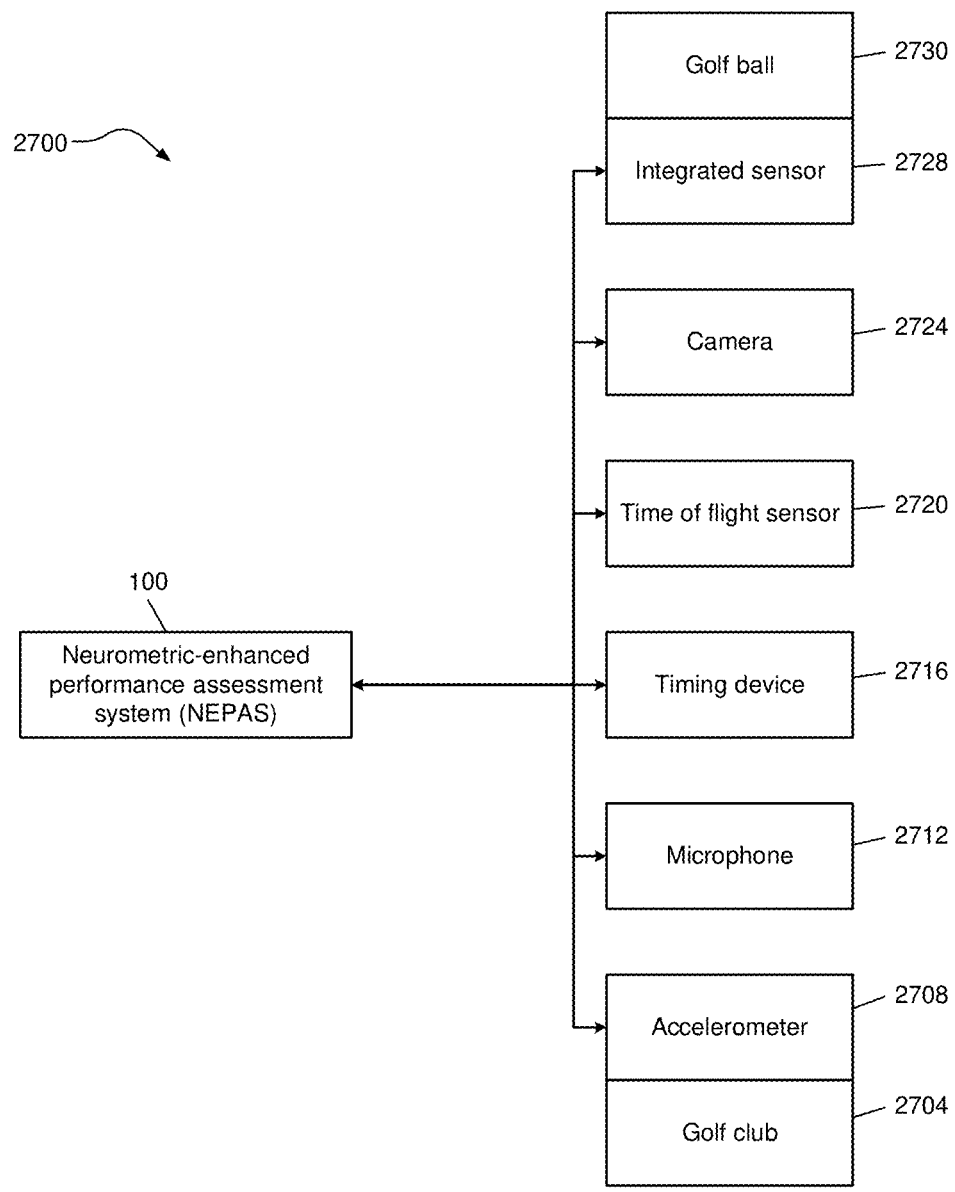
FIG. 70 is a function block diagram of neurometric-enhanced performance assessment system integrated with a golf system.

FIG. 70 is a function block diagram of the NEPAS 100 integrated with a golf system 2700. In various implementations, the golf system 2700 may include the NEPAS 100, a golf club 2704, an accelerometer 2708, one or more microphones 2712, a timing device 2716, one or more time of flight sensors 2720, one or more cameras 2724, and/or one or more sensors 2728 integrated with a golf ball 2730. In various implementations, the accelerometer 2708 may be removably coupled to the golf club 2704. For example, the accelerometer 2708 may be attached to the golf club 2704 at or near the handle. By attaching the accelerometer 2708 at or near the handle of the golf club 2704, the mass of the accelerometer 2708 may be relatively further away from the end of the moment arm of the golf club 2704 (e.g., near the head of the golf club 2704), minimizing the impact of the mass of the accelerometer 2708 on the handling characteristics of the golf club 2704. In various implementations, the sensors 2728 may be embedded within the golf ball 2730. In various implementations, the sensors 2728 may include a multi-axis accelerometer, a magnetometer, a GPS receiver, a timing device, and/or a transceiver. In various implementations, the sensors 2728 and/or the cameras 2724 may track and/or predict time of impact, location of impact on the club face, club face angle, type of club, number of club, direction of initial flight, acceleration, velocity, the flight path, spin rate, spin direction, angle of ascent, angle of descent, bounce height, number of bounces, roll distance, directional accuracy relative to target, distance from target at a point of conclusion of movement, g-forces at impact, degree of draw or fade, time in the air, and/or height apex of the golf ball 2730, among others.

In various implementations, the accelerometer 2708, microphones 2712, timing device 2716, time of flight sensors 2720, cameras 2724, and/or sensors 2728 may be operatively coupled to the NEPAS 100 and/or each other. For example, the accelerometer 2708, microphones 2712, timing device 2716, time of flight sensors 2720, cameras 2724, and/or sensors 2728 may be in electrical communication with various elements of the NEPAS 100 and/or each other through wired and/or wireless connections. In various implementations, the accelerometer 2708 may measure where the golf club 2704 is in the swing cycle. The accelerometer 2708 may also detect vibration, such as when the golf club 2704 strikes the ball or ground. In various implementations, the timing device 2716 may correlate the swing cycle data to brain states measured by the NEPAS 100 based on the time stamps of the swing cycle data and time stamps of the brain states. This allows the NEPAS 100 to identify the most relevant brain state data (e.g., the golfer's brain state proximate the period that the golfer initiates the swing to the period proximate the golf club 2704 making contact with the golf ball 2730).

In various implementations, the microphones 2712 may detect a distinctive sound signature generated when the golf club 2704 strikes the golf ball 2730. In various implementations, the microphones 2712 may be directional microphones, which can be oriented towards the golf ball 2730 in order to minimize detection of nuisance sounds from the surrounding environment. The NEPAS 100 and/or the timing device 2716 may compare the time stamps associated with the swing cycle data and/or the time stamps of the brain states against the time stamps associated with the distinctive sound signatures to error-check the swing cycle data and reject false positives in the swing cycle data erroneously indicating that the golf club 2704 struck the golf ball 2730. In various implementations, the identified false positives may be tagged with a data marker indicating their status as potential false positives or may be deleted from the swing cycle data.

In various implementations, the cameras 2724 may capture still images and/or videos of the golfer's stroke. The captured still images and/or videos may be used by the NEPAS 100 for analysis. In various implementations, data from the time-of-flight sensor 2720 and/or the sensors 2728 may be used by the NEPAS 100 for analysis.

In various implementations, the golf system 2700 can accurately measure the brain state at each point in the swing. In various implementations, the golf system 2700 can identify the specific brain state at each point in the swing— including at the period of time immediately before the golfer initiates the swing. In various implementations, the golf system 2700 may accurately measure, store, and analyze parameters about the swing, such as the face angle and/or the angle of attack of the head of the golf club 2704. In various implementations, the golf system 2700 can use measurements from the neurometric interface 120 to generate a visual image of what the golfer is visualizing in his or her mind during the golf swing. This visual image may be saved to a data store and/or output via a user interface.

Error-Checking for Neurophysiological Sensors

Figure 71:
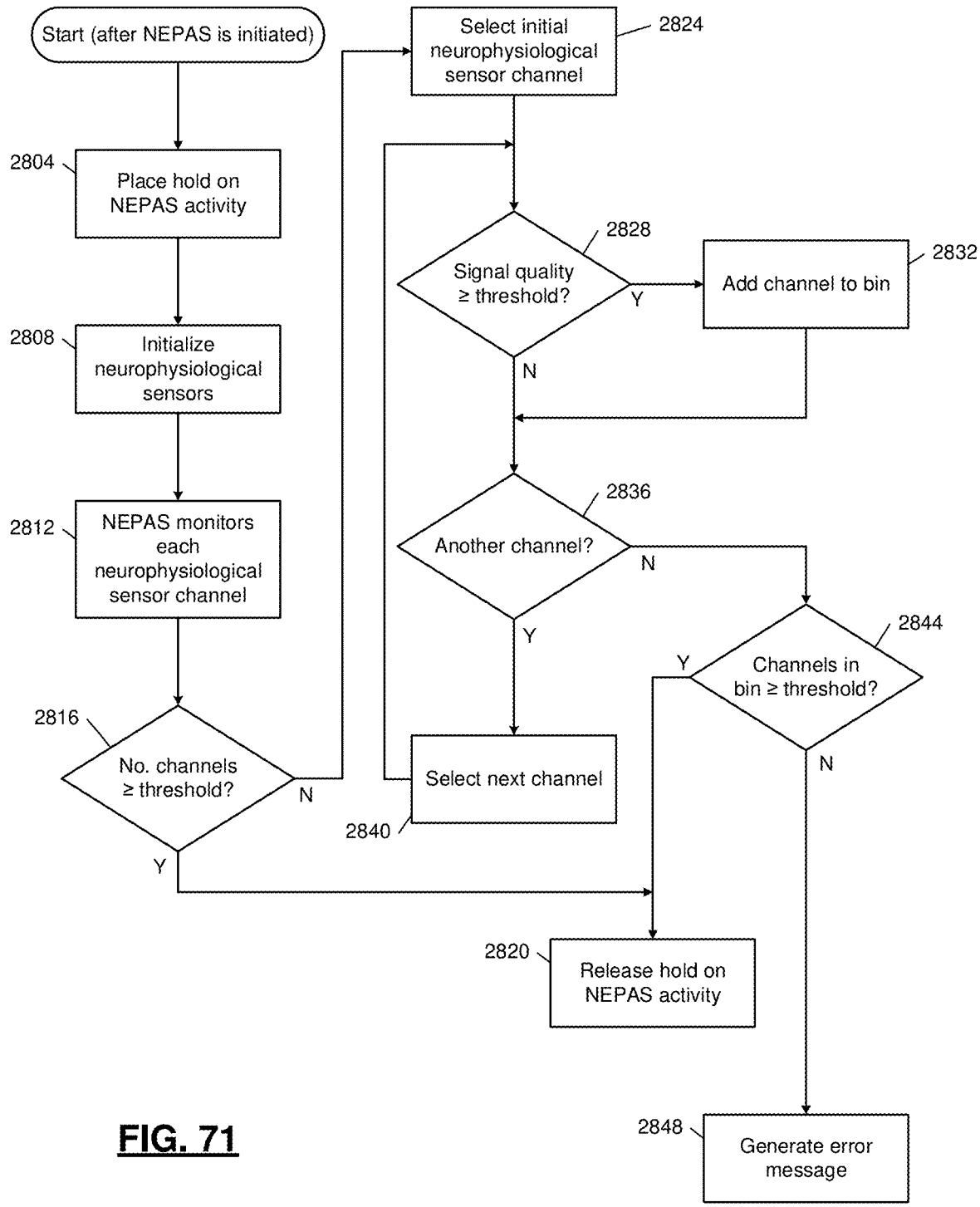
FIG. 71 is a flowchart of an error-checking process for neurophysiological sensors of a neurometric interface.

FIG. 71 is a flowchart of an error-checking process for the neurophysiological sensors of the neurometric interface 120. The process begins at 2804 after the NEPAS 100 is initialized. At 2804, control places a hold on NEPAS 100 and/or trading platform 900 activity. Control proceeds to 2808. At 2808, the NEPAS 100 initializes the neurophysiological sensors of the neurometric interface 120. In various implementations, the neurophysiological sensors may be EEG sensors. In various implementations, the EEG sensors may be wet electrodes. In various implementations, the EEG sensors may be dry electrodes. In various implementations, the EEG sensors may be intracranial electrodes. After the EEG sensors are initiated, control proceeds to 2812. At 2812, the NEPAS 100 and/or the trading platform 900 monitors each neurophysiological sensor channel. The NEPAS 100 and/or the trading platform 900 may determine a total number of neurophysiological sensor channels present. Control proceeds to 2816. At 2816, the NEPAS 100 and/or the trading platform 900 determines whether the total number of neurophysiological channels present meets or exceeds a threshold. In various implementations, the threshold may be a total number of channels. In various implementations, the threshold may be 20 channels. If at 2816 the NEPAS 100 and/or the trading platform 900 determines that the number of channels meets or exceeds the threshold, control proceeds to 2820. Otherwise, control proceeds to 2824.

At 2820, the NEPAS 100 and/or the trading platform 900 releases the hold on activity. At 2824, the NEPAS 100 and/or the trading platform 900 selects an initial neurophysiological sensor channel and proceeds to 2828. At 2828, the NEPAS 100 and/or the trading platform 900 determines whether the signal quality meets or exceeds a threshold. In various implementations, the signal quality may be a signal-to-noise ratio (SNR). If at 2828 the NEPAS 100 and/or the trading platform 900 determines that the signal quality meets or exceeds the threshold, control proceeds to 2832. At 2832, the NEPAS 100 and/or the trading platform 900 adds a count representing the channel and/or its location to a bin. Control proceeds to 2836. If at 2828 the NEPAS 100 and/or the trading platform 900 determines that the signal quality does not meet or exceed the threshold, control proceeds to 2836.

At 2836, the NEPAS 100 and/or the trading platform 900 determines whether neurophysiological sensor channel is present. If yes, control proceeds to 2840. Otherwise, control proceeds to 2844. At 2840, the NEPAS 100 and/or the trading platform 900 selects the next channel and proceeds back to 2828. At 2844, the NEPAS 100 and/or the trading platform 900 determines whether the count representing the number and/or location of channels in the bin exceeds a threshold. In various implementations, the threshold may be eight channels from electrodes located at the frontal central region of the scalp/brain. If at 2844 the count exceeds the threshold, control proceeds to 2820. Otherwise, control proceeds to 2848, where the NEPAS 100 and/or the trading platform 900 generates and outputs an error message to a user interface. In various implementations, the error message may indicate that there are an insufficient number of channels and/or that the signal quality of the neurophysiological sensors is not sufficient.

In various implementations, each EEG monitoring site may be monitored by more than one EEG electrode. For example, each EEG monitoring site may be monitored by three electrodes. In various implementations, the NEPAS 100 and/or the trading platform 900 may reject the dirtier signals from each EEG monitoring site, keeping only the cleanest EEG signal.

Upscaling Neurophysiological Sensor Data

Figure 72:
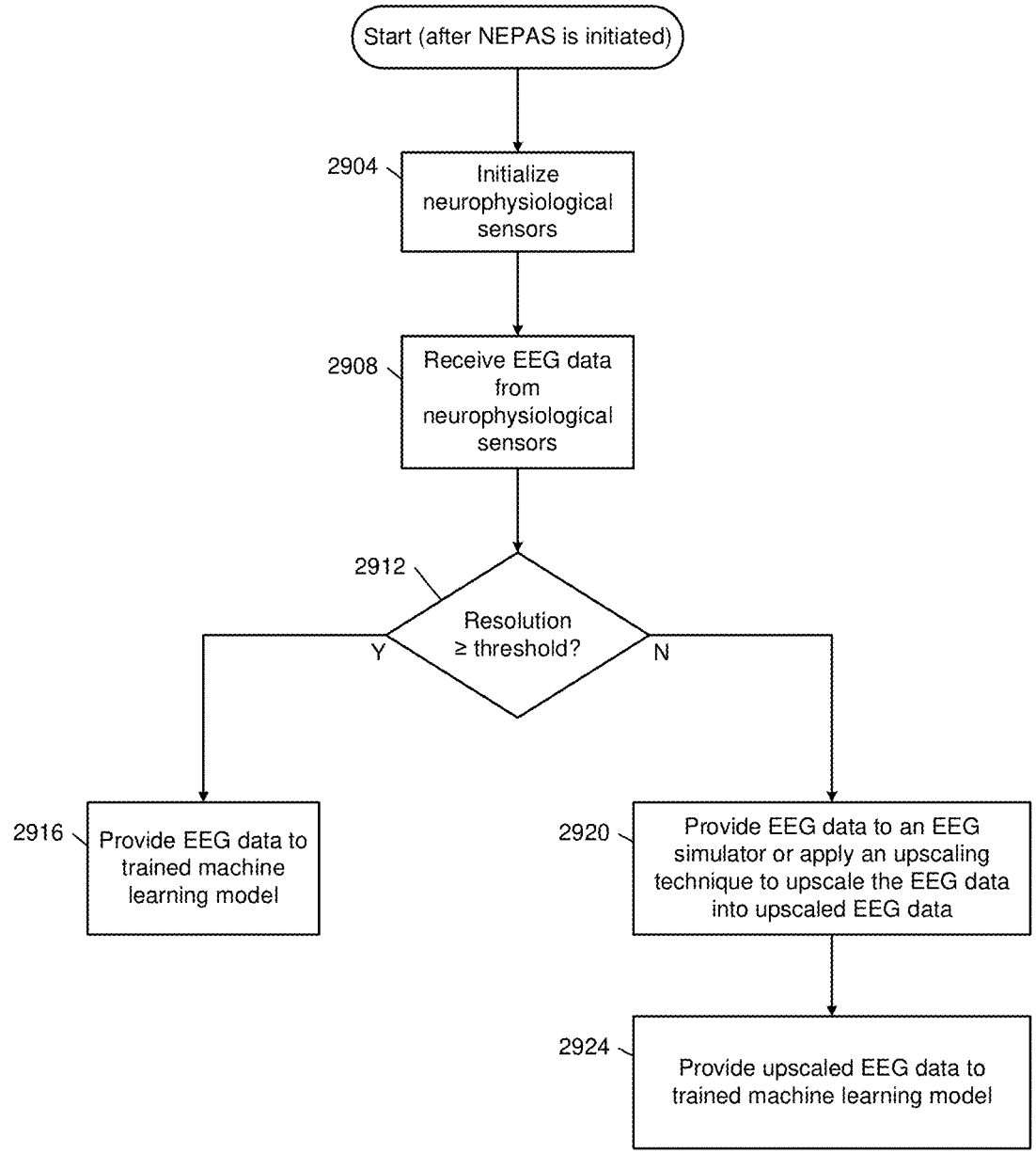
FIG. 72 is a flowchart of a process to selectively upscale neurophysiological sensor data.

FIG. 72 is a flowchart of a process to selectively upscale neurophysiological sensor data. The process begins at 2904 after the NEPAS 100 and/or the trading platform 900 is initialized. At 2904, the NEPAS 100 and/or the trading platform 900 initializes the neurometric interface 120 and proceeds to 2908. At 2908, the NEPAS 100 and/or the trading platform 900 receives EEG data from the neurophysiological sensors of the neurometric interface 120. Control proceeds to 2912. At 2912, the NEPAS 100 and/or the trading platform 900 determines whether the resolution of the EEG data meets or exceeds a threshold. If at 2912, the resolution meets or exceeds the threshold, control proceeds to 2916. Otherwise, control proceeds to 2920. At 2916, the NEPAS 100 and/or the trading platform 900 provides the EEG data to a trained machine learning model.

At 2920, the NEPAS 100 and/or the trading platform 900 provides the EEG data to an EEG simulator or applies an upscaling technique to the EEG data. In various implementations, if the EEG data is missing data from electrodes, a machine learning model may be used to generate synthetic or simulated data to substitute for the missing data. In various implementations, if the EEG data is of insufficient resolution, an upscaling technique may be applied to upscale low-resolution EEG data into high-resolution EEG data. Control proceeds to 2924. At 2924, the NEPAS 100 and/or the trading platform 900 provides the upscaled EEG data to the trained machine learning model.

Integrated Accelerometers for Data Cleansing

In various implementations, the neurophysiological sensors of the neurometric interface 120 may be associated with an accelerometer. For example, if the neurometric interface 120 is a wearable headset, the accelerometer may be coupled to the headset. Thus, the accelerometer may be able to detect when the user's head moves by detecting movements of the wearable headsets. The neurophysiological sensors may be wet EEG electrodes and/or dry EEG electrodes. Generally, when the headset moves, the momentum of the headset may cause it and the EEG electrodes to shift position, generating noisy sensor data. This may be particularly true when the neurophysiological sensors are dry EEG electrodes, as dry EEG electrode headsets are generally more massive than wet EEG electrode headsets.

Figure 73:
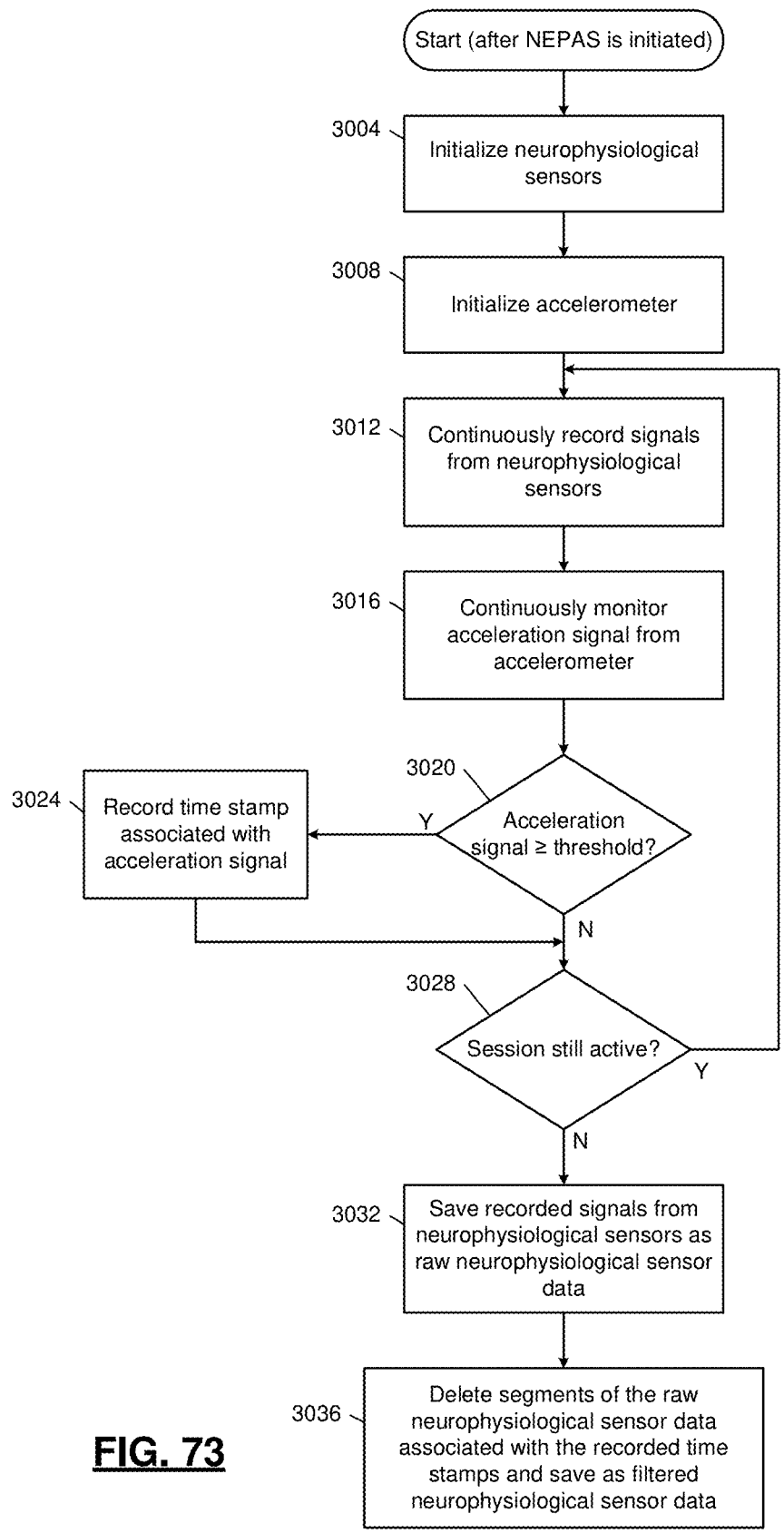
FIG. 73 is a flowchart of a process to automatically detect shifting neurophysiological interfaces and remove noisy signals associated with the shifts.

FIG. 73 is a flowchart of a process to automatically detect shifting neurophysiological interfaces 120 and remove noisy signals associated with the shifts. The process begins at 3004 after the NEPAS 100 and/or the trading platform 900 is initialized. At 3004, the NEPAS 100 and/or the trading platform 900 initializes the neurophysiological sensors of the neurometric interface 120. Control proceeds to 3008. At 3008, the NEPAS 100 and/or the trading platform 900 initializes an accelerometer coupled to the neurometric interface 120. Control proceeds to 3012. At 3012, the NEPAS 100 and/or the trading platform 900 continuously records signals from the neurophysiological sensors. Control proceeds to 3016. At 3016, the NEPAS 100 and/or the trading platform 900 continuously monitors the acceleration signal from the accelerometer. Control proceeds to 3020. At 3020, the NEPAS 100 and/or the trading platform 900 determines whether the monitored acceleration signal meets or exceeds a threshold. If yes, control proceeds to 3024. Otherwise, control proceeds to 3028. At 3024, the NEPAS 100 and/or the trading platform 900 records a time stamp associated with the acceleration signal. Control proceeds to 3028.

At 3028, the NEPAS 100 and/or the trading platform 900 determines whether user session is still active (e.g., whether to continue monitoring brain states using the neurometric interface 120). If at 3028, the session is still active, control proceeds back to 3012. Otherwise, control proceeds to 3032. At 3032, the NEPAS 100 and/or the trading platform 900 saves the recorded signals from the neurophysiological sensors as raw neurophysiological sensor data. Control proceeds to 3036. At 3036, the NEPAS 100 and/or the trading platform 900 deletes segments of the raw neurophysiological sensor data associated with the recorded time stamps and saves the data as filtered neurophysiological sensor data.

More generally, in various implementations, the NEPAS 100 and/or the trading platform 900 may use a trained machine learning model to filter raw EEG data. In various implementations, a user may be equipped with a neurometric interface 120 and tasked to perform activities inducing noise. The machine learning model may be trained to recognize characteristics of EEG data when the user is performing noise-inducing activities. The trained machine learning model may then be used to recognize noise-related characteristics in the raw EEG data and remove the characteristics.

More generally, in various implementations, the NEPAS 100 and/or the trading platform 900 may include built-in tools to monitor the contact quality of the neurometric interface 120. In various implementations, the NEPAS 100 and/or the trading platform 900 may automatically monitor for: insufficient gel between the electrode and the scalp, improper contact of the electrode through hair, inconsistent day-to-day positioning of EEG electrodes, loose electrodes, shifting electrodes (e.g., electrodes disturbed by headphones or headwear), electrodes displaced as a result of jaw motion, electrodes displaced as a result of scratching, signal noise as a result of eye, jaw, or head movements, signal noise resulting from speaking (the NEPAS 100 and/or the trading platform 900 may include a microphone to detect when a user is speaking), poor connections between electrodes and the NEPAS 100 and/or the trading platform 900, signal spikes, and/or transient artifacts.

User Interfaces and Cloud Deployment

In various implementations, one or more portions of the NEPAS 100 and/or the trading platform 900 may be deployed to the cloud. In various implementations, the NEPAS 100 and/or the trading platform 900 may generate custom user interfaces for multiple users. For example, the user interfaces may provide instructions to traders on how to self-don the neurometric interface 120. In various implementations, the NEPAS 100 and/or the trading platform 900 may provide for a fully automated, one-button training pipeline. The end-user experience may be for the user to plug the neurometric interface 120 into a single physical apparatus containing the local portions of the NEPAS 100 and/or the trading platform 900 (in some embodiments, the remaining portions may be remotely deployed). The NEPAS 100 and/or the trading platform 900 may generate instructions for the user to don the neurometric interface 120 and automatically run through the evaluation and/or prediction processes with the user.

Competitive Athlete Scenario

Figure 74:
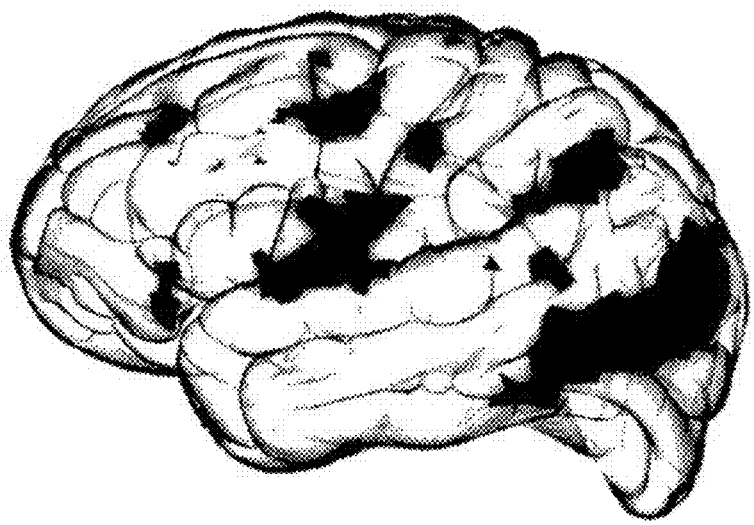
FIG. 74 illustrates an example of a 3D spatial representation of a brain state of a novice with extra-active pathways illuminated.
Figure 75:
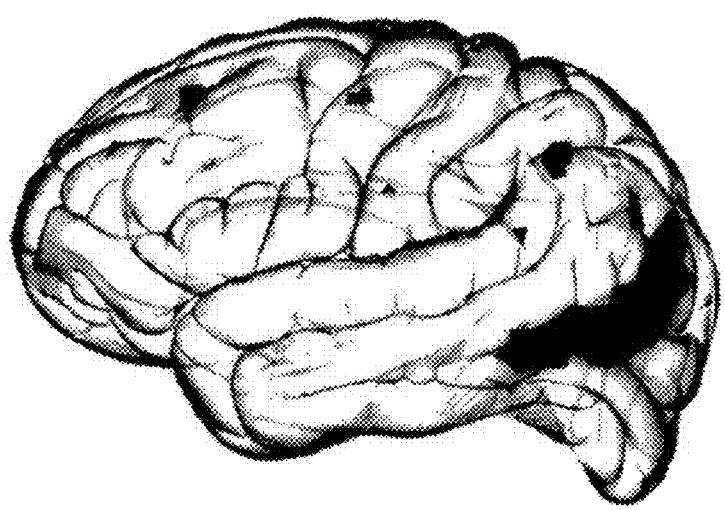
FIG. 75 illustrates an example of a 3D spatial representation of a brain state of an expert with extra-active pathways illuminated.

Using the NEPAS 100, proven neuroscience can be applied to real-world situations where human performance can be measurably impacted. An implementation of the NEPAS 100 has been used for over ten years in elite military applications (e.g., DARPA) and produced dramatic improvements in the performance of front-line military personnel operating in high-stakes settings. The NEPAS 100 may include the world's largest brain database associated with elite performance. In proprietary trading applications, various implementations of the NEPAS 100 can reliably predict the profitability of trades in advance solely based on brainwaves. In competitive golf applications, the NEPAS 100 may be able to improve putting accuracy by 30%. While at DARPA, scientists originally demonstrated that the brains of expert marksmen look profoundly different than those of novices, especially when they are "in the zone." Then, using an implementation of the NEPAS 100, these marksmen were trained on how to reliably access the expert brain state—increasing their shooting accuracy in just a few sessions. Leveraging the brain database, the NEPAS 100 trains people to rewire their brain activity so that they more reliably enter the "zone," dramatically impacting performance. FIG. 74 illustrates an example of a 3D spatial representation of a brain state of a novice with extra-active pathways illuminated. FIG. 75 illustrates an example of a 3D spatial representation of a brain state of an expert with extra-active pathways illuminated. Use of the NEPAS 100 led to doubled performance (e.g., accuracy) of elite sharpshooters after just a few training sessions.

In a competitive athletic scenario (e.g., professional baseball), proprietary neural metrics allows the NEPAS 100 to uniquely assess players "from the neck up." The NEPAS 100 may include proprietary neural training systems that require players' brains and thus enhance their athletic performance. As stated by professional baseball player Ty Cobb, "the most important part of a player's body is above his shoulders."

Modern neuroscience techniques now allow us, for the first time, to look into the brain and obtain novel metrics about its performance. Because of their cutting-edge nature as well as the critical importance of the brain to sports performance, these types of neuroscience-based metrics could very realistically offer professional baseball players and/or teams a meaningful competitive advantage in a very short time.

Given proven success at developing neuro-metrics for the NEPAS 100 that "move the needle" in other settings (e.g., elite military environments), the NEPAS 100 can be used to develop proprietary neuro-metrics that offer professional baseball players and/or teams this same type of edge. Over a dozen potential brain-based metrics have been identified for the NEPAS 100 that could be both practical and useful to professional baseball players and/or teams.

Illustrative neural metrics include (1) the speed with which a batter's brain can "recognize" a pitch. Based on multiple studies as well as common sense, there is good reason to imagine that it could be very predictive of player's batting averages over time. This metric could be easily and reliably assessed using EEG-based evoked responses through the NEPAS 100.

Illustrative neural metrics include (2) visuo-motor connectivity. Based on research, it has been demonstrated that the visuo-motor connectivity levels in player's brains could also be predictive of player's athletic performance. These connectivity levels would be assayed by combining visual stimulation cues with transcranial stimulation of player's motor cortices, such as via the NEPAS 100.

Illustrative neural metrics include (3) ocular efficiency. There is an extensive body of research demonstrating that eye movement patterns, particularly when coupled with other neurophysiological measures (e.g., heart rate), can be highly predictive of athletic performance, both in baseball and other sports. Nonetheless, there are no commercially available tools that allow baseball teams to capture this information in a scientifically valid and actionable manner. To address these needs, examples of the NEPAS 100 include a tablet-based app that captures player's eye movements (as well as other physiological measures) when they watch game footage, quickly and reliably measuring cognitive fatigue and predicting players' game-day performance.

The NEPAS 100 may be used to: (1) inform game-day managerial decisions based on players' cognitive "fitness"; (2) predict player slumps more quickly than traditional statistical measures, while also obtaining control signals that can be used to tune interventions; and/or (3) integrate neural metrics into player selection and development, particularly in young athletes.

Because players' physical skills have historically been easier to measure and train than their cognitive ones, notwithstanding how important mental performance is to the game, "brain training" has historically taken a back-seat to physical training in baseball. During the past few years, as a direct outgrowth of recent neuroscience advances, cognitive training (e.g., addressing cognitive readiness, sleep/fatigue, visual processing, etc.) has become increasingly important in professional baseball and other sports. Because neuroperformance is both a relatively new and rapidly evolving field, and because there are still very few bona-fide "experts" in the field, professional baseball players and/or teams that move quickly enough to adopt the NEPAS 100 will almost certainly be able to develop a substantial competitive edge in this arena. This first mover advantage, in and of itself, could very realistically have a dramatic impact on players' and/or teams' performance in as little as two years.

Illustrative neural training options include (1) neurofeedback. The NEPAS 100 includes neurofeedback tools for both snipers and golfers that have been shown in multiple studies to produce extraordinarily strong results. Examples of the golf system 2700, which trains participant's brains to get "into the zone" when they step up to a golf ball, has been shown to improve putting accuracy by 30% after only a month of training. Based on this work, as well as an advanced understanding of what an optimal brain state looks like in a batter, the NEPAS 100 can reliably train batters' brains to get into an optimal mental state when they step up to the plate—almost certainly offering players and/or teams that use the NEPAS 100 a meaningful edge.

Illustrative neural training options include (2) neurostimulation. The NEPAS 100 can provide brain stimulation techniques that act directly on the central nervous system to rapidly and dramatically improve athletic performance. These techniques, which typically involve non-invasive electrical, magnetic, or ultrasonic brain stimulation have been clearly shown to positively affect brain function, while simultaneously promoting learning and memory. These techniques are both easy to implement and extremely safe.

Illustrative neural training options include (3) visuo-motor training. Research demonstrates that: (a) the brain's visual processing capacities are highly trainable and (b) visuo-motor training can immediately translate into athletic performance improvements. For example, if a batter's brain learns how to recognize a pitch more quickly, this should directly translate into improved batting performance. The NEPAS 100 includes proven tools adapted to provide visuo-motor training.

The NEPAS 100 may be used for player identification: brain-based metrics, such as neural metrics, may be used to accurately predict player success or failure. The NEPAS 100 may be used for player development: neural metrics and/or neural training may be used to provide personalized, brain-based training programs and development plans for players. The NEPAS 100 may be used in health and safety applications: neural metrics and/or neural training may be used in data and programs that help players avoid injury and improve mental health.

The NEPAS 100 may be used in a study to establish the efficacy of a program using the NEPAS 100. In various implementations, the study ideally involves ten players for 30 days (five players with above a 0.300 batting average and five players with below a 0.250 batting average). Each player spends 15-20 minutes a day in a batting cage while the NEPAS 100 measures their brainwaves. A brief brain assessment may also be performed on each player using the NEPAS 100 before they go into the batting cage. The NEPAS 100 may use machine learning models to identify brainwave "signatures" in each of the players that correlate with (and predict) relevant statistics associated with quality at-bats. The data may be analyzed over time for individual players, and also used to identify differences between the players based on their skill levels. In addition to validating key brain metrics that predict batting success (translating into assessment tools), the study also allows the NEPAS 100 to validate potential brain-state targets for neurofeedback and neuromodulation. At the conclusion of the study, the NEPAS 100 may produce a detailed report documenting identified brain "signatures" that were correlated with relevant batting statistics as well as the statistical power of the findings.

Illustrative neurostimulation options include (1) applying transcranial stimulation over the pre-supplementary motor cortex (pSMA). This may induce plastic changes that improve a hitter's ability to inhibit their swing on an unfavorable pitch. This hypothesis is based on experiments demonstrating that pSMA is more active in players than controls and that it is the site of motor inhibition. This would translate into an improved OBP and plate discipline.

Illustrative neurostimulation options include (2) applying transcranial stimulation to the fusiform gyrus. This may induce plasticity and promote pitch trajectory learning and representation, and thus we would expect it to result in quicker pitch recognition and better OBP. This hypothesis is based on experiments demonstrating that the fusiform gyrus represents pitch trajectories in hitters and is a privileged area that promotes fast responses and actions.

Illustrative neurostimulation options include (3) using photobiomodulation (PBM) to improve player performance in general. This is a technique that delivers near-infrared light to the brain with the goal of increasing energy metabolism. The light is presumed to be accepted by the body's mitochondria, leading to higher levels of cellular energy. PBM of the muscle has already been shown to aid in sports performance and recovery. Here, transcranial PBM, which has been shown to increase functional connectivity in the human brain, would be employed to deliver energy to brain regions identified to be metabolically demanding during gameplay. All brain circuits require a steady supply of cellular energy for proper functioning (signaling), and it is expected that increased cerebral energy metabolism will enhance performance. One benefit of PBM is that it can be applied in a minimally invasive and potentially concealed fashion: e.g., using light emitting diodes (LEDs) that are located on the inside of a baseball cap and/or batting helmet.

In another market, the NEPAS 100 may be integrated into a golf system. The golf system may use the NEPAS 100 to help golfers rewire their brains so that they can reliably access an optimal mental state prior to initiating a golf swing. For example only, this may improve putting accuracy by about 30% after about 30 days of training. In various implementations, the golf system includes a medical-grade headset that measures brain data to determine whether the brain is "in the zone" or not. In various implementations, the golf system provides each golfer a custom training program based on their unique brain as well as a mechanics benchmark assessment. In various implementations, the golf system includes a mobile app for tracking, analyzing, sharing, and improving a golfer's performance.

Automated Brain-State-Dependent Trading Platform

In various implementations, the NEPAS 100 and/or the trading platform 900 can make real-time predictions—based solely on a trader's brainwaves—as to whether trades will be profitable or unprofitable. In some examples, the predictions have an accuracy exceeding 62%, significantly exceeding the 50% accuracy indicated by chance. In some examples, the 62% accuracy is calculated based on over 175,000 transactions over a three-year time period (the statistical probability that this is due to chance alone is less than one in ten million).

In some studies, traders utilizing the NEPAS 100 and/or the trading platform 900 outperformed traders that did not utilize either the NEPAS 100 or the trading platform 900 by about an 800% margin and generated a Sharpe ratio of about 7.1. Table 12 below demonstrates some results of studies showing metrics where traders utilizing the NEPAS 100 and/or the trading platform 900 outperformed traders that did not:

TABLE 12

| Profit and Loss (P&L) Analysis | NEPAS 100 and/or Trading Platform 900 Not Used | NEPAS 100 and/or Trading Platform 900 Used |
|---|---|---|
| Cumulative P&L | 3.4% | 30.0% |
| Daily Volatility | 1.43% | 1.50% |
| Sharpe Ratio | 0.8 | 7.1 |
| Downside Deviation | 1.0% | 0.5% |
| Annualized Downside | 16.3% | 7.7% |
| Sortino Ratio | 1.2 | 21.9 |
| % Up Days | 56% | 73% |
| % Down Days | 44% | 27% |
| Largest Up Day | 3.5% | 6.2% |
| Largest Down Day | −4.5% | −2.6% |
| Maximum Drawdown | 7.3% | 2.6% |

Based on a trader's brain state, an example system may programmatically take action and/or programmatically prevent action from being taken. Examples of automatic action include prompting the trader: for example, if the system determines that the trader's brain state suggests that the trader is not operating at peak performance, the system may present this determination to the trader when placing a trade. For example, the trader may need to confirm placement of the trade in advance; or the trade may go through after a small delay (for example, less than 5 seconds). In various implementations, the trader may be able to circumvent the delay by confirming the trade. In various implementations, the system may actually prevent the trade from going through this prevention may be shown to the trader or may be transparent, such that the trader does not know at that moment that the trade was not executed. On the other hand, if the system determines that the trader's brain state suggests that the trader is operating at peak performance, the system may indicate this determination to the trader to encourage the trader to place trades while operating at peak performance.

The system may also place other trades, according to risk models and subject to limits (such as total amount, percentage of holding, etc.), based on the trader's brain state. For example, if the system determines that the trader's brain state suggests that the trader is not operating at peak performance, in response to placement of a trade by the trader, the system may execute one or more counter-trades to hedge risk. As a simple example, if the trader shorts an equity, the counter-trade may include taking a long position on the equity. As another action, the system may decrease an amount of the trade based on off-peak performance. On the other hand, if the system determines that the trader's brain state suggests that the trader is operating at peak performance, the system may automatically place a consistent trade. For example, the system may increase the volume of the trade and/or place a parallel trade from a separate account.

In various implementations, some or all automatic actions may be governed by manual review. For example, placement of other trades may be screened by a trading manager or automated trading supervisor. In various implementations, the other trades may proceed if not stopped by the manual review within a predetermined period of time, such as 10 seconds. In other implementations, a trade may only proceed upon explicit approval. In another example, prevention of a trader's trade due to their performance appearing to be sub-optimal may be conditioned on manual review. The manager may approve a trade despite an automated prevention of the trade. In various implementations, there may be different thresholds depending on one or more factors, such as amount of the trade in absolute dollars, downside risk in absolute dollars, amount of the trade as a percentage of holdings, etc. These factors may be scaled depending on the trader. For example, some traders are responsible for a wider array of holdings and/or may be authorized to make larger trades.

Figure 76:
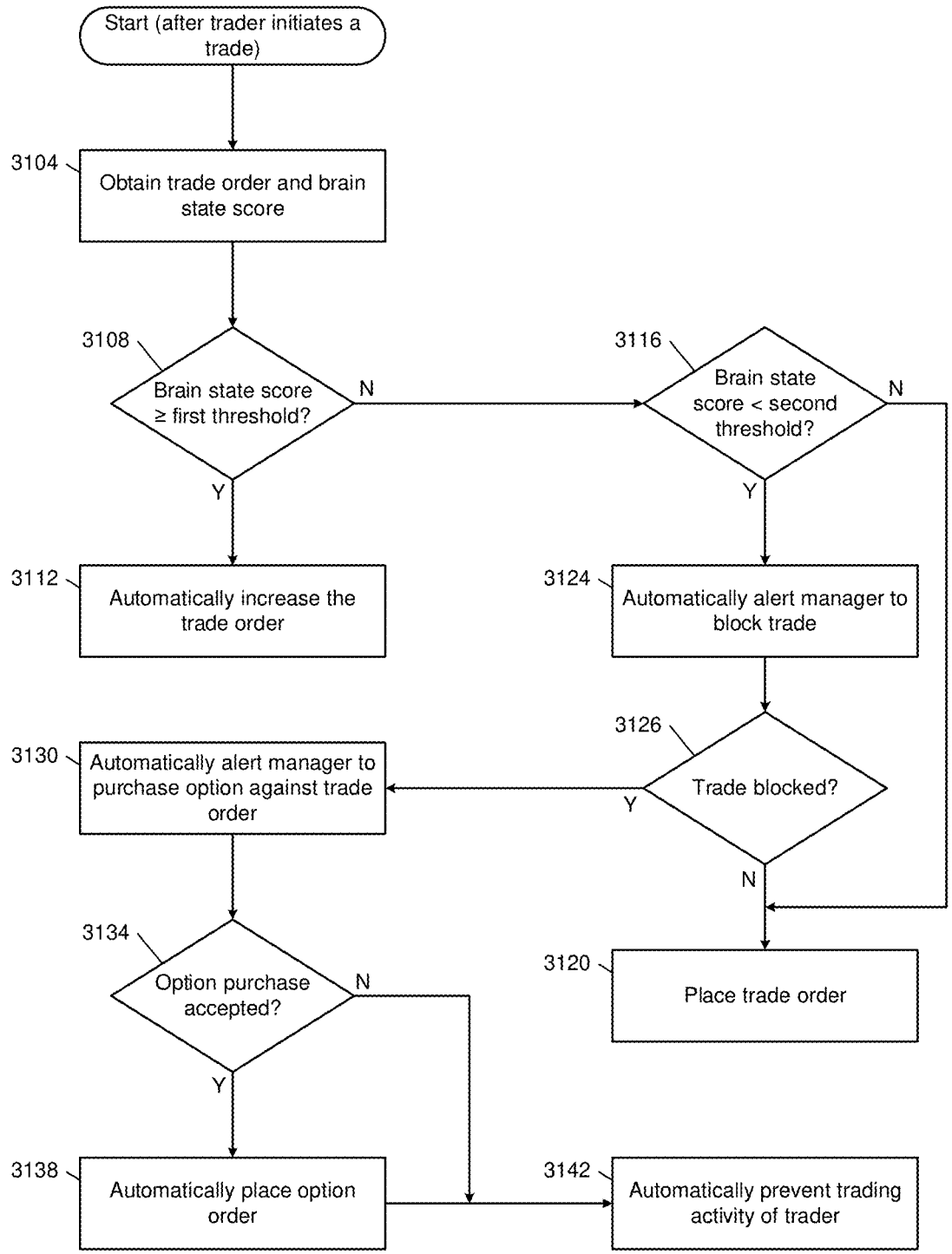
FIG. 76 is a flowchart of an example method of automatically augmenting or preventing trades based on a trader's brain state.

FIG. 76 is a flowchart of an example method of automatically augmenting or preventing trades based on a trader's brain state. As previously described, the NEPAS 100 and/or the trading system 900 may analyze the trader's brain state in real time and assign a profitability prediction based on the trade.

In various implementations, the trader's brain state score may be indicative of a likelihood of the trade being profitable. The method begins at 3104 after the trader initiates a trade. At 3104, the NEPAS 100 and/or the trading platform 900 obtains the trade order and the brain state score. Control proceeds to 3108. At 3108, the NEPAS 100 and/or the trading platform 900 determines whether the brain state score meets or exceeds a first threshold. If at 3108 the answer is yes, control proceeds to 3112, where the NEPAS 100 and/or the trading platform 900 automatically increases the trader order and places the increased trade order. Otherwise, if at 3108 the answer is no, control proceeds to 3116.

At 3116, the NEPAS 100 and/or the trading platform 900 determines whether the brain state scores is less than a second threshold. In various implementations, the second threshold may be the same as the first threshold. In various implementations, the second threshold may be different from the first threshold. If at 3116 the answer is no, control proceeds to 3120, where the NEPAS 100 and/or the trading platform 900 places the trade order. If at 3116 the answer is yes, control proceeds to 3124, where the NEPAS 100 and/or the trading platform 900 automatically generates and sends an alert to a manager at a user device. The alert may be generated on a graphical user interface and output to a screen of the user device. In various implementations, the alert may prompt the manager to block the trade. Control proceeds to 3126. If at 3126 the manager selects a user interface element to allow the trade to proceed, control proceeds to 3120. Otherwise, if at 3126 the manager selects a user interface element to block the trade, control proceeds to 3130.

At 3130, the NEPAS 100 and/or the trading platform 900 automatically generates and sends an alert to the manager at the user device. The alert may be generated on the graphical user interface and output to the screen of the user device. In various implementations, the alert may prompt the manager to purchase an option against the trade order. In various implementations, the option may be a put option or a call option for the financial instrument specified in the trade order. Control proceeds to 3134. If at 3134 the manager selects a user interface element to purchase the option, control proceeds to 3138. Otherwise, if at 3134 the manager selects a user interface element to reject the purchase of the option, control proceeds to 3142. At 3138, the NEPAS 100 and/or the trading platform 900 automatically places an order for the option. At 3142, the NEPAS 100 and/or the trading platform 900 automatically prevents trading activity of the trader. In various implementations, the NEPAS 100 and/or the trading platform 900 may automatically reject the trade order. In various implementations, the NEPAS 100 and/or the trading platform 900 may automatically prevent the trader from engaging in any trading activity for a specified duration.

In various implementations, the NEPAS 100 and/or the trading platform 900 may automatically reject the trade order, prevent the trader from engaging in any trading activity for the specified duration, or place the order for the option without intervention from the manager at 3124, 3126, 3130, and 3134.

Integrated Closed-Loop Feedback Platform

Figure 77:
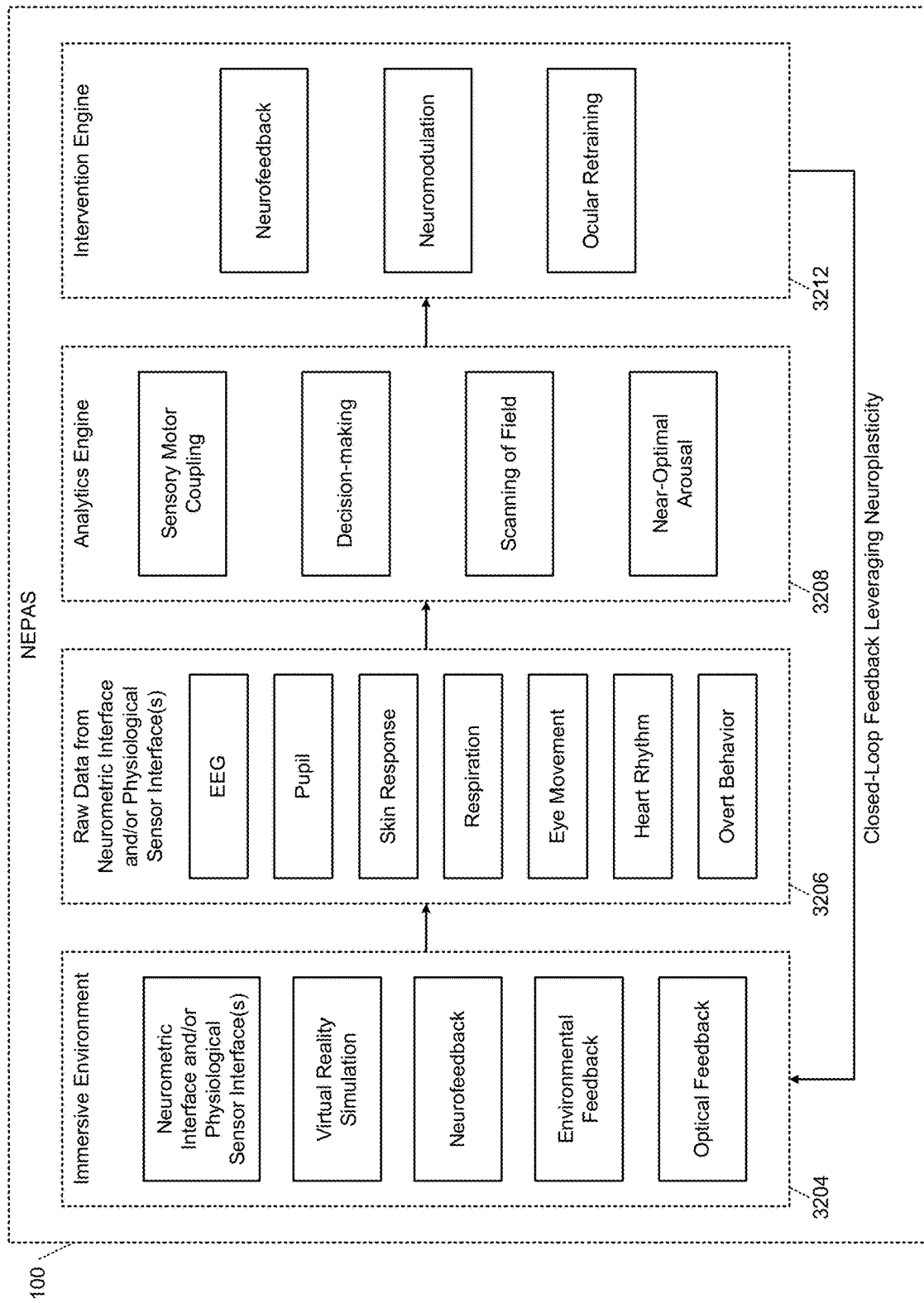
FIG. 77 is a functional block diagram of examples of a configuration of the NEPAS.
Figure 78:
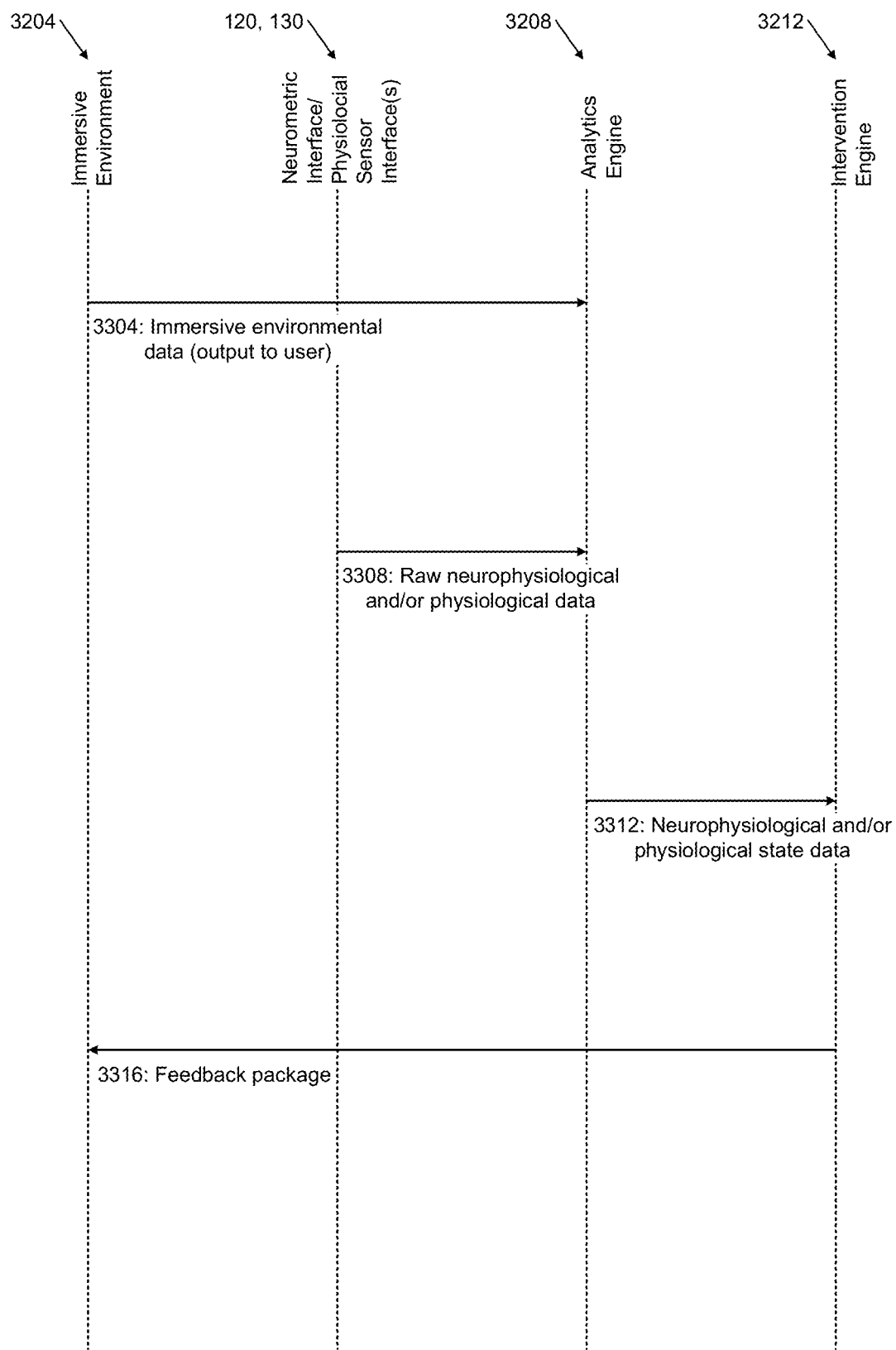
FIG. 78 is a message sequence chart illustrating examples of interactions of the configuration of the NEPAS shown in FIG. 77.

FIG. 77 is a functional block diagram of examples of a configuration of the NEPAS 100. FIG. 78 is a message sequence chart illustrating examples of interactions of the configuration of the NEPAS 100 shown in FIG. 77. As illustrated in FIG. 77, some examples of the NEPAS 100 may include components for generating an immersive environment 3204 for a user, raw data from one or more neurometric interfaces and/or one or more physiological sensor interfaces 3206, an analytics engine 3208, and an intervention engine 3212. In various implementations, the immersive environment 3204 may include one or more virtual reality headsets such those previously described in this specification, neurofeedback devices, and/or optical feedback devices, one or more neurofeedback devices, one or more environmental feedback devices, one or more optical feedback devices, and/or one or more neurometric interfaces and/or physiological sensor interfaces such as neurometric interfaces 120 and/or physiological sensor interfaces 130. In various implementations, the one or more neurometric interfaces 120 and/or one or more physiological sensor interfaces 130 may collect raw data 3206, such as EEG data, pupil data, skin response data, respiration data, eye movement data, heart rhythm data, and/or data related to overt (e.g., physical) behavior.

In various implementations, the analytics engine 3208 may analyze the raw data 3206 collected by the neurometric interfaces 120 and/or the physiological sensor interface 130 to generate raw neurophysiological and/or raw physiological data related to the neurophysiological state and/or the physiological state of the user. In various implementations, the analytics engine 3208 may generate neurophysiological state data and/or physiological state data based on the raw neurophysiological and/or raw physiological data, such as data related to the sensory motor coupling, decision making, scanning of field, and/or near-optimal arousal levels of the user. In various implementations, the data—such as the neurophysiological state data and/or the physiological state data—generated by the analytics engine 3208 may be used by the intervention engine 3212 to generate neurofeedback data, neuromodulation data, and/or ocular retraining data.

FIG. 78 captures some examples of interactions that may occur between components of the NEPAS 100 as configured in FIG. 77. At 3304, the immersive environment 3204 may send a data payload indicative of the immersive environment being output to the user to the analytics engine 3208. At 3308, the one or more neurometric interfaces 120 and/or the one or more physiological sensor interfaces 130 may send raw neurophysiological and/or raw physiological data to the analytics engine 3208. At 3312, the analytics engine 3208 provides the neurophysiological state data and/or the physiological state data to the intervention engine 3212. At 3316, the intervention engine 3212 packages the generated neurofeedback data, neuromodulation data, and/or ocular retraining data as a feedback package and sends the feedback package to the immersive environment 3204. Based on the feedback package, the immersive environment 3204 can generate and provide environmental feedback such as visual, optical, and/or sensory feedback—and/or neurofeedback to the user.

Examples of the NEPAS 100 illustrated in FIGS. 77 and 78 may be used to: enhance the spatial awareness capabilities of an athlete—such as a quarterback, point guard, or midfielder; train athletes to perform under intense pressure; notify a distance athlete—such as by using brain scans—that they are over-training and need to rest; train young athletes—such as by using neurofeedback—towards the optimal brain state in their sport and position; identify expert brain signatures for different sports and positions (e.g., identify brain signatures associated with a "world class" striker); develop an understanding of what happens to an athlete's brain over the course of a long season and/or career to identify and extend peak performance periods; and/or use predictive analytics to select specific athletes and avoid costly mistakes.

Sports Organization Use Case

A system according to the present disclosure may assist an organization, such as a sports team, to achieve a status where, for example, one or more of the following will be integrated into the organization's daily routine:

Neuro-Enhanced Practice: for example, in the context of baseball, players take batting or pitching practice in a smart batting cage/bullpen and receive real-time feedback on their neural state in between pitches and/or after a session Pre-Game Cognitive Warmups: players have the option to receive neuromodulation (in, for example, the clubhouse) before game time with a suite of programs to help enter an optimal mental state (e.g., quiet, engage, arouse)

Neuro-metric Decision Making: coaches receive automated reports of players' neuro-metrics that include slump forecasts and other health indicators to assist in establishing, in the context of baseball, lineups and pitching rotations Player-Specific Neuro Development: players each have a personalized database of their neuro-metrics that allows them to monitor relevant trends (e.g., fatigue, pressure, slumps), supporting personal awareness and development.

In various implementations, this technology will harness neurofeedback and neuroplasticity to train hitters to more consistently achieve an optimal brain state that results in peak batting performance, particularly during high-pressure situations. Over time, players will begin to recognize what an optimal brain state feels like in the brain and body, and their brain will learn to reliably access this state under pressure. This transference is an integral part of neurofeedback training. For example, players may observe measurable improvements in, for example, launch angle, bat path, exit velocity, and batting average. In addition, managers, coaches, trainers, and analysts may be able to view real-time neuro-metrics.

In various implementations, a software suite enabled by the NEPAS 100 offers multiple pre-game neuromodulation options to ensure players are in an optimal mental state before they play. Each participating player would have a customized program developed to their specific needs. A player may observe measurable improvements in:

Calming the Mind—via targeted reductions in prefrontal cortex activity, helping players to enter the zone (flow state) prior to game time Overcoming the "Yips"—via identification of and reduction in a "fight or flight" brain-state prior to taking the field Motor Priming—via priming of the motor and motor planning systems of hitters and fielders to improve their reaction time Situational Visualization—this will allow players to repeatedly visualize important scenarios ahead of time while maintaining a calm physiology (akin to flooding or desensitization therapy)

Applications enabled by the NEPAS 100 can exploit the predictive power of neuro-analytics to help management predict player performance trends risks earlier than conventional performance metrics do. With these analytics, management will be able to optimize the roster via:

Player Development: neuro-metrics can be also used over time to train models to recognize untapped potential in ways that can't be detected behaviorally Slump Prediction: knowing the probability of player X entering a slump today Injury Prevention: knowing the probability of player Y sustaining a fatigue-related injury in the very near term Lineup Optimization: constructing the optimal lineup for that day. Note that neuro-metrics can easily be integrated into conventional lineup optimization tools Load Management: optimizing rest days for players and determining when to sit a player due their neuro-metrics being sub-optimal In various implementations, the NEPAS 100 may be used for a sports team, such as a baseball team. In one example, an implementation for a baseball team includes three phases: phase 1, a pilot study (in various implementations, during the off-season); phase 2, a beta testing period spanning a 12-month interval following the pilot study; and phase 3, program deployment following the beta testing period.

For example, phase 1 and phase 2 may occupy a fixed period of time, such as 6 months for phase 1 and 12 months for phase 2. In various implementations, the length of one or both phases maybe dynamic, for example with end conditions determined by the NEPAS 100—a phase may then be complete once the end conditions are considered satisfied by an arbiter, such as the NEPAS 100.

In phase 1, brain data may be collected and analyzed from a set of players, such as ten minor league players. In various implementations, the collection may occur over a thirty-day period, including while they are in a batting cage, to demonstrate and statistically validate the efficacy of the system. For example only, the selected players may include a subset (such as five) who have a batting average (BA) greater than 0.300 and another subset (such as five) who have a batting average (BA) lower than 0.250. The measurements may include, for example, a daily brief brain assessment prior to the player's entry into the batting cage and then measurements spanning 15-20 minutes in the batting cage.

Phase 1 may include using machine learning techniques in the NEPAS 100 to, for example, (i) identify brainwave "signatures" in each of the players that correlate with, and predict, relevant statistics associated with quality at-bats, (ii) analyze data over time for individual players to identify differences between players based on their skill levels, and/or (iii) validate key brain metrics that predict batting success, setting the foundation for future neurofeedback, neuromodulation, and assessment tools.

Phase 1 may include producing a report that includes, for example (i) identified brain "signatures" that correlate with relevant batting statistics along with the statistical power of our findings, (ii) clear visibility into the potential value that a proprietary neuroperformance program could offer the team, and/or (iii) a roadmap for a comprehensive program that broadly impacts player identification, development, and health and safety.

Phase 2 may include an expansion study conducted during the off-season, and may leverage insights from phase 1 by training models in the NEPAS 100. Phase 2 may involve pilot testing neurofeedback and neuromodulation systems that train players to get into an optimal performance brain state. This may be referred to as a "clear-the-mechanism" neuromodulation system that quiets and focuses the mind before games. The study may include a set of players that may partially overlap, fully overlap, or not overlap with the set of players chosen for phase 1. For example, the selected players may include a subset (such as five) who have a batting average (BA) greater than 0.300 and another subset (such as five) who have a batting average (BA) lower than 0.250. The measurements may include, for example, daily measurements spanning 30-60 minutes in the batting cage.

Building on phase 1 work, phase 2 may include the use of virtual reality (VR) environments, neurofeedback, and neuromodulation to, for example, (i) train players via neurofeedback in a batting cage to "get into" brain states associated with batting success (for example, these states may have been identified in phase 1) in real-time, (ii) pilot test neuromodulation technology that quiets pre-frontal cortical activity under game stress, and (iii) develop the team's capacity to measure brainwave signatures in real-time in a state-of-the-art immersive VR batting environment. Phase 2 may include producing a report that includes, for example, (i) success metrics associated with the applicable beta tests, including but not limited to, time spent in desired brain states at the desired moment, associated batting metrics, and the statistical power of the study findings; and (ii) updated roadmap for a comprehensive program that broadly impacts player identification, development, and health and safety.

Phase 3 may include (i) rollout of neurofeedback and neuromodulation training to improve players' reaction time, accuracy, and concentration and (ii) rollout of data analytics system to assess players and monitor changes in cognitive performance and health over time. Although research and development may continue in phase 3, a shift may be made to an operational focus, working in conjunction with the team to roll out a neuroperformance program throughout the organization, which may be performed in stages. The operational focus may be based on an ongoing return on investment (ROI) analysis.

The NEPAS 100 may track ongoing program metrics including, for example, baseline and ongoing cognitive health assessments, neurofeedback/neuromodulation performance-related success metrics, player and overall team cognitive health, ROI, and/or player evaluations comparisons over time.

Conclusion

The background description is presented simply for context, and is not necessarily well-understood, routine, or conventional. Further, the background description is not an admission of what does or does not qualify as prior art. In fact, some or all of the background description may be work attributable to the named inventors that is otherwise unknown in the art. Physical (such as spatial and/or electrical) and functional relationships between elements (for example, between modules, circuit elements, semiconductor layers, etc.) are described using various terms. Unless explicitly described as being "direct," when a relationship between first and second elements is described, that relationship encompasses both (i) a direct relationship where no other intervening elements are present between the first and second elements and (ii) an indirect relationship where one or more intervening elements are present between the first and second elements. Example relationship terms include "adjoining," "transmitting," "receiving," "connected," "engaged," "coupled," "adjacent," "next to," "on top of,"

"above," "below," "abutting," and "disposed." The detailed description includes specific examples for illustration only, and not to limit the disclosure or its applicability. The examples are not intended to be an exhaustive list, but instead simply demonstrate possession by the inventors of the full scope of the currently presented and envisioned future claims. Variations, combinations, and equivalents of the examples are within the scope of the disclosure. No language in the specification should be construed as indicating that any non-claimed element is essential or critical to the practice of the disclosure. The term "exemplary" simply means "example" and does not indicate a best or preferred example. The term "set" does not necessarily exclude the empty set—in other words, in some circumstances a "set" may have zero elements. The term "non-empty set" may be used to indicate exclusion of the empty set—that is, a non-empty set must have one or more elements. The term "subset" does not necessarily require a proper subset. In other words, a "subset" of a first set may be coextensive with (equal to) the first set. Further, the term "subset" does not necessarily exclude the empty set in some circumstances a "subset" may have zero elements. The phrase "at least one of A, B, and C" should be construed to mean a logical (A OR B OR C), using a non-exclusive logical OR, and should not be construed to mean "at least one of A, at least one of B, and at least one of C." The use of the terms "a," "an," "the," and similar referents in the context of describing the disclosure and claims encompasses both the singular and the plural, unless contradicted explicitly or by context. Unless otherwise specified, the terms "comprising," "having," "with," "including," and "containing," and their variants, are open-ended terms, meaning "including, but not limited to." Each publication referenced in this disclosure, including foreign and domestic patent applications and patents, is hereby incorporated by reference in its entirety. Although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of multiple embodiments remain within the scope of this disclosure. One or more elements (for example, steps within a method, instructions, actions, or operations) may be executed in a different order (and/or concurrently) without altering the principles of the present disclosure. Unless technically infeasible, elements described as being in series may be implemented partially or fully in parallel. Similarly, unless technically infeasible, elements described as being in parallel may be implemented partially or fully in series. While the disclosure describes structures corresponding to claimed elements, those elements do not necessarily invoke a means plus function interpretation unless they explicitly use the signifier "means for."

While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. In the drawings, reference numbers may be reused to identify identical elements or may simply identify elements that implement similar functionality. Numbering or other labeling of instructions or method steps is done for convenient reference, not to indicate a fixed order. In the drawings, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. As just one example, for information sent from element A to element B, element B may send requests and/or acknowledgements to element A. Unless otherwise indicated, recitations of ranges of values are merely intended to serve as a shorthand way of referring individually to each separate value falling within the range, and each separate value is hereby incorporated into the specification as if it were individually recited.

A special-purpose system includes hardware and/or software and may be described in terms of an apparatus, a method, or a computer-readable medium. In various embodiments, functionality may be apportioned differently between software and hardware. For example, some functionality may be implemented by hardware in one embodiment and by software in another embodiment. Further, software may be encoded by hardware structures, and hardware may be defined by software, such as in software-defined networking or software-defined radio. In this application, including the claims, the term module refers to a special-purpose system. The module may be implemented by one or more special-purpose systems. The one or more special-purpose systems may also implement some or all of the other modules. In this application, including the claims, the term module may be replaced with the terms controller or circuit. In this application, including the claims, the term platform refers to one or more modules that offer a set of functions. In this application, including the claims, the term system may be used interchangeably with module or with the term special-purpose system. The special-purpose system may be directed or controlled by an operator. The special-purpose system may be hosted by one or more of assets owned by the operator, assets leased by the operator, and third-party assets. The assets may be referred to as a private, community, or hybrid cloud computing network or cloud computing environment. For example, the special-purpose system may be partially or fully hosted by a third party offering software as a service (SaaS), platform as a service (PaaS), and/or infrastructure as a service (IaaS). The special-purpose system may be implemented using agile development and operations (DevOps) principles. In embodiments, some or all of the special-purpose system may be implemented in a multiple-environment architecture. For example, the multiple environments may include one or more production environments, one or more integration environments, one or more development environments, etc.

A special-purpose system may be partially or fully implemented using or by a mobile device. Examples of mobile devices include navigation devices, cell phones, smart phones, mobile phones, mobile personal digital assistants, palmtops, netbooks, pagers, electronic book readers, tablets, music players, etc. A special-purpose system may be partially or fully implemented using or by a network device. Examples of network devices include switches, routers, firewalls, gateways, hubs, base stations, access points, repeaters, head-ends, user equipment, cell sites, antennas, towers, etc. A special-purpose system may be partially or fully implemented using a computer having a variety of form factors and other characteristics. For example, the computer may be characterized as a personal computer, as a server, etc. The computer may be portable, as in the case of a laptop, netbook, etc. The computer may or may not have any output device, such as a monitor, line printer, liquid crystal display (LCD), light emitting diodes (LEDs), etc. The computer may or may not have any input device, such as a keyboard, mouse, touchpad, trackpad, computer vision system, barcode scanner, button array, etc. The computer may run a general-purpose operating system, such as the WINDOWS operating system from Microsoft Corporation, the MACOS operating system from Apple, Inc., or a variant of the LINUX operating system. Examples of servers include a file server, print server, domain server, internet server, intranet server, cloud server, infrastructure-as-a-service server, platform-as-a-service server, web server, secondary server, host server, distributed server, failover server, and backup server.

The term hardware encompasses components such as processing hardware, storage hardware, networking hardware, and other general-purpose and special-purpose components. Note that these are not mutually-exclusive categories. For example, processing hardware may integrate storage hardware and vice versa. Examples of a component are integrated circuits (ICs), application specific integrated circuit (ASICs), digital circuit elements, analog circuit elements, combinational logic circuits, gate arrays such as field programmable gate arrays (FPGAs), digital signal processors (DSPs), complex programmable logic devices (CPLDs), etc. Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an artificial intelligence (AI) system-on-chip, a video processing system-on-chip, an organ-on-chip, a quantum algorithm system-on-chip, etc. The hardware may integrate and/or receive signals from sensors. The sensors may allow observation and measurement of conditions including temperature, pressure, wear, light, humidity, deformation, expansion, contraction, deflection, bending, stress, strain, load-bearing, shrinkage, power, energy, mass, location, temperature, humidity, pressure, viscosity, liquid flow, chemical/gas presence, sound, and air quality. A sensor may include image and/or video capture in visible and/or non-visible (such as thermal) wavelengths, such as a charge-coupled device (CCD) or complementary metal-oxide semiconductor (CMOS) sensor.

Examples of processing hardware include a central processing unit (CPU), a graphics processing unit (GPU), an approximate computing processor, a quantum computing processor, a parallel computing processor, a neural network processor, a signal processor, a digital processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an artificial intelligence (AI) co-processor.

The processor may enable execution of multiple threads. These multiple threads may correspond to different programs. In various embodiments, a single program may be implemented as multiple threads by the programmer or may be decomposed into multiple threads by the processing hardware. The threads may be executed simultaneously to enhance the performance of the processor and to facilitate simultaneous operations of the application. A processor may be implemented as a packaged semiconductor die. The die includes one or more processing cores and may include additional functional blocks, such as cache. In various embodiments, the processor may be implemented by multiple dies, which may be combined in a single package or packaged separately.

The networking hardware may include one or more interface circuits. In some examples, the interface circuit(s) may implement wired or wireless interfaces that connect, directly or indirectly, to one or more networks. Examples of networks include a cellular network, a local area network (LAN), a wireless personal area network (WPAN), a metropolitan area network (MAN), and/or a wide area network (WAN). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs). Examples of cellular networks include GSM, GPRS, 3G, 4G, 5G, LTE, and EVDO. The cellular network may be implemented using frequency division multiple access (FDMA) network or code division multiple access (CDMA) network. Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN include IEEE Standard 802.15.4, including the ZIGBEE standard from the ZigBee Alliance. Further examples of a WPAN include the BLUETOOTH wireless networking standard, including Core Specification versions 3.0, 4.0, 4.1, 4.2, 5.0, and 5.1 from the Bluetooth Special Interest Group (SIG). A WAN may also be referred to as a distributed communications system (DCS). One example of a WAN is the internet.

Storage hardware is or includes a computer-readable medium. The term computer-readable medium, as used in this disclosure, encompasses both nonvolatile storage and volatile storage, such as dynamic random access memory (DRAM). The term computer-readable medium only excludes transitory electrical or electromagnetic signals propagating through a medium (such as on a carrier wave). A computer-readable medium in this disclosure is therefore non-transitory, and may also be considered to be tangible.

Examples of storage implemented by the storage hardware include a database (such as a relational database or a NoSQL database), a data store, a data lake, a column store, a data warehouse. Example of storage hardware include nonvolatile memory devices, volatile memory devices, magnetic storage media, a storage area network (SAN), network-attached storage (NAS), optical storage media, printed media (such as bar codes and magnetic ink), and paper media (such as punch cards and paper tape). The storage hardware may include cache memory, which may be collocated with or integrated with processing hardware. Storage hardware may have read-only, write-once, or read/write properties. Storage hardware may be random access or sequential access. Storage hardware may be location-addressable, file-addressable, and/or content-addressable. Example of nonvolatile memory devices include flash memory (including NAND and NOR technologies), solid state drives (SSDs), an erasable programmable read-only memory device such as an electrically erasable programmable read-only memory (EEPROM) device, and a mask read-only memory device (ROM). Example of volatile memory devices include processor registers and random access memory (RAM), such as static RAM (SRAM), dynamic RAM (DRAM), synchronous DRAM (SDRAM), synchronous graphics RAM (SGRAM), and video RAM (VRAM). Example of magnetic storage media include analog magnetic tape, digital magnetic tape, and rotating hard disk drive (HDDs). Examples of optical storage media include a CD (such as a CD-R, CD-RW, or CD-ROM), a DVD, a Blu-ray disc, and an Ultra HD Blu-ray disc. Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether. Some or all features of hardware may be defined using a language for hardware description, such as IEEE Standard 1364-2005 (commonly called "Verilog") and IEEE Standard 1076-2008 (commonly called "VHDL"). The hardware description language may be used to manufacture and/or program hardware. A special-purpose system may be distributed across multiple different software and hardware entities. Communication within a special-purpose system and between special-purpose systems may be performed using networking hardware. The distribution may vary across embodiments and may vary over time. For example, the distribution may vary based on demand, with additional hardware and/or software entities invoked to handle higher demand. In various embodiments, a load balancer may direct requests to one of multiple instantiations of the special purpose system. The hardware and/or software entities may be physically distinct and/or may share some hardware and/or software, such as in a virtualized environment. Multiple hardware entities may be referred to as a server rack, server farm, data center, etc.

Software includes instructions that are machine-readable and/or executable. Instructions may be logically grouped into programs, codes, methods, steps, actions, routines, functions, libraries, objects, classes, etc. Software may be stored by storage hardware or encoded in other hardware. Software encompasses (i) descriptive text to be parsed, such as HTML (hypertext markup language), XML (extensible markup language), and JSON (JavaScript Object Notation), (ii) assembly code, (iii) object code generated from source code by a compiler, (iv) source code for execution by an interpreter, (v) bytecode, (vi) source code for compilation and execution by a just-in-time compiler, etc. As examples only, source code may be written using syntax from languages including C, C++, JavaScript, Java, Python, R, etc. Software also includes data. However, data and instructions are not mutually-exclusive categories. In various embodiments, the instructions may be used as data in one or more operations. As another example, instructions may be derived from data. The functional blocks and flowchart elements in this disclosure serve as software specifications, which can be translated into software by the routine work of a skilled technician or programmer. Software may include and/or rely on firmware, processor microcode, an operating system (OS), a basic input/output system (BIOS), application programming interfaces (APIs), libraries such as dynamic-link libraries (DLLs), device drivers, hypervisors, user applications, background services, background applications, etc. Software includes native applications and web applications. For example, a web application may be served to a device through a browser using hypertext markup language 5th revision (HTML5). Software may include artificial intelligence systems, which may include machine learning or other computational intelligence. For example, artificial intelligence may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs. Examples of the models include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformer (GPT). Training a machine-learning model may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), computer vision (CV), classification, image recognition, etc.

Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. In a client-server model, some of the software executes on first hardware identified functionally as a server, while other of the software executes on second hardware identified functionally as a client. The identity of the client and server is not fixed: for some functionality, the first hardware may act as the server while for other functionality, the first hardware may act as the client. In different embodiments and in different scenarios, functionality may be shifted between the client and the server. In one dynamic example, some functionality normally performed by the second hardware is shifted to the first hardware when the second hardware has less capability. In various embodiments, the term "local" may be used in place of "client," and the term "remote" may be used in place of "server." Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model. Some or all of the software may be arranged logically into layers. In a layered architecture, a second layer may be logically placed between a first layer and a third layer. The first layer and the third layer would then generally interact with the second layer and not with each other. In various embodiments, this is not strictly enforced—that is, some direct communication may occur between the first and third layers.

The invention claimed is:

1. A method comprising:
generating a trading performance model for a trading activity involving a set of trading decisions by a set of traders, wherein the trading performance model includes a set of input data sets, a set of data processing workflows operating on the set of input data sets, and a set of trading decision outputs resulting from interaction of the set of traders with a user interface representing the trading performance model;
measuring, using a set of neurophysiological sensors equipped on the set of traders, a set of brain states of the set of traders while the set of traders makes the set of trading decisions;
generating a brain state model representing the set of brain states of the set of traders;
assessing quality of the set of trading decisions by measuring a set of quantitative outcomes resulting from the set of trading decisions;
determining a preferred pattern of trader brain state sequences by correlating the brain state model to the set of quantitative outcomes to identify brain states that correspond to positive quantitative outcomes, wherein the preferred pattern of trader brain state sequences is determined based on the identified brain states; and
modifying a subsequent trading activity based on the preferred pattern of trader brain state sequences, wherein modifying the subsequent trading activity includes generating a trading simulation environment that simulates the trading activity.

2. The method of claim 1 wherein assessing the quality of the set of trading decision outputs includes rating the set of trading decisions based on alignment of the set of trading decisions to a trade decision-making model.

3. The method of claim 1 wherein assessing the quality of the set of trading decision outputs includes a set of self-assessments by the set of traders of the set of trading decisions.

4. The method of claim 1 wherein assessing the quality of the set of trading decision outputs includes a set of expert ratings of the set of trading decisions.

5. The method of claim 1 wherein modifying the subsequent trading activity includes mirroring decisions of a selected subset of the set of traders in a different set of trading activities.

6. The method of claim 1 wherein modifying the subsequent trading activity includes preferentially executing trades recommended by traders during periods when the traders are determined to be manifesting brain states that correspond to the preferred pattern of brain state sequences.

7. The method of claim 1 wherein modifying the subsequent trading activity includes undertaking a set of actions to induce the preferred pattern of brain state sequences before or during performance of trading by the set of traders.

8. The method of claim 1 wherein modifying the subsequent trading activity includes training, using the trading simulation environment, the set of traders to induce the preferred pattern of brain states.

9. The method of claim 1 wherein modifying the subsequent trading activity includes training, using the trading simulation environment, the set of traders to recognize the preferred pattern of brain states.

10. A method comprising:
generating a trading performance model for a trading activity involving a set of trading decisions by a set of traders, wherein the trading performance model includes a set of input data sets, a set of data processing workflows operating on the set of input data sets, and a set of trading decision outputs resulting from interaction of the set of traders with a user interface representing the trading performance model;
measuring, using a set of neurophysiological sensors equipped on the set of traders, a set of brain states of the set of traders while the set of traders makes the set of trading decisions;
generating a brain state model representing the set of brain states of the set of traders;
assessing quality of the set of trading decisions by measuring a set of quantitative outcomes resulting from the set of trading decisions;
based on assessing the quality of the set of trading decisions, determining a preferred pattern of trader brain state sequences by correlating the brain state model to the set of quantitative outcomes to identify brain states that correspond to positive quantitative outcomes, wherein the preferred pattern of trader brain state sequences is determined based on the identified brain states; and
modifying a subsequent trading activity based on determining the preferred pattern of trader brain state sequences,
wherein modifying the subsequent trading activity includes:
iteratively adjusting trading guidance to the set of traders,
measuring resulting patterns of brain states across a set of trading sessions, and
generating, based on the resulting patterns of brain states, an improved set of trading instructions, an improved model of preferred brain state patterns for the trading activity, and a trading simulation environment that simulates the trading activity.

11. The method of claim 10 wherein assessing the quality of the set of trading decision outputs includes rating the set of trading decisions based on alignment of the set of trading decisions to a trade decision-making model.

12. The method of claim 10 wherein assessing the quality of the set of trading decision outputs includes a set of self-assessments by the set of traders of the set of trading decisions.

13. The method of claim 10 wherein assessing the quality of the set of trading decision outputs includes a set of expert ratings of the set of trading decisions.

14. The method of claim 10 wherein modifying the subsequent trading activity includes mirroring decisions of a selected subset of the set of traders in a different set of trading activities.

15. The method of claim 10 wherein modifying the subsequent trading activity includes preferentially executing trades recommended by traders during periods when the traders are determined to be manifesting brain states that correspond to the preferred pattern of trader brain state sequences.

16. The method of claim 10 wherein modifying the subsequent trading activity includes undertaking a set of actions to induce the preferred pattern of trader brain state sequences before or during performance of trading by the set of traders.

17. The method of claim 10 wherein modifying the subsequent trading activity includes training, using the trading simulation environment, the set of traders to induce the preferred pattern of trader brain state sequences.

18. The method of claim 10 wherein modifying the subsequent trading activity includes training, using the trading simulation environment, the set of traders to recognize the preferred pattern of trader brain state sequences.

\* \* \* \* \*